(12) United States Patent
Calhoun et al.

(10) Patent No.: US 11,897,787 B2
(45) Date of Patent: *Feb. 13, 2024

(54) ZERO DISCHARGE WATER TREATMENT APPARATUS AND METHOD

(71) Applicant: Zero Discharge, LLC, Newton Center, MA (US)

(72) Inventors: David D. Calhoun, Duxbury, MA (US); Mark D. Lorusso, Portsmouth, NH (US); R. Edward Rose, Jr., Hingham, MA (US); Ernest M. Hawkesworth, Weymouth, MA (US)

(73) Assignee: ZERO DISCHARGE, LLC, Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,202

(22) Filed: Jul. 18, 2022

(65) Prior Publication Data

US 2023/0040351 A1     Feb. 9, 2023

Related U.S. Application Data

(63) Continuation-in-part of application No. PCT/US2021/058142, filed on Nov. 4, 2021, and a
(Continued)

(51) Int. Cl.
*C02F 1/04* (2023.01)
*C02F 1/30* (2023.01)
(Continued)

(52) U.S. Cl.
CPC ............ *C02F 1/048* (2013.01); *B01D 1/30* (2013.01); *B01J 3/04* (2013.01); *B01J 3/042* (2013.01);
(Continued)

(58) Field of Classification Search
CPC .......... C02F 3/1268; C02F 1/001; C02F 9/00; C02F 1/447; C02F 1/72; C02F 1/048;
(Continued)

(56) References Cited

U.S. PATENT DOCUMENTS 3,338,663 A * 8/1967 Beecher .................... A61L 2/07
422/298
3,454,353 A * 7/1969 Anders ..................... A61L 2/24
422/26
(Continued)

FOREIGN PATENT DOCUMENTS

CZ          19149 U1 * 12/2008 ............... A61L 2/26
DE      60301126 T2 *  1/2006 ............... B01J 19/18
(Continued)

OTHER PUBLICATIONS

English Translation of Alkaloida et al patent publication HU213076B, published Feb. 1997. (Year: 1997).*
(Continued)

*Primary Examiner* — Joseph W Drodge
(74) *Attorney, Agent, or Firm* — LORUSSO & ASSOCIATES

(57) ABSTRACT

A wastewater management system includes a series of water treatment modules to treat wastewater and produce reusable and/or potable water and other beneficial byproducts of the wastewater treatment process. A pretreatment module, a filtration module, an evaporator module, an odor control module, a UV-light module, an autoclave module, a sonolysis module, an ozone module and a chlorination module are combined in multiple combinations along with holding tanks, condensers, flash tanks and other components to address water purification and reclamation needs based upon specific wastewater conditions. The system captures condensate from AC systems and rainwater from rainwater gutter systems processes the water to produce reusable
(Continued)

and/or potable water with or without re-mineralization. Any $CO_2$ produced by the water treatment system is captured and processed using naturally-occurring flora. The wastewater treatment system includes multiple closed-loop subsystems to minimize energy usage and maximize water purification and reclamation for reuse.

49 Claims, 100 Drawing Sheets

Related U.S. Application Data continuation-in-part of application No. PCT/US2021/021013, filed on Mar. 5, 2021, and a continuation-in-part of application No. 16/862,121, filed on Apr. 29, 2020, now Pat. No. 11,390,545.

(51) Int. Cl.
```
B01J 3/04      (2006.01)
B01D 1/30      (2006.01)
C02F 1/00      (2023.01)
C02F 103/00    (2006.01)
C02F 103/02    (2006.01)
```

(52) U.S. Cl.
CPC .......... *C02F 1/004* (2013.01); *C02F 1/045* (2013.01); *C02F 1/302* (2013.01); *C02F 2103/001* (2013.01); *C02F 2103/023* (2013.01); *C02F 2303/02* (2013.01)

(58) Field of Classification Search
CPC ........ C02F 2301/08; C02F 1/16; C02F 1/302; C02F 2001/007; C02F 2303/24; C02F 1/36; C02F 1/76; C02F 1/78; C02F 1/32; C02F 1/042; C02F 1/008; C02F 1/02; C02F 1/025; C02F 1/04; C02F 1/44; C02F 1/441; C02F 1/442; C02F 1/444; C02F 3/006; C02F 3/1273; C02F 11/13; C02F 11/18; C02F 2201/002; C02F 2201/005; C02F 2201/007; C02F 2209/001; C02F 2209/08; C02F 1/004; C02F 1/045; C02F 2103/001; C02F 2103/023; C02F 2303/02; Y02W 10/10; Y02W 10/37; B01D 5/006; B01D 1/0011; B01D 1/0041; B01D 1/0047; B01D 1/0052; B01D 1/0082; B01D 1/0094; B01D 1/14; B01D 1/30; B01D 5/0057; B01D 36/00; B01D 36/04; B01J 2219/0085; B01J 2219/0094; B01J 3/04; B01J 3/042; B01J 3/044; B01J 3/046; B01J 3/048; A61L 2/07

See application file for complete search history.

(56) References Cited

U.S. PATENT DOCUMENTS

| | | | | |
|---|---|---|---|---|
| 4,297,216 A | * | 10/1981 | Ishida | C02F 1/02 |
| | | | | 210/603 |
| 4,570,443 A | * | 2/1986 | Specht | B01J 3/002 |
| | | | | 60/670 |
| 4,601,885 A | * | 7/1986 | McClure | B65B 55/02 |
| | | | | 141/90 |
| 5,211,724 A | * | 5/1993 | Khan | C10L 5/46 |
| | | | | 252/373 |
| 5,264,009 A | * | 11/1993 | Khan | C10K 1/005 |
| | | | | 48/209 |
| 5,582,440 A | * | 12/1996 | Pascaru | F16L 9/22 |
| | | | | 285/423 |
| 11,390,545 B2 | * | 7/2022 | Calhoun | C02F 1/16 |
| 2003/0085219 A1 | * | 5/2003 | Toll | F26B 9/06 |
| | | | | 219/400 |
| 2006/0096918 A1 | * | 5/2006 | Semmens | B01D 63/02 |
| | | | | 210/615 |
| 2006/0163155 A1 | * | 7/2006 | Chauzy | C02F 3/1221 |
| | | | | 210/605 |
| 2007/0163958 A1 | * | 7/2007 | Newcombe | C02F 3/1268 |
| | | | | 210/257.2 |
| 2007/0209999 A1 | * | 9/2007 | Smith | G01R 1/067 |
| | | | | 210/631 |
| 2012/0097590 A1 | * | 4/2012 | Early | C02F 1/484 |
| | | | | 210/348 |
| 2012/0181229 A1 | * | 7/2012 | Shinohara | C02F 3/308 |
| | | | | 210/603 |
| 2013/0213888 A1 | * | 8/2013 | Tempest, Jr. | C02F 9/00 |
| | | | | 210/639 |
| 2015/0164108 A1 | * | 6/2015 | Logan | A23K 10/12 |
| | | | | 435/71.1 |
| 2016/0368803 A1 | * | 12/2016 | Pyrhonen | C02F 11/04 |
| 2020/0393477 A1 | * | 12/2020 | Davey | G01N 35/04 |

FOREIGN PATENT DOCUMENTS

| | | | | | |
|---|---|---|---|---|---|
| GB | 2528611 A | * | 1/2016 | | B01J 19/28 |
| HU | 177542 B | * | 11/1981 | | B29H 5/04 |
| HU | 213076 B | * | 2/1997 | | B01J 3/04 |
| JP | 2004129993 A | * | 4/2004 | | A61G 12/00 |

OTHER PUBLICATIONS

English Translation of Kazuo et al patent publication JP2004129993A, published Apr. 2004. (Year: 2004).*

English Translation of Tomaue patent publication CZ19149U1, published Dec. 2008. (Year: 2008).*

English Translation of Nuris patent publication DE60301126T2, published Jun. 2006. (Year: 2006).*

English Translation of Browdie et al publication HU-177542-B, published Nov. 1981. (Year: 1981).*

* cited by examiner

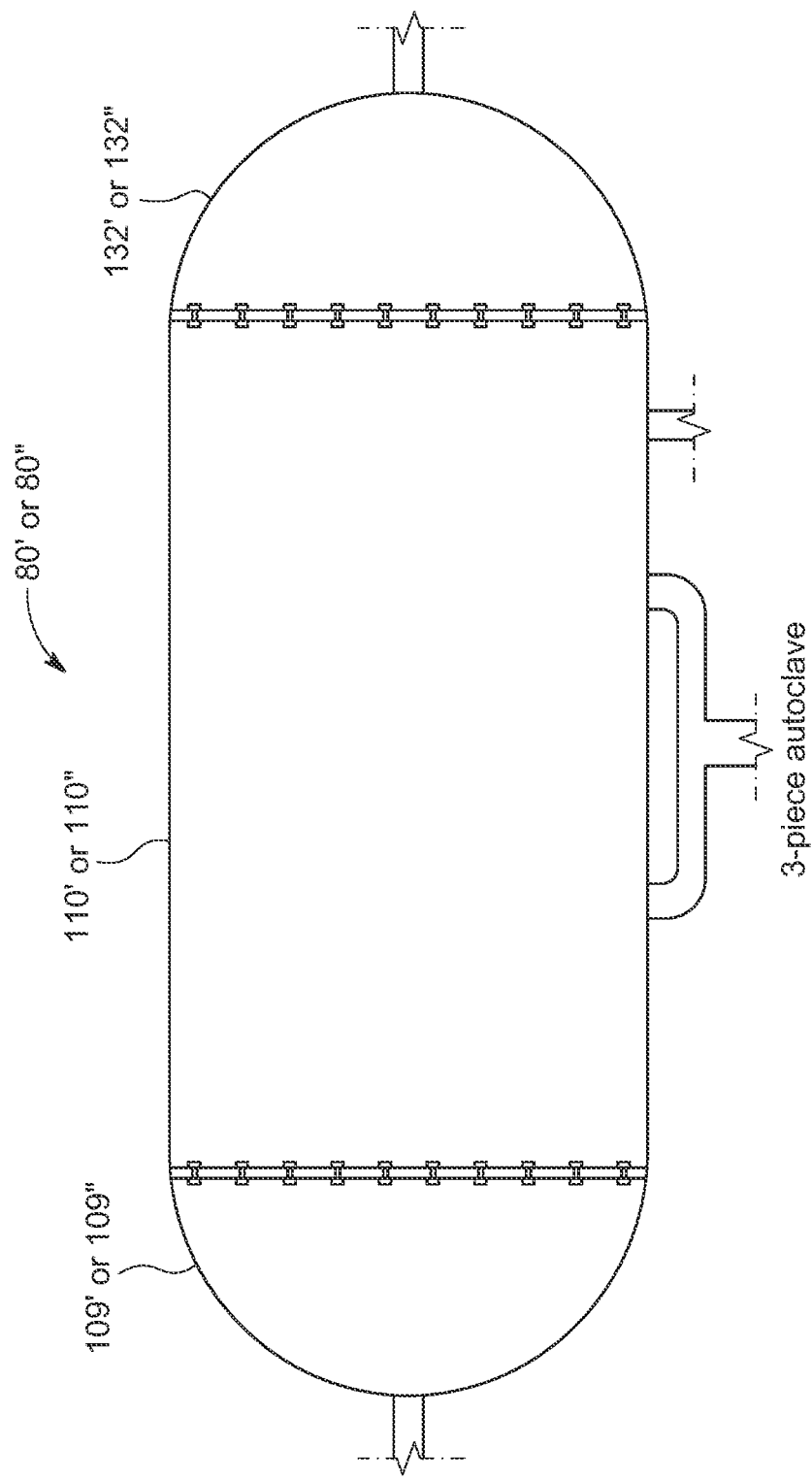

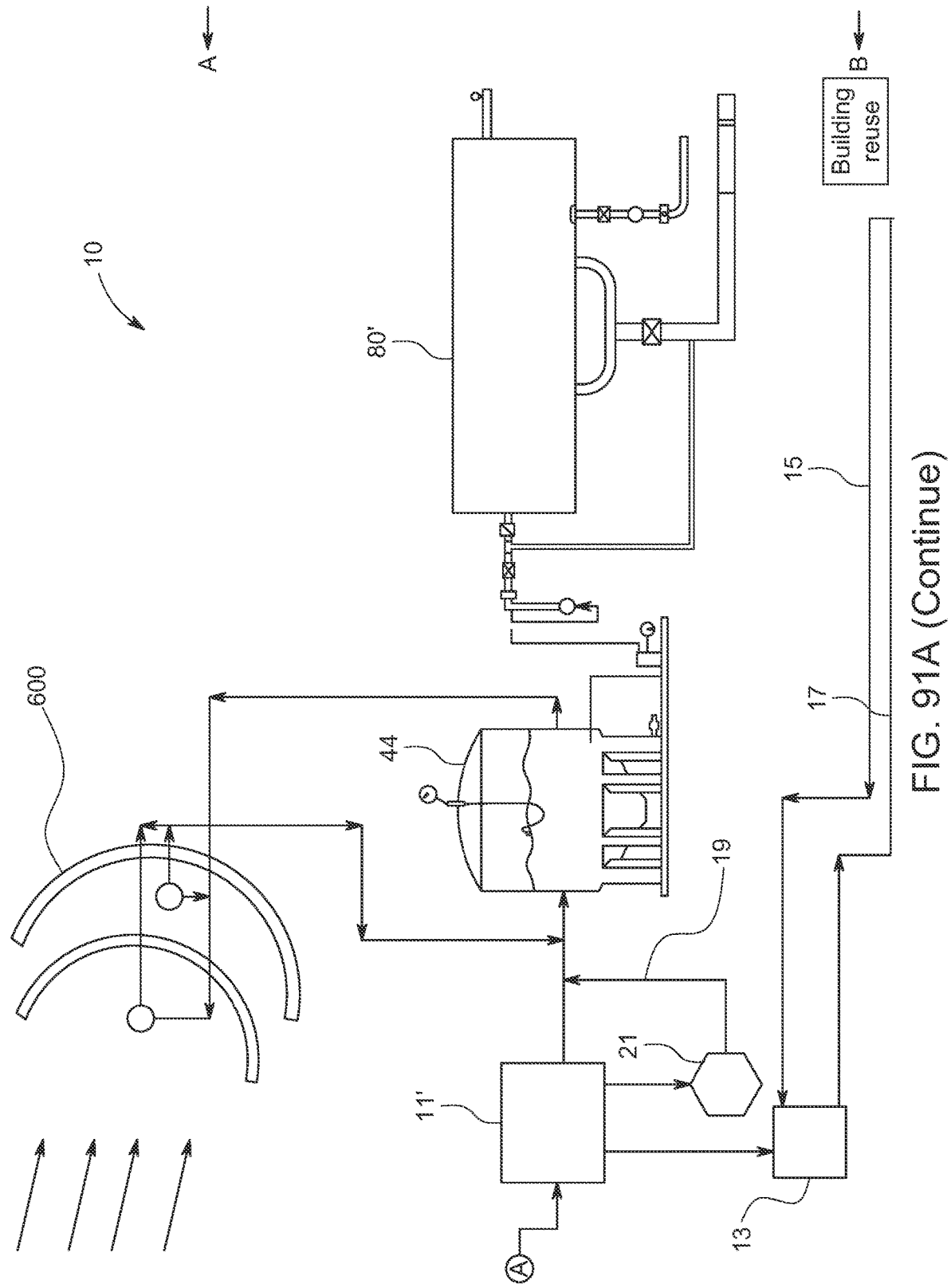
FIG. 91A (Continue)

ZERO DISCHARGE WATER TREATMENT APPARATUS AND METHOD

CROSS-REFERENCE TO RELATED APPLICATIONS

This Regular Utility Application is a Continuation-In-Part of U.S. Regular Utility Application Ser. No. 16/862,121, filed Apr. 29, 2020, now U.S. Pat. No. 11,390,545, issued Jul. 19, 2022, which claims priority to U.S. Provisional Application Ser. No. 62/839,901, filed Apr. 29, 2019. A claim of priority also is made to PCT Application No. PCT/US2021/021013, filed Mar. 5, 2021 and to PCT Application No. PCT/US2021/58142, filed Nov. 4, 2021, the contents all of which are incorporated herein by reference.

FIELD OF THE DISCLOSURE

This disclosure relates to apparatus and methods to treat wastewater in large multi-unit housing buildings and large commercial buildings. More particularly, the disclosure relates to apparatus and methods to achieve zero wastewater discharge and to reduce emission discharge from buildings having multiple water-usage apparatus and fixtures with water usage and disposal limitations. The disclosure also relates to apparatus and methods to treat contaminated wastewater/water and to reduce overall water usage via reuse for a particular building complex and/or municipality. The disclosure further relates to apparatus and methods to treat, neutralize and/or remove organic and inorganic compounds from water including drinking water.

BACKGROUND OF THE DISCLOSURE

With ever increasing housing costs, particularly those associated with single family homes, more and more developments involve condominium and apartment complexes to provide more affordable housing. Such large-scale residential real estate developments place a significant burden on municipal services. In similar fashion, commercial developments such as office buildings and medical facilities also place a significant burden on municipal services, especially water and sewer services. With large buildings, whether residential or commercial, multiple bathrooms, kitchens, laundry rooms and similar rooms have faucets, showers, toilets and clothes washers that drain wastewater to a common wastewater system. In municipal settings, wastewater flows into a common sewer line that brings sludge-laden and other-contaminated wastewater to treatment plants for processing and elimination. This is one juncture at which the methods and apparatuses disclosed herein can be used to treat a municipality's effluent discharge water as an end-treatment before permitting the "treated" wastewater effluent's release into rivers and larger bodies of water in accordance with one practice followed by wastewater treatment facilities.

The impact of new housing or commercial real estate developments on wastewater treatment plants is becoming ever more significant as any such plant has capacity limits. Each new development brings each plant closer to full capacity. For this reason, among many urban planning issues, limitations have to be placed on the number of building permits issued by a municipality. In some instances, building/construction moratoriums have to be implemented to address infrastructure limitations.

With any new building development, multiple permits have to be secured in order to proceed with construction and development. State authorities, such as departments of environmental protection and local health departments, often have to approve a construction project plan before construction begins. One criterion often considered is the impact on groundwater and water sources by, and sewer availability for, a construction project. This is less of a consideration if municipal sewer systems are used to receive effluent from a building development. If septic systems are needed, the issue is much more pronounced. Either way, wastewater produced by a housing or other building project adds either to the municipal burden and/or to the environmental burden.

A similar associated problem, the burden on water resources, is created by new developments. Water requirements for condominium complexes, multi-unit housing facilities as well as commercial properties place significant pressure on water sources. As much as modern appliances and fixtures are designed to reduce water consumption, the burden is inevitably increased with each new development. Much of the water used eventually finds its way to the sewer system that renders the water unusable. The water is processed to remove harmful contaminants at wastewater treatment plants and is discharged into large bodies of water such as the ocean, rivers or into leach fields. Although water reuse is becoming more prevalent with ever shrinking freshwater supplies, reuse is currently the exception and not the rule.

A yet further problem associated with water and wastewater is access to both. For real estate developments to be approved and permitted, there must be access to water and a means to eliminate wastewater. Many parcels of land do not have access to a sewer system. The same parcels cannot be permitted for septic-type systems due to their close proximity to critical freshwater sources, poor drainage as shown by percolates, and being in close proximity to wetlands. Absent a means to safely dispose of wastewater, such parcels of land cannot be developed.

In an initial attempt to solve some of these problems, as shown in FIG. 1, a wastewater treatment system was developed that incorporated four main components: a pretreatment system 2, a filtration system 4, a UV light system 6 and an evaporator system 8. Although this system may be effective in separating water from contaminants, the system has considerable limitations particularly with respect to water conservation, odor emissions, combustion emissions, maintenance and water reuse control. Water purified by the system via the evaporation process is simply evaporated into the atmosphere. The energy used to operate the evaporators, which is often natural gas, creates hydrocarbons that are permitted to escape into the atmosphere, which thereby adds $CO_2$ to the atmosphere. Moreover, all the heat generated by the evaporators is lost. Although the system effectively eliminates the need to tie into wastewater treatment systems, it does not address what are becoming pressing issues with respect to climate change, water purification and water resource management. Moreover, the sludge derived from the filtration component can be a toxic brew of pathogenic materials and toxic chemicals, notably Per- and Polyfluoroalkyl Substances (PFAS), that require transportation offsite for final disposal. In doing so, the pathogenic materials and toxic chemicals are simply shifted from one place to another, and potentially concentrated with other toxic sludge, and disposed, sometimes, via incineration, which can create air emission issues. In a related issue, the filtration system does not have a robust odor control system essential to application of the system.

What is needed is a means to eliminate the need for housing and commercial projects to be tied into municipal sewer systems or Title V (based upon Commonwealth of Massachusetts regulations) (septic) systems. What also is needed is a means to eliminate the impact on groundwater and other water sources by wastewater produced by housing and commercial developments. What is additionally needed is an on-site means to recapture and reuse the water component in waste water to better conserve the resource. A further need is to implement carbon capture so as not to add to $CO_2$ concentrations in the atmosphere during treatment and prevent the deposit of nitrates and nitrites into groundwater. Yet another need is to conserve and reuse the heat generated by evaporator units. A yet further need is to neutralize or eliminate the pathogenic and toxic materials in the sludge component of wastewater with means other than filtration and reuse the sludge for purposes such as fertilizer. A still further need is to capture condensate from air conditioning units and capture and purify rainwater for use. These and other objects of the disclosure will become apparent from a reading of the following summary and detailed description of the disclosure.

SUMMARY OF THE DISCLOSURE

To achieve the solutions provided by the disclosed wastewater treatment system, a series of wastewater treatment modules or units are disclosed, each of which performs a certain function ultimately related to the purification and reclamation of water. These treatment modules provide a significant degree of flexibility to design the wastewater treatment system to address the issues present in a specific location. By design, the modules are, to a large extent, interchangeable and serially repositionable so as to address the specific water treatment requirements without having to incorporate modules that perform specific functions not needed at a particular site. For example, for wastewater that does not contain harmful chemicals or pathogens, the sonolysis and autoclave modules, as disclosed herein, may not be required. In other settings, those same modules may be needed to address issues such as the presence of toxic chemicals dissolved in the wastewater.

With respect to all the variations possible for constructing a wastewater treatment system according to the disclosure for processing wastewater that includes solid waste, it was initially thought that three modules must always be present, a combination pre-treatment (settling tank) and filtration module, an odor control module and an evaporator module. In these applications, the filtration module always precedes the evaporator module. Other accessory modules, e.g., a sonolysis module, an autoclave module and an ozone module, may be placed between the filtration and evaporator modules, after the evaporator module, or some combination of accessory modules both before and after the evaporator module in a wastewater treatment train. Other than a pretreatment module, the filtration module should be the first module in the wastewater treatment system. It is now understood that in alternative embodiments, the first module may be solely a pretreatment module (settling tank) without a filtration module (and optionally without the odor control module) if the phase separation performed by the pretreatment module is complete enough to eliminate the need for formal filtration. In such embodiments, the pretreatment module would be succeeded downstream by at least one of the other modules, e.g., the evaporation module, the sonolysis module, the autoclave module, a mineralization module, etc.

For applications that address wastewater that does not include solid waste as a component, such as ground water contaminated by industrial chemicals dissolved in the water, a wastewater treatment system train, according to the disclosure useful for such applications, may not require the filtration module or the pretreatment module. Instead, the evaporator module in combination with one or more of the accessory modules, i.e., illustratively, the sonolysis module, the autoclave module, the UV-light module, the ozone module, the chlorination module, and the mineralization module may be used to effectively purify the contaminated water. This modified wastewater treatment system is expected to be particularly applicable to decommissioned military bases with significant groundwater contamination in need of remediation. Unlike other systems currently in use that filter out such harmful chemicals and toxins, the disclosed wastewater treatment system destroys or degrades the chemicals and pathogens to render them harmless or less harmful to human and environmental health. This is a significant advancement over filtration systems as those systems simply concentrate the harmful chemicals and toxins but do not destroy or degrade them. Burial or incineration steps are often used to address the filtered-out materials. Filtration is a solution that simply moves a problem from on site to another.

In one aspect of the disclosure, a wastewater treatment system incorporates one or more wastewater collection tanks secured to waste lines running from fixtures such as sinks, toilets, laundries and laboratory fixtures. At least one collection tank is secured to lines connected to a building's rain gutter system and may be filtered before entering other modules of the disclosed water treatment system so as to collect runoff from rain in a manner considered proper under some municipal codes. At least one collection tank is further connected to a building water use system such as the building's air conditioning (AC) and/or heating, ventilation and air-conditioning units (HVAC unit(s)) to siphon off condensate and/or to supply purified water needed for the unit(s) to function. At least one of the collection tanks is connected upstream to a membrane bioreactor treatment system (filtration module) or alternatively, a diatomaceous earth filtration system. The primary function of the bioreactor treatment system (or diatomaceous earth filtration system) is to separate the solid and liquid components of waste water via filtration for the liquid's ultimate reuse. Separated-out solids, which may be treated to reduce or eliminate harmful toxins, pathogens and chemicals, are taken offsite for final disposal. In an alternate embodiment, the solids are treated with heat generated by the system to dry the solids for further processing, microwave energy and/or ozone before offsite disposal. The bioreactor treatment system or alternative filtration system may include an ozone-generating enclosed hood (odor control module) to neutralize any unwanted odors from the filtration process.

The liquid component of the wastewater separated from the solids, in one embodiment, is exposed to a UV disinfection unit to neutralize potential pathogens and other microbial elements in the liquid component. Thereafter, the liquid is transferred to an effluent holding tank for further transmission to one or more evaporator units. The evaporator unit(s) permit(s) the evaporation or distillation of the wastewater to separate any remaining particulate matter from the water component. The water component is evaporated and then condensed with one or more condensers and optionally re-mineralized for additional use as a source of water for reuse in the building including as a water source for growing carbon-capturing plants. In one embodiment, the solids are systematically removed and transported to solids reclamation facilities. In an alternate embodiment, the solids are treated to neutralize or eliminate potentially harmful pathogens and toxic chemical compounds before off-site removal. A yet third option is to harvest valuable components of the solids such as minerals and salts. Phosphorus is a particularly valuable element to recapture due to diminishing natural sources of the element.

One or more evaporator units use an energy source, such as electricity, natural gas, propane, parabolic solar generation, and/or diesel fuel, to heat the wastewater and cause separation of the solid and liquid components. For systems that use fossil fuels such as natural gas, a combustion capture system is included to capture and process emissions from the natural gas combustion process. The carbon capture system may include plants enclosed in a building with filtered exhaust ports. The carbon based emissions are exposed to the plants that absorb and assimilate the $CO_2$ content of the emissions.

In a further aspect of the disclosure, the evaporator unit(s) can be either vacuum or atmospheric units. Vacuum units reduce the pressure in the unit which permits evaporation at a much lower temperature and thereby lowers the cost per gallon of wastewater effluent evaporated. An atmospheric-based evaporator system does not alter the pressure within the unit and requires larger amounts of energy than the vacuum-based units to evaporate water.

In yet another aspect of the disclosure, one or more sonolysis units (of which several embodiments are disclosed) are used to break up harmful chemical compounds found in waste water or drinking water. A sonolysis unit uses a plurality of sound-emitting transducers to create cavitation bubbles that significantly increase the temperature and pressure in the bubbles to break down chemical components. Use of a sonolysis unit eliminates and degrades harmful chemicals and organic pollutants before the treated fluids are further processed by the evaporator unit(s). The sonolysis unit can be used in conjunction with the UV unit or as a substitution for the UV unit. Base chemicals, such as Sodium Bicarbonate, may be added to the water to further neutralize the compounds broken down in the sonolysis process.

In a still further aspect of the disclosure, at least one continuous-cycle-capable autoclave unit is positioned between the UV-light unit or module and the evaporator unit(s) or module, or as a substitute for the UV-light unit, to apply high heat and high pressure to break down and eliminate harmful chemical compounds in the waste water. The autoclave uses steam created by the evaporator and/or siphoned off from a flash tank downstream the autoclave by means of a steam compressor in a feed-back loop to increase the pressure and temperature in the autoclave and therefore, the water to be treated. The elevated temperature and pressure lead to the destruction of the unwanted chemical compounds and pathogens resident in the water being treated. The feed-back loop also functions to conserve and reuse heat produced by the evaporator unit(s) or other modules.

In another aspect of the disclosure, a flash tank is placed between the autoclave unit and the evaporator unit(s). The liquids processed in the autoclave unit remain at a high pressure and high temperature level and cannot be sent back directly to the evaporator unit(s). Instead, the processed liquids, e.g., water, which may be completely or partially in the form of a pure gas or a gas having a special liquid fluidity known in the art due to the autoclave processing, is sent to the flash tank to permit the safe reduction of the temperature and pressure of the water before transmission to the evaporator unit(s). The water, which enters the flash tank in a high-temperature and high-pressure state, is released from the flash tank at a lower pressure and temperature relative to the water's entry pressure and temperature, but selectively at an elevated temperature. The water, which can be in both fluid and vapor forms in the flash tank, is transferred to the evaporator(s) in any form at an elevated temperature that greatly reduces the energy requirements to further process the water introduced into the evaporator via pure evaporation and/or distillation. Alternatively, any steam in the flash tank can be sent via a feedback loop into the autoclave upstream the flash tank via a steam compressor downstream of the autoclave to benefit the efficiency performance of the autoclave function by reusing the steam to thereby reduce energy costs.

In a further alternative embodiment, steam from both the flash tank and evaporator unit(s) can be used as the source of compressed steam to operate the upstream autoclave unit(s). In a yet further alternative embodiment, the steam or pressurized gas used in the autoclave unit to impart heat and pressure to wastewater effluent is maintained in a closed loop with intake and outtake pipe lines with compressors and/or vacuum-assist apparatus positioned in the closed loop.

In a further aspect of the disclosure, the effluent water tank (post-filtration tank) has lines leading to the autoclave and/or the evaporator unit(s) to supply additional water if levels drop below the amounts necessary for the autoclave and/or evaporator unit(s) to operate. A secondary make-up tank may be placed between the effluent water tank and the autoclave to permit the addition of chemical reagents to send to the autoclave to neutralize and/or eliminate any chemical compounds formed by the autoclave or alternatively placed between the autoclave(s) and flash tank(s). These and other aspects of the disclosure will become apparent from a review of the appended drawings and a reading of the following detailed description of the disclosure.

BRIEF DESCRIPTION OF THE DRAWINGS

FIG. 24 is a side view of a 3-piece autoclave unit housing according to one embodiment of the disclosure.

FIG. 91b is a second half of the wastewater treatment system flow chart shown in FIG. 91a.

DETAILED DESCRIPTION OF THE DISCLOSURE

Figure 1:
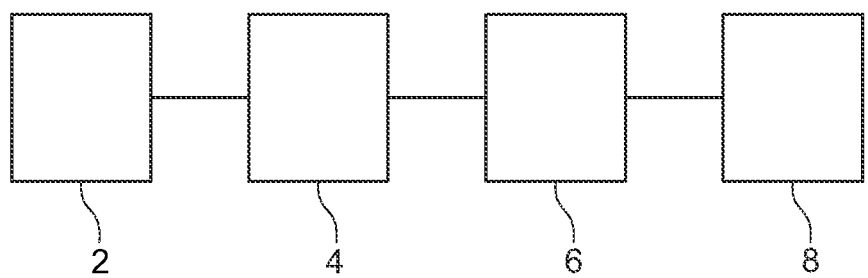
FIG. 1 is a flow chart of a relevant prior art wastewater disposal system that includes a pre-treatment unit, a filtration unit, a UV unit and an evaporator unit.
Figure 2:
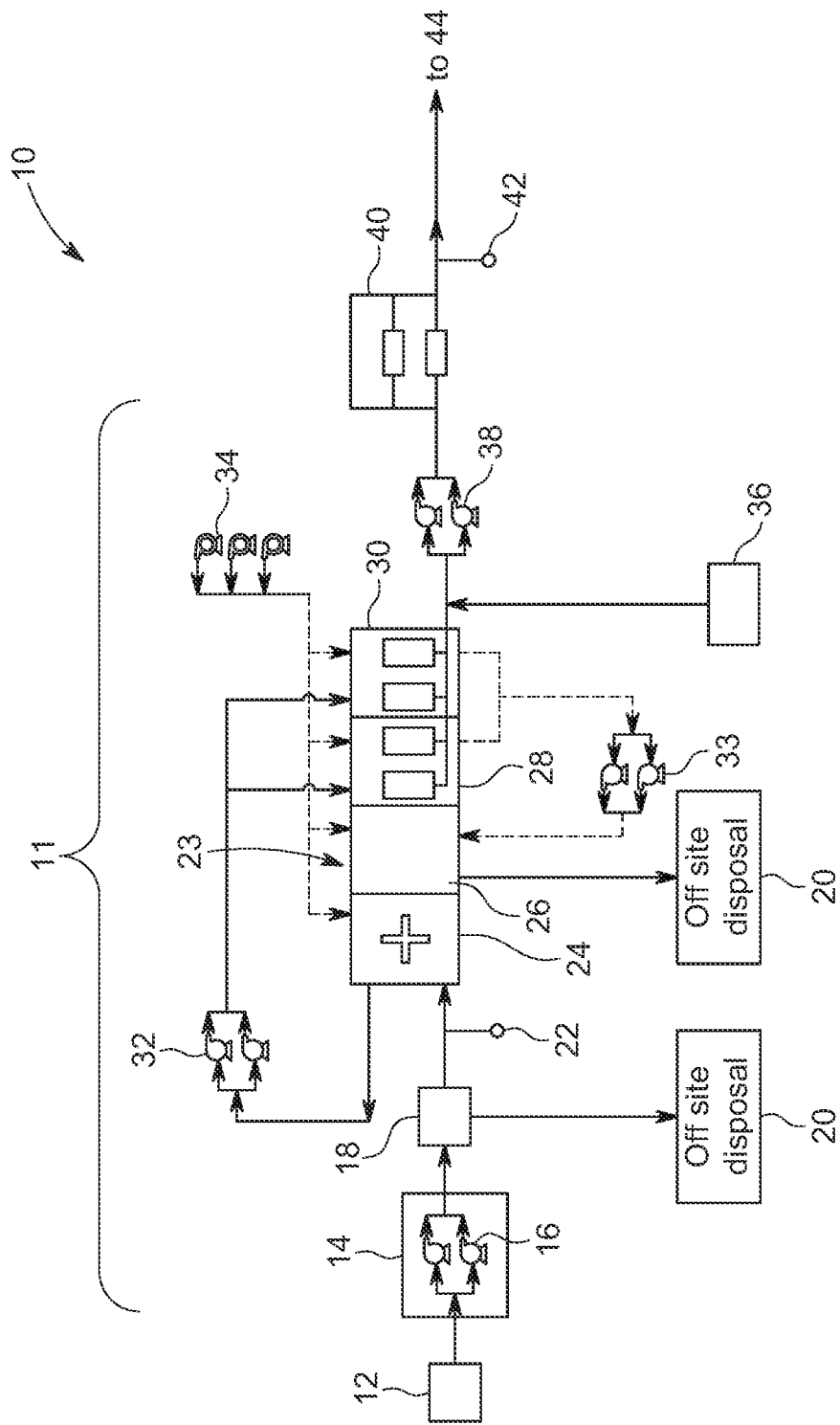
FIG. 2 is a flow chart of a first segment of a wastewater treatment system having a pretreatment module, a filtration module and a UV treatment module according to one embodiment of the disclosure.

Referring to FIG. 2, in one aspect of the disclosure, a wastewater treatment system, shown generally as 10, includes a series of components or wastewater treatment modules used to separate and reduce raw sewage into disposable/reusable solids and reusable liquids brought to the system by a building's plumbing system. As disclosed herein, the treatment modules can be arranged in a multitude of configurations to address various water treatment needs, i.e., "one size does not fit all".

I. Pretreatment and Filtration Modules

FIG. 2 shows a filtration subassembly or module designated generally as 11. This module performs the function of filtering out solids from wastewater. Filtration subassembly 11 is available from Ovivo USA, LLC (Round Rock, Texas) and comprises the first primary section of the broader wastewater treatment system 10. The raw sewage is first deposited into one or more pretreatment modules, pretreatment tanks or settling tanks 12, that function as septic tanks to separate grease, grit and primary solids from the liquid component of the wastewater. As disclosed herein, pretreatment modules are defined separately from filtration modules even though the two modules are often used together as a primary segment of the disclosed wastewater treatment system embodiments.

The separated-out solids component may be shipped offsite according to means used with conventional septic systems as is known in the art. Whether or not the solids component is shipped offsite, the solids may be treated with microwave energy or re-useable excess steam to degrade pathogens and toxic chemicals in the solids. The clarified liquid component is transferred via pipe system to one or more flow equalization tanks 14 that each include one or more influent pumps 16. Pumps 16 are used to force the clarified liquid through a fine screen 18 before further transfer in system 10. Fine screen 18 has a mesh selected for the particular solids being filtered out as is well known in the art.

Any particulate matter filtered out by screen 18 is shipped offsite with the solids component derived from pretreatment tank(s) 12. An optional influent composite sampling tap 22 may be placed in the piping system downstream of screen 18 to monitor the composition of the clarified and filtered liquid or influent before entry into other components of system 10 downstream of screen 18. It should be understood that "influent" as used in this context concerns fluids processed through filtration subassembly 11 and intended to be introduced into an evaporator and other components of system 10 for further processing. This permits adjustment of the pretreatment tank(s) and filter screen to produce influent with the degree of clarity necessary to meet state, federal and local regulations. As is well known in the art, a finer mesh screen will retain smaller particles and result in clearer/cleaner water. Conversely, use of a coarser mesh screen will not retain smaller particles and result in cloudier/less-clean water.

Once the clarified liquid has been screened, it is transferred next to a membrane bioreactor shown generally as 23. Bioreactor 23 is a multi-component subassembly with an anoxic zone 24, waste activated sludge holding and storage zone 26, a first membrane bioreactor basin 30 and a second membrane bioreactor basin 28. The four separate treatment zones each further reduce particulate matter in the influent to further clear the fluids.

The clarified liquid first enters anoxic zone 24 to remove any dissolved oxygen in the liquid. Once the liquid has been cycled through anoxic zone 24, it is transferred through bioreactor 23 via one or more transfer pumps 32 incorporated into bioreactor 23. The oxygen-depleted liquid or influent is moved by transfer pump(s) 32 from anoxic zone 24 to membrane basins 28 and 30. Membrane basins 28 and 30 each include one or more filter membrane units that further filter out particulate matter in the clarified liquid. One or more blowers 34 flow pressurized air into the membrane basins to create a positive pressure environment to increase the filter rate of the membrane basins. Blowers 34 also flow pressurized air into anoxic zone 24 and WAS holding zone 26 to also increase the pressure in the bioreactor segments to improve flow through bioreactor 23. For purposes of this disclosure, the components from screen 18' to a clean-in-place unit 36', disclosed in more detail With respect to the particulate or sludge component derived from the filtration of the clarified liquid, the component is pumped out of membrane basins 28 and 29 into a WAS holding zone 26 via waste-activated sludge pumps 33. The contents of the holding compartment 26 is removed from the compartment and taken offsite for disposal 20 along with the screened particulate matter previously described.

Figure 3:
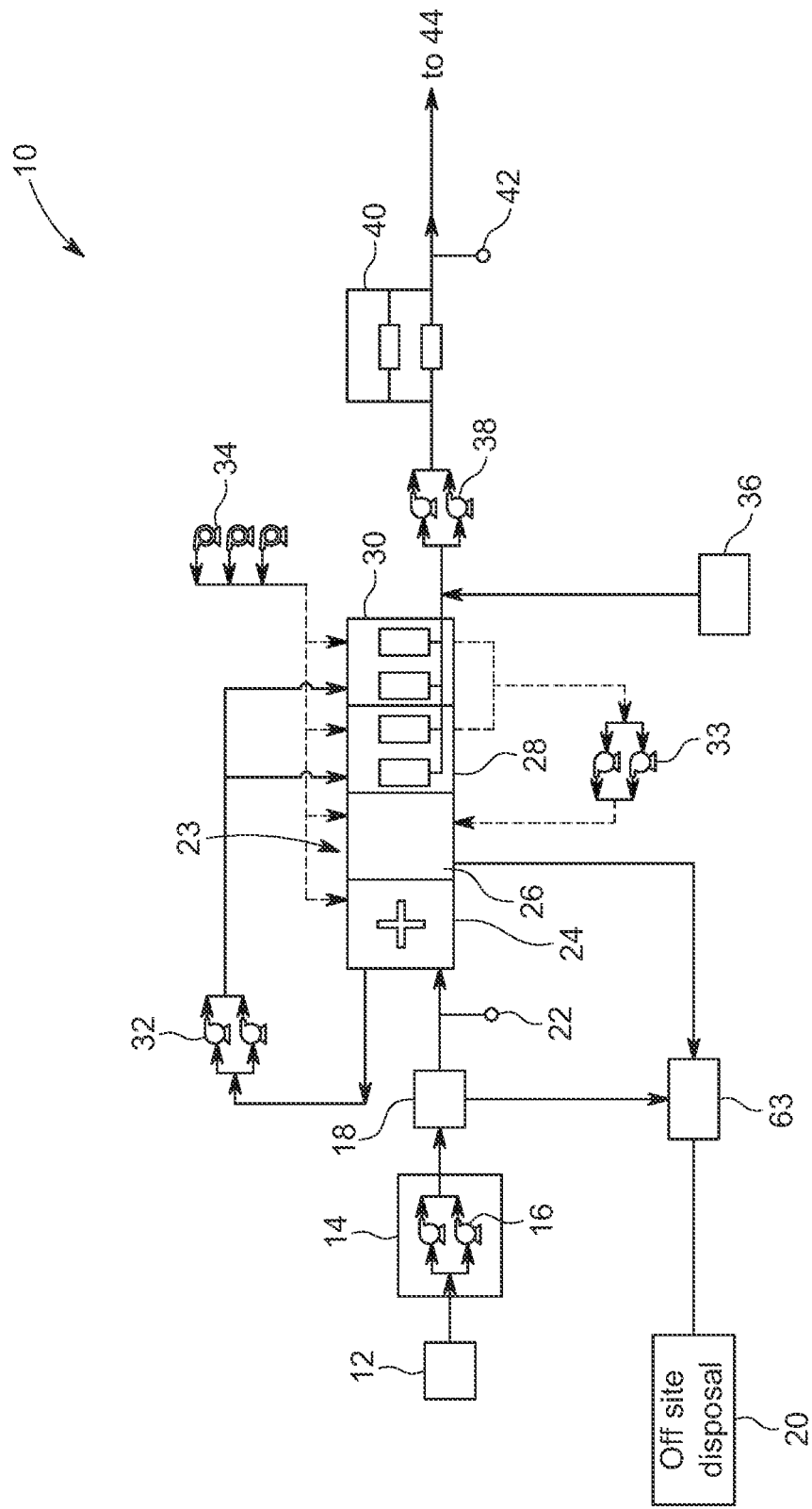
FIG. 3 is a flow chart of a first segment of a wastewater treatment system having a pretreatment module, a filtration module and a UV treatment module with a microwave module according to another embodiment of the disclosure.
Figure 91A:
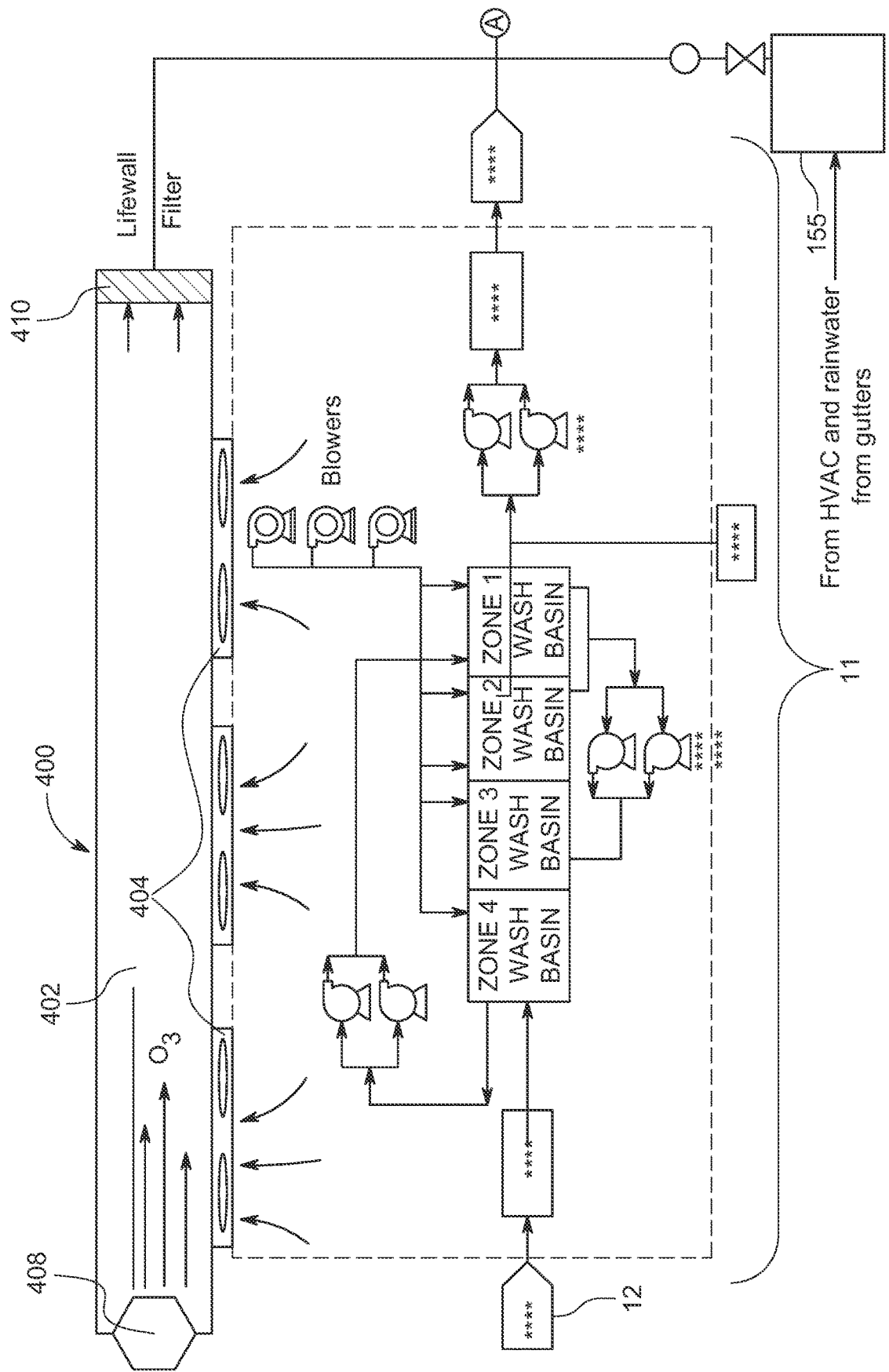
FIG. 91a is a first half of a flow chart of a wastewater treatment system with at least one diatomaceous earth filter and heat feedback loops according to a further embodiment of the disclosure.

As an optional pre-treatment or pre-disposal step, the particulate or sludge component may be treated with an optional microwave unit to degrade and destroy at least some of the harmful biological and chemical materials and compounds resident in the sludge. As shown in FIG. 3, a microwave unit 63 is positioned in-line with screen 18 and WAS holding zone 26. This ensures the sludge material shipped off-site is as inert as possible before final disposal or reuse as fertilizer. In an alternative embodiment, as shown in FIG. 91A, the solid waste or sludge recovered from filter subassembly 11 and/or diatomaceous earth filter(s) 11' may be transferred to a drying container 13. Steam derived from any of the autoclave, flash tank and/or evaporator(s) may be transferred via drying delivery pipe 15 to drying container 13 to dry the solids before further offsite processing or disposal. A drying return pipe 17 returns any remaining steam or condensate to any line connected to the evaporator(s) 48.

One significant drawback with the use of filter subassembly 11, however efficacious functionally, is the complexity of the system including the significant maintenance issues required to maintain subassembly 11 functional. In an alternative embodiment, a diatomaceous earth filter system 11' may be substituted for filter subassembly 11 to greatly reduce the construction and maintenance costs associated with filter subassembly 11. Diatomaceous earth filter system 11' eliminates the need to use a reverse osmosis filter apparatus.

As shown in FIG. 91A, in place of, or in addition to, filter subassembly 11, one or more diatomaceous earth filters 11' are installed between settling tank 12 and holding tank 44. If added with filter subassembly 11 included in the wastewater treatment assembly, one or more diatomaceous earth filters 11' are added between filter subassembly 11 and holding tank 44 as shown in FIG. 91A. If necessary, more than one settling tank 12 may be used in series to reduce the turbidity levels to facilitate the filtration function of the diatomaceous earth filter(s) 11'. Such a configuration permits the filtration of up to 20 million gallons of wastewater a day through filters 11' when drawn in with pumps (not shown). Any backwash forced from the filters in a filter cleaning/revitalization process can be additionally treated by adding the backwash to the storage tank 44 to combine with other collected effluent for further processing.

The difference in porosity between diatomaceous earth filters and reverse osmosis filters, with the diatomaceous earth filters having larger porosities, permits the passage of chemicals, toxins and pathogens through the diatomaceous earth filters. This is advantageous in that the chemicals and pathogens can travel through the wastewater treatment assembly 10 to other processing modules, such as the autoclave and sonolysis modules, to be neutralized and/or eliminated. With filter assembly 11, much of the chemicals and pathogens are collected by the filter components (active carbon filters and reverse osmosis filters) without further processing. Filtration collects and concentrates the pathogens and chemicals, which creates a further problem—how to dispose of the concentrated material. Incineration and burial are two of the common methods used to address such issues. Use of diatomaceous earth filter(s) in combination with the autoclave, sonolysis and/or evaporator modules disclosed herein provides a solution to this problem. The chemicals and/or pathogens are neutralized and/or eliminated by the wastewater treatment processing modules downstream diatomaceous filter(s) 11' onsite rather than concentrated and removed offsite for further processing.

One of the further advantages of using diatomaceous earth filters is the ability to backflush the filters for extended use. As shown in FIG. 91A, anything back-flushed out of the filters is transferred to the line feeding holding tank 44 via backflush line 19. As an alternative, optional step, anything back-flushed out of the diatomaceous filters may be treated with a base or other chemicals, such as $NaHCO_3$, via a backflush chemical treatment dispenser 21. If desired, effluent derived from the filtration subassemblies 11 and/or diatomaceous earth filter(s) 11' may be heated prior to entry into holding tank 44 via parabolic mirrors 600 by transferring effluent in the holding tank to piping within the parabolic mirrors and back to the holding tank feedline as shown in FIG. 91A. In an alternative embodiment, a heat-absorbing material such as vegetable oil or some other heat-absorbing oil may be heated in a closed-loop heat transfer coil by the parabolic mirrors and transferred to the holding tank to heat the effluent with the heat-depleted oil returned to the parabolic mirrors for future effluent heating cycles.

Figure 28A:
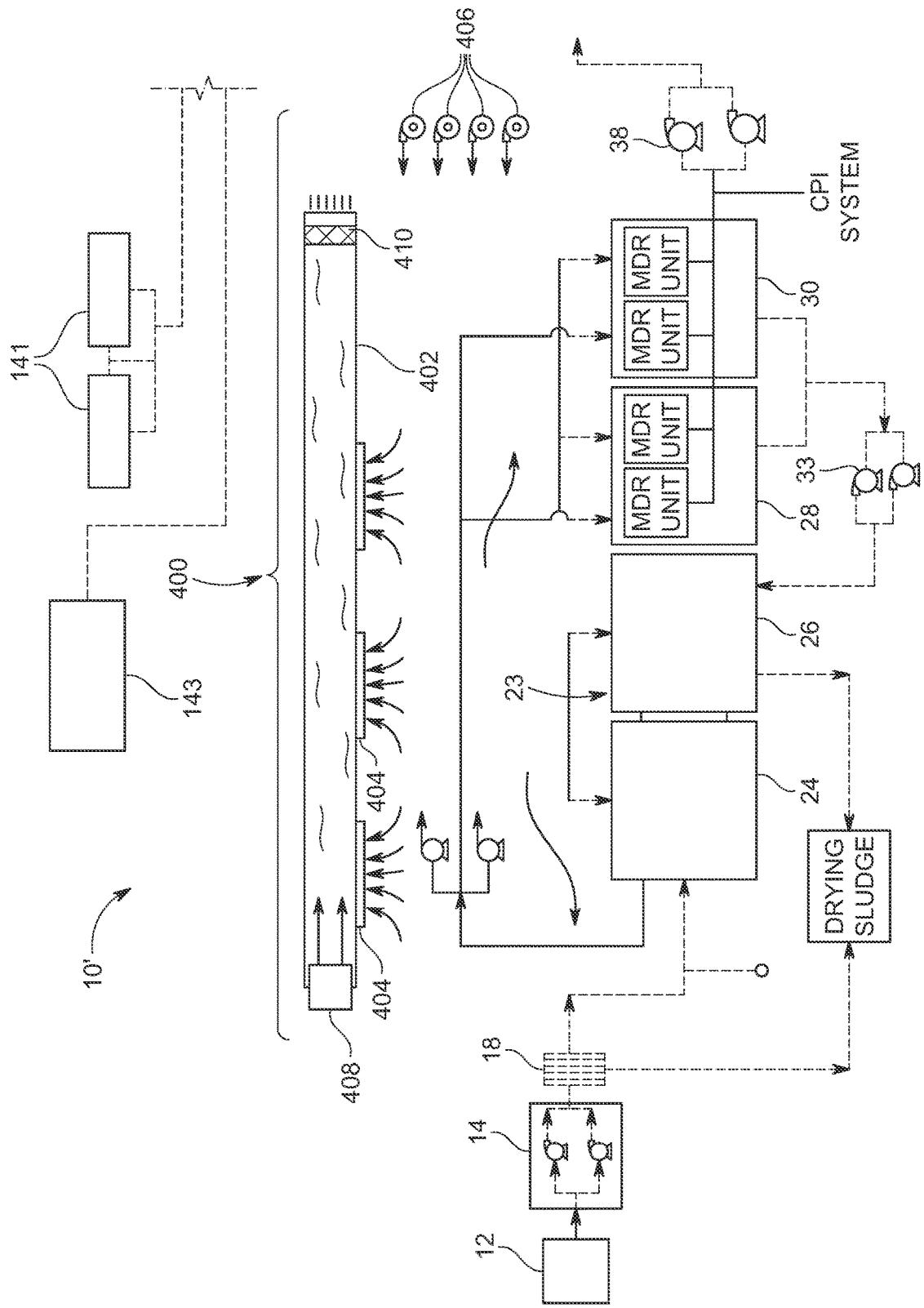
FIG. 28a is a first segment of a wastewater treatment system with an odor control unit secured over a filtration module according to a further embodiment of the disclosure.

II. Odor Control Module:

One of the potential problems, particularly with respect to the filtration module, is the creation of foul odors that can escape the module and flow into other areas of a building in which the wastewater treatment system is placed. As shown in FIG. 28A, to address this problem, an odor capture unit or odor control module, designated generally as 400, and odor capture method is used. Odor capture unit 400 includes an enclosed, airtight and hermetically sealed ozone chamber 402. Chamber 402 has one or more fans 404 that pull the noxious fumes and air into the enclosed chamber. A series of blowers 406 are used to focus any gases escaping from pretreatment tank 12, filtration module 11 and other collection areas toward fans 404. Blowers 406 in combination with fans 404 create a negative pressure zone in the filtration module to draw in any malodorous fumes into the ozone hood for processing and removal into the atmosphere after ozone treatment. As a further enhancement, odor-detecting devices known as "sniffers" can be implemented to keep track of the levels of malodorous fumes in order to further control any odor situation.

One or more ozone generation units 408 generate ozone that flows completely into ozone chamber 402. Gases drawn into the chamber by the blowers and fans mixes with the ozone that neutralizes malodorous gases and neutralizes aerosolized organic materials such as viruses. One or more one-way exhaust fans 410 forces the gases contained in chamber 402 out to the atmosphere. One or more activated charcoal filters may be or are included with exhaust fan(s) 410 to capture and reduce the ozone. During this process, the ozone is reduced to diatomic oxygen, which is the form the oxygen takes before being expelled into the atmosphere. To the extent the ozone is not consumed when reacting with the odor-causing components of the air transferred into odor capture unit 400, as a precautionary measure, additional carbon filters 411 may be placed before the exhaust fans to assure complete ozone destruction before release into the atmosphere.

For purposes of this disclosure, it should be understood that the ozone-based odor capture unit or odor control module 400 is not the same as the ozone module disclosed hereinbelow. The ozone module is structured to neutralize potentially harmful contaminants in the wastewater processed through the system. The ozone module is not designed to address odors. It should be further understood that odor control module 400 can be adapted via dimensional modifications to control any odors created by any of the water treatment modules disclosed herein.

III. UV-Light Module

Still referring to FIG. 2, having been filtered through filtration subassembly or module 11, the filtrate or permeate component of the now filtered liquid (effluent) may be drawn into a clean-in-place unit 36 by one or more in-line permeate pumps 38. In one embodiment, pumps 38 urge the filtrate or permeate into one or more ultraviolet disinfection modules or units 40. The UV-light unit(s) or module(s) 40 bombard(s) the filtered liquid with UV light to destroy and/or degrade organic pathogens such as legionella and adenovirus. It may degrade coronaviruses such as COVID-19 resident in the filtered water as well. Hallet UV light systems (UV Pure, Ontario, Canada) are particularly effective for these noted purposes. In alternate embodiments, as will be described herein, the UV-light module is not placed after the filtration module or not incorporated at all.

Figure 4:
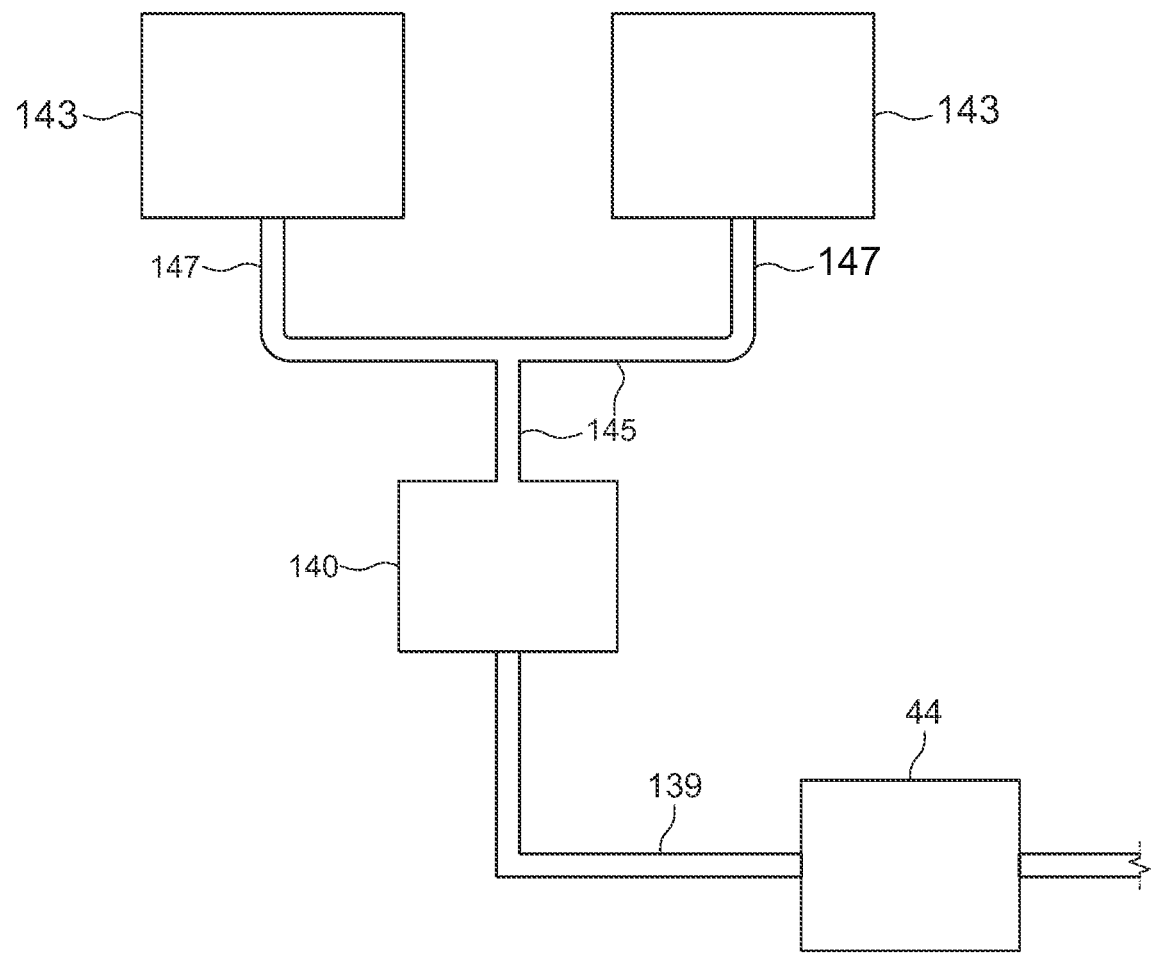
FIG. 4 is a flow chart of a building's air conditioning system condensate drain pipe assembly connected indirectly to a holding tank of a wastewater treatment system according to one embodiment of the disclosure.

Once treated in the UV disinfection unit(s) or UV-light module(s) 40, the treated liquid, now described as effluent or UV processed liquid in the currently described embodiment, is transferred to an effluent storage tank 44 (as shown in FIG. 4) to await further processing. It should be understood that for any wastewater system embodiment that includes UV-light unit(s) 40 positioned downstream filtration subassembly 11 and upstream evaporator unit(s) 48, holding tank 44 will be positioned downstream UV unit(s) 40 and upstream evaporator unit(s) 48. For wastewater treatment systems that substitute one or more sonolysis modules and/or one or more autoclave modules for the UV-light unit(s) or module(s) 40, as disclosed in more detail herein, holding tank 44 is positioned upstream of the sonolysis and/or autoclave module(s).

Holding tank 44 may include a vent 44a for off-gassing and pressure control. Apart from temporarily storing the filtrate or permeate portion of the filtered liquid, also referred to as processed liquid herein, holding tank 44 is also connected to other structures in a building that concern the collection of water, e.g., air conditioning unit condensate, and rainwater, etc., as disclosed in more detail herein. An effluent 24-hour composite sampling tap 42 is connected to the line between units 40 and storage tank 44 to permit round-the-clock sampling and evaluation of the treated liquid.

To further add to the water conservation benefits of the wastewater treatment system, water vapor condensed by air conditioning (AC) units 143 (shown in FIGS. 61-65) in a building serviced by the disclosed wastewater treatment system can be piped directly into the wastewater treatment system 10 as disclosed in more detail herein. Such systems create water through condensation components in the systems. The water is conventionally piped out of the building or into the building's wastewater line, which adds to the burden placed on municipal wastewater treatment plants. Instead, as shown in FIG. 4, any condensate created by HVAC or AC systems 143 is transferred via AC pipe(s) 147 to common collection pipe 145, which transfers the AC water to holding tank 140. Tank 140 is connected via piping 139 to holding tank 44, or directly or indirectly, to any of the water treatment modules disclosed herein.

Figure 5:
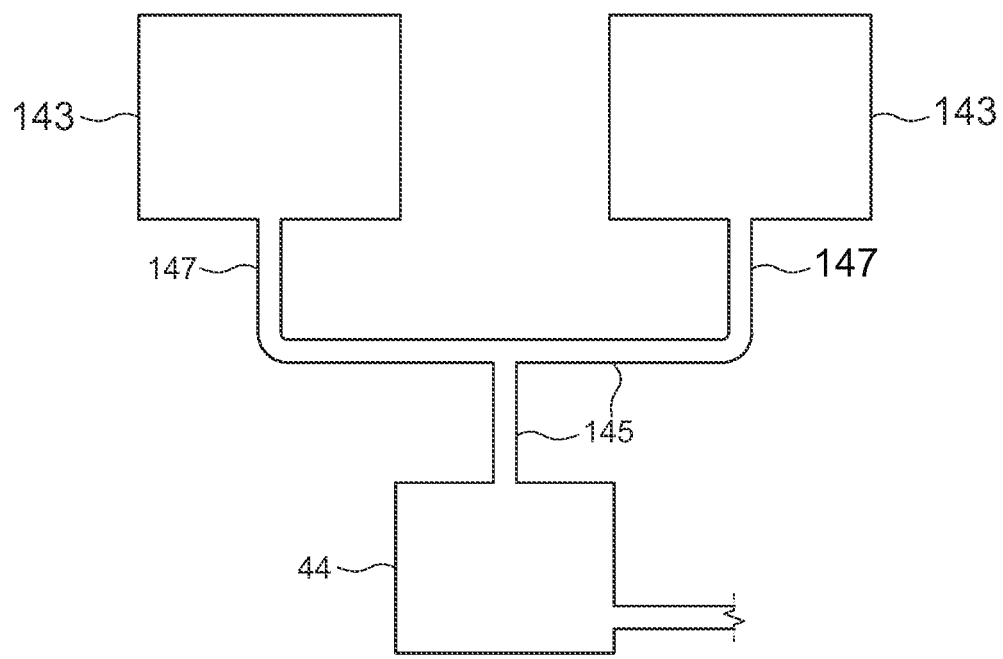
FIG. 5 is a flow chart of a building's air conditioning system condensate drain pipe assembly connected directly to a holding tank of a wastewater treatment system according to a further embodiment of the disclosure.
Figure 6:
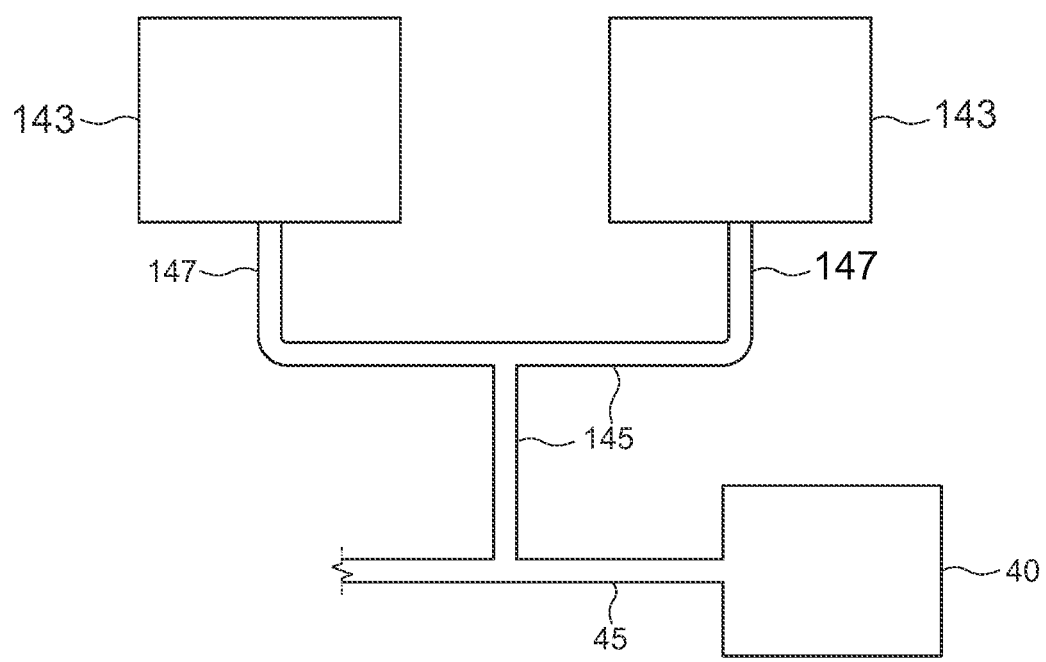
FIG. 6 is a flow chart of a building's air conditioning system condensate drain pipe assembly connected to an evaporator unit feedline of a wastewater treatment system according to yet another embodiment of the disclosure.
Figure 7:
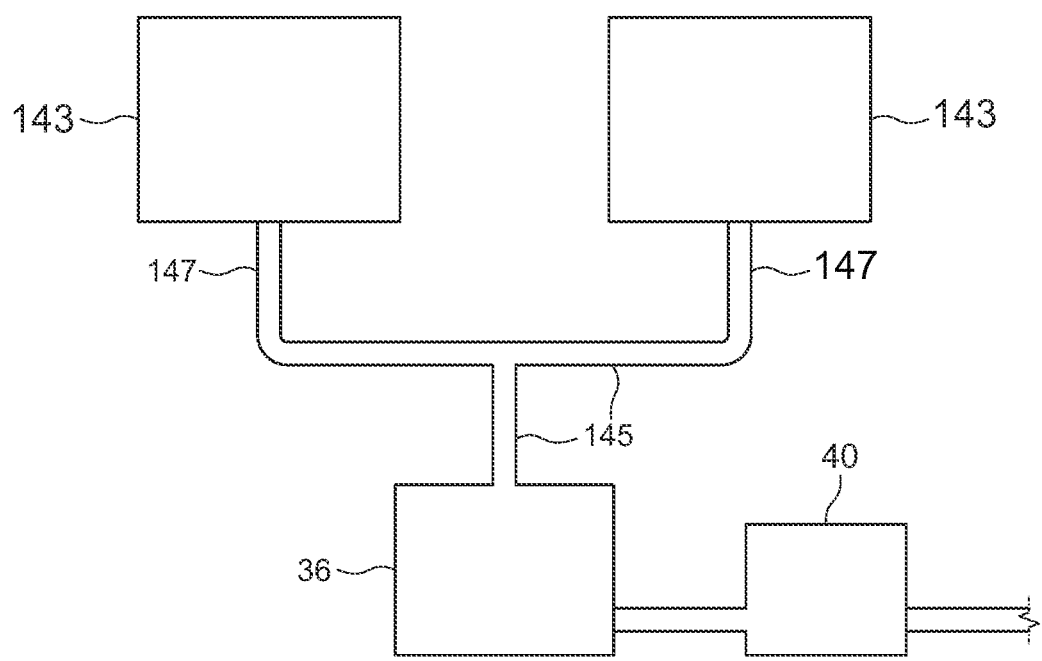
FIG. 7 is a flow chart of a building's air conditioning system condensate drain pipe assembly connected to a clean-in-place unit of a wastewater treatment system according to another embodiment of the disclosure.

Alternatively, as shown in FIG. 5, common collection pipe 145 can connect pipe(s) 147 directly to holding tank 44. If a further alternative embodiment as shown in FIG. 6, the captured AC unit water can be transferred directly into the line 45 feeding the UV disinfection unit(s) 40. As shown in FIG. 7, in yet another embodiment, the captured AC water may be fed directly into clean-in-place unit 36 for further transfer to UV disinfection unit(s) 40 or other modules disclosed herein. The location of the transfer can be before or after the in-line permeate pumps 38. In a further alternative embodiment, the AC condensed water can be transferred to a dedicated holding tank, e.g., AC holding tank 140 shown in FIG. 4 for transfer and processing by any of the water treatment modules disclosed herein. Regardless, what path is taken, by transferring AC condensed water to wastewater treatment system 10, water that would otherwise be lost down a sewer line can be captured, purified and reused rather than remain stagnant in the HVAC holding tank as is the case in many installations or lost down a sewer line.

In a yet further improvement to the water conservation benefits of the disclosed wastewater treatment system, a building's rainwater gutter system can be tied into the wastewater treatment system to capture water that would otherwise flow onto driveways, parking lots, storm drains, etc. For large buildings, such runoff often requires extensive drainage plans to control the runoff. Such plans often require permitting by local and regional authorities. By transferring rainwater to the wastewater treatment system 10, water that would otherwise be lost down a storm drain system can be captured, filtered, purified and reused as disclosed herein. Such capture also renders moot the need to develop a rainwater runoff plan at least with respect to rain captured by the gutter system. The captured rainwater can be transferred, once filtered, directly into the line feeding the UV disinfection unit(s) 40 or may be fed, once filtered, directly into clean-in-place unit 36 for further transfer to UV disinfection unit(s) 40 or other water treatment modules disclosed herein. The location of the transfer can be before or after the in-line permeate pumps 38. For example, it can be added to the clarified fluid derived from the pretreatment unit 12. Alternatively, the rainwater can be transferred to storage tank 44 (or other dedicated holding tank) for processing, particularly with respect to embodiments of the wastewater treatment system that do not incorporate UV disinfection units after filtration subassembly 11.

Figure 8:
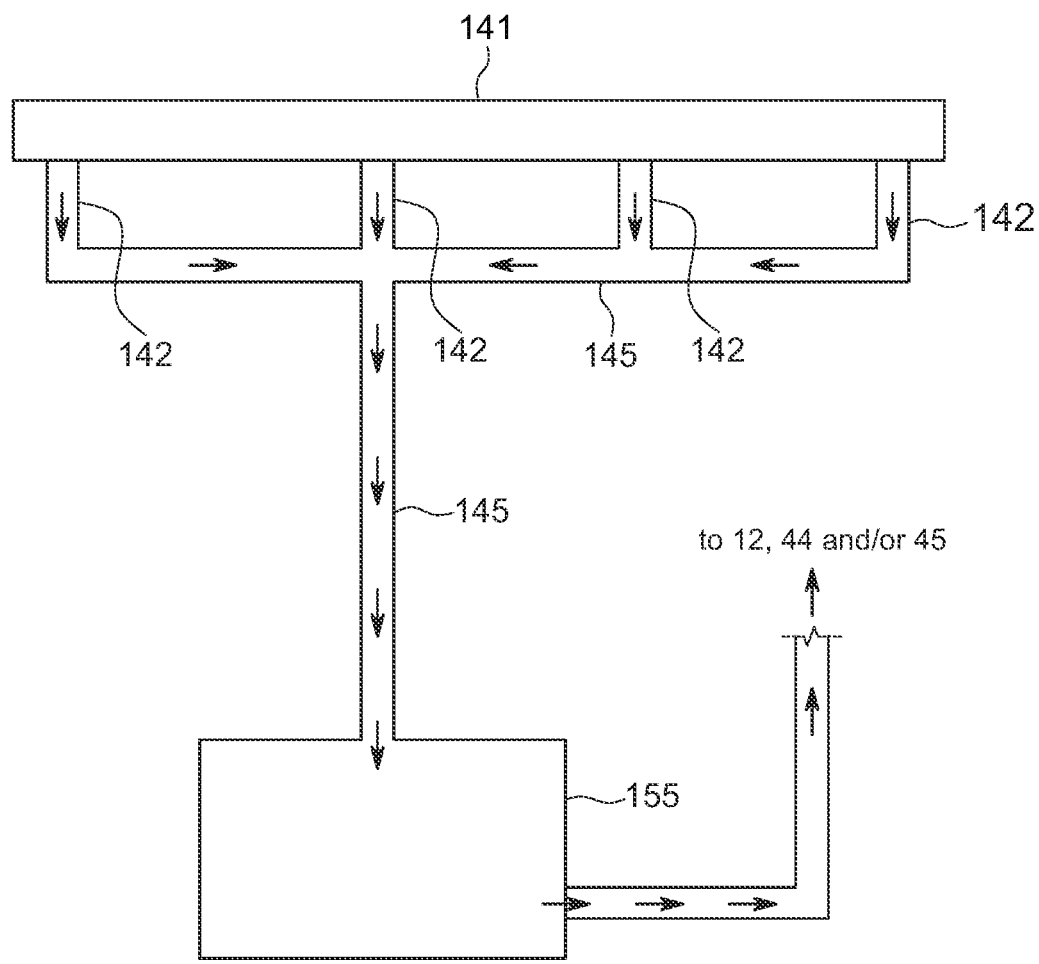
FIG. 8 is a flow chart of a building's rainwater capture system connected to a wastewater treatment system according to one embodiment of the disclosure.
Figure 61:
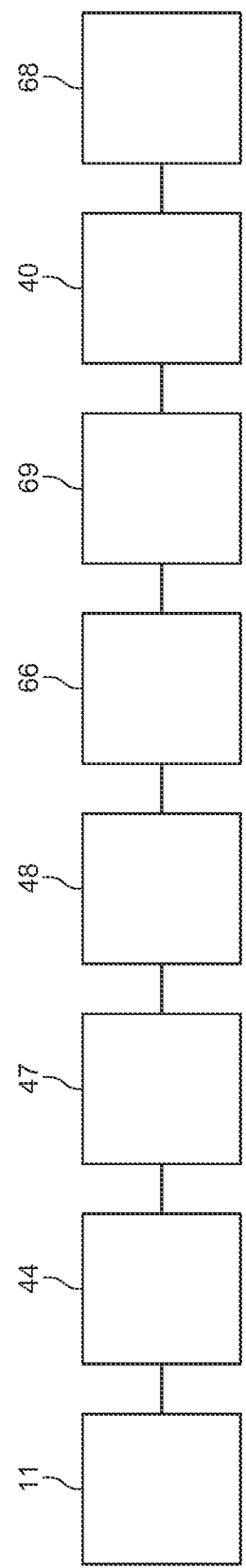
FIG. 61 is a flow chart of the wastewater treatment system shown in FIG. 58 with an ozone module secured downstream from the condenser unit and a UV-light module secured downstream the ozone module according to another embodiment of the disclosure.

In one such embodiment, as shown in FIG. 8, the system is connected to a building's rainwater gutter system 141. Rather than allow the rainwater collected by the gutter system to be directed to the ground or capped surfaces such as parking lots, the rainwater is transferred via piping 142 to a common collection pipe 145 connected to one or several pipes or system components such as shown in FIG. 61. In one embodiment, common collection pipe is connected to holding tank 44. In a second embodiment, pipe 145 is connected to pretreatment tank or module 12. In a third embodiment, pipe 145 is connected to pipe 45 positioned upstream of UV light unit or module 40. In a fourth embodiment, as shown in FIG. 7, pipe 145 is connected to an underground rainwater holding tank or cistern 155.

With respect to the option shown in FIG. 7, cistern 155 should be a food-grade container made from stainless steel or chemical polymer as is well known in the art. The cistern has water level controls to prevent an overflow condition. Rainwater is drawn out of the cistern when needed for further use and/or to reduce the volume in the cistern. Because of the many exit paths provided by the disclosed wastewater system, the rainwater can be used for multiple purposes such as functioning as supplemental water in pretreatment tank 12 to reduce the concentration of solids as well as additional water to form steam via evaporator unit(s)

40 for use in operating autoclave module 80 if one or more autoclave units are incorporated into the wastewater treatment system.

If the rainwater is transferred to holding tank 40, it is mixed with the processed effluent, if after UV unit module 40, or with unprocessed effluent for systems that substitute an autoclave and/or a sonolysis module for the UV unit module, for further processing in system 10'. If the rainwater is transferred to pretreatment tank or module 12, it is mixed with wastewater directed into tank 12. If the rainwater is transferred to the pipe upstream UV light module 40, it is mixed with untreated effluent and then treated in module 40. If the rainwater is transferred to cistern 155, it is next transferred to three locations. A first option is to transfer the rainwater via piping to pretreatment tank 12. A second option is to transfer the rainwater via piping to the pipe upstream UV light module 40. A third option is to transfer the rainwater via piping to holding tank 44 for further processing in the wastewater treatment system. With any of the options used, one or more pumps are used to urge the rainwater to the various points in the wastewater treatment system for processing. With any of the options, the rainwater may be filtered before being transferred to any of the wastewater system modules. If transferred to holding tank 44, the rainwater may be further transferred to a building's toilet system without further processing.

It should be understood that rainwater can be introduced into the wastewater treatment system at any point along the water treatment train of modules and remain within the scope of the disclosure. The point of entry into the wastewater treatment system for rainwater likely will be dictated by the condition of the rainwater. Rainwater in need of significant water purification treatments can be transferred into one of the first treatment modules, e.g., pretreatment tank 12 to undergo significant processing into essentially pure water. The rainwater also may be filtered before entry into cistern 155 or before entry into any of the treatment modules disclosed herein in order to remove any resident pollutants. Any filtration used to filter the rainwater may be backflushed with the backflush material transferred into pretreatment tank 12 for further processing.

It further should be understood that separate, dedicated piping systems may be used to transfer water from the AC systems and the rainwater gutter systems directly to holding tank 44 or directly to filters and then to holding tank 44 or some other holding tank in the wastewater treatment system. Like the rainwater, the AC water is mixed with the unprocessed effluent (or processed effluent for systems that use a UV unit module after the filtration module and before the holding tank) for further processing in system 10'. By capturing water produced by AC units and collecting rainwater, system 10' can potentially recycle more water than is drawn into a building from municipal and/or well sources. Alternatively, the water collected from AC units and rain runoff can be transferred via dedicated pipe lines directly to specific treatment modules, e.g., the sonolysis, autoclave and/or evaporator modules separately from the effluent to be processed separately and then collected in a post-treatment holding tank such as holding tank 68.

Figure 9:
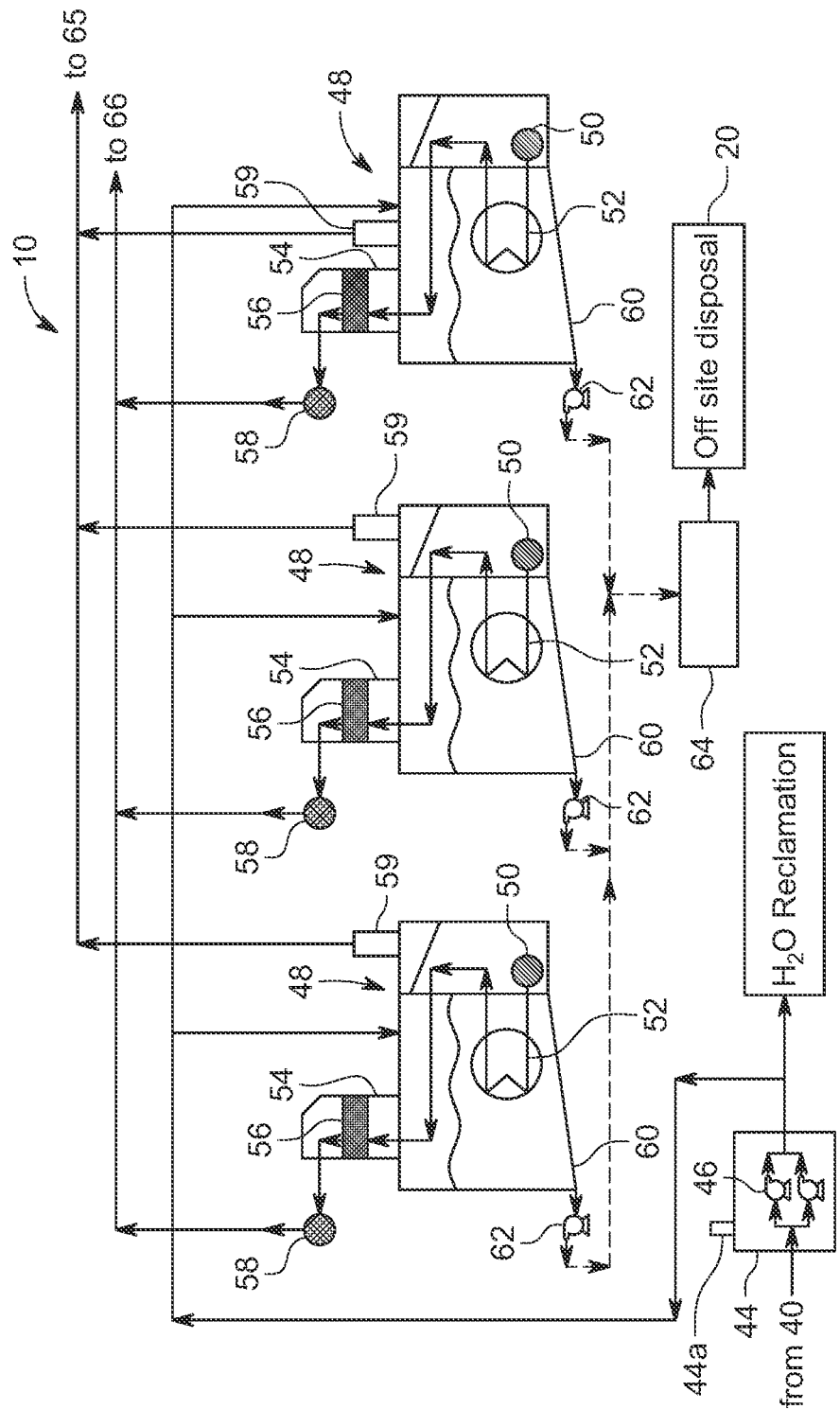
FIG. 9 is a flow chart of a second segment of a wastewater treatment system having an evaporator module according to one embodiment of the disclosure.
Figure 60:
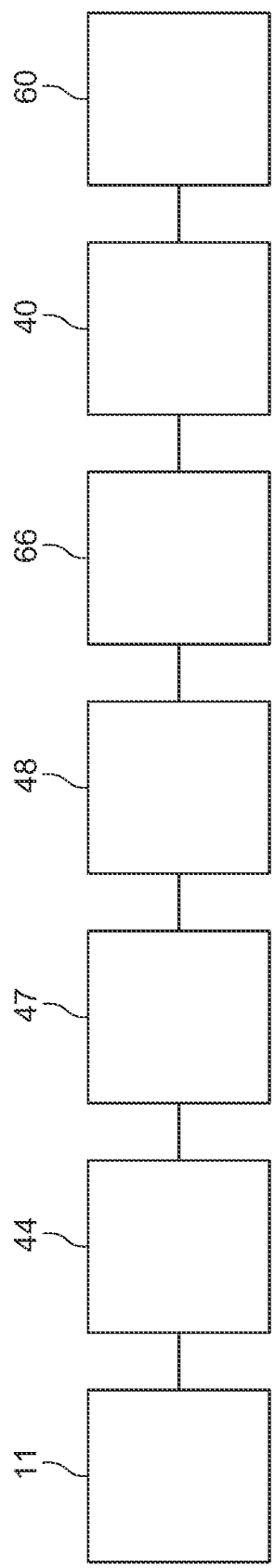
FIG. 60 is a flow chart of the wastewater treatment system shown in FIG. 58 with a UV-light module secured downstream from the condenser unit according to a still further embodiment of the disclosure.

Referring now to FIG. 9, effluent pumps 46, positioned in effluent storage tank 44, pump the treated liquid stored in the tank onto one of two tracks. The first track is for reuse as toilet water if the UV-treated liquid meets the requirements for classification as Class A reclaimed water, or water that is of sufficient quality to be reused for toilets based upon state and local laws and regulations. A first branch, dedicated pipe system (as shown in FIG. 60) connects storage tank 44 to one or more toilets 500, laundry rooms, NC units, etc. in a building, as allowed by federal, state and local regulations and ordinances, to provide the reclaimed water for targeted use. A secondary line from a building's main water line(s) also may be used in the event there is insufficient reclaimed water to meet usage rates. For embodiments that incorporate a UV-light module after the filtration module, it is anticipated that at least 30% of the UV-treated effluent may be used for this purpose. Otherwise, or in addition thereto, the UV-treated effluent can be transferred to one or more thermal evaporators 48 (disclosed below) for further processing and further purification via a second branching pipe line from storage tank 44. It should be understood that the piping system dedicated to toilets and the like may be linked to one or more storage tanks further downstream in the wastewater treatment system 10 to provide purer water for all expected uses. These options are disclosed in more detail herein.

As shown in FIG. 8, one or more thermal evaporators 48 are connected downstream from storage tank 44 to further separate any particulate matter from the effluent. Thermal evaporators 48 may be atmospheric evaporators such as those sold by Encon Industries, (Keene, NH), or vacuum-distilled-type evaporators such as those sold by Condorchem Envitech (Barcelona, Spain), that perform the evaporation function at much lower temperatures than atmospheric evaporators, i.e., much lower than the 212° F. temperature needed by atmospheric evaporators, due to the very low pressure in the vacuum evaporator system. Any type of evaporator may be structured to function as a distillation unit in which liquids are evaporated. The evaporated liquids may be released into the atmosphere or may be condensed and captured for reuse. Any type of evaporator may be structured also as a pure evaporator in which the liquids are completely vaporized and allowed to escape to the atmosphere. It has been found that use of a vacuum evaporator is especially advantageous in terms of energy efficiency when an autoclave unit and a flash tank are incorporated into the wastewater treatment system as disclosed hereinbelow.

Each thermal evaporator has a fuel source and a burner 50. Natural gas is the preferred fuel source if fossil fuel is used as its combustion byproducts of $CO_2$ and $H_2O$ are usable in further processing steps disclosed hereinbelow. It should be understood that other fuel sources may be used to run the thermal evaporators such as electricity and fuel oil among others known in the art. If electricity is used, solar panels and passive electricity generation can be the source of the electricity.

Figure 28B:
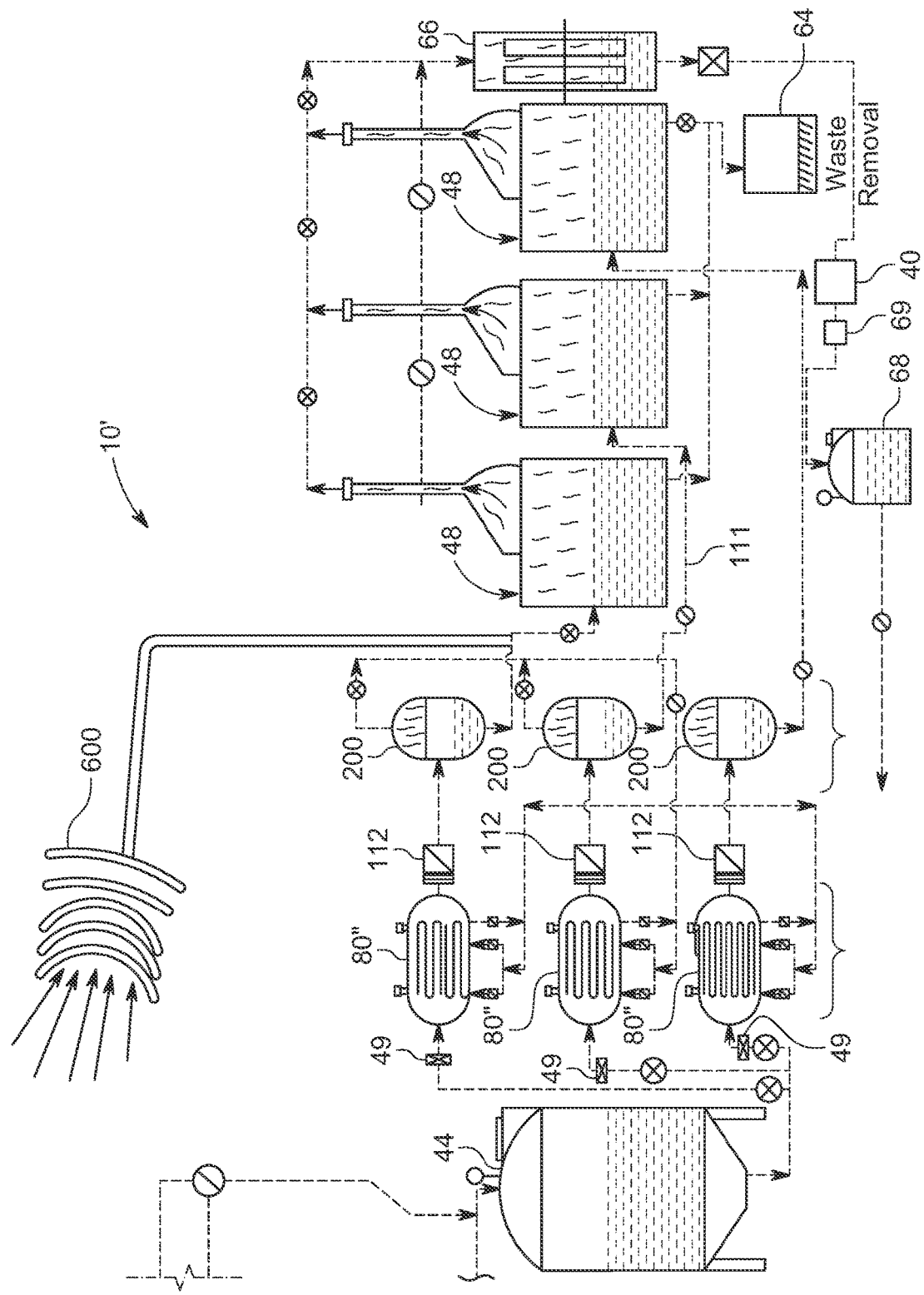
FIG. 28b is a second segment of the wastewater treatment system shown in FIG. 28a with a plurality of autoclave units, a plurality of flash tanks and a plurality of evaporator units.
Figure 28C:
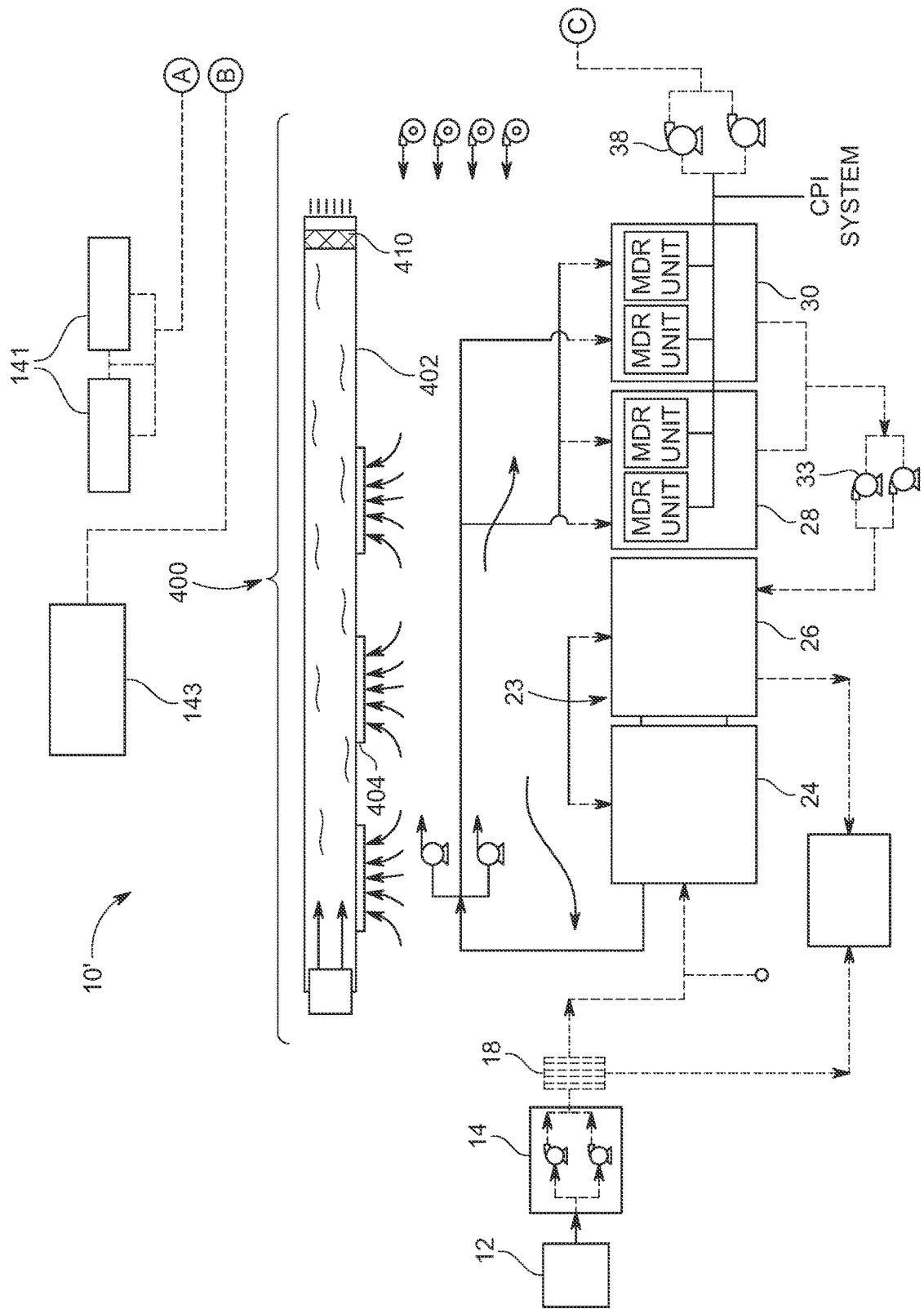
FIG. 28c is a reduced-scale flow chart of the wastewater treatment system shown in FIGS. 28a and 28b.
Figure 28C:
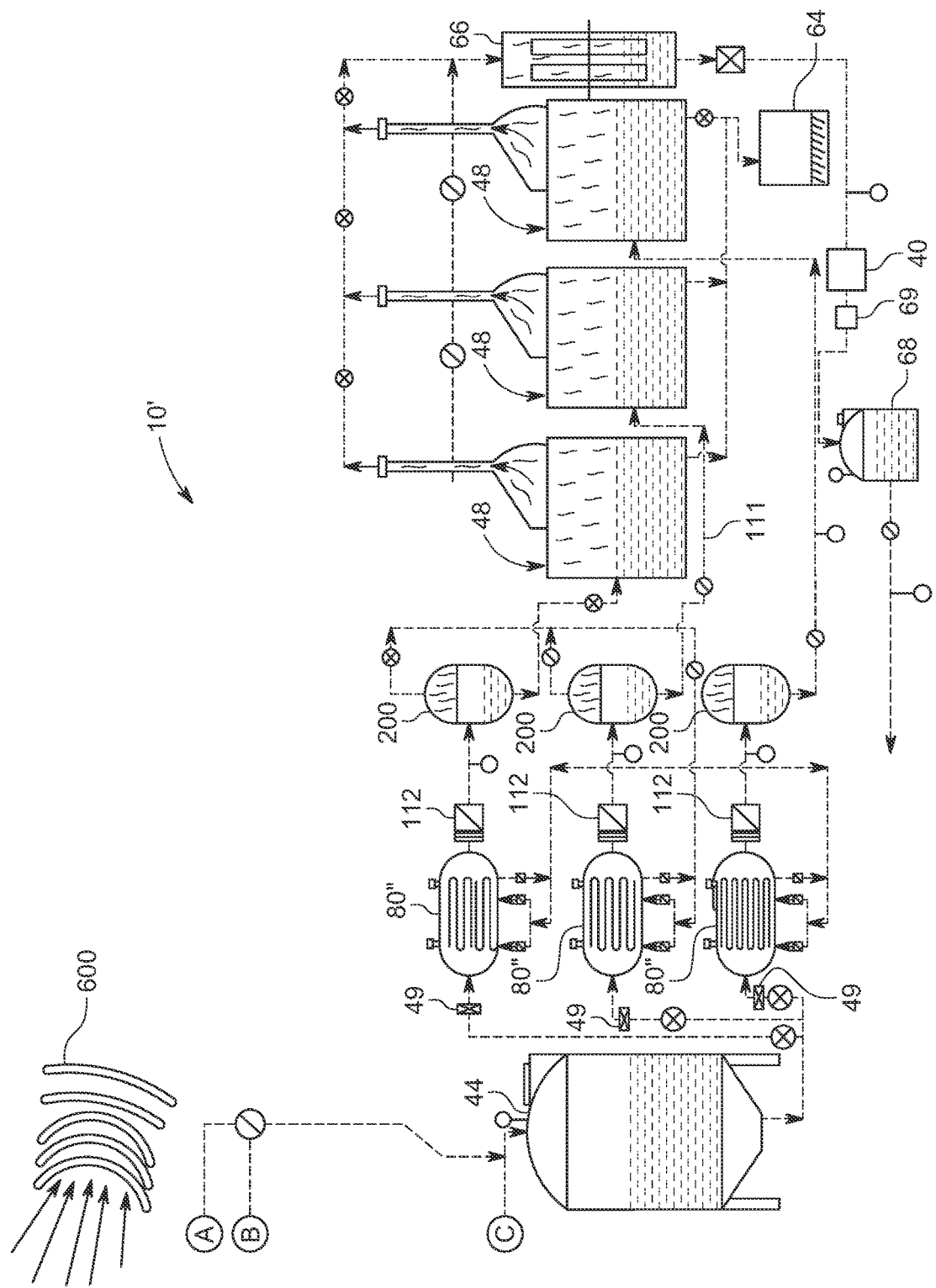
Figure 34:
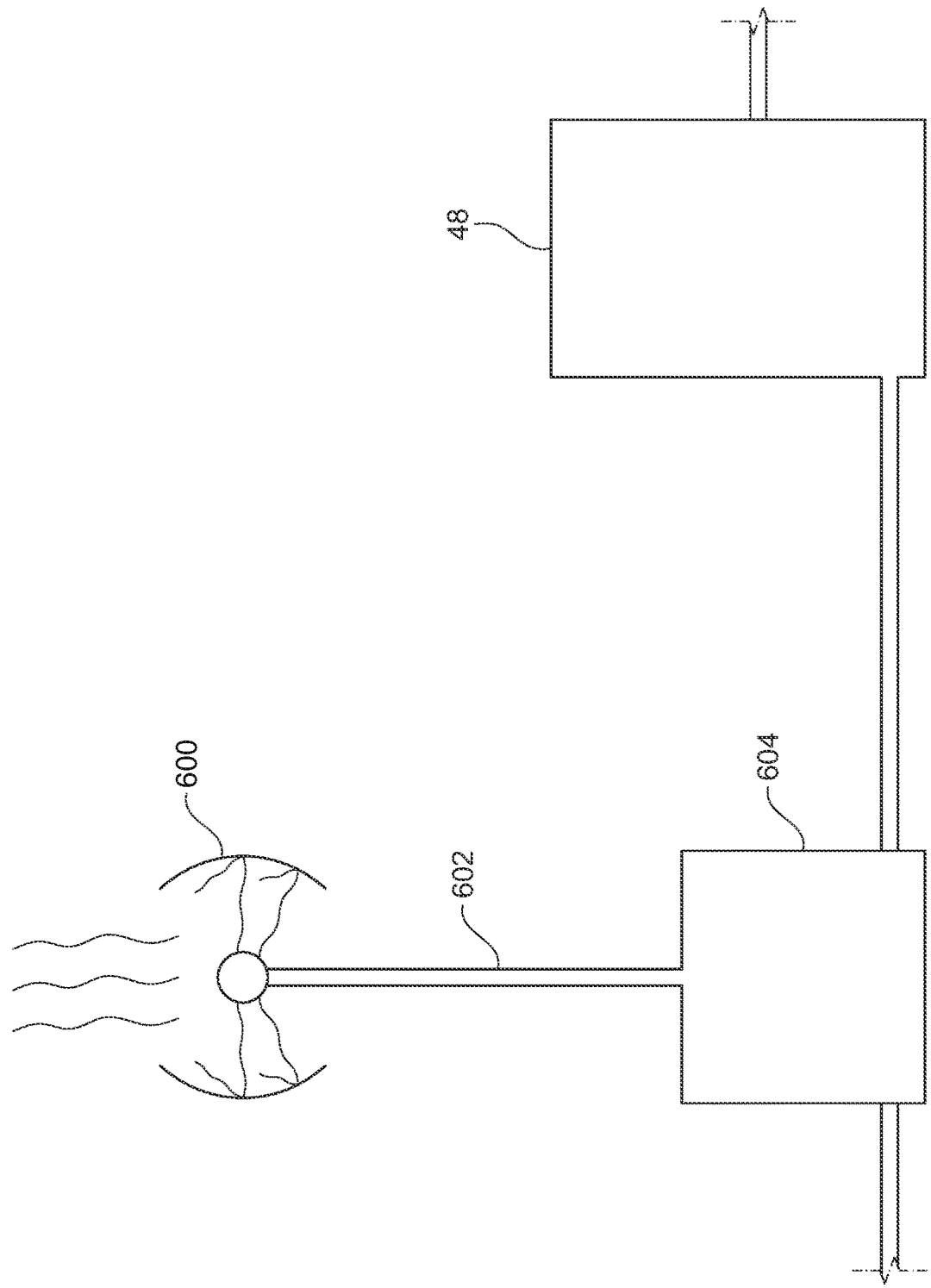
FIG. 34 is a flow chart of a parabolic mirror heating system connected to a wastewater treatment system evaporator according to a further embodiment of the disclosure.

In a further embodiment of the disclosure, to further improve the efficiency of the wastewater treatment system in general, and the evaporator units in particular, as shown in FIG. 28B, a solar heating system comprising parabolic heat concentration mirrors 600 redirect and concentrate heat energy emitted by the sun transfer the heat via a heat conduit 602 to a pre-evaporator holding tank 604 positioned upstream of the evaporator unit(s) 48 as shown in FIG. 34. The heat transfers into the treated effluent to elevate its temperature before transfer to the evaporator unit(s). Alternatively, the heat can be transferred directly to the evaporator unit(s) via piping, electric cable, or any other means used to transfer heat energy as is known in the art. By heating the effluent (before or during evaporator unit operation), the overall energy needs of the evaporator unit(s) is further reduced. It should be understood that the use of the parabolic heat concentration mirrors can augment or substitute the effluent heating derived from any of the heat-producing modules such as the autoclave units.

Effluent derived directly from the pretreatment and filtration modules, or UV-treated effluent, if a UV-light module is placed upstream from the evaporator unit(s) or module(s) 48, is transferred into the thermal evaporator(s) 48 and exposed to high heat via a heat exchanger 52. The heat exchanger causes the liquid component of the treated effluent to phase shift from a liquid to a gas, i.e., evaporate, and travel upwardly into a stack 54. Any particulate component separated from the liquid phase gets deposited on a sloped surface 60 that directs the particulates to an evaporator pump 62. Pump 62 forces the particulates to a residuals storage tank 64 for eventual disposal offsite. The residuals can be combined with the sludge components derived from the filtration subassembly 11 for offsite disposal as well as for microwave treatment prior to offsite disposal. The distilled water component is transferred to condenser 66 and any of the post-distillation treatments such as the UV-light unit or module 40 and ozonation module 69 shown illustratively in FIG. 28B.

V. Microwave Module

Figure 10:
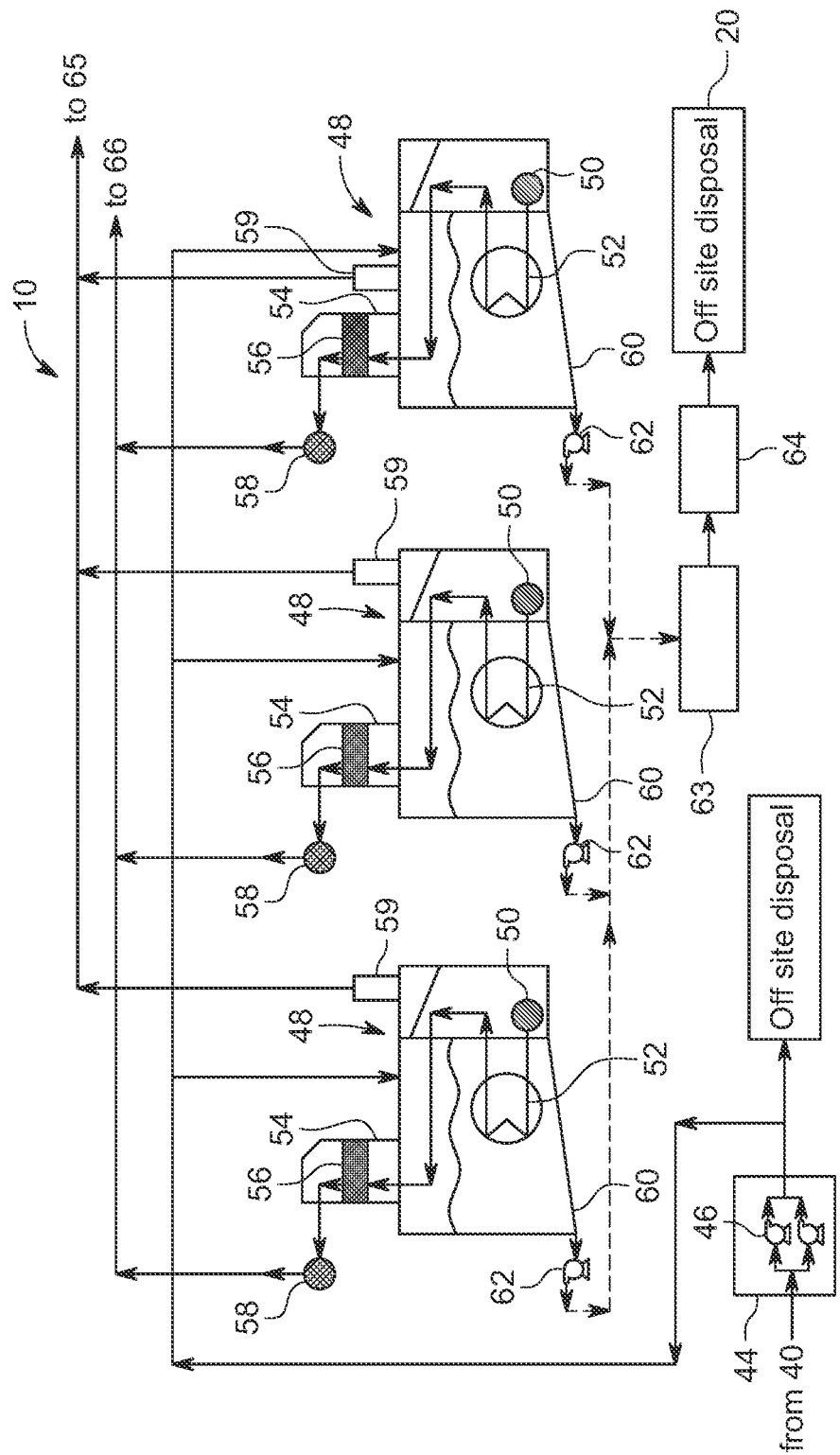
FIG. 10 is a flow chart of a second segment of a wastewater treatment system having an evaporator module with a microwave module according to another embodiment of the disclosure.

As an optional pre-treatment or pre-disposal step for the particulate matter derived from the evaporator unit(s) 48, in those embodiments that do not have an autoclave unit, the particulate or sludge component derived from evaporator(s) 48 may be sent through a dedicated optional microwave module or unit to degrade and destroy harmful biological and chemical materials and compounds resident in the evaporator-derived sludge. As shown in FIG. 10, a microwave module or unit 63 is positioned in-line with, and upstream from, storage tank 64. This ensures the sludge material shipped off-site is as inert as possible before final disposal. In a yet further alternative embodiment, a single microwave unit 63 may be positioned in-line with screen 18, WAS holding zone 26 and storage tank 64 to pre-treat all the particulates and sludge produced by the filtration sub-system or module and the evaporator sub-system or module in one location.

The evaporated liquid component, which is almost 100% water vapor, passes through a mist capture system 56. The water vapor next travels upwardly through a vent stack 58 that leads to a condenser 66 disclosed in more detail herein and shown in FIG. 11. At this point, the water vapor is essentially distilled water in vapor form. Any volatiles present in the effluent at the beginning of the process are removed prior to the treated effluent reaching a water storage tank 68 via the mist capturing device in the stacks of the atmospheric eliminator. If autoclave unit(s) or modules and flash tank(s) of some embodiments is/are present and utilized, all the volatiles and other inorganic and organic compounds will have been destroyed before evaporation.

Figure 11:
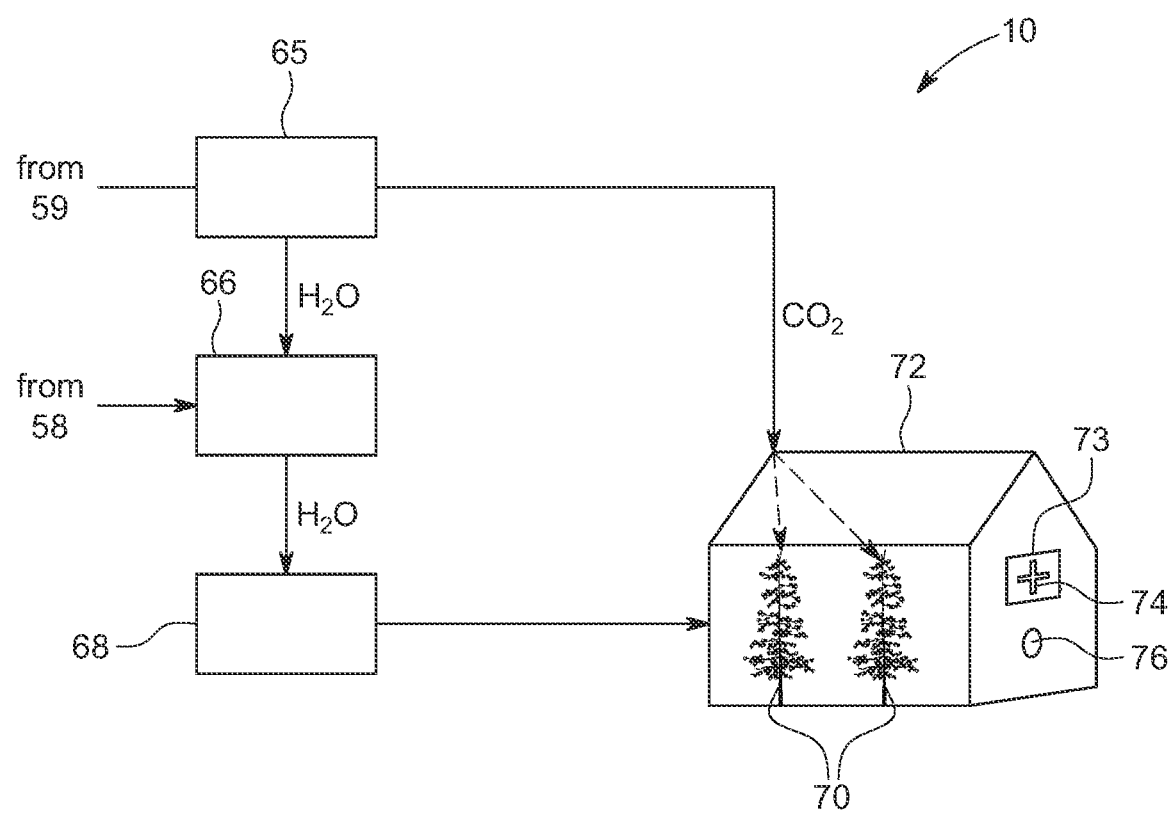
FIG. 11 is a flow chart of a third segment of a wastewater treatment system according to one embodiment of the disclosure.

Referring still to FIG. 11, condenser 66 converts the water vapor to liquid water. Food-grade water storage tank 68 receives, directly or indirectly from at least one condenser 66, the condensed water. The purified water may be used in part or in whole to irrigate carbon-capturing plants 70 planted in a greenhouse, a rooftop garden or set in a hydroponic system collectively designated as 72. If a conventional greenhouse is used, water will be supplied with a sprayer, irrigation system, or similar system. If a hydroponic system or rooftop garden is used, the water will be added to the water supply of that system, as needed. Greenhouse or hydroponic system 72 is an enclosure with at least one outlet 73, such as a vent for the ingress and egress of air.

Outlet 73, or a second outlet (not shown), which may also be a vent, may include a reversible fan 74 to permit the relative pressure within greenhouse 72 to be positive or negative depending upon the processes being performed in the greenhouse. For example, if the concentration of $CO_2$ is at an acceptable low level, outlet 73, which may be in the form of a controllable vent, may be opened to permit $CO_2$-laden air to be drawn into the greenhouse for further $CO_2$ uptake and assimilation by the resident plants. If the concentration of $CO_2$ is at a level dangerous to humans, the vent may be maintained in a closed position to permit the resident flora to absorb and assimilate the $CO_2$. Alternatively, if the $CO_2$ levels are high and humans are required to enter the greenhouse 72, outlet 73 may be opened to permit outside air to mix with the air in the greenhouse to reduce the overall $CO_2$ concentration. The mixing may be achieved by activation of fan 74. A series of pipes and tubes may extend from water storage tank 68 to provide regulated amounts of water to the individual plants 70. The water irrigation may be computer controlled to set parameters.

The balance of water stored in the food-grade storage tank may be directed and reused for other purposes in the building illustratively including replenishing water in rooftop NC units, toilets, laundry room appliances, on-site swimming pools and irrigation systems. The purified water may also be designated for offsite sale such as for offsite swimming pool water, irrigation systems, etc. If of sufficient purity, it may be used as drinking and bathing water. If used for drinking water, in particular, the purified water should be re-mineralized to transform it to a potable state. Before reusing or redirecting the reclaimed and purified water, it may require additional treatment(s) with additional treatment modules such as ozonation, UV light, chlorination and/or re-mineralization modules depending upon relevant federal, state and local regulations and ordinances that control the reuse of wastewater and potable water.

Referring still to FIG. 11, if natural gas is the fuel used to fire thermal evaporators 48, the combustion components of the natural gas, i.e., $CO_2$ and $H_2O$ are transferred via a dedicated vent 59 to condenser 66 used to condense the water vapor component. Essentially, the $H_2O$ in vapor form is separated out from the $CO_2$ by the condenser 66. The $H_2O$ vapor and $CO_2$ gas combination transferred via pipe to condenser 66 combines with the water vapor component derived from the heat exchange process performed on the treated effluent. The condensed water may be sent via piping directly to storage tank 68. The $CO_2$ component that will not be condensed by the condenser will remain in a gas phase and be transferred via a dedicated pipeline into greenhouse 72. Alternatively, the $CO_2$ may be transferred to a $CO_2$ holding tank, as disclosed in more detail herein, for controlled delivery to greenhouse/rooftop garden and/or hydroponic system 72. Technology concerning the direct capture of $CO_2$ gas from the combustion of natural gas is still in its infancy. The $CO_2$ capture provided by this disclosure uses plant life in the greenhouse/hydroponic systems to assimilate the $CO_2$ to reduce the overall $CO_2$ content. Depending upon how much $CO_2$ is produced by the combustion process, storage and selective release over time into the greenhouse/rooftop garden and/or hydroponic system 72 can significantly reduce the amount of $CO_2$ gas released into the atmosphere. Moreover, the $CO_2$ also may be used as a refrigerant if the sonolysis module is used as disclosed in more detail herein.

VI. Ozonation Module

Figure 12:
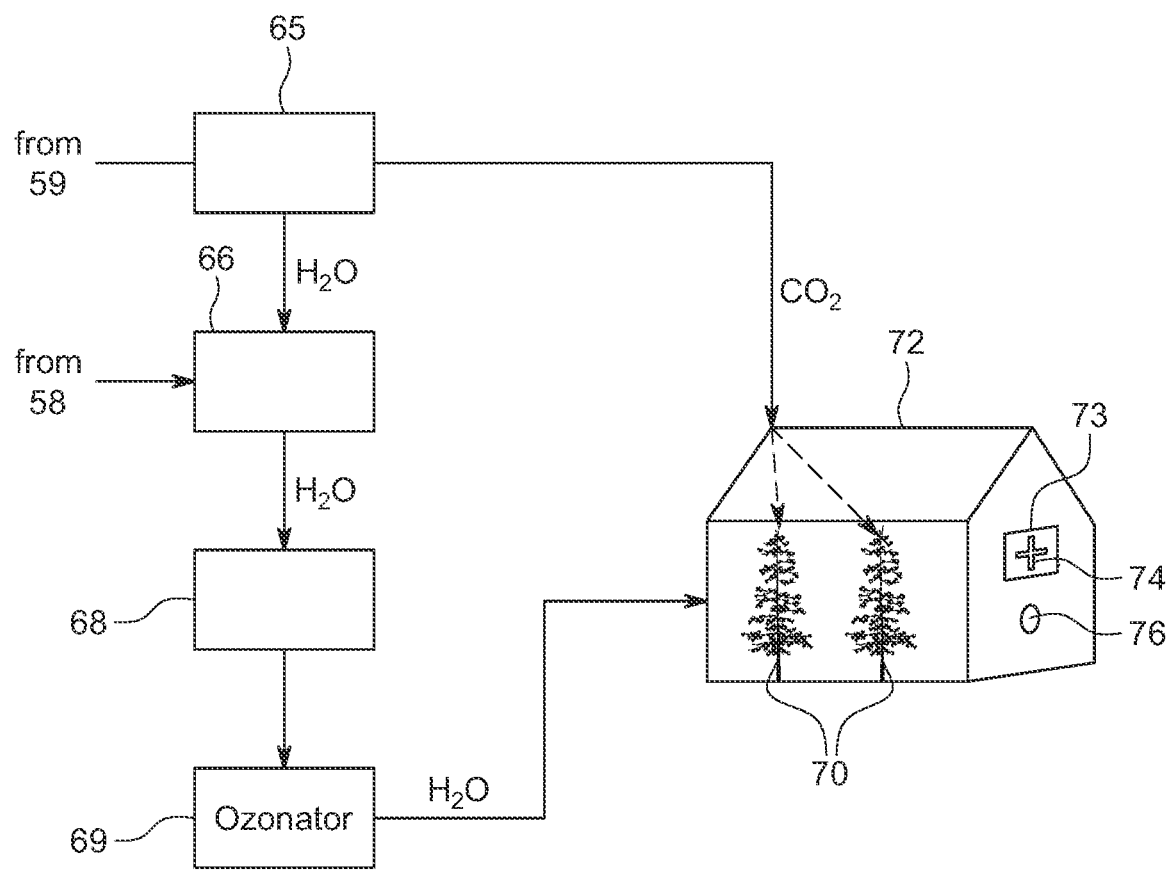
FIG. 12 is a flow chart of a third segment of a wastewater treatment system with an ozone module according to another embodiment of the disclosure.

With respect to the water vapor captured and reduced to liquid water and stored in storage tank 68, to ensure the purity of the water, the water can be run through an ozone or ozonator module or unit 69 as shown in FIG. 12. As is well known in the art, ozonation of water is an effective treatment for eliminating bromides and other harmful substances in water. And as a preferred method for storage of water in food-grade tanks (holding tank 68), a sampling port will be installed in the piping before and after treatment and before storage in order to test for total coliform, *E. coli*, heterotrophic plate counts (HPCs), Per- and Poly-fluoroalkyl Substances (PFAS) and any other monitored contaminants.

VII. Post-Evaporator UV and Chlorination Modules

Figure 13:
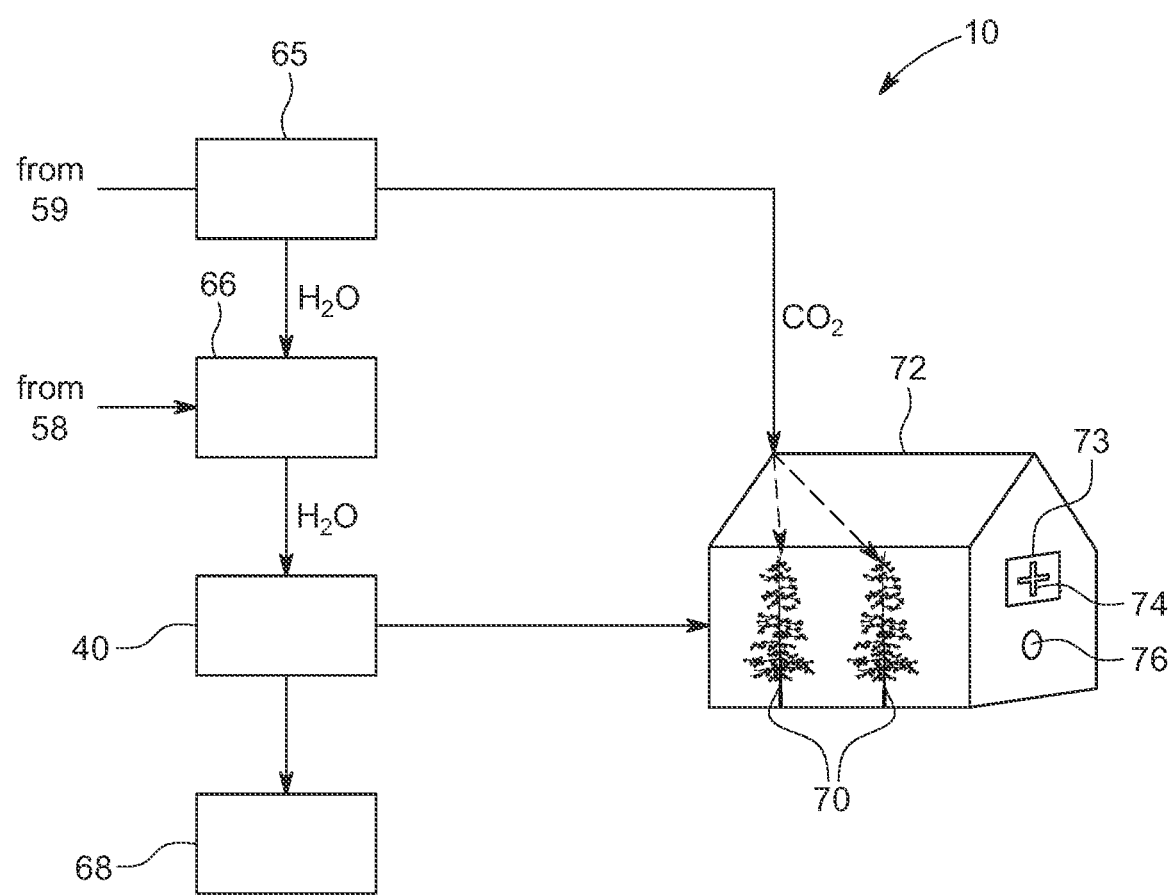
FIG. 13 is a flow chart of a third segment of a wastewater treatment system with a UV-light module according to a further embodiment of the disclosure.
Figure 36:
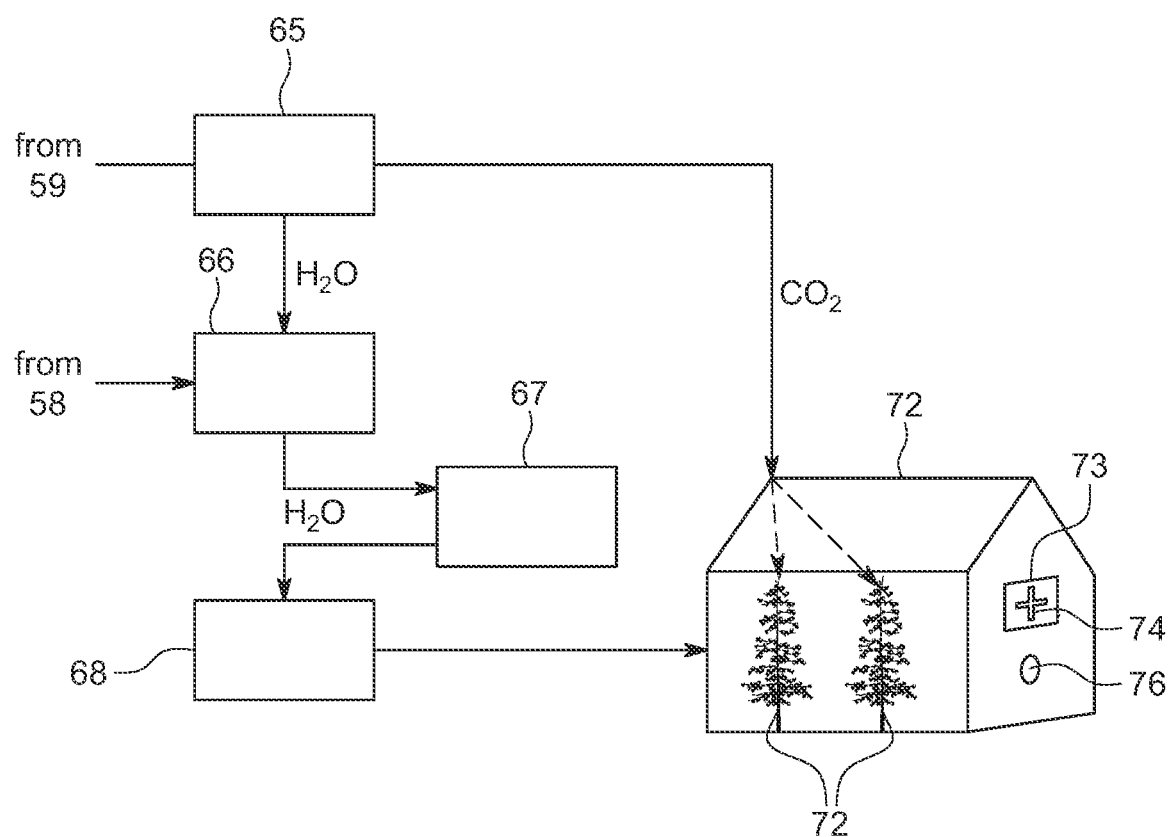
FIG. 36 is a flow chart of a third segment of a wastewater treatment system with a chlorination module according to a further embodiment of the disclosure.

In an alternative embodiment as shown in FIG. 13, a UV-light module or unit 40 as previously described is positioned in-line between condenser 66 and water holding tank 68 to ensure no bacteria or other potential pathogens are present in the water as a condition of reuse. Use of UV unit 40 may be enhanced with, or substituted by, the application of a chlorination module 67 as a substitute as shown in FIG. 36, or as an auxiliary purification source, as is well known in the art to be a precondition of reusing the reclaimed water under some local ordinances. Chlorination module 67 comprises a chlorination holding tank for holding the treatment, a metering device such as a metering valve for transferring the chlorinating agent into the purified water and a chlorination delivery pipe in fluid communication with the chlorination holding tank and water holding tank 68. In an alternative embodiment, the water may be treated with any combination of ozone, UV light, chlorination and microwave energy modules, in any sequence to ensure the treated water is brought to a purer state including re-mineralization to bring to a potable state via mineralization module that may include passing the treated water through a lime bed as one illustrative example of re-mineralization. One or more of the post-distillation treatments may be positioned after holding tank 68.

Referring now to the captured $CO_2$ derived from the evaporation module, plants 70 are exposed to the $CO_2$ in order to absorb and assimilate the gas to perform the carbon-capture function. When $CO_2$ from the combustion of natural gas is introduced into greenhouse 72, the relative pressure of the greenhouse atmosphere may be kept either neutral of slightly positive relative to the ambient atmospheric pressure outside the greenhouse. This is accomplished with outlet 73 and optional fan 74. When $CO_2$ is not being pumped into greenhouse 72 from thermal evaporator(s) 48, and the $CO_2$ content of the air in greenhouse 72 is below a set level, fan 74 may be operated in a direction (clockwise, counterclockwise depending upon the blade orientation) to create a negative pressure in the greenhouse so as to pull carbon-dioxide-laden outside air into the greenhouse. This permits plants 70 to extract $CO_2$ from the air and maintain their natural function to continue to capture and assimilate $CO_2$.

At least one $CO_2$ monitor 76 is placed in greenhouse 72 to ensure human-acceptable levels are maintained. Current average atmospheric concentration levels run between about 350 to about 400 parts per million in air (depending on altitude). The system is designed to constantly monitor $CO_2$ concentration. If $CO_2$ levels are too high, fan 74 can be activated to blow the greenhouse air out into the atmosphere until an acceptable level of $CO_2$ is reached. The parameters used to set the $CO_2$ can be modified as needed for a particular application. The system may be designed with a default setting of blowing air out of greenhouse 72 in the event of a system failure to prevent carbon dioxide buildup.

All plants undergo carbon fixation as part of the natural processes performed by plants as well as algae and cyanobacteria. Although any species of plant may be used, plants that have the highest carbon fixation rates are preferred. By way of illustration and not limitation, several species of Hemp plants are particularly suitable for this use as they are known to have some of the highest carbon fixation rates in the Plant Kingdom. They are additionally advantageous as the leaves can be harvested for other uses such as the production of CBD oil.

In an alternate embodiment, if evaporator unit(s) 48 are used to completely evaporate and eliminate the water component of the wastewater, separator 65, condenser 66, ozonation unit 69 and greenhouse 72 can be eliminated from system 10. If the energy source used to run evaporator unit(s) 48 is electric, the $CO_2$ capture components also are not needed and can be eliminated from system 10.

VIII. Autoclave Module

Referring now to FIGS. 14-31, in another aspect of the disclosure, a wastewater treatment system shown generally as 10' includes a series of modules to separate and reduce raw sewage into disposable solids and reusable liquids brought to the system by a building's plumbing system and one or more continuous-cycle autoclave modules or units 80 to eliminate or degrade toxic chemicals and pathogens. The autoclave units destroy harmful chemical compounds and organic pollutants such as PFASs (Per- or Polyfluoroalkyl Substances) and convert them into inert compounds to ensure water removed from system 10' is essentially free of any harmful chemical compounds as well as any organic and microbial pathogens. As used herein, identical reference characters having differently primed or unprimed variations and assigned to features of the disclosure are intended to identify different embodiments of the same feature.

Figure 14:
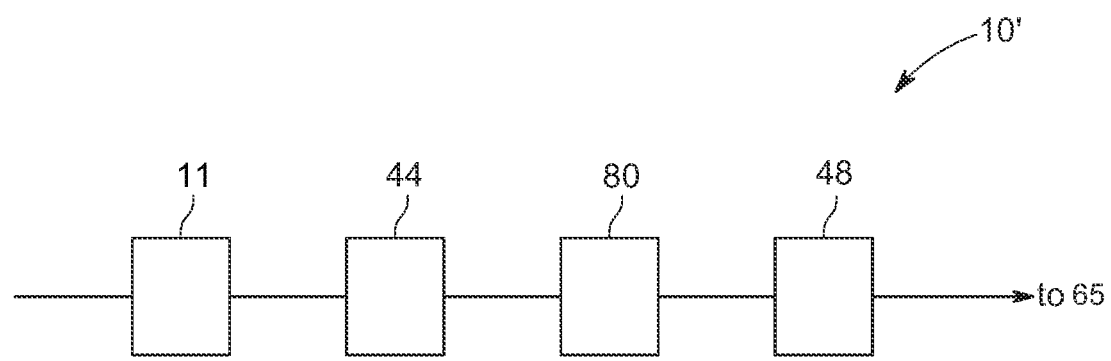
FIG. 14 is a flow chart of a wastewater treatment system with an autoclave module according to a further embodiment of the disclosure.

A partial segment of wastewater treatment system 10' is shown in FIG. 14. In similar fashion to the embodiment shown in FIG. 2, the raw sewage is first deposited into one or more pretreatment tank modules (not shown) that function as septic tanks to separate grease, grit and primary solids from the liquid component of the wastewater. The clarified liquid component is transferred via pipe system to a filtration module 11, the details of which are disclosed in more detail herein. In the embodiment shown in FIG. 14, effluent derived from filtration module 11 is transferred to holding tank 44. The effluent stored in holding tank 44 is next transferred to one or more autoclave units 80 for further processing. It should be understood that the embodiment shown in FIG. 14 is but one illustrative embodiment incorporating an autoclave module between filtration module 11 and evaporator module 48.

Referring still to FIG. 14, the particular embodiment of the disclosed wastewater treatment system that incorporates the autoclave module, UV unit(s) 40 are eliminated from the system between the filtration module and the evaporator module. In place thereof, one or more autoclave units 80 (or 80', 80") is/are inserted in-line between the filtration module and the evaporator module to destroy and/or degrade any unwanted chemical compounds as well as microbial life and microscopic pathogens. Substitution of the autoclave unit for the UV units enhances the water purification function in that the autoclave unit can address chemical compounds impervious to UV light treatment. Any effluent treated in autoclave unit 80 (or corresponding autoclave embodiments 80' and 80") will be sufficiently inert for further processing by evaporator unit(s) 48. UV treatment may be incorporated into the system downstream the evaporator unit(s) 48 to meet any local, state and/or federal regulations that require such treatment to ensure potable water is achieved.

Figure 15:
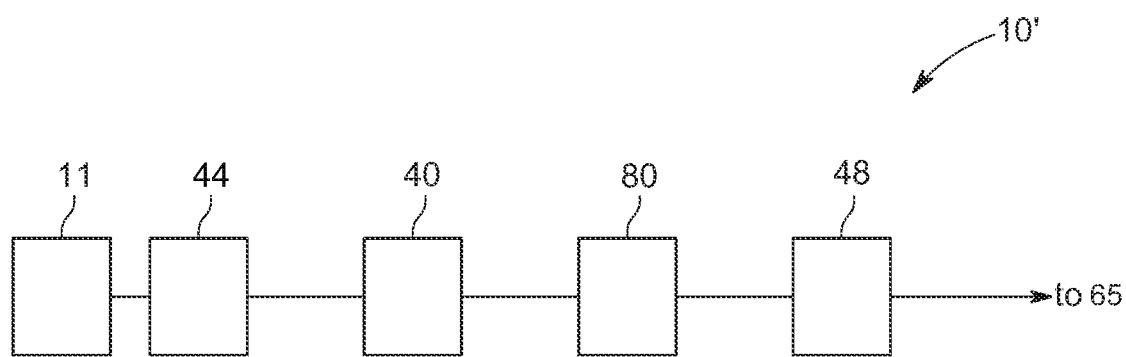
FIG. 15 is a flow chart of a wastewater treatment system with a UV-light module and an autoclave module according to a further embodiment of the disclosure.
Figure 16:
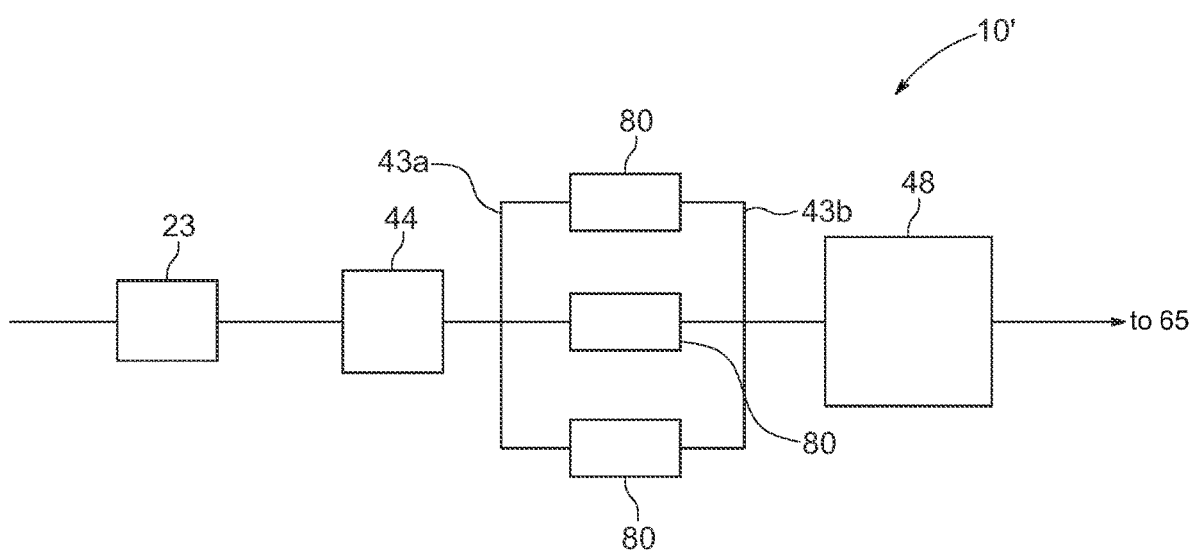
FIG. 16 is a flow chart of a wastewater treatment system with a plurality of autoclave units according to a yet further embodiment of the disclosure.
Figure 19:
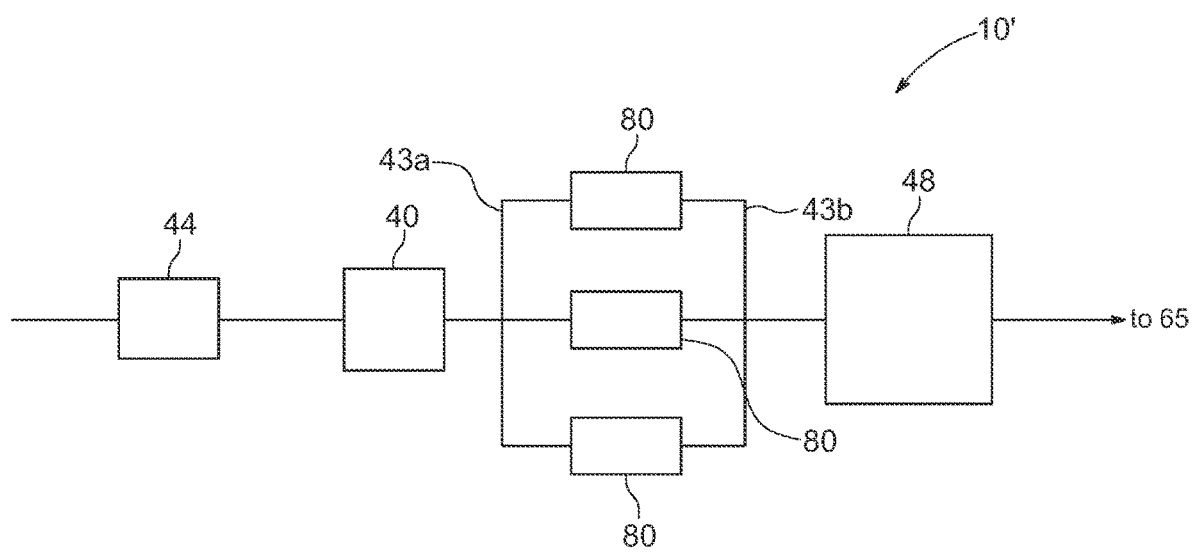
FIG. 19 is a flow chart of a partial segment of a wastewater treatment system with a UV-light module upstream a plurality of autoclave units according to another embodiment of the disclosure.

In other embodiments including an embodiment shown in FIG. 15, a UV-light module, such as UV-light module or unit 40 as also shown in FIG. 2 may be incorporated in-line and upstream or downstream from autoclave unit(s) 80 to provide additional water treatment. The variability of the sequencing of modules is explained in more detail herein. FIG. 19 shows the embodiment shown in FIG. 15 with a plurality of autoclave units 80 configured in a parallel configuration as disclosed in more detail herein.

Figures 17, 20:
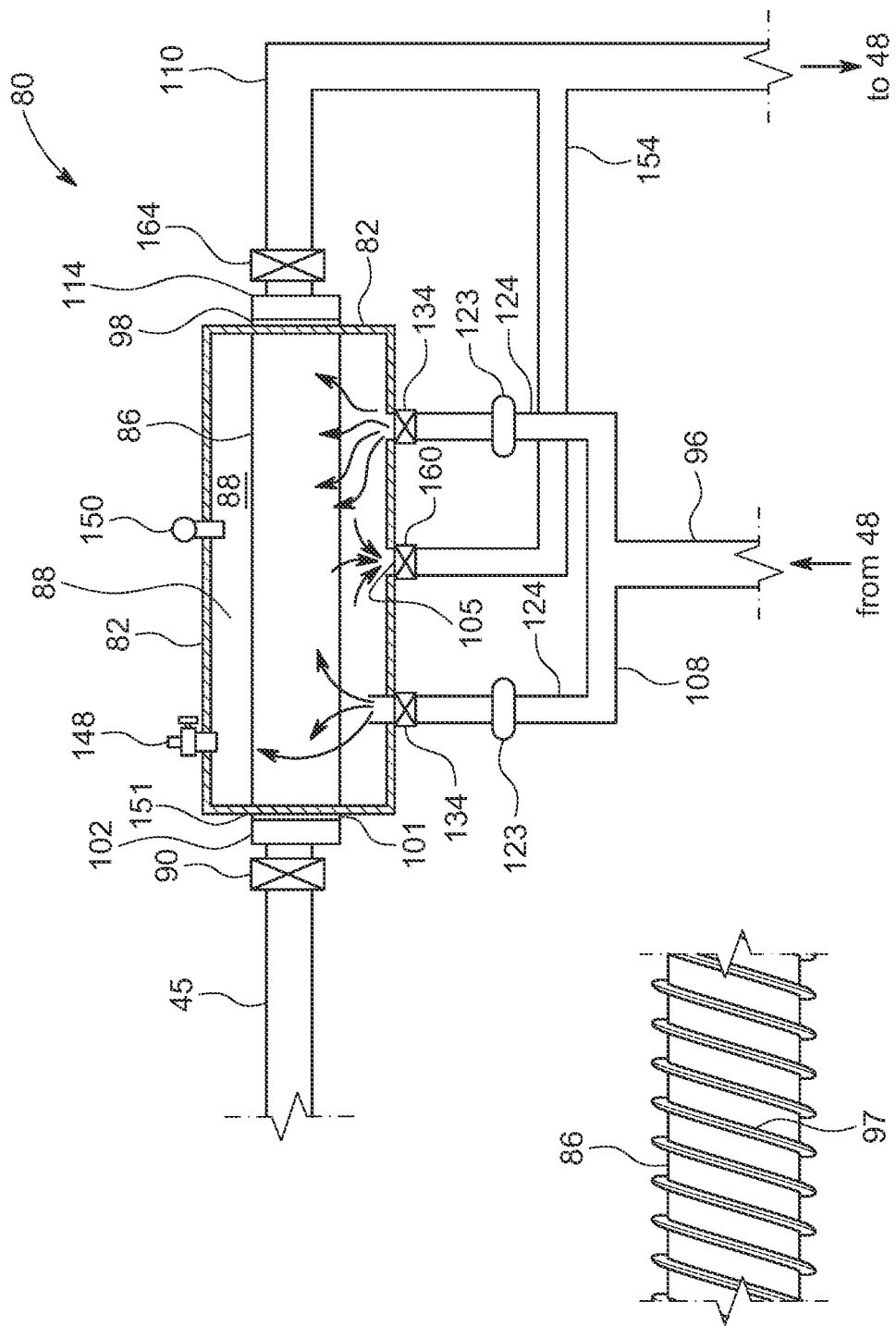
FIG. 17 is a side view of an autoclave unit according to one embodiment of the disclosure.
FIG. 20 is a side view of an autoclave pipe of the autoclave unit shown in FIG. 17 modified with a heating element according to according to another embodiment of the disclosure.

For the embodiment shown in FIGS. 14 and 17, effluent derived from the filtration module 11 and/or from additional water treatment modules placed downstream from filtration module 11 and upstream the autoclave module is transferred to one of a variety of autoclave module embodiments. The autoclave module can be a continuous-cycle autoclave unit 80 or a continuous-cycle autoclave/flash tank system combination as disclosed in more detail herein. Absent any intervening water treatment modules, the effluent travels directly from storage tank 44 to autoclave module or unit 80.

As shown in FIG. 17, autoclave unit, designated generally as 80, includes an inlet pipe 45 for transferring the treated liquid to the autoclave. Inlet pipe 45 may be formed from 304 stainless steel piping. An inlet valve 90 positioned in-line with inlet pipe 45 controls the flow of treated liquid into the autoclave unit. Valve 90 may be manual or automated. An inlet flange 102 secured to an end of inlet pipe 45 transitions the pipe to a proximal end of an autoclave pipe 86. Inlet flange 102 and autoclave pipe 86 both may be fabricated from 316 stainless steel. A distal or downstream end of autoclave pipe 86 is secured to an outlet flange 114 (which can be connected via NPT threading) that transitions the autoclave pipe 86 to an outlet pipe 110 and next to an outlet automated high-pressure valve 164. Outlet pipe 110 is connected to evaporator(s) 48 at a downstream end. Outlet high-pressure valve 164 positioned in-line with outlet pipe 110 controls the flow of treated effluent into the autoclave unit. Valve 164 should be automated in synchronized fashion with valve 90. The purpose of activating both valves automatically and in sync is to ensure proper control of the treatment time within the autoclave unit so the desired temperature (approximately 400-600° F.+) and pressure (approximately 30-50 Atm) are achieved for approximately 20-25 minutes. In an alternative embodiment, the temperatures used can be up to, and in excess of, 600° F. with pressures between about 45 to about 60 Atm for from about 5-15 minutes. It should be understood that the temperatures, pressures and time intervals can be modified from the disclosed ranges and remain within the scope of the disclosure. Such factors are dependent upon, among other considerations, the total amount of PFAS concentrate present, and whether treating wastewater or drinking water.

To create the elevated heat and pressure conditions of an autoclave, an autoclave jacket 82 is formed about autoclave pipe 86. In one embodiment, autoclave jacket 82 is cylindrical and superposed about autoclave pipe 86 to create an annular chamber 88 around pipe 86. An inlet jacket end is sealed around autoclave pipe 86 with an inlet gasket 151 and "wedge" styled weld 101. A weld joint alone can also be used instead of a gasket to secure the jacket to the pipe 86 if removal for maintenance or replacement is not required. Inlet gasket 151 and welding joint 101 are structured to withstand the high temperatures and pressures of the autoclave unit 80. An outlet jacket end is sealed around autoclave pipe 86 with an outlet gasket 98. A weld joint can also be used instead of a gasket to secure the jacket to the pipe 86 if removal for maintenance or replacement is not required. Outlet gasket 98 is structured to withstand the high temperatures and pressures of autoclave unit 80. The inlet flange 102 and outlet flange 114 (as well as all components of any autoclave unit disclosed herein) are constructed to ensure the containment of the desired pressure and temperature values according to Section VIII, Divisions 1-3 of the American Society of Mechanical Engineers (ASME) Pressure Vessel Standards, which should not be confused with ASME boiler standards that involve much lower pressures and temperatures as is well known in the art. Autoclave jacket 82 and its associated structures are insulated to maximize the efficiency of autoclave unit 80.

Autoclave unit 80 is structured to generate temperatures from about 400° F. to about 600° F.+ and pressures from about 40 to about 60 Atm within autoclave pipe 86. It should be understood that different temperature, pressure ranges and time intervals, including others disclosed herein, may be used and remain with the scope of the disclosure and appended claims. It should be understood further that before the introduction of steam from the compressor(s) into autoclave unit 80 to generate the target temperature and pressures, all current air/used steam within autoclave pipe 86 must be vacated from the autoclave using, illustratively, a vacuum compressor (such as one produced by ROOTS™) in order to avoid implosion of autoclave pipe 86 due to the presence of a gas in the pipe. This evacuation procedure may be used after every effluent treatment cycle to ensure autoclave pipe 86 is filled entirely with effluent and little to no gas/air. Once autoclave pipe 86 is filled substantially completely with effluent for treatment, steam may be introduced and compressed into annular chamber 88. In order to achieve the target temperature and pressure parameters, steam generated by evaporator(s) 48 is/are fed into chamber 88 with a series of pipes and optionally assisted by at least one steam compressor. Heating elements (run via fossil fuels, natural gas, electricity including solar) (not shown) also may be used to generate the desired temperatures and pressures alone or in combination with the steam compressor(s). A main delivery pipe 96 attached to, and in fluid communication with, evaporator(s) 48 splits into two or more secondary steam delivery pipes 124 that feed directly into jacket 82. Pressure regulators 123 are positioned in line with secondary delivery pipes 124 to control the pressure generated in jacket 82 that directly affects the pressure in autoclave pipe 86.

Figure 18:
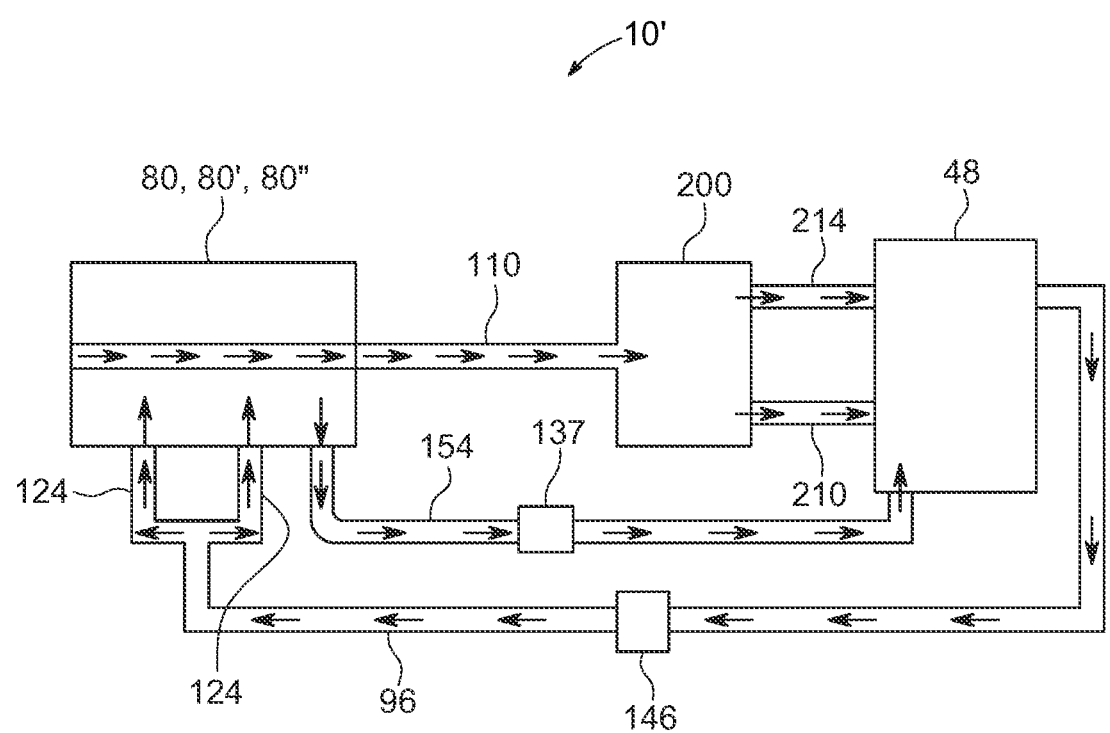
FIG. 18 is a flow chart of a wastewater treatment system with an autoclave module, a flash tank and an evaporator module with a closed loop fluid circuit between the autoclave module and the evaporator module according to one embodiment of the disclosure.

Steam supply valves 134 control the flow of steam into jacket 82. One or more steam exhaust pipes 154 are secured to jacket 82 and are in fluid communication with chamber 88 to relieve or remove pressure from the autoclave unit 80 after a volume of effluent has been processed by the autoclave unit. An exhaust high-pressure valve 160 controls the flow of steam out of jacket 82. An optional screen 105 may be placed at the jacket/exhaust pipe junction to prevent any contaminants in jacket 82 from being passed to evaporator(s) 48. The closed loop steam circuit is shown in FIG. 18. It should be understood that the embodiment shown in FIG. 18 may be modified by removing flash tank 200 and sending the treated effluent directly to evaporator unit(s) 48 as shown in FIG. 17.

In one embodiment, a distal end of exhaust pipe(s) 154 is/are connected directly or indirectly to a vacuum-style pump 137 and then to the evaporator(s) 48. This assures complete removal of any air/steam/water from the autoclave and assists with the inflow of new high-pressurized steam. Exhaust pipe(s) 154 may be connected to outlet pipe 110 (as shown in FIG. 17). In an alternate embodiment disclosed in more detail below, exhaust pipe(s) 154 is/are connected to a downstream flash tank, positioned upstream from evaporator(s) 48 to reduce the steam/water pressure and temperature.

To ensure proper sterilizing conditions and to ensure operation in a safe manner, a safety valve 150 is secured to jacket 82. Safety valve 150 may be in the form of a pressure/temperature relief valve, such as those used on an oil-fired furnace to bleed off steam if the temperature and/or pressure exceed preselected ceiling values. A pressure and/or temperature gauge 148 also is secured to jacket 82 to monitor the pressure and/or temperature within jacket 82. Control of the temperature and pressure within jacket 82 may be computer-automated and coordinated with the various valves used to introduce unprocessed effluent into autoclave 80 as well as the valves used to introduce high-pressure, high-temperature steam into the autoclave and to release steam from the autoclave.

As a backup and/or an accessory system, electrically-generated heat may be used to increase the temperature and pressure within autoclave 80 to the desired levels for chemical compound destruction. For this backup system, a heating wire or thermostatic system 97 is coiled around autoclave pipe 86 as shown in FIG. 20. When switched on, resistance in the wire creates heat used to heat pipe 86. Control of the wire can be manual or automated and coordinated with the steam-based autoclave process.

Figure 21:
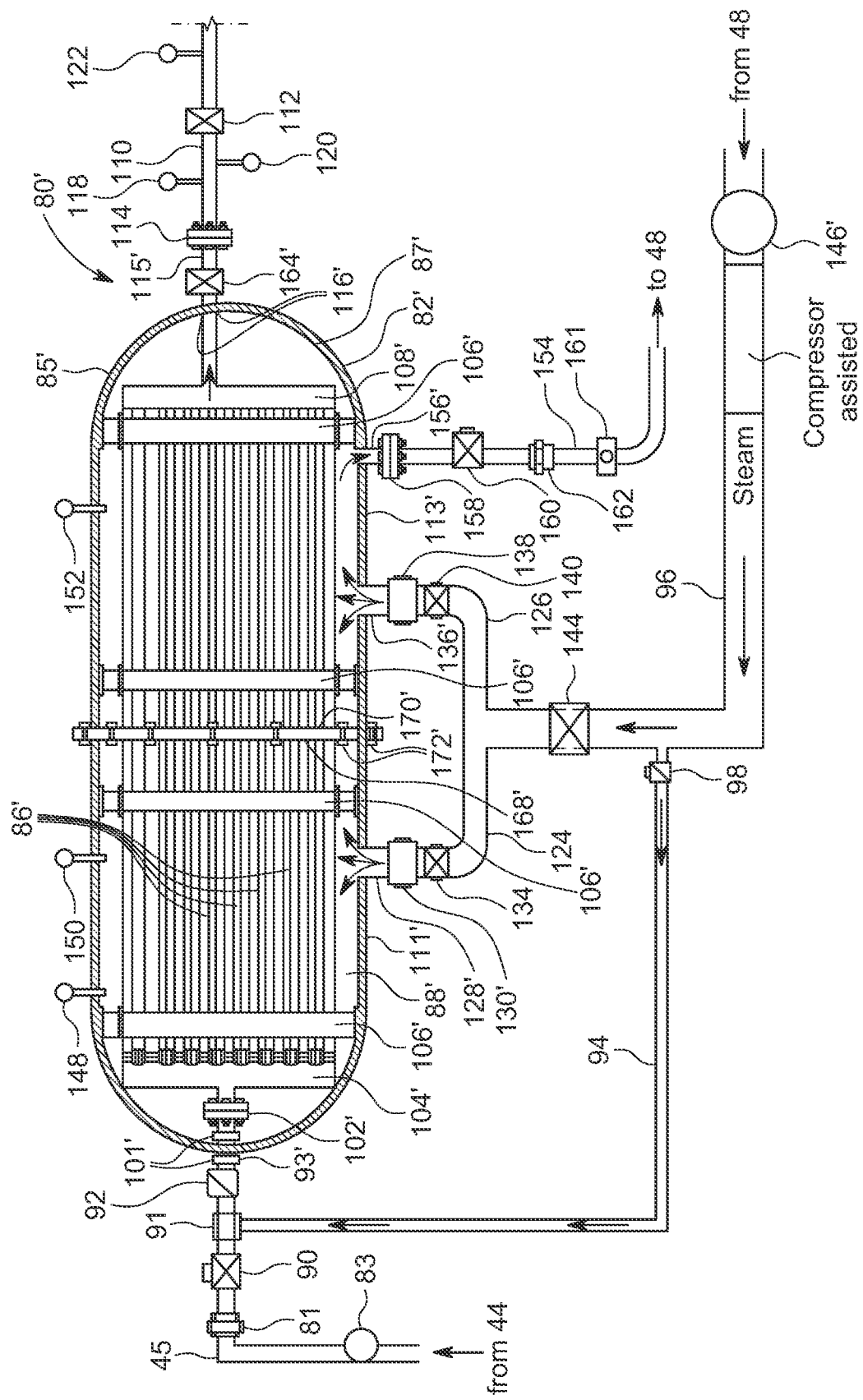
FIG. 21 is a side view of an autoclave unit with a pipe manifold according to another embodiment of the disclosure.
Figure 21A:
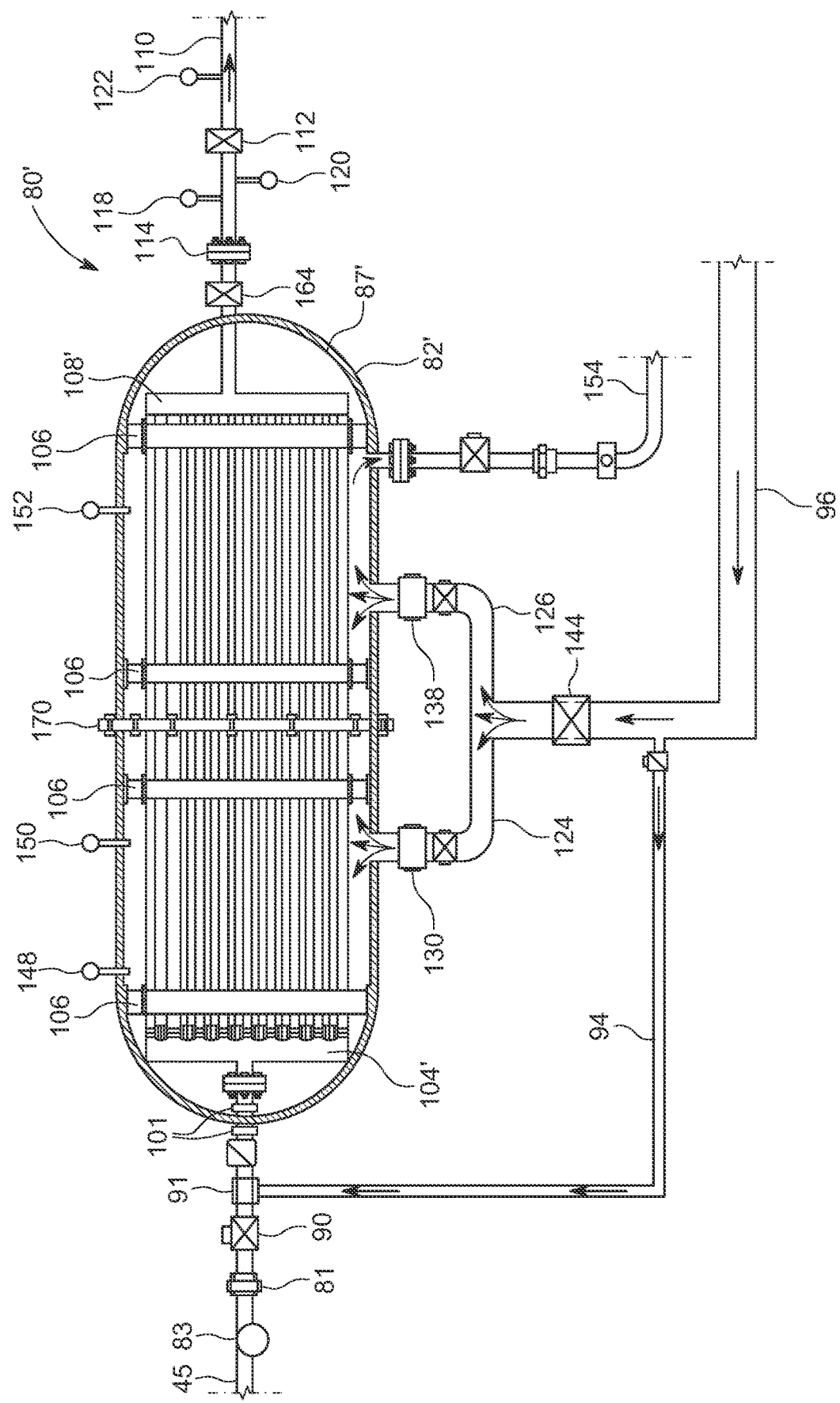
FIG. 21a is a reduced-scale side view of the autoclave unit shown in FIG. 21.
Figure 22:
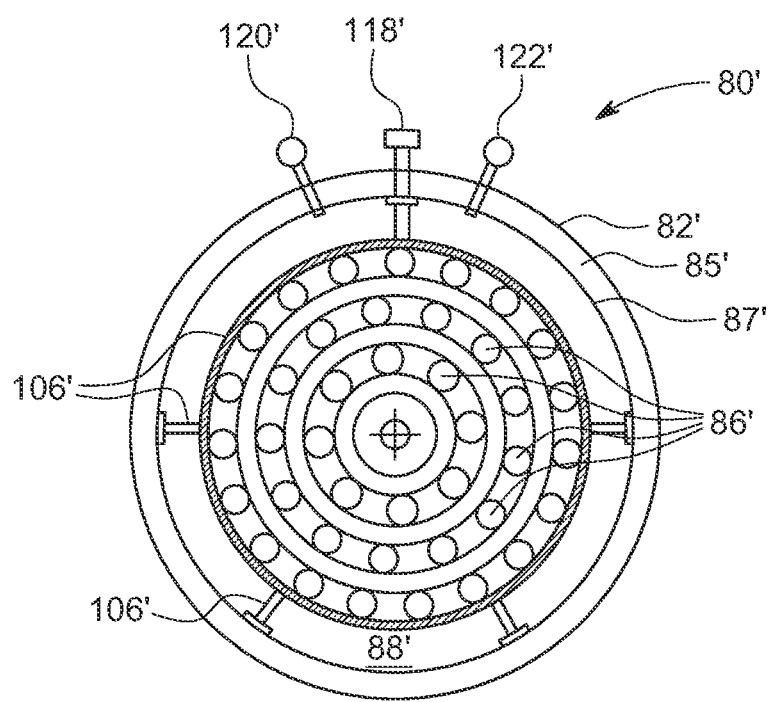
FIG. 22 is an end view of the autoclave unit shown in FIG. 21.

Referring now to FIGS. 21, 21*a* and 22, in an alternative autoclave embodiment, a multi-pipe autoclave unit 80' is placed downstream of the storage tank 44 used to store the fluid processed through the filtration unit. It should be understood that autoclave unit 80' or any of the other autoclave unit embodiments are positioned in the wastewater treatment system after, or downstream from, any embodiment of filtration subassembly 11 and before, or upstream from, any embodiment of the evaporator unit(s). If a UV disinfection module or unit(s) is/are incorporated into the wastewater treatment system upstream of the evaporator module, the autoclave unit(s) are positioned after, or downstream from, the UV disinfection unit(s) and before, or upstream from, the evaporator unit(s).

All embodiments that involve processing wastewater with solids have as base components the pretreatment module, the filtration module and the evaporator module. The autoclave unit(s), UV disinfection unit(s) and sonolysis unit(s) (disclosed herein) are added to the base system. If either or both the autoclave module(s) or unit(s) and the sonolysis module(s) or unit(s) are incorporated into the system, the UV disinfection module(s) or unit(s) positioned between the filtration module and the evaporator module are not needed as the autoclave unit(s) and the sonolysis unit(s) are much more effective in eliminating or degrading organic pathogens and toxic chemicals.

With the presence of autoclave unit(s) 80', an autoclave inlet pipe 45 transfers the fluid/effluent in the storage tank 44 to autoclave 80'. The flow may be gravity-fed or enhanced with pump 83. The inlet pipe may have a pipe union 81 to permit separation of autoclave 80' from the system for replacement, maintenance, etc. It should be understood that any connection point disclosed herein can be modular, e.g., unions, or fixed, e.g., welds. An upstream high-pressure electronic valve 90 controls flow of the fluid into autoclave 80'. A check-valve (backflow) device 92 ensures fluids entering autoclave 80' do not back upstream. An optional autoclave cleaning line 94 for a clean-in-place system may be included to provide a means to clean pipes 86' between treatment sessions. Cleaning line 94 connects to steam feed line 96 and inlet pipe line 45 before check valve 92. A cleaning line valve 98, which may be automated, is used to control flow of steam/water through cleaning line 94. In an alternative embodiment, cleaning line 94 may be connected to a soap and acid wash dispenser to further clean the illustratively stainless-steel pipes of any of the autoclave embodiments disclosed herein. The cleaning solution can simply be allowed to pass through the system to the evaporator(s) 48 for processing.

To permit autoclave 80' to be disassembled, a pipe flange 102' is positioned inside an autoclave inlet end cap or autoclave inlet end (if the autoclave housing does not have modular ends) to permit the enclosed piping system (disclosed in more detail below) to be removable from the autoclave housing or to permit the end cap to be separated from the main body of the autoclave housing if the end cap is modular. Pipe flange 102' is positioned before an inlet manifold 104' disclosed in more detail below. Pipe 45 passes through the autoclave housing inlet end or end cap 109' (shown in FIGS. 24-26) and may be welded at points 101' to ensure a fluid-tight seal and to withstand the high temperature and pressure presented within the autoclave unit.

Autoclave unit 80' includes broadly an outer jacket wall 82' that encloses a plurality of autoclave pipes 86' that may be arranged in a plurality of concentric circular layers as shown in FIG. 22. Jacket wall 82' may be formed from steel and painted with high-temperature paint or epoxy. An insulation layer 85' is secured to an inside surface of outer jacket wall 82' to stabilize and maintain the temperature of any fluids introduced into the assembly. Insulation layer 85' may be two or more inches in thickness and be made from insulation materials such as fiberglass, cellulose fibers or any of the other insulation materials well known in the art. A passivated insulation support layer wall 87' may be formed from 316 stainless steel sheet material constructed with a thickness sufficient to withstand the high heat and high pressure of the system and to protect the insulation material from gases and fluids introduced into the autoclave. An autoclave chamber 88' is defined by an inner surface of support layer wall 87'. Pipes 86' are secured within a central area of chamber 88' via a plurality of tank supports or struts 106' secured to jacket wall 82' and pipe bundle 86'. Chamber 88' provides a space to introduce high-temperature/high-pressure steam vapor about pipe bundle 86' to impart high-heat/high-pressure to the contents of pipes 86'.

Due to the high heat and pressure, and constant exposure to water, tank supports 106' may be formed from a water-resistant material such as stainless steel and more particularly, 304 or 316 stainless steel. Polymers that can withstand the high temperature and pressure levels also can be used to form the tank supports. The same stainless steel or similar materials may be used to fabricate pipes 86' that are exposed to potentially caustic fluids introduced into the pipes. As outer jacket wall 82' is isolated from the gases and fluids introduced into autoclave 80', the materials used to fabricate the jacket wall may be common steel although stainless steel or polymer-based materials also may be used to fabricate the jacket wall.

Figure 26:
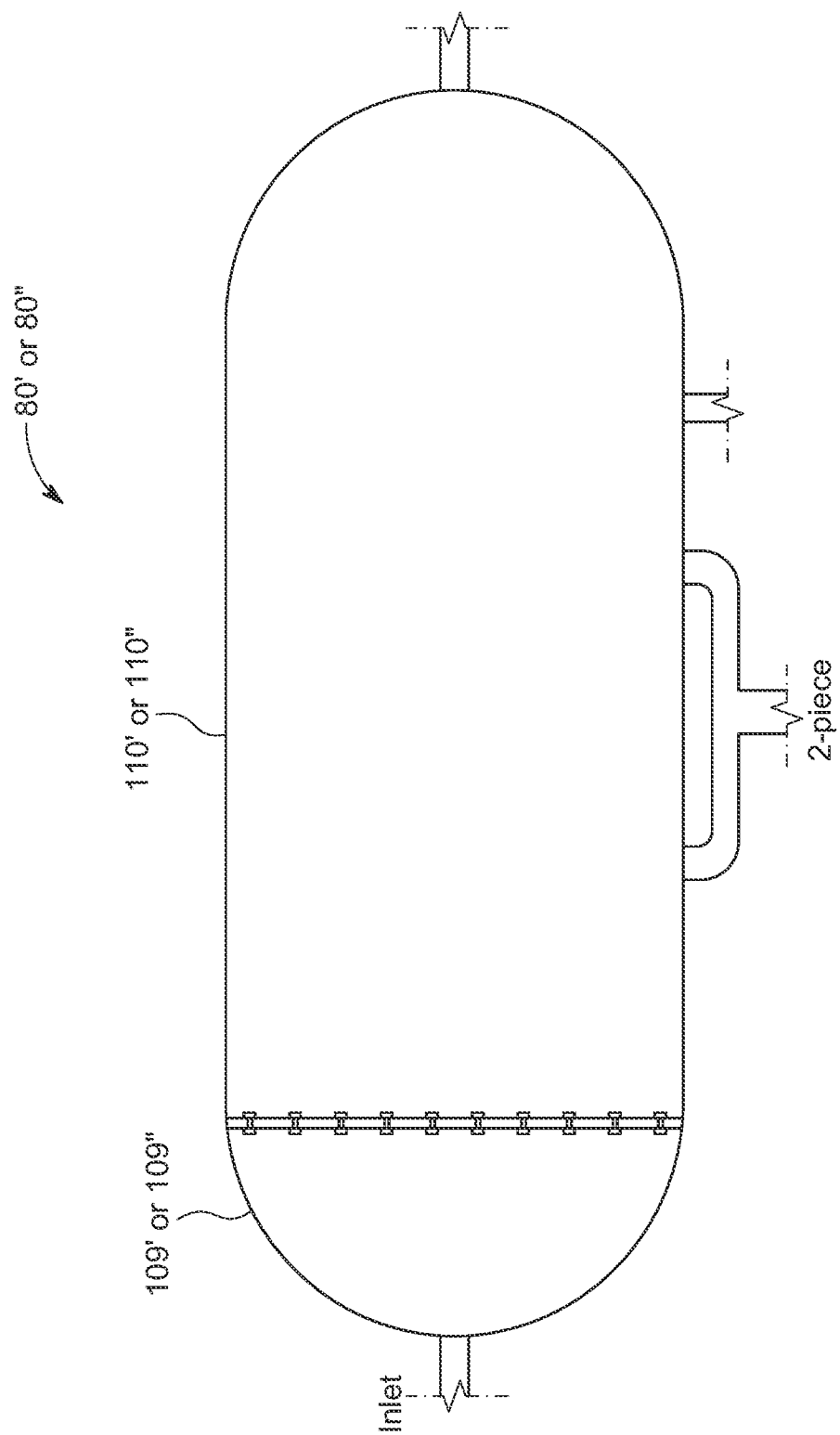
FIG. 26 is a side view of a 2-piece autoclave unit housing according to a further embodiment of the disclosure.
Figure 27:
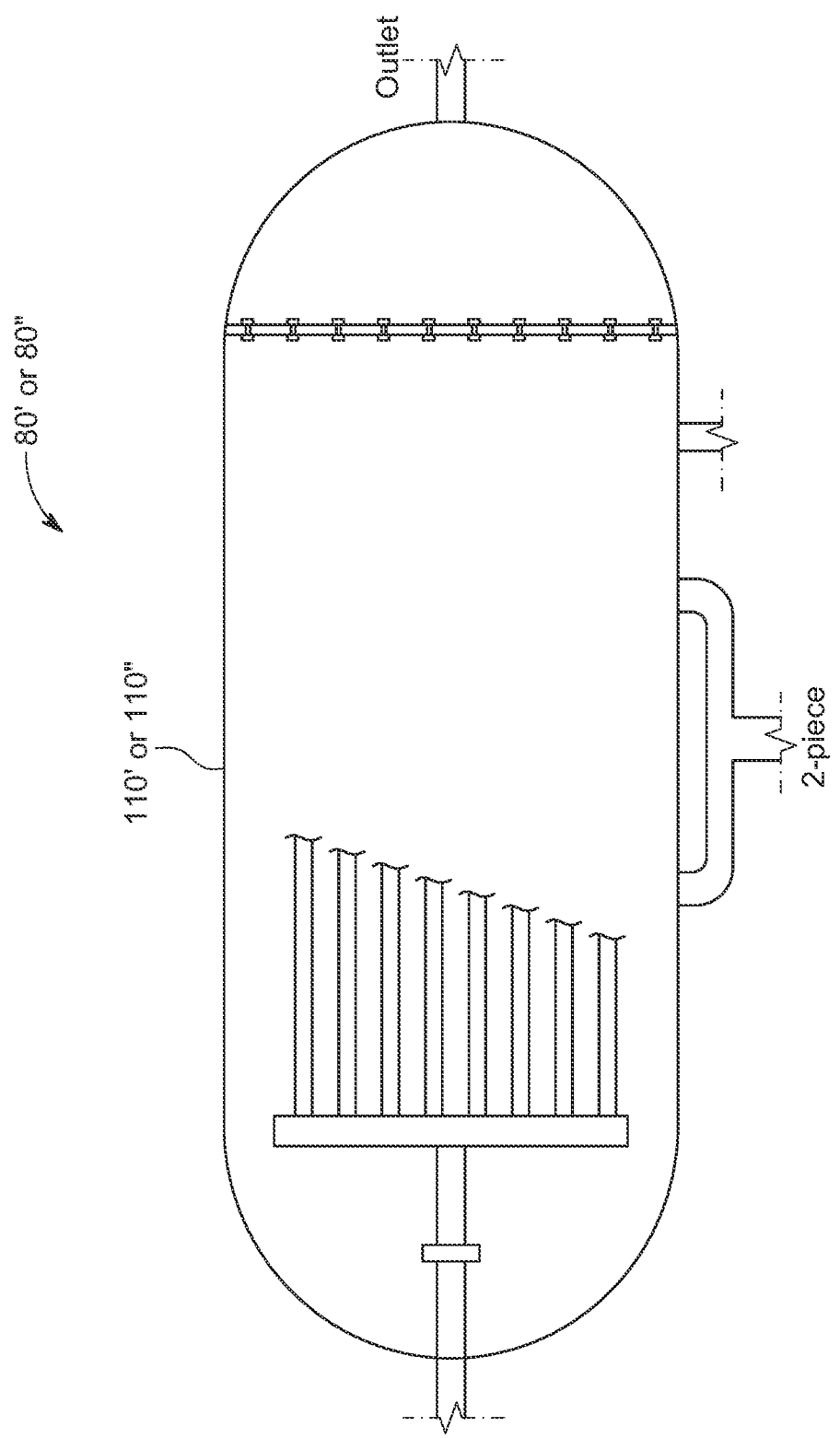
FIG. 27 is a side view of a 2-piece autoclave unit housing according to a yet further embodiment of the disclosure.

The housing of autoclave 80' may be formed as a fully enclosed unit, or may be formed as a modular unit as shown in FIG. 24-27. To permit maintenance and upgrades, jacket wall 82' may be formed as a two-, three-, or four-part container. One or more ends of autoclave 80' may be formed as separate hemispherical end caps, secured via annular flanges and mechanical fasteners to a substantially cylindrical and flanged main autoclave body 110' as is well known in the art. Alternatively, one or both end caps (inlet end cap 109' and outlet end cap 132') may be permanently secured to, or integral with, main autoclave body 110' as shown in FIGS. 21, 26 and 27.

Autoclave body 82' may be formed as two segments, a first inlet segment 111' and a second outlet segment 113' (FIG. 22), secured together with mating flanges, e.g., 168' and 170' and mechanical fasteners, e.g., 172' or other similar engagement means in a compression fit securement means. This permits the jacket wall 82' to be opened to permit the internal components such as pipes 86' to be serviced and/or replaced as needed. Annular or semi-circular frame struts 106' may rigidify jacket wall 82'. Frame struts 106' may also be secured to the pipe bundle via a solid or perforated tank wall enclosure, (not shown), to provide additional structural support and to maintain the bundle substantially within the center of the chamber defined by the jacket wall/insulation/passivated wall combination.

Pipes 86', of the embodiment shown in FIG. 21, are arranged about a central longitudinal axis of autoclave 80'. The axis itself may be occupied by a pipe 86' as shown in FIG. 22. They may number between 42 and 50 and be approximately 4 inches in diameter each. It should be understood that the number and dimensions of the pipes are disclosed illustratively and are not meant to be limiting. The number and dimensions of the pipes used can vary from the disclosed ranges and dimensions without departing from the scope of the disclosure and appended claims. The pipes may be spaced or registered against one another and are essentially fixed at their ends. An inlet end of each pipe 86' is secured to an inlet water chamber or manifold 104'.

Inlet manifold 104' disperses incoming fluids into the various pipes 86'. By using multiple pipes, the surface-to-volume ratio of the pipe walls to the pipe lumen is maintained at a high ratio relative to the surface-to-volume ratio of the autoclave 80' enclosure and its volume. By having a relatively high surface-to-volume ratio, heat and pressure transfer from the high-heat/high-pressure fluid (in the form of a liquid or a gas) in chamber 88' is maximized. This results in the efficient degradation and destruction of toxic chemicals, pathogens and other organic pollutants resident in the fluids/effluent being processed by autoclave 80'.

Outlet ends of pipes 86' are secured to an outlet water chamber or manifold 108'. Outlet manifold 108' collects all the fluids processed in pipes 86' and directs them to one or more outlet pipes 110 that transfer the processed fluids to the evaporator units 48 disclosed in more detail below. A downstream high-pressure electronic valve 164 is positioned in-line with port pipe 115 to provide a means to selectively and automatically shut off flow out of autoclave unit 80'. A downstream check valve (not shown) may be incorporated inline either before or after valve 164 to ensure no backflow into the autoclave. The check valve placed before valve 164 will eliminate the need to close the valve to prevent backflow.

To operate autoclave unit 80', upstream high-pressure electronic valve 90 is opened to permit fluid/effluent to flow into autoclave unit 80' from holding tank 44. Downstream high-pressure electronic valve 164 is opened and closed in coordination with valve 90' to permit the entry and capture of a selected volume of fluid/effluent in autoclave unit 80' for processing. The valves may be opened and closed simultaneously when processing volumes of fluid/effluent in a serial manner.

An automated flow meter 93 positioned upstream of autoclave unit 80' is used to permit the flow of a pre-selected volume of unprocessed fluid/effluent into the autoclave. When the preselected volume passes flow meter 93, a signal is sent to close upstream high-pressure electronic valve 92 and downstream high-pressure electronic valve 112 to lock the preselected volume of fluid/effluent in autoclave 80'. By synchronizing the opening and closing of valves 92 and 112 any air or fluid resident in pipes 86' will be forced out by the incoming pre-selected volume of unprocessed fluid/effluent. In this manner, the volume of fluid in the autoclave is processed and then forced out of the autoclave by the next pre-selected volume of unprocessed fluid effluent.

Figure 29:
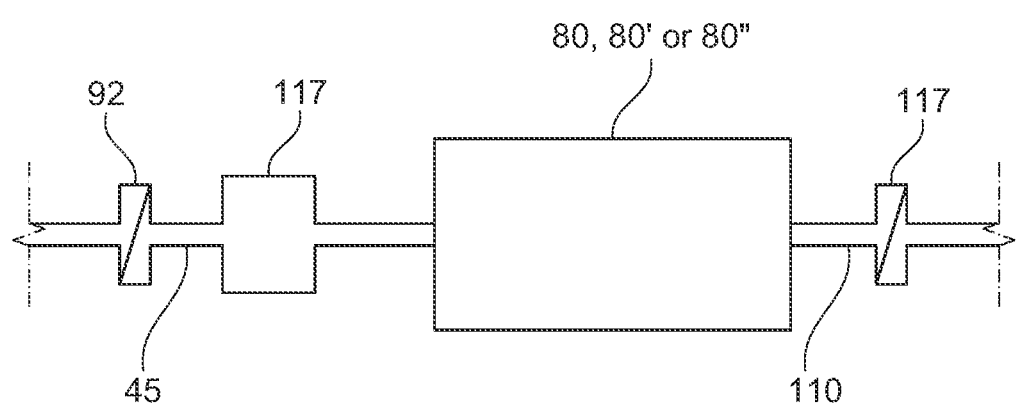
FIG. 29 is a flow chart of an autoclave unit with a purge pump according to another embodiment of the disclosure.
Figure 30:
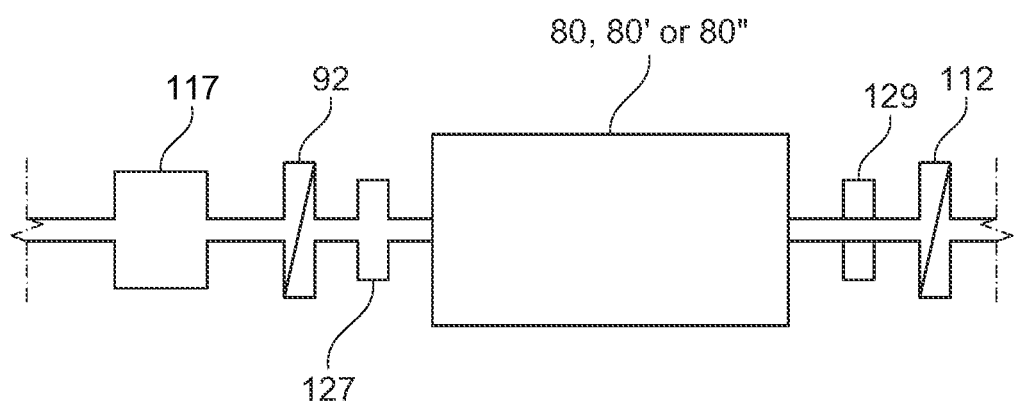
FIG. 30 is a flow chart of an autoclave unit with a purge pump according to a further embodiment of the disclosure.
Figure 31:
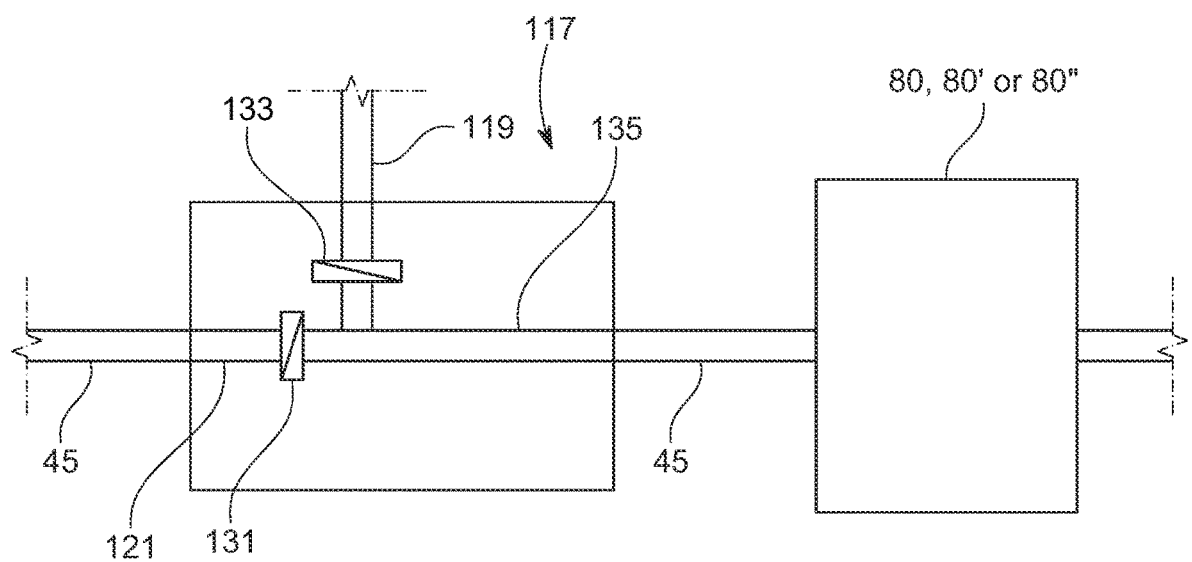
FIG. 31 is a flow chart of an autoclave unit with a purge pump according to yet another embodiment of the disclosure.

In an alternative embodiment as shown in FIGS. 29-31, a purge pump 117, placed upstream from autoclave 80' (or 80 or 80"), and before or after opening valve 92, may be used in combination with downstream high-pressure valve 112 (and upstream valve 92 if upstream from valve 92) to purge the volume of fluid in the pipes after autoclave processing. Purge pump 117 has two infeed lines and a common line 135. A first purge pump line 119 is used to force air into the autoclave system. A second purge pump line 121 is connected to effluent feedline 45 to draw unprocessed effluent into the autoclave. An effluent feedline valve 131 controls flow through second purge pump line 121, which is connected directly to common purge line 135. An air feedline valve 133 controls flow through first purge pump line 119, which is connected to, and in fluid communication with, common purge line 135. Valves 131 and 133 are coordinated to permit either effluent or air to flow into common line 135 and into autoclave 80. For air, valve 131 is closed and valve 133 is opened. To purge or force effluent through purge pump 117, valve 131 is opened and valve 133 is closed. With use of this alternative embodiment, the pre-selected volumes of unprocessed effluent treated in the autoclave do not mix.

To perform the purge function, i.e., to purge the volume of now processed effluent out of the autoclave, the first purge pump line, or airline, 125 is activated via the opening of valve 133 and the closing of valve 131 to draw air from the environment and force the air through the autoclave. First purge pump line 119 may include one or more filters to ensure the air used to purge the autoclave is not contaminated. If purge pump 117 is upstream form valve 92, valve 92' and downstream valve 112 are opened. If purge pump 117 is downstream valve 92, valve 92 is maintained in a closed position during the purge function. A check valve 127, downstream from valve 92 (or downstream from purge pump 117) and upstream the autoclave, may be incorporated in-line to ensure fluid processed in the autoclave does not flow upstream.

With the first purge pump line 119 selected, purge pump 117 is activated to draw air into the purge pump and forced into the autoclave. The air forces the now processed effluent, resident in the autoclave downstream out of the autoclave and past downstream valve 112 and a check valve 129 positioned upstream or downstream from valve 112. For the purge function, a volume or air that exceeds the volume of the autoclave may be used to ensure all the now processed effluent is purged out of the autoclave. Because air is compressible, it is understood a volume of air larger than the volume of pipes 86' will be needed to perform the purge function. Once the processed effluent has all or substantially all passed downstream valve 112, valve 112 is closed. If upstream valve 92 is positioned downstream from purge pump 117, valve 92 may be closed as well to prepare for the next volume of unprocessed effluent. If upstream valve 92 is positioned upstream of purge pump 117, the valve should be maintained in a closed position during the purge function.

After the purge process is complete, to bring the next pre-selected volume of unprocessed effluent into the autoclave, upstream valve 92 and downstream valve 112 are opened. Second purge pump line 121 is now activated, which is in fluid communication with common purge line 135 and feedline line 45. Valve 131 is opened and valve 133 is closed to activate line 121. Purge pump 117 is now activated to draw unprocessed effluent into the pump and urged into the autoclave. The act of introducing a new volume of unprocessed effluent into the autoclave will purge the air resident in the autoclave used to purge the prior volume of now processed effluent. The air will simply continue in the system until reaching any of the downstream air or vapor vents and simply pass into the atmosphere. Check valves, again, prevent any backflow of air or fluid from occurring. Once the pre-selected volume of unprocessed effluent is drawn into the autoclave, purge pump 117 is deactivated, and upstream valve 92 and downstream valve 112 are closed, which closures may be substantially simultaneous. The autoclave is then activated to process the enclosed unprocessed effluent. The feed, process, purge cycle is repeated as many times as is necessary to process all the unprocessed effluent.

For embodiments that do not incorporate a purge pump, once the autoclave-processed fluid is fully processed within pipe(s) 86' (or 86 or 86"), valves 92 and 112 are opened, which openings may be coordinated to be substantially simultaneous, to permit the next pre-selected volume of unprocessed fluid/effluent to enter the autoclave for processing. By bringing in the next volume of unprocessed effluent into the autoclave, the previously processed volume is forced out of the autoclave. Once the preselected volume of unprocessed fluid/effluent is urged into pipes 86', determined by either the flow meter 93 or the purge pump 117 via an internal meter, valves 92 and 112 are closed to contain the fluid/effluent in the autoclave for processing. Any air and/or fluid resident in autoclave unit 80' (or 80 or 80"), before valves 92 and 112 are opened, will be forced out by the incoming fluid. Once pipes 86' (or 86 or 86") are filled, high-pressure, high-temperature steam is transferred into chamber 88' (or 88 or 88") from steam feedline 96 to commence the next autoclave processing cycle. Once the processing cycle is completed, the high-pressure steam is transferred to one or more flash tank(s) 200 as disclosed more fully herein.

Once an autoclave processing cycle is completed, the now processed effluent is transferred out of the autoclave via outlet pipe 110. Outlet pipe 110 may include a pressure-reducing valve 112 to reduce the pressure of the processed fluids exiting autoclave 80' (or 80 or 80") to from about 30 psi to about 40 psi before the fluids travel to one or more flash tanks and/or then to the evaporator units. A shut-off valve (not shown) may also be included in-line with outlet pipe 110 in combination with an outlet union or pipe flange assembly 114 to isolate the autoclave unit 80' (or 80 or 80") from the flash tank(s) and/or the evaporator unit(s) 48' for servicing or replacement.

Outlet pipe 110 is secured via flange assembly 114 to an outlet port pipe 115' fixed or mechanically fastened to outlet manifold 108. Port pipe 115' may be welded to an outlet end or endcap 132' at the point 116' where the pipe passes through the endcap (or autoclave outlet end) to ensure a fluid and pressure-tight seal between the pipe and the endcap. A safety pressure valve 118 may be secured in-line with outlet pipe 110 downstream from flange 114 to permit pressure beyond a pre-selected ceiling level to be bled out of the system. A temperature gauge 120 also may be secured in-line with outlet pipe 106' downstream from flange 107' and illustratively may detect temperatures up to and above 700° F. A pressure gauge 122 may be secured in-line with outlet pipe 110 downstream from pressure-reducing valve 112 to ensure the processed fluid pressure is within an acceptable range before entering flash tank 200 disclosed in more detail below. The gauge may be used to provide a feedback loop to electronically control valve 112 and may read pressures up to and above 50 atmospheres.

Referring again to FIGS. 18 and 21, to process the fluids/effluent transferred into pipes 86' (or 86 or 86"), heated steam produced by the evaporator unit(s) 48 is transferred into chamber 88' via main steam feedline 96. A downstream end of feedline 96 may be split into two or more branches, such as inlet feedline branch 124 and outlet feedline branch 126, to more evenly disburse the steam in chamber 88'. The use of the terms "inlet" and "outlet" to characterize the feedline branches in the prior sentence is intended to denote the proximate location of the branches rather than differential functionality. The steam-line branches are not part of the inlet or outlet features of autoclave 80' that concern the transmission of fluids/effluent. The effluent and high-pressure steam do not mix but experience thermal transmission. As shown in FIG. 21, an inlet steam pipe 128' extends out from jacket wall 82' in alignment with inlet feedline branch 124. A first steam-line flange assembly 130 comprising mating flanges and mechanical fasteners joins inlet steam pipe 128' to inlet feedline branch 124 in a fluid-tight seal. The lumen of inlet steam pipe 128' and inlet feedline branch 124 are in fluid communication with chamber 88'.

A manual or automated inlet steam-line valve 134 controls flow of steam into chamber 88' from inlet steam-line branch 124. A manual or automated outlet steam-line valve 134 controls flow of steam into chamber 88' from inlet steam-line branch 124. An optional manual emergency shut-off valve 144 may be placed in-line with main steam feedline 96. Optional check valves, not shown, may be placed in-line with any or all of the main steam feedline 96 and steam-line branches, 124 and 126, to prevent the backflow of steam in the feedline and branches.

A second outlet steam pipe 136' extends out from jacket wall 82' in alignment with inlet feedline branch 126. A second steam-line flange assembly 138 comprising mating flanges and mechanical fasteners joins inlet steam pipe 136' to second inlet feedline branch 126 in a fluid-tight seal. The lumen of inlet steam pipe 136' and inlet feedline branch 126 are in fluid communication with chamber 88'.

Steam feedline 96 may have a check valve (back-flow preventer) device 149 and a pressure-relief valve 151 to ensure the safe transfer of heated and pressurized steam to chamber 88'. An optional shutoff valve 153, positioned in-line with feedline 96, which may be automated, shuts off the flow of high-pressure steam into chamber 88' to permit the steam to transfer its heat into the resident effluent in pipes 86' to degrade and destroy the unwanted contaminants in the fluid/effluent. Line-dedicated back-flow-preventer-type check valves, 134 and 140, may also be incorporated in-line with feedline branches, 124 and 126, respectively, to prevent any backflow. Alternatively to, or in addition to, check valves 134 and 140, a check valve (not shown) may be positioned in-line with main steam feedline 96. A manual emergency shutoff valve 144 may be included as an added safety precaution. A compressor 146 may be used to further pressurize the heated steam/water to achieve the desired temperature of from about 400° F. to about 600° F. and the desired pressure of from about 20 to about 40 atmospheres. A chamber temperature gauge 148, a temperature/pressure safety valve 150 and a pressure gauge 152 may be incorporated into autoclave 80' to monitor and regulate the conditions within the autoclave during processing. Pressure gauge 152 should be able to read pressures of at least 75 atmospheres or according to ASME standards requirements for pressure gauges.

A steam/water return line 154 is secured to a steam return pipe 156', which extends out from jacket wall 82' via a flange/mechanical fastener combination 158 at an upstream end and to either flash tank 200 or evaporator 48 at a downstream end via a flange (not shown). A high pressure return valve 160 is secured in-line with return line 154 and used to regulate the temperature and/or pressure of the steam/water returning to the flash tank and/or evaporator(s) from the autoclave. An in-line vacuum-assist pump (not shown) may be used to urge the steam/water back to flash tank 200 and/or evaporator(s) 48. An optional second union 162 may be placed in-line and downstream from return valve 160 to provide a means to decouple the return valve for maintenance and/or replacement. It should be understood that any of the components of the system 10' can be removed and inserted into the system with the use of union and flange assemblies. Any system component can be modular or permanent in nature and remain within the scope of the disclosure.

In one embodiment, due to the insulation layer 85', the pressurized/heated fluid remains resident in chamber 88' for a pre-selected period of time, e.g., illustratively from about 20 minutes to about 60 minutes, to permit the high heat and high pressure to penetrate pipes 86' and act upon the processed fluids. It is well known in the art that high heat and high pressure is an effective way to degrade and destroy toxic chemicals such as PFAS and pathogens, such as bacteria and viruses. It should be understood the temperature ranges, pressure ranges and time periods disclosed herein are illustrative and not limiting. Temperatures, pressures and time periods outside the disclosed ranges may be used depending upon the fluids being processed and the conditions resident in the system.

Once the pre-selected time period has expired, outlet valve 112 is opened and a purge pump 97 is activated upstream of the autoclave to pump the unprocessed fluid/effluent to flash tank 200 or optionally to evaporator(s) 48, as disclosed in more detail hereinabove. Purging the processed fluid/effluent creates a vacuum in autoclave 80' until another preselected volume of unprocessed fluid (or air) is flowed into the autoclave. Two methods of addressing the removal of now processed effluent are described above.

The steam/water in chamber 88' remains at a high temperature and pressure. Due to this fact, the steam/water is transferred to flash tank 200 to permit the water to be reduced in temperature and pressure to reduce the explosive nature of high-pressure steam when released from an enclosed environment. Once the steam/water temperature and pressure has been reduced to a satisfactory level, which is expected and intended to be higher than ambient pressure and temperature and maintained at a relatively high temperature to reduce overall energy needs, the water is reintroduced into evaporator(s) 48 to be distilled with the processed fluids. By maintaining the steam/water at a relatively high temperature and pressure, the contents of the evaporator, before activation, is at a higher temperature and pressure due to mixing with the incoming water/steam. This reduces the overall energy needed to operate the evaporator to perform the distillation function.

Alternatively, the water from chamber 88' may be transferred to a holding tank without first being processed by evaporator(s) 48 and later mixed with the distilled water end product of the evaporator process. This is made possible as the steam/water used to operate the autoclave is distilled water/steam produced by the evaporator(s) in a previous processing step. The piping through which the steam/water flows is constantly being sterilized by the steam/water so the transfer of the steam/water to a holding tank rather than the evaporator(s) should not result in any contaminants being mixed with the end product, i.e., distilled water, of the evaporator process.

Figure 23:
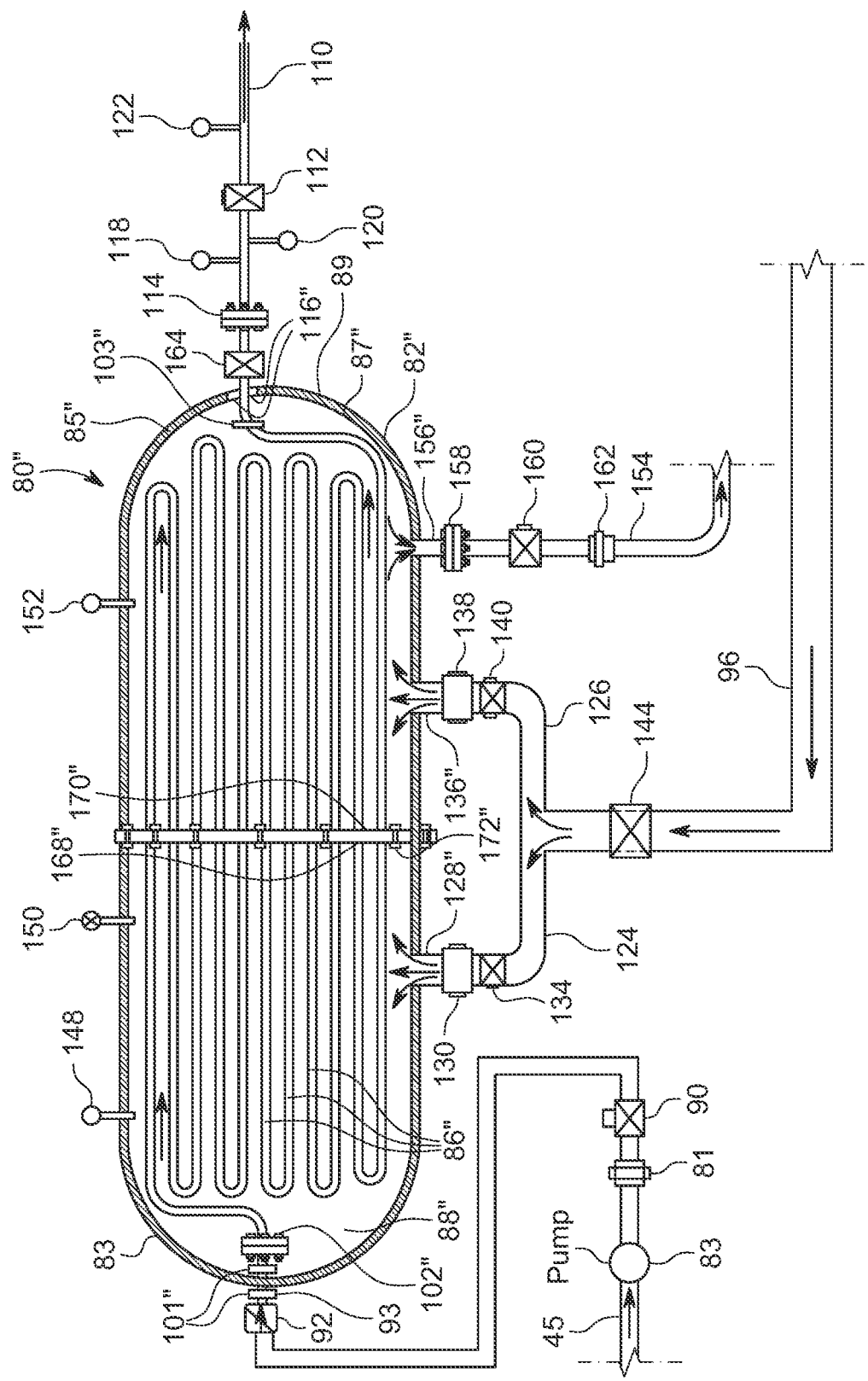
FIG. 23 is a side view of an autoclave unit with a serpentine pipe according to a further embodiment of the disclosure
Figure 23A:
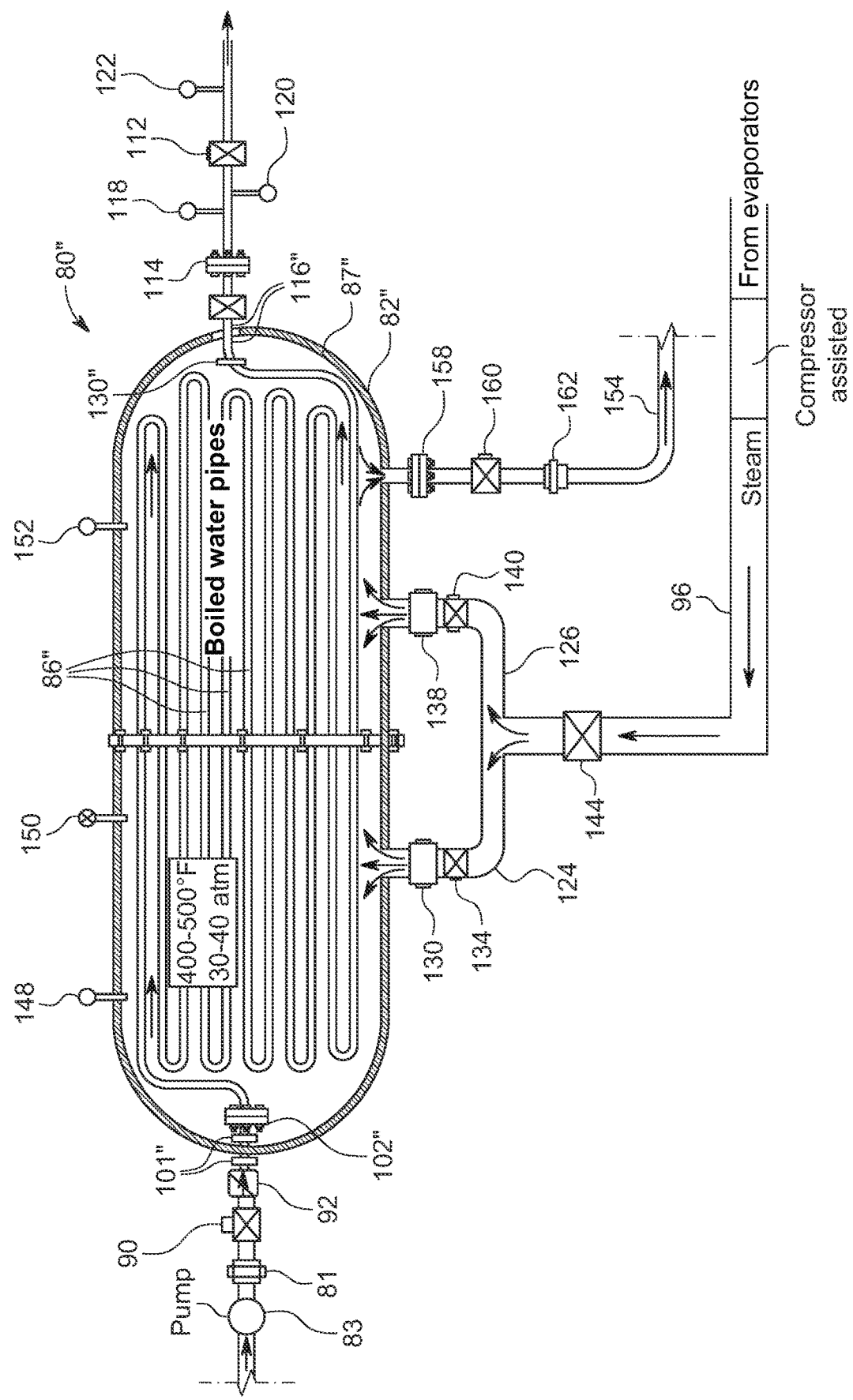
FIG. 23a is reduced-scale side view of the autoclave unit shown in FIG. 23.
Figure 25:
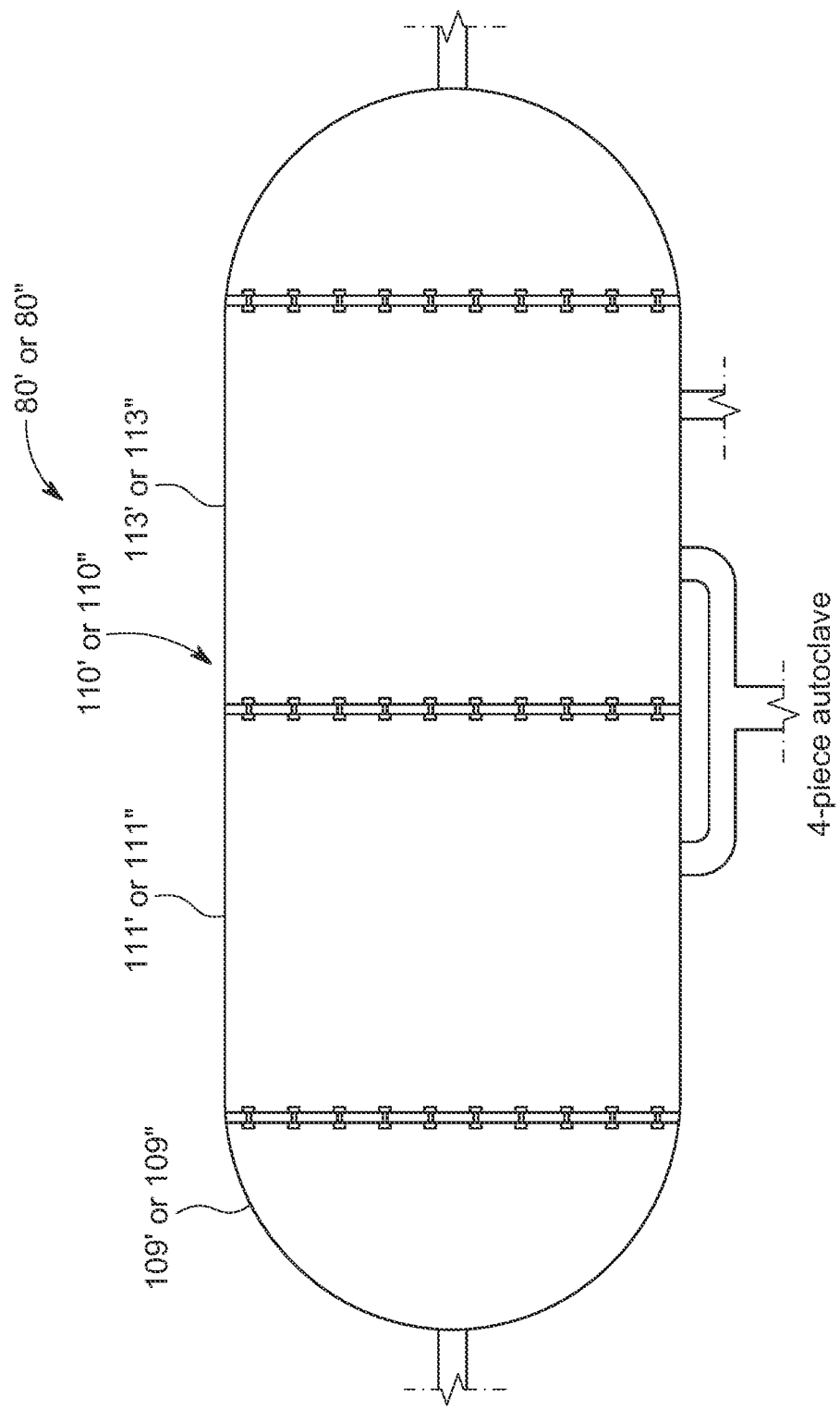
FIG. 25 is a side view of a 4-piece autoclave unit housing according to another embodiment of the disclosure.

Referring now to FIGS. 23 and 23*a*, in an alternative autoclave embodiment, an autoclave 80" has features similar to the features of autoclave 80' with the notable exception of the pipe configuration. In autoclave 80', a plurality of pipes are arranged concentrically about a centerline of the autoclave. In contradistinction, autoclave 80" includes a single pipe arranged in a serpentine pattern not dissimilar to the coil units used in water heaters as is well known in the art. By using the serpentine configuration, the inlet and outlet manifolds of autoclave 80' can be eliminated. One or more brackets (not shown) may be used to secure the serpentine segments in static positions with preselected spacing between the pipe segments to maximize the transfer of heat and pressure into the pipes.

As shown in FIG. 23, autoclave 80" is placed downstream of the storage tank 44 used to store the fluid processed through the filtration unit. Autoclave inlet pipe 45 transfers the fluid in storage tank 44 to autoclave 80". The flow may be gravity-fed or enhanced with pump 83. The inlet pipe may have a pipe union 81 to permit separation of autoclave 80" from the system for replacement, maintenance, etc. An inlet high-pressure electronic valve 90 controls flow of the fluid into autoclave 80. A check valve 92 ensures fluids entering autoclave 80" do not flow upstream.

An optional autoclave cleaning line 94 (shown in FIG. 21) may be included to provide a means to clean serpentine pipe 86" between treatment sessions. If utilized, cleaning line 94 connects to steam feed line 96 and inlet pipe line 45 upstream from check valve 92. A cleaning line valve 91, which may be automated, is used to control flow of steam/water through cleaning line 94. High-pressure steam is flowed from cleaning line 94 through serpentine pipe 86" to clean the inner walls of the pipe. Cleaning solutions also may be introduced to serpentine pipe 86" via cleaning line 94 with the addition of a cleaning solution inlet or source tank secured to, and in fluid communication with, cleaning line 94 and serpentine pipe 86".

To permit autoclave 80" to be disassembled, a pipe flange connection assembly 102 is positioned inside an inlet end 83*a* (or optional modular inlet end cap 109) to permit serpentine pipe 86" to be separated from the autoclave housing when the housing is disassembled with, or without, modular end caps. The embodiment shown in FIG. 23 has integral ends with a mid-section flange/mechanical fastener connection means comprising flanges 168" and 170" secured together with flange bolt/nut assemblies 172" secured in through-bores formed in the flanges. A gasket (not shown) can be inserted between the flanges to ensure a fluid-tight seal. Alternatively, the flange mating faces may be formed with precision milled surfaces to provide a metal-to-metal seal. This potentially eliminates any contamination from whatever material is used to make the gasket, if implemented. Pipe flange 102" is positioned upstream of serpentine pipe configuration 86" disclosed in more detail below. A downstream pipe flange connection assembly 103" positioned at a distal end of serpentine pipe 86" permits the serpentine pipe to be disassembled from outlet pipe 110" for replacement and/or maintenance.

Autoclave 80" includes broadly an outer jacket wall 82" that encloses an optional autoclave tank wall, (not shown), that, in turn, encloses pipe 86" arranged in a serpentine pattern of counter-directional runs as shown in FIG. 23. Absent the inner autoclave tank wall, jacket wall 82" only encloses pipe(s) 86". Outer jacket wall 82" may be formed from steel and painted. An insulation layer 85" is secured to an inside surface of outer jacket wall 82" to stabilize and maintain the temperature of any fluids introduced into the autoclave assembly. Insulation layer 85" may be two or more inches in thickness and made from insulation materials such as fiberglass, ceramic fibers, cellulose fibers or any of the other insulation materials well known in the art. A passivated insulation support layer 87" may be formed from 316 stainless steel sheet material to protect the insulation material from gases and fluids introduced into the autoclave. A chamber 88" is defined by an inner surface of support layer 87" in which pipe(s) 86" reside. Chamber 88" provides a space to introduce high-temperature/high-pressure steam/water to impart high heat and high pressure to the contents of serpentine pipe 86".

Due to the high heat and pressure and constant exposure to contaminated and possibly caustic fluids, serpentine pipe 86" may be formed from a water-resistant material such as stainless steel and more particularly, 304 stainless steel. As outer jacket wall 82" is isolated from the gases and fluids introduced into autoclave 80", the materials used to fabricate the jacket wall may be common steel although stainless steel or polymer-based materials also may be used to fabricate the jacket wall.

The housing of autoclave 80", like the housing of autoclave unit 80', may be formed as a fully enclosed unit, or may be formed as a modular unit as shown in FIG. 23. To permit maintenance and upgrades, jacket wall 82" may be formed as a two-, three-, or four-part container as shown in FIGS. 24-27. The combinations possible for the configuration of the housing of autoclave 80" is the same as those described for autoclave 80'. The combinations are incorporated here with respect to autoclave 80". Regardless the autoclave housing modular configuration, use of modular configurations allows the jacket wall 82" to be opened to permit the internal components such as serpentine pipe 86" to be constructed, serviced and/or replaced as needed. Frame struts (not shown) may be included to rigidify jacket wall 82". If provided, such frame struts may also be secured to the serpentine pipe 86" to provide structural support, pipe segment spacing, and to maintain the bundle substantially within the center of the chamber defined by the jacket wall/insulation/passivated layer combination.

Pipe 86", of the embodiment shown in FIG. 23, is arranged about a central longitudinal axis of autoclave 80". The number of serpentine courses may be between 42 and 50 and be approximately 4 inches in diameter each. It should be understood that the number and dimensions of the pipe and corresponding pipe segments are disclosed illustratively and are not meant to be limiting. The number of segments and the dimension of the pipe and pipe segments used can vary from the disclosed ranges and dimensions without departing from the scope of the disclosure and appended claims. The pipe courses/segments may be spaced or registered against one another and are essentially fixed at their ends. There may be more than one pipe arranged in a serpentine orientation and even multiple pipes intertwined in a serpentine or similar pattern. An inlet end of each pipe 86" is secured to fluid feedline pipe 45 as disclosed herein. By using multiple pipe segments and/or multiple pipe courses, the surface-to-volume ratio of the pipe walls to the pipe lumen is maintained at a high ratio relative to the surface to volume ratio of the chamber defined by jacket wall 82". By having a relatively high surface-to-volume ratio, heat and pressure transfer from the high-heat/high-pressure fluid in chamber 88" is maximized. This results in the efficient degradation and destruction of toxic chemicals and pathogens resident in the fluids being processed by autoclave 80".

An outlet end of serpentine pipe(s) 86" is/are secured via downstream end(s) to one or more outlet pipe(s) 110 that transfer the processed fluids to the flash tank(s) 200 and then to evaporator units 48 disclosed in more detail below. It should be understood that more than one serpentine pipe 86" can be incorporated into autoclave 80" with multiple pipes aligned or oriented in tandem, inter-wrapped, superposed one over the other(s), vertically stacked, horizontally arranged, or any relational configuration. If multiple serpentine pipes are used, inlet and outlet manifolds, such as those disclosed for autoclave 80' may be used to connect the infeed and outfeed fluid/effluent lines to the plurality of serpentine pipes 86".

For configurations with a single serpentine pipe 86" or multiple serpentine pipes 86", the downstream end(s) of pipe(s) 86" pass through an outlet end 89 or outlet end cap of autoclave 80" and is/are welded to the outlet end or endcap to ensure a fluid and pressure-tight joint. Outlet pipe 110 may include a pressure-reducing valve 112 to reduce the pressure of the processed fluids/effluent exiting autoclave 80" to about 50 psi before the fluids travel to the flash tank(s) and then to the evaporator units. The pressure reduction level can be reduced to other pressure levels without departing from the scope of the disclosure. The goal is to keep the steam's temperature and pressure as high as possible to reduce the overall energy needed to operate the evaporator (s).

A shut-off valve (not shown) may also be included in-line with outlet pipe 110" in combination with an outlet union 114 to isolate the autoclave unit 80" from the evaporator unit(s) 48 and/or flash tank(s) 200 for servicing or replacement. The shut-off valve should be positioned upstream of outlet union 114 to prevent fluids from leaking out of the autoclave after disassembly.

As previously described, outlet pipe 110 is secured to the distal end(s) of serpentine pipe(s) 86" via flange assembly 103". A safety pressure valve 118 may be secured in-line with outlet pipe 110 downstream from outlet union 114. A temperature gauge 120 also may be secured in-line with outlet pipe 110 downstream from outlet union 114. A pressure gauge 122 may be secured in-line with outlet pipe 110 downstream from pressure-reducing valve 112 to ensure the processed fluid pressure is within an acceptable range before entering flash tank 200 disclosed in more detail below. The gauge may be used to provide a feedback loop to inlet electronically controlled valve 90.

To process the fluids/unprocessed effluent transferred into serpentine pipe(s) 86", like the fluids/unprocessed effluent transferred into pipes 86', steam produced by the evaporator unit(s) 48 is transferred into chamber 88" via main steam feedline 96. A downstream end of fluid/effluent feedline 108" passes through the inlet end or inlet endcap 83 of autoclave 80" and is welded to the inlet end or endcap to ensure a fluid-tight joint. A flange and mechanical fastener combination can be used to secure feedline 108" to serpentine pipe 86".

For embodiments of autoclave 80" with multiple serpentine pipes 86", an inlet pipe, which may be a downstream end of feedline 45 welded to an inlet end of jacket 82" is fixed in fluid communication to an inlet manifold (not shown) as disclosed for autoclave 80'. The upstream ends of each of the multiple serpentine pipes 86" are secured to the manifold, which permits distribution of fluid/effluent flowed into autoclave 80" among the multiple pipes 86". Feedline 108" may have a back-flow-preventer-type check valve 110 and a pressure-relief valve 112 to ensure the safe transfer of heated and pressurized steam to chamber 88". A shutoff valve 114, which may be automated, shuts off the flow of steam into chamber 88" to permit the heated and pressurized fluid to degrade and destroy the unwanted contaminants in the processed fluid. A manual emergency shutoff valve (not shown) may be included as an added safety precaution.

A compressor 116 may be used to further pressurize the steam to achieve the desired temperature of from about 400° F. to about 600° F.+ and the desired pressure of from about 40 to about 50+ atmospheres. Alternatively, compressor 116 may increase the pressure from 2 psi up to 60 Bar and 600° F.+. In a further alternative embodiment, multiple compressors may be used to incrementally increase the pressure and temperature to the desired values. A chamber temperature gauge 148, a safety valve 150 and a pressure gauge 152 may be incorporated into autoclave 80" to monitor and regulate the conditions within the autoclave during processing. Pressure gauge 152 should be able to read pressures of at least 75 atmospheres.

Main steam feedline 96 may be split into two or more branch lines, 124 and 126, that each connects directly to autoclave 80". Each branch line may have a dedicated high-pressure automatic valve, 134 and 140, respectively, to control flow into the autoclave. Line-dedicated check valves (not shown) may also be incorporated in-line with branch lines downstream from the high-pressure valves to prevent any backflow from the autoclave. As shown in FIG. 19, an inlet steam pipe 128 extends out from jacket wall 82" in alignment with inlet feedline branch 124. A first steam-line flange assembly 130 comprising mating flanges and mechanical fasteners joins inlet steam pipe 128" to inlet feedline branch 124 in a fluid-tight seal. The lumen of inlet steam pipe 128" and inlet feedline branch 124 are in fluid communication with chamber 88".

A second inlet steam pipe 136" extends out from jacket wall 82" in alignment with second inlet feedline branch 126. A second steam-line flange assembly 138 comprising mating flanges and mechanical fasteners joins second inlet steam pipe 136" to second inlet feedline branch 126 in a fluid-tight seal. The lumen of second inlet steam pipe 136" and second inlet feedline branch 126 are in fluid communication with chamber 88".

In similar fashion to the autoclave 80' embodiment, due to the insulation layer 85", the pressurized/heated fluid transferred into the autoclave unit remains resident in chamber 88" for a pre-selected period of time, e.g., from about 20 minutes to about 25 minutes, to permit the high heat and high pressure to penetrate serpentine pipe(s) 86" and act upon the processed fluids. Again, it is well known in the art that high heat and high pressure is an effective way to degrade and destroy toxic chemicals such as PFAS and pathogens, such as bacteria and viruses. It should be understood the temperature ranges, pressure ranges and time periods disclosed herein are illustrative and not limiting. Temperatures, pressures and time periods outside the disclosed ranges may be used depending upon the fluids being processed.

Once the pre-selected time period has expired, inlet high-pressure electronic valve 90 and outlet high-pressure electronic valve 112 are opened and the processed fluid is permitted to escape from autoclave 80" and transfer to at least one flash tank 200 and then to evaporator(s) 48 for further processing. The water in chamber 88" remains at a high temperature and pressure, but remains in a pure state due to it being derived from the distillation process performed by the evaporator unit(s) 48 and maintained in a closed loop. Due to this fact, the steam/water may be transferred to either flash tank 200 if the temperature/pressure is too high to permit the water to be reduced safely in temperature and pressure. If the exit temperature/pressure is below a pre-selected level, the steam/water may be transferred directly to condenser 66 for transformation to liquid. If the steam/water is first directed to flash tank 200, it remains there until the water temperature and pressure has been reduced to a satisfactory level as disclosed herein. In this embodiment, the water is reintroduced into evaporator unit(s) 48 with the processed fluid to be distilled with the processed fluids. Alternatively, the water from chamber 88" may be transferred directly to a holding tank downstream condenser without first being processed by evaporator unit(s) 48 or condenser 66.

To transfer the water/steam out of autoclave 80", a steam/water return line 154 is connected to a steam return pipe 156". Return line 154 and steam return pipe 156" are joined together with a union or a flange/mechanical fastener assembly 158. A high pressure return valve 160 is secured in-line with return line 154 and used to regulate the temperature and/or pressure of the steam/water returning to the flash tank and/or evaporator(s) from the autoclave. An in-line vacuum-assist pump (not shown) may be used to urge the steam/water back to flash tank 200 and/or evaporator unit(s) 48. An optional second union 162 may be placed in-line and downstream from return valve 160 to provide a means to decouple the return valve for maintenance and/or replacement. A downstream end of return line 154 can be connected to outlet pipe 110 before flash tank 200 or may be connected directly to flash tank 200. In a yet further embodiment of the disclosure, return line 154 can be connected directly to evaporator unit(s) 48 or may be connected to outlet pipe 110 upstream from evaporator unit(s) 48.

Figure 32:
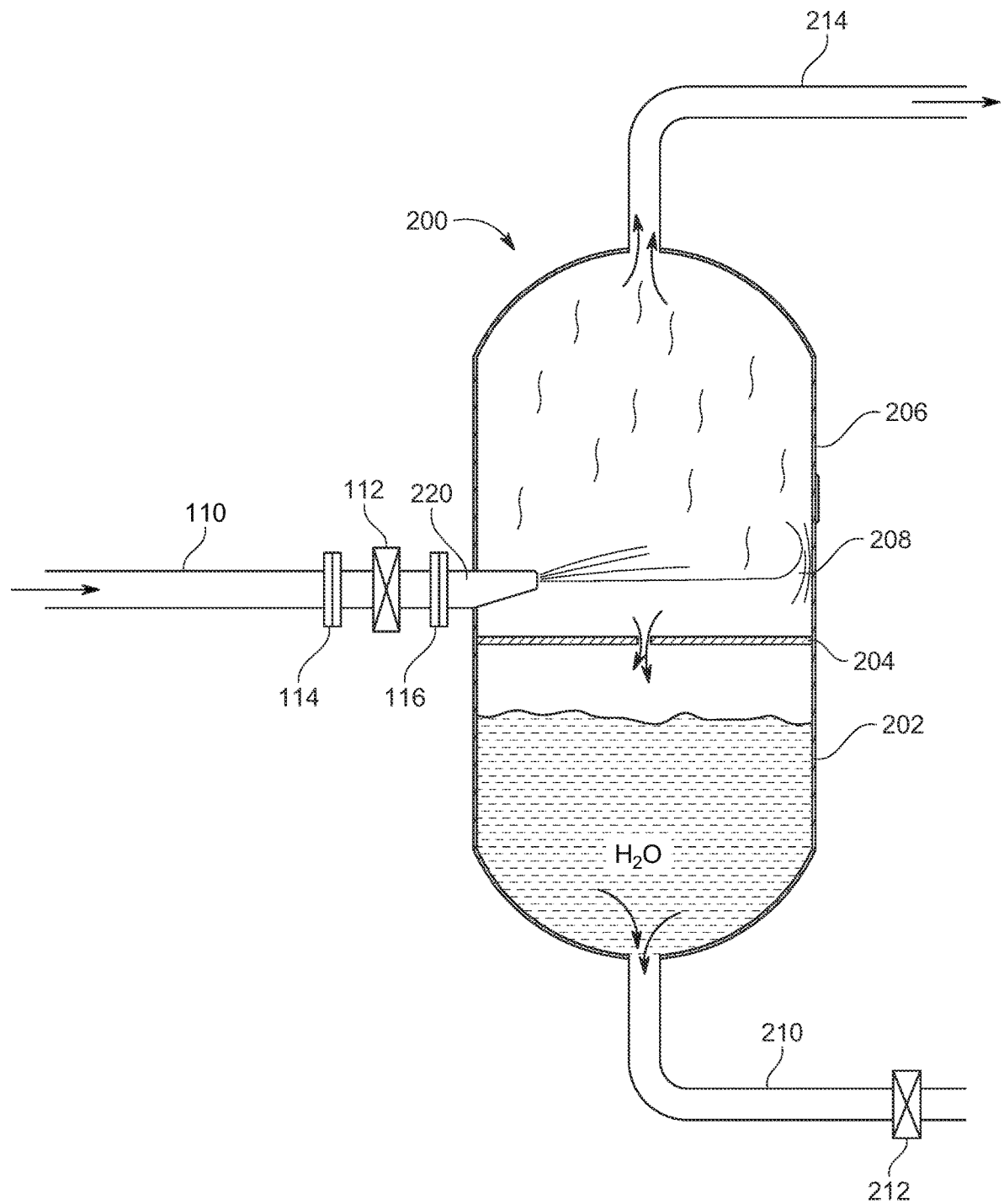
FIG. 32 is a side view of a flash tank according to one embodiment of the disclosure.
Figure 32A:
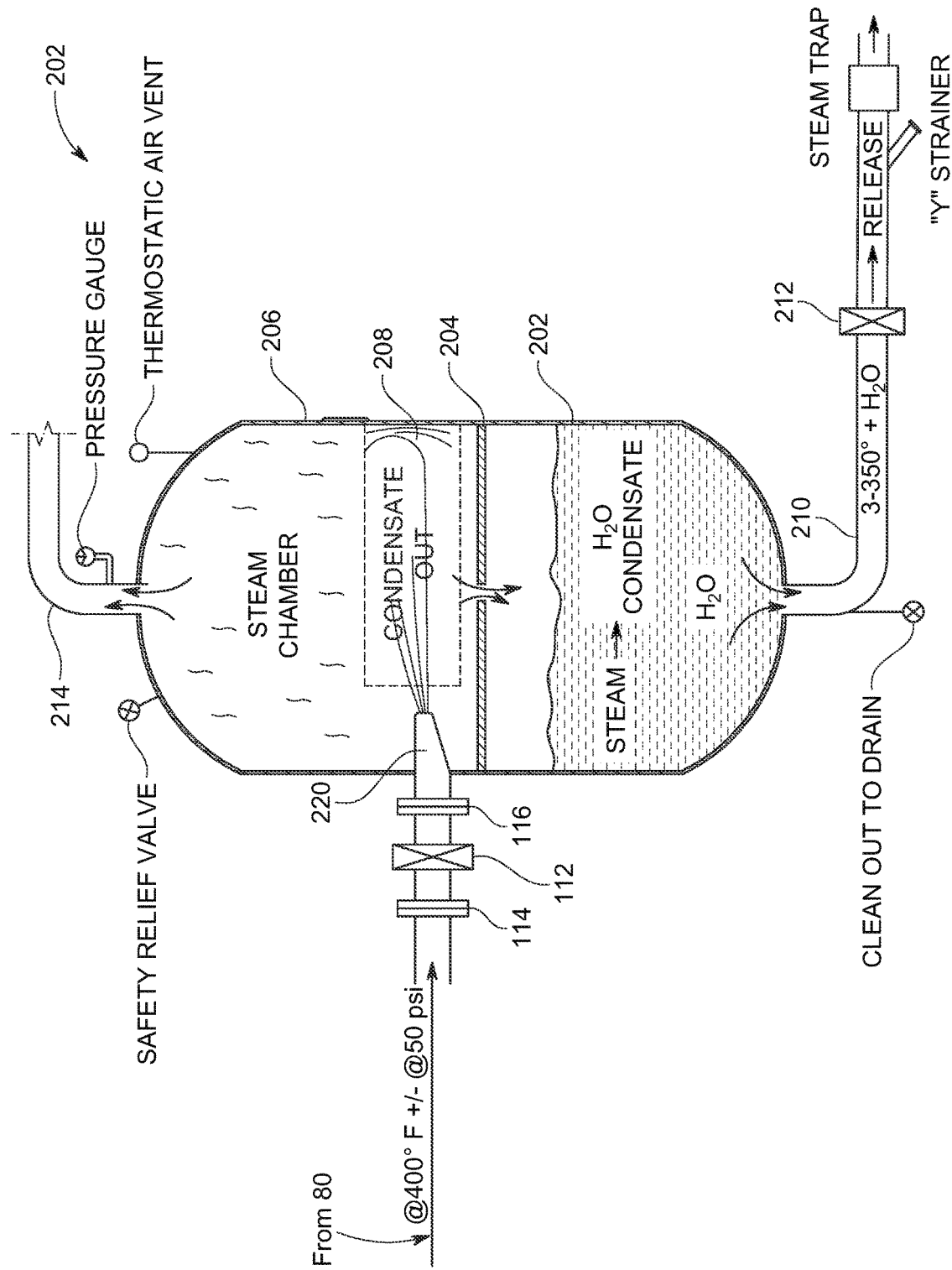
FIG. 32a is a reduced-scale side view of the flash tank shown in FIG. 32.

Referring now to FIG. 32*a*, flash tank 200 provides a means to reduce the high-pressure, high-temperature fluid/effluent processed by the autoclave unit. Flash tank 200 includes an outer shell 202 that defines a chamber 204. Chamber 204 has a separator plate 206 dividing the chamber into an upper gas section 208 and a lower fluid section 210. An aperture 212 formed in separator plate 206 enables fluid communication between upper gas section 208 and lower fluid section 210. Heavier/denser fluid flows through aperture 212 into lower fluid section 210. Lighter, less dense steam or gas remains in upper gas section 208 unless the temperature and pressure in section 208 is reduced and results in the steam condensing into a fluid state. If such a transformation occurs, the fluid passes through aperture 212 into lower fluid section 210.

Outlet pipe 110, at a downstream end, is attached to a flash tank nozzle pipe 220 via at least one flash tank flange assembly 114. A high-pressure reducing valve 112 is secured in-line with outlet pipe 110 and nozzle pipe 220. An optional second flash tank flange assembly 116 may be placed downstream valve 112 to permit removal of the valve for maintenance/replacement. Nozzle pipe 220 is open at a downstream end and permits high-pressure, high-temperature fluid/steam to be released into flash tank 200 and specifically into upper gas section 208. A baffle plate 208 is positioned against an inner wall of flash tank 200, opposite pipe nozzle 220 to absorb the blast of high-pressure, high-temperature fluid to protect the inner wall from damage. Baffle plate 208 may be formed as a partial hemispherical disk to redirect the force of the fluid/steam blast throughout the chamber. An access door 206 is secured to flash tank wall 202 to permit access to chamber 204 for maintenance and repair.

High-pressure, high-temperature fluid entering into flash tank 200 flashes into vapor due to entry into the relatively lower pressure vessel. The liquid and vapor components separate based upon their density. And each phase variant has an outlet for transmission to the evaporators. A vapor outlet pipe 214 provides a pathway for the vapor to travel to evaporator 48. A fluid outlet pipe 210 provides a pathway for the fluid component to travel to evaporator 48. It should be understood that because of the high-temperature and high-pressure environments experienced by the autoclave units and flash tanks disclosed herein, both structures should be constructed in accordance with ASME (American Society of Mechanical Engineers) standards as is well known in the art and the rules of which are incorporated herein by reference.

Referring again to FIG. 21, the high-pressure, high-temperature steam flowed into the autoclave unit to process the effluent is permitted to leave the unit via the opening of steam valve 160. An optional vacuum assist unit 161 may be placed in-line with exhaust line 154 to facilitate transmission of the steam out of the autoclave unit. Simply opening steam valve 160 will result in the downstream flow of the still pressurized, high-heat steam/water as it will be allowed to expand out of the autoclave. A vacuum pressure (negative pressure) will develop in volume 88' (or 88 or 88"), particularly if a vacuum assist unit is used, that will facilitate the entry of the next volume of high-temperature, high-pressure steam/water for the next autoclave processing cycle. This is particularly important if the steam intake valves are closed when outlet steam valve 160 is opened. Transferring the steam/water out of the autoclave without opening the steam inlet valves will create a vacuum with or without vacuum assist.

There are at least two ways to prevent the formation of a vacuum in the autoclave. The first is to coordinate the opening and closing of the stream inlet and outlet valves to transfer fresh high-temperature, high-pressure steam into the autoclave when the steam/water volume resident in the autoclave is transferred out. The resident steam/water is simply displaced or replaced by the incoming steam/water. The second method involves the transfer of resident steam/water out of the autoclave that is not replaced with a subsequent volume of steam/water. This condition will occur is an autoclave processing cycle is not immediately followed by another processing cycle. In that situation, the resident steam/water can remain in the autoclave, which will permit the steam/water to slowly reduce in temperature and pressure over time. By maintaining the steam lines closed, there is no opportunity for a pressure differential to be formed and the resident steam/water can simply be transferred out when the next processing cycle is initiated.

With any processing cycle, it should be understood that the sequencing of the influx of unprocessed liquid/effluent into pipe(s) 86' (and in any corresponding embodiment of the autoclave) and the influx of steam/water into chamber 88' (and in any corresponding embodiment of the autoclave), the sequencing can be sequential with either the unprocessed fluid/effluent being transferred in before or after the steam/water or substantially simultaneously. The pre-selected time period used to process the fluid/effluent can be commenced when both the fluid/effluent and steam/water are at full capacity in the autoclave unit. It should be understood that other commencement points can be selected, e.g., when the first of the fluid/effluent or steam/water is introduced into the autoclave unit, and remain within the scope of the disclosure. The important criterion is to establish a time period sufficient to eliminate or degrade substantially all the chemical and biological contaminants in the water.

Figure 33:
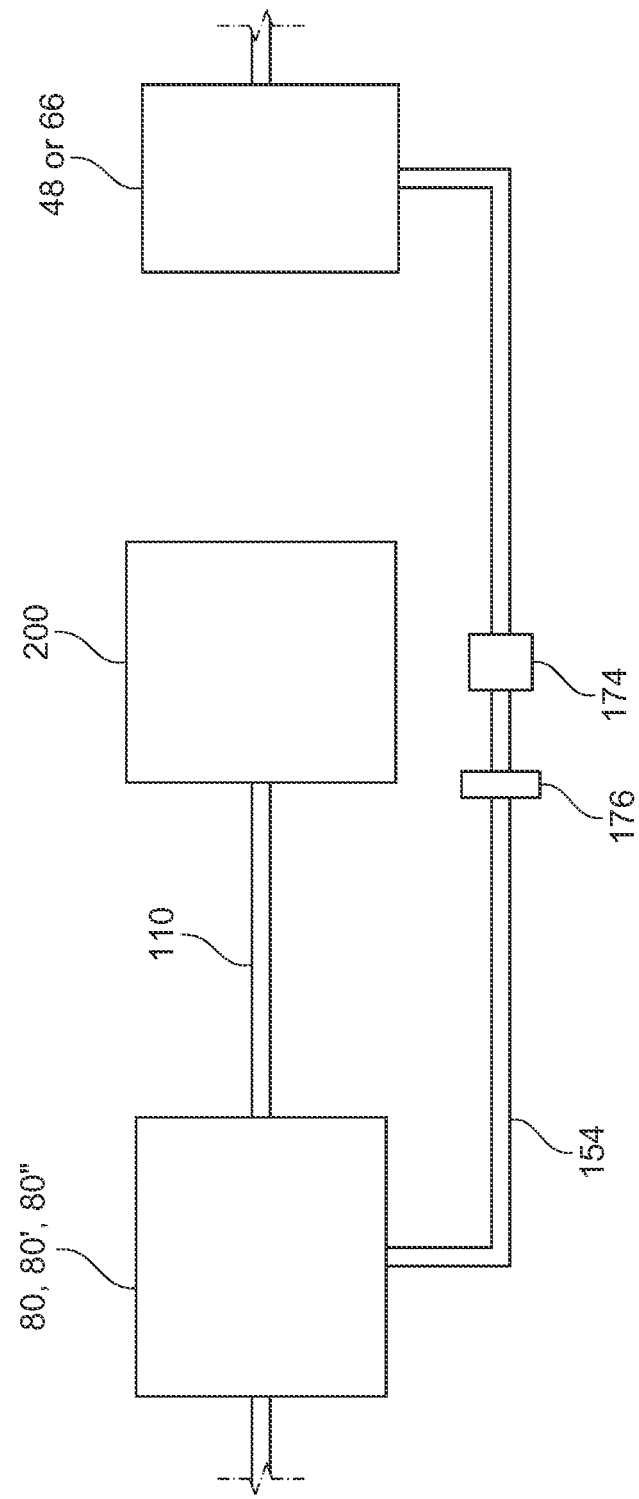
FIG. 33 is a flow chart of an autoclave unit, a flash tank, an evaporator unit and a steam return line according to one embodiment of the disclosure.

With respect to the transfer of steam out of the autoclave unit, the system may be constructed to provide two or more pathways for the steam. Illustratively, as shown in FIG. 33, the exhaust line 154 may be split into two lines. One line is connected to, and in fluid communication with, flash tank 200 to permit the steam to reduce temperature and pressure and condense into liquid water. As used herein, the terms "liquid" and "fluid" are used interchangeably to identify the liquid phase of a material or substance such as water unless fluid is specifically described to mean a liquid or gas. A second line is connected directly to either the evaporator(s) 48 or condenser 66 for transformation into fluid. Which path is taken is determined by the temperature of the steam when it exits the autoclave unit. A pre-selected temperature threshold is used to determine which path to take. An electronically-controlled steam offloading valve 174 is used to direct the fluid into either pathway. A check valve 176 also may be added before offloading valve 174 to ensure one-way transmission of the steam regardless of pressure gradients that may exist in the system. If the flash tank path is selected, the steam/water will ultimately be transferred to the evaporator for distillation and subsequent condensation via the condenser. In this manner, any steam generated by the evaporator used to process fluid/effluent in the autoclave will remain in a closed system or loop that ensures the water or water vapor is maintained substantially contaminant-free.

Referring now to FIGS. 16, 28A-28C, in a further alternative wastewater treatment system embodiment, a water treatment system, shown generally as 10', incorporates a plurality of autoclave units 80 (or 80' or 80") arranged in parallel with an autoclave manifold. System 10' has the same basic components or modules as system 10. A pretreatment tank 12 and a filtration module 11 provide effluent for further processing. An intake manifold 43a, connected after UV unit(s) 40, if present, or after holding tank 44, directs effluent treated in the filtration system and UV unit(s) 40 into the multiple autoclave units 80. This enables system 10' to handle much larger volumes of effluent over a specified time period. Intake or inlet manifold 43a may include valves dedicated to each branch of the manifold to selectively direct effluent to one or more autoclave units as needed to handle the particular effluent volume in a given time. The valves also function as inlet valves 84 to close off the autoclave unit(s) when not in use. Having multiple autoclave units also provides the ability to take one or more offline for servicing while leaving one or more units online to handle effluent loads.

To connect the multiple autoclave units 80 (or 80' or 80") to flash tank(s) 200 or evaporator unit(s) 48, an outtake manifold 43b has dedicated ports for each autoclave unit connects the autoclave units to deliver the treated effluent downstream to the flash tank or evaporator units. Outtake manifold 43b may include valves 96 dedicated to each branch of the outtake manifold to selectively close an autoclave unit in operation. Once the effluent treatment operation is completed, the valve is opened and the treated effluent is transferred to the at least one flash tank 200. The steam/water is permitted to undergo a reduction in pressure and temperature for further travel to evaporator unit(s) 48'.

To destroy or degrade harmful chemical compounds such as PFAS, effluent transferred and retained in autoclave pipe 86 (or 86' or 86") is exposed to heat and pressure approximately 20 minutes to allow sufficient time to effectively destroy and degrade all the harmful substances, organic, inorganic and/or microbial, in the effluent. It should be understood the effluent resident time in the autoclave pipe as well as the temperature and pressure settings can be modified without departing from the spirit and scope of the disclosure.

To perform each autoclave cycle, the intake valves and outtake valves may be coordinated to ensure each treated volume of effluent is offloaded while a new volume of untreated effluent is permitted to flow into autoclave unit(s) 80 (or 80' or 80"). To ensure no untreated effluent is permitted to exit the autoclave segment of the system, the volume released from the autoclave units can be set to be less than the total volume of the autoclave unit(s) 80 (or 80' or 80").

Figure 35:
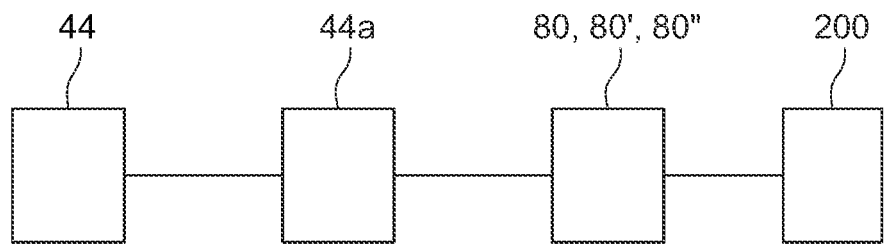
FIG. 35 is a flow chart of a segment of a wastewater treatment system with pre-autoclave holding tank according to another embodiment of the disclosure.

Alternatively, as shown in FIG. 35, a pre-treatment staging holding tank 44a can be incorporated into the system to hold a volume of untreated effluent greater than the autoclave unit volume. With such a tank, the treated fluid in the autoclave unit can be transferred out of the autoclave and the outlet valve closed before the next volume is introduced. A vent valve in the form of a one-way check valve can be secured to the autoclave pipe to permit air to escape into the autoclave chamber while the next volume is transferred into the unit. The valve can have an electronically-controlled cover to seal the autoclave tube for effluent processing. Once the preselected volume is transferred, the intake valve is closed. Tank 44a also provides an alternative structural means (other than holding tank 44, particularly if tank 44 is constructed with a sonolysis module) to introduce chemical compounds into the effluent before entry into the autoclave module as more fully disclosed herein.

In a yet further alternative embodiment, to ensure a volume of treated effluent in an autoclave unit is not contaminated by successive volumes to be treated, a combination of an upstream intake/purge pump, a downstream shut-off valve and a one-way check valve are used. The upstream pump is positioned in close proximity to the inlet end of the autoclave unit. The pump has both a fluid line connected to the lines in which the untreated effluent flow and a gas line that permits the infusion of air or other inert gas into the fluid lines. Electronically-controlled shut-off valves control which line is connected to the pump function. An upstream shut-off valve is positioned between the pump and the inlet end of the autoclave unit. A downstream shut-off valve is positioned proximal to, and downstream from, the outlet end of the autoclave unit. A check valve is positioned immediately downstream from the downstream shut-off valve.

To fill the autoclave system, both the upstream and downstream shut-off valves are opened. The intake/purge pump is then operated to transfer untreated fluid into the autoclave unit. The first volume introduced into the autoclave will displace air in the autoclave pipes. The check-valve ensure no backflow into the autoclave unit. Once a preselected volume of untreated effluent is transferred into the autoclave unit, the upstream and downstream shut-off valves are closed and the autoclave unit is operated as more fully disclosed herein. Once the treatment process is completed, the upstream and downstream shut-off valves are opened. Next, the intake purge pump is operated to expel the now treated effluent out of the autoclave unit and past the downstream shut-off valve. Rather than transfer untreated fluid into the autoclave unit, the intake/purge pump connects to the air line and uses air or inert gas to purge the treated effluent from the autoclave unit. If air is used, the air is drawn from the wastewater treatment system environment via the air intake line which may have a filter. By using air rather than untreated effluent to force the treated volume of effluent from the autoclave unit, no contamination occurs as the untreated effluent upstream of the now treated effluent in the autoclave unit does not come into contact with the treated effluent.

Once the treated fluid is fully purged from the autoclave unit, the intake/purge pump is deactivated and switched to the fluid line. The check-valve ensures no treated effluent flows back through the downstream pipe into the autoclave. Next, the intake/purge pump is activated and the fluid intake channel is opened to pump untreated effluent into the autoclave unit. Any air resident in the autoclave unit will be forced out by the incoming untreated effluent. The check valve ensures no air can reverse back into the autoclave unit. Once a preselected volume of effluent is transferred into the autoclave unit, the upstream and downstream shut-off valves are closed and the autoclave unit is ready to perform another treatment process. The air purged from the autoclave unit simply travels to flash tank 200 and exits the vapor outlet.

In a yet further alternative embodiment, to ensure no cross-contamination between successive volumes of processed and unprocessed fluid/effluent occurs, a time delay can be used to coordinate the opening and closing of the inlet and the outlet autoclave valves. To put into effect this alternative, the outlet valve(s) are opened to allow fluid/effluent processed in the autoclave unit(s) to exit the autoclave(s). By allowing a preselected amount of time to pass, the processed fluid/effluent will flow downstream out of the autoclave and form an air gap or air gaps at the inlet end(s) of the autoclave unit(s). After the preselected time delay has passed, the inlet valve(s) is/are opened and any purge pump assist is activated to transfer the next untreated volume of fluid/effluent into the autoclave unit(s). The air gap formed by the time delay will be urged out of the autoclave unit(s) by the incoming unprocessed fluid/effluent volume.

To ascertain the amount of untreated effluent transferred into the autoclave units, a computer-controlled, volumetric metering device can be positioned upstream of the intake manifold 43a to selectively transfer the desired effluent volume. The metering device may be a standalone device or may be part of a purge pump. Whatever volume of effluent is selected, the volume is transferred into the autoclave unit(s) and the inlet and outlet valves are shut to prepare the autoclave unit(s) for fluid processing. By design, the process is cyclical. Successive volumes of untreated fluid/effluent are transferred into the autoclave unit(s) until all the fluid/effluent derived from the filtration module is processed.

Once a cycle has been completed, outlet valve 96 is opened and the heated effluent is transferred to the at least one flash tank 200 and then to the evaporator(s) via outlet pipe 100. To start a new cycle, inlet valve 84 is opened in coordination with outlet valve 96 or time delayed relative to the opening of the outlet valve. Once autoclave pipe 92 is filled, the inlet and outlet valves are closed and the process is repeated.

Once the liquid has been processed by autoclave unit(s) 80 (or 80' and/or 80"), the fluid may be transferred to an effluent storage tank (not shown) to wait further processing or may be transferred directly to flash tank(s) 200 or evaporator unit(s) 48. An effluent 24-hour composite sampling tap 42 may be connected to the line, between units 80' and evaporator unit(s) 48, to permit round-the-clock sampling and evaluation of the treated liquid.

Referring more particularly now to FIGS. 29A and 29B, in wastewater treatment system 10', the UV-light module is eliminated and substituted with a plurality of autoclave units 80 (autoclave units 80" shown) arranged in parallel. System 10' includes most of the components of wastewater treatment system 10. System 10' has a pretreatment tank 12 followed by a filtration module 12 that transfers effluent to holding tank 44. Effluent held in holding tank 44 is transferred to the autoclave units by pipe 45. An inlet or intake manifold 43a connects pipe 45 to each of the autoclave units 80". It should be understood that autoclave units 80 and 80' can be substituted in for units 80". Automated or manually controlled inlet shutoff valves 49, one dedicated to each autoclave unit, permit the selective operation of each autoclave unit. In this way, the number of autoclave units operated can be adjusted to handle varying effluent volumes.

An outlet manifold 108 is secured to the downstream ends of each autoclave unit 80 and further connected to outlet line 110 to transfer processed effluent out of the autoclave units for delivery to either one or more flash tanks 200 or one or more evaporator units 48 for further processing. The use of multiple autoclave units also enables one or more units to be taken offline for maintenance, repair and/or replacement. The autoclave units 80 are operated in the same manner for a single autoclave unit 80. Volumes and processing times should remain the same for similarly sized autoclave units with respect to effluent processing conditions. It should be understood that the size, dimensions and running time of the autoclave units 80 can be varied, e.g., staggered use, and remain within the scope of the disclosure.

As shown in FIG. 28B, one or more flash tanks 200 are connected downstream to the autoclave units 80" and upstream to the thermal evaporators 48 to further separate any particulate matter from the liquid component of the effluent. As previously described herein and shown in FIG. 9, each thermal evaporator has a fuel source and a burner 50. Treated effluent is transferred into the thermal evaporator(s) 48 and exposed to high heat via a heat exchanger 52. The heat exchanger causes the liquid component of the treated effluent to evaporate and travel upwardly into stack 54. Any particulate/sludge component separated from the liquid phase gets deposited on a sloped surface 60 that directs the particulates to an evaporator pump 62. Pump 62 forces the particulates to a residual's storage tank 64 for eventual disposal offsite.

The evaporated liquid component, which is essentially 100% water vapor passes through a mist capturing system 56. The water vapor next travels upwardly through a vent stack 58 that leads to a condenser 66 disclosed in more detail herein. At this point, the water vapor is essentially distilled water in vapor form. Any volatiles present in the effluent at the beginning of the process are removed prior to the treated effluent reaching condenser 66 via the mist capturing system 56.

Referring back to FIG. 11, condenser 66 converts the water vapor to liquid water. A food-grade water storage tank 68 receives the water for use to irrigate carbon-capturing plants 70 planted in a greenhouse 72. Greenhouse 72 is an enclosure with at least one outlet 73 for the ingress and egress of air. A second outlet includes reversible fan 74 permits the relative pressure within greenhouse 72 to be positive or negative depending upon the processes being performed in the greenhouse. A series of pipe and tubes extend from water storage tank 68" to provide regulated amounts of water to the individual plants 70. The water dissemination may be computer controlled to set parameters.

Figure 37:
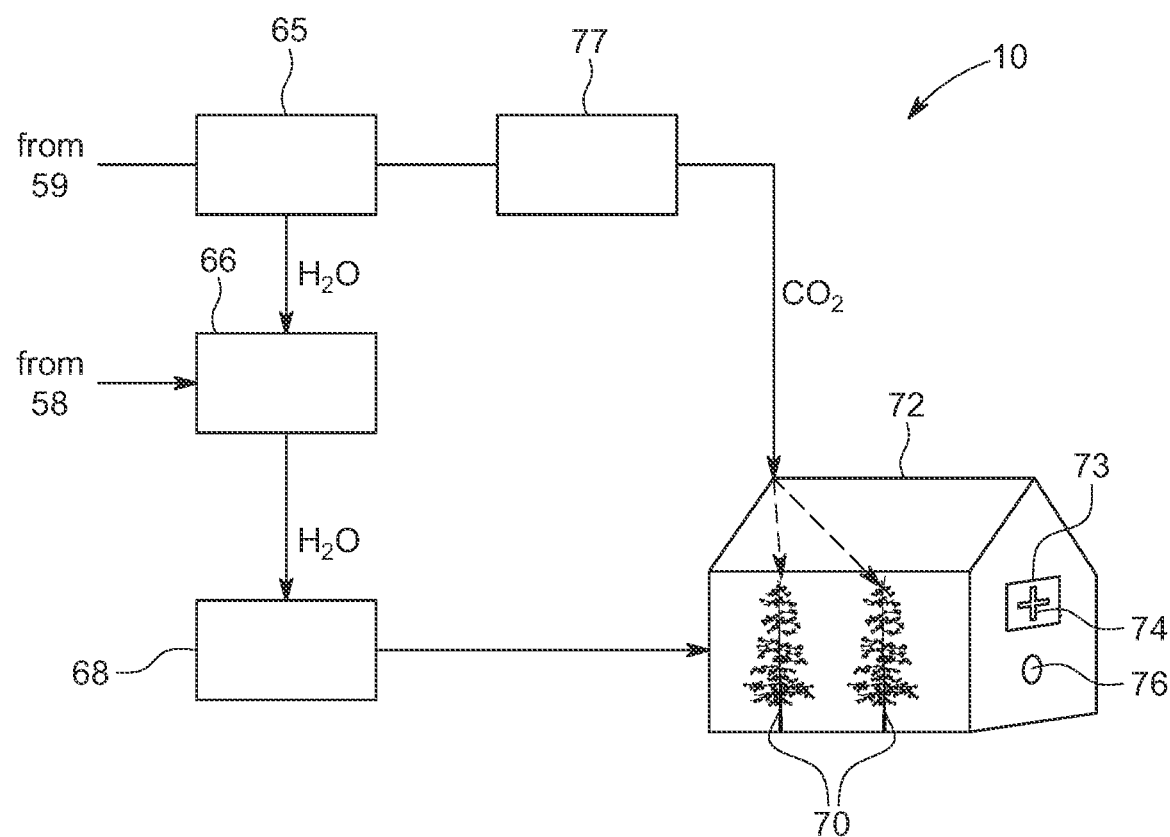
FIG. 37 is a flow chart of a third segment of a wastewater treatment system with a $CO_2$ holding tank according to a yet further embodiment of the disclosure.

Referring now to FIG. 14, if natural gas is the fuel used to fire thermal evaporators 48, the combustion components of the natural gas, i.e., $CO_2$ and $H_2O$ are transferred via a dedicated vent 59 to a separator 65 used to separate the $CO_2$ from the $H_2O$. The $H_2O$ is transferred directly, or indirectly via separator 65, via pipe to condenser 66 so as to be combined with the water vapor component derived from the heat exchange process performed on the treated effluent. The $CO_2$ component is transferred via a dedicated pipeline into greenhouse 72. Alternatively, the $CO_2$ component can be transferred to a $CO_2$ holding tank 77 as shown in FIG. 37 before controlled delivery to greenhouse 72.

The plants 70 are exposed to the $CO_2$ in order to absorb the $CO_2$ to perform the carbon-capture function. When $CO_2$ from the combustion of natural gas is introduced into greenhouse 72, the relative pressure of the greenhouse atmosphere is kept either neutral of slightly positive relative to the ambient atmospheric pressure outside the greenhouse. This is accomplished with fan 74. When $CO_2$ is not being pumped into greenhouse 72 from thermal evaporator(s) 48, fan 74 is operated to create a negative pressure in the greenhouse so as to pull carbon-dioxide-laden outside air into the greenhouse. This permits plants 70 to extract the $CO_2$ from the air and maintain their natural function to continue to capture and assimilate $CO_2$.

At least one $CO_2$ monitor 76 is placed in greenhouse 72 to ensure human-acceptable levels are maintained. Current average atmospheric levels run between about 350 to about 400 parts per million concentration in air (depending on altitude). The system is designed to constantly monitor $CO_2$ concentration. If $CO_2$ levels are too high, fan 74 can be activated to blow the greenhouse air out into the atmosphere until an acceptable level of $CO_2$ is reached. The parameters used to set the $CO_2$ can be modified as needed for a particular application. The system may be designed with a default setting of blowing air out of greenhouse 72 in the event of a system failure to prevent carbon dioxide buildup.

Referring again to FIGS. 28A and 28B, in an overview of the wastewater treatment process embodiments that incorporate an autoclave module or unit, unprocessed fluids/effluent derived from pretreatment tank 12 and filtration module 11, and held in holding tank 44 is transferred to one or more autoclave units (e.g., 80, 80', 80") for further processing as disclosed herein. The now processed fluid/effluent, now potentially in the form of high-pressure steam due to the autoclave process, is next transferred to one or more flash tanks 200 via pipe(s) 110 to reduce the temperature and pressure of the fluid. Flash tanks 200 permits the high-pressure steam to flash into a reduced-pressure steam/condensate/fluid before introduction into the evaporators. One benefit is the temperature of the processed fluid/effluent will be elevated, which results in much less energy needed to evaporate the fluid/effluent in the evaporator(s).

With any of the autoclave embodiments disclosed herein, the function of the autoclave units can be augmented with chemical solutions to neutralize or render harmless the products of the autoclave process with respect to harmful chemicals in the effluent, such as PFAS. The chemical solutions can be introduced into the effluent and/or autoclave units before, during, or after the autoclave process. To introduce chemical compounds into the autoclave process, chemical compounds can be introduced either into pipes 86 (or any variation of pipes 86 disclosed herein) during a treatment session or after a treatment session before the now treated effluent is released from the autoclave unit(s) 80, or from any other embodiment of the autoclave units.

Figure 38:
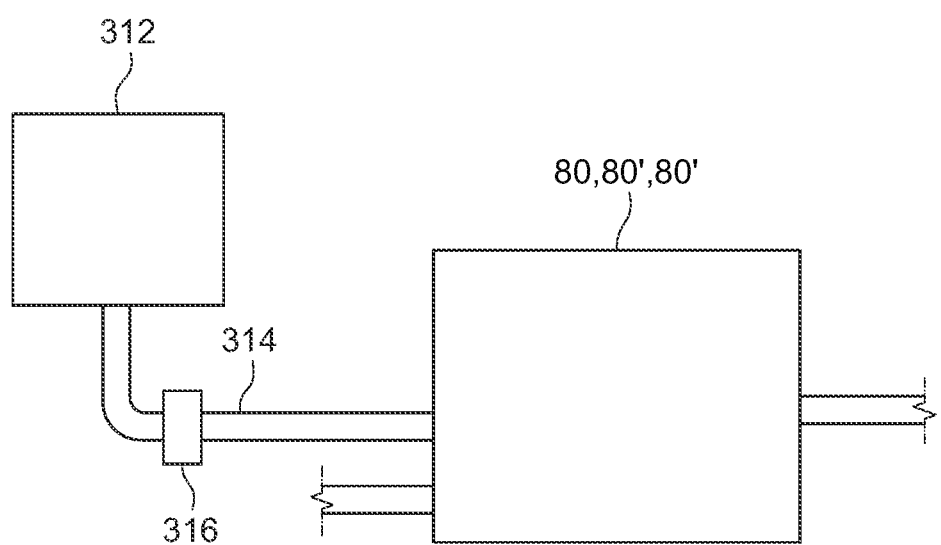
FIG. 38 is a flow chart of a chemical treatment assembly connected to an autoclave unit according to another embodiment of the disclosure.
Figure 39:
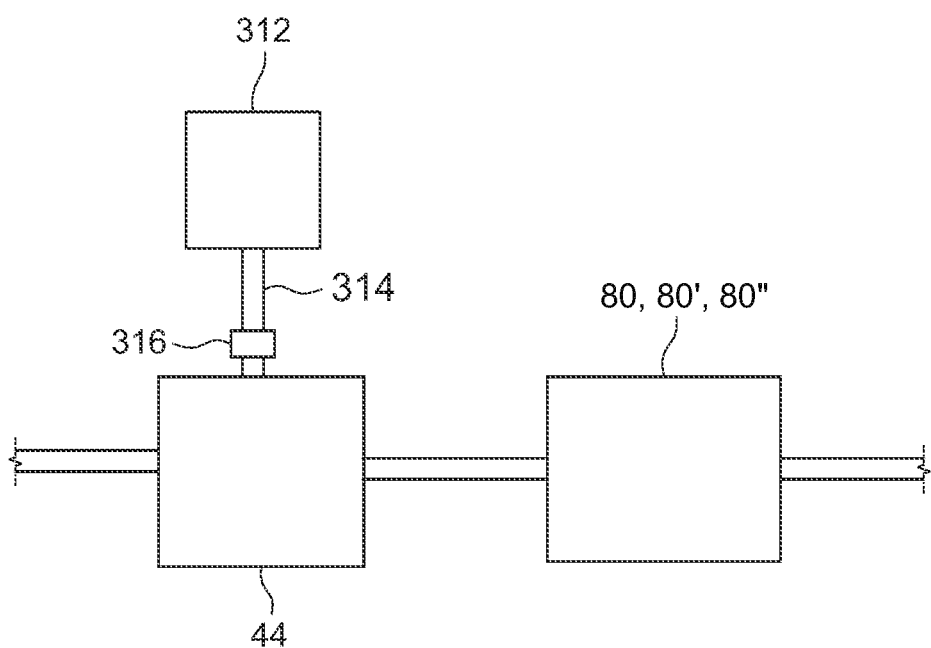
FIG. 39 is a flow chart of a chemical treatment assembly connected to a holding tank upstream an autoclave unit according to a further embodiment of the disclosure or between the autoclave and the flash tank
Figure 40:
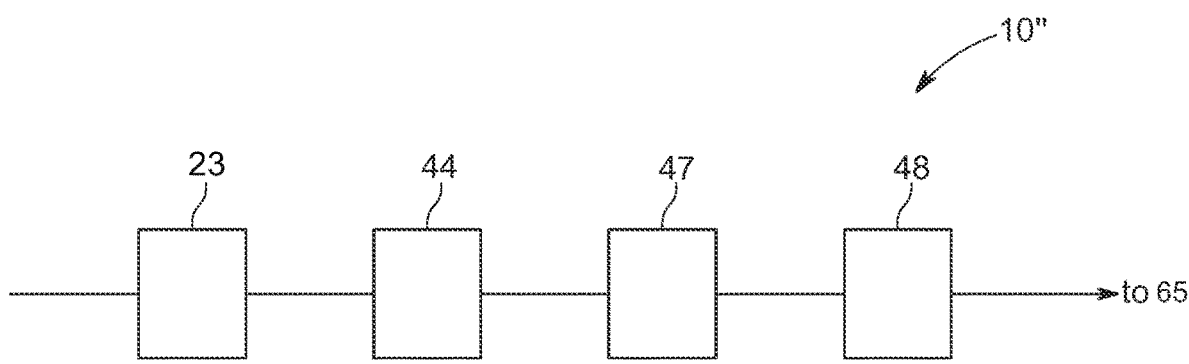
FIG. 40 is a flow chart of a segment of a wastewater treatment system with a sonolysis module according to yet another embodiment of the disclosure.
Figure 41:
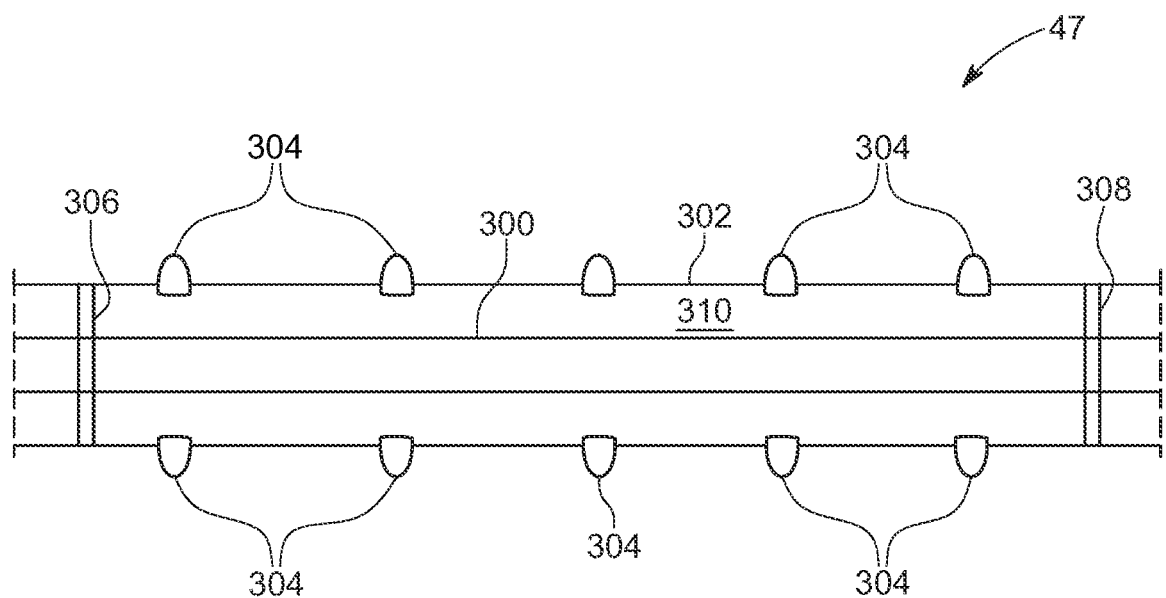
FIG. 41 is a side view of a sonolysis unit according to one embodiment of the disclosure.
Figure 42:
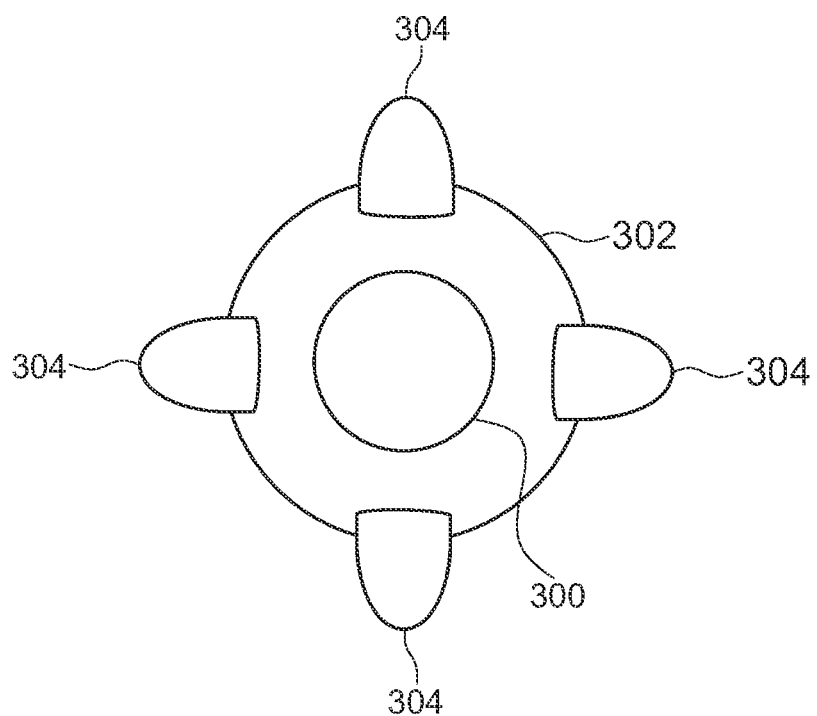
FIG. 42 is an end view of the sonolysis unit shown in FIG. 41.

A chemical mixing tank 312, as shown illustratively in FIG. 38, with a chemical feedline 314 connecting the mixing tank and autoclave unit(s) 80 may be used for this purpose. It should be understood that chemical mixing tank 312 can be positioned inline and downstream of autoclave unit(s) 80 and upstream a flash tank 200 (disclosed in more detail herein) or evaporator 48 in order to deliver chemicals to the treated effluent post-autoclave. In an alternate embodiment, mixing tank 312 may be connected to a pre-treatment tank dedicated to mix effluent with the chemical compounds. As shown in FIG. 39, holding tank 44 may be used for this purpose as well. Mixing tank 312 is periodically filled with the desired chemical compounds, the delivery of which to the holding tank, including amounts and concentrations, is electronically controlled. An electrically-controlled chemical pump 316 may be positioned in-line with feedline 314 to urge chemical compounds into the holding tank 44 or other holding tank.

Base chemicals, such as, illustratively, sodium bicarbonate, sodium hydroxide and calcium oxide and various mixtures thereof may be used to produce compounds such as sodium fluoride, calcium carbonate and other harmless chemical compounds when the fluorine atom is cleaved from PFAS via the high-temperature, high-pressure environment in the autoclave unit(s). The base chemicals can be in the form of a pre-mixed slurry of a base, e.g., $NaHCO_3$ added to the tank before or during the sonolysis treatment. The resulting products, e.g., NaF, free hydrogen ions or $H_2$ and $CO_2$ all can be captured and utilized elsewhere in the wastewater treatment system or for other purposes beyond the treatment system.

Once the processed fluid turned high-pressure steam has returned to a lower pressure and temperature fluid, it is transferred to evaporator(s) 48 via piping 111. Check valves, shut-off valves, unions and flanged joints may be incorporated into piping 111 to decouple the evaporators 48 from the flash tank(s) 200 and control the flow from the flash tank(s) to the evaporator(s). At this point, evaporator(s) 48 are operated to evaporate the fluid. The evaporated fluid in its distillate, aerosolized form is transferred to condenser 66 for phase transition to water. The water is optionally further processed as disclosed herein with ozone, UV treatments, and/or chlorination and the like before transmission to the food-grade holding tank 68. At this point the water held in holding tank 68 is pure, drinkable water.

Holding tank 68 may have a fluid level float secured therein to monitor the water level. Should the level exceed the volumetric limits of the tank, added water volume can be direct to one or more auxiliary holding tanks (not shown). Holding tank 68 also may have a vent. Feed lines from holding tank 68 or any auxiliary holding tanks, if used, can be installed to feed the water to toilets, the AC/HVAC systems, showers, sinks, greenhouses, gardens and for any other uses, e.g., irrigation, permitted by local, state and federal laws and regulations.

IX. Sonolysis Module

Figure 43:
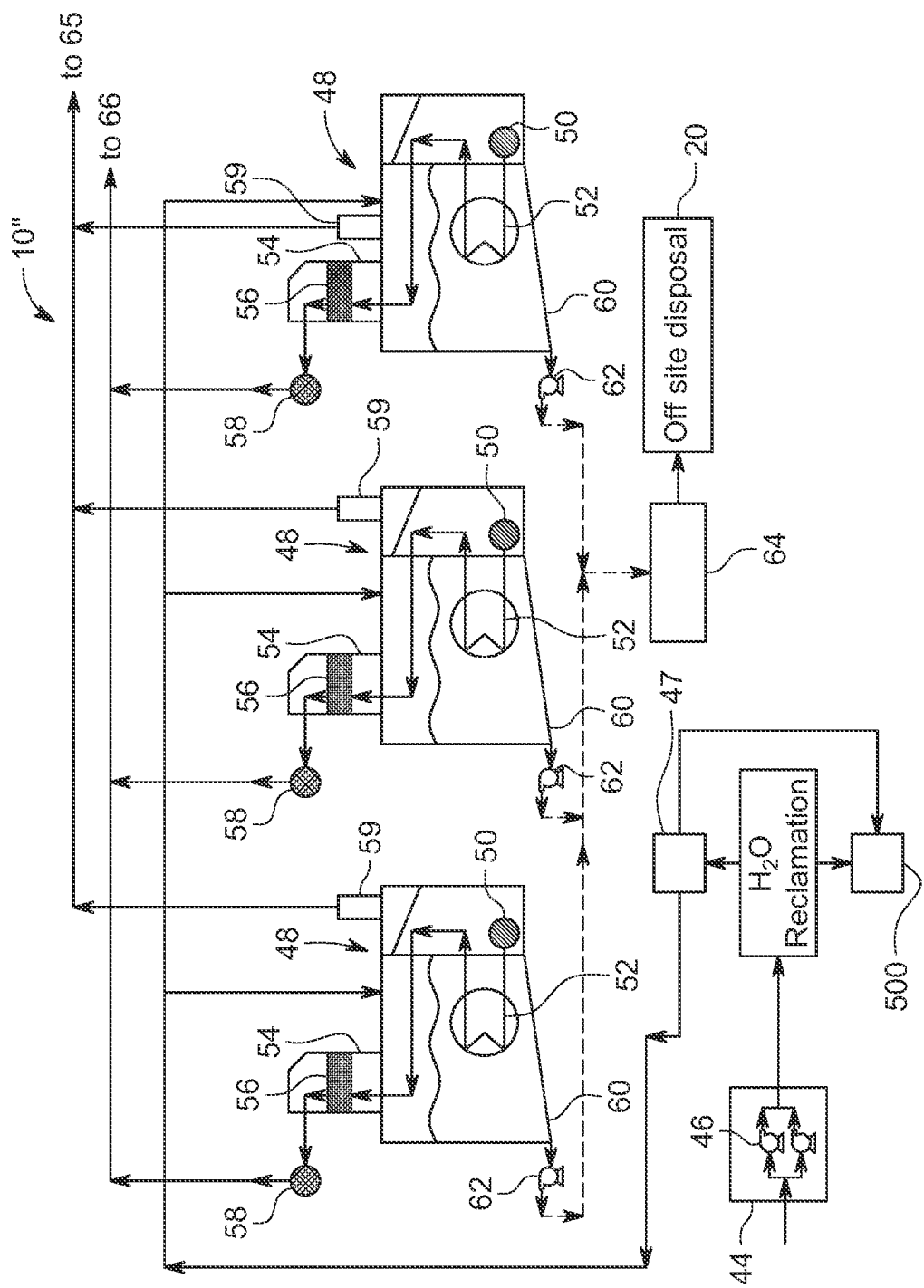
FIG. 43 is a flow chart of a second segment of a wastewater treatment system with a sonolysis unit according to another embodiment of the disclosure.

In a yet further aspect of the disclosure, one or more sonolysis units may be incorporated into the wastewater treatment system in place of, or in addition to, autoclave unit(s) 80 and/or UV unit(s) 40 positioned between an upstream filtration module 11 and a downstream evaporator module 48. As shown in FIG. 43, a sonolysis unit or module 47 can be placed downstream from holding tank 44 and be connected to the water reclamation segment to process the water before transfer to other elements such as the toilet system 500.

Referring now to FIGS. 40-45, a sonolysis unit, shown designated generally as 47 provides an alternative or additional means to destroy and degrade pathogenic microbial life and hazardous chemical compounds. As shown particularly in FIGS. 41 and 42, sonolysis unit 47 includes a sonolysis tube 300 made from a rigid material such as stainless steel to withstand the high-heat and temperature environment of the unit. Unit 47 is coaxially arranged in a cylindrical outer jacket 302 that supports a plurality of sound transducers 304. The transducers may be positioned equidistantly along the length of jacket 302. An inlet valve 306 and an outlet valve 308 positioned at the inlet and outlet ends, respectively, of tube 300 permit the controlled entry and exit of effluent into the sonolysis module or unit for treatment.

An annular sonolysis chamber 310 formed between sonolysis tube 300 and jacket 302 is filled with a liquid coolant to protect the transducer probes and to enhance the energy transfer when sound transducers 304 are activated. When activated, transducers 304 produce sound waves that create cavitation of the effluent in tube 300, which forms bubbles within tube 300. The bubbles form in an adiabatic environment in which the temperature and pressures within the bubbles can reach 500° K and twenty times atmospheric pressure while the temperature and pressure of the effluent can remain at ambient or atmospheric levels present in the tube's environment. This high-heat, high-pressure environment of the bubbles destroys any chemical compounds caught in the bubbles. The effluent is exposed to the sonolysis procedure for approximately 20 minutes. It should be understood that other time periods may be used and remain within the scope of disclosure. After the designated treatment time has elapsed, the now treated effluent is transferred out of tube 300 and to another treatment module such as evaporator unit(s) 48.

Figure 46:
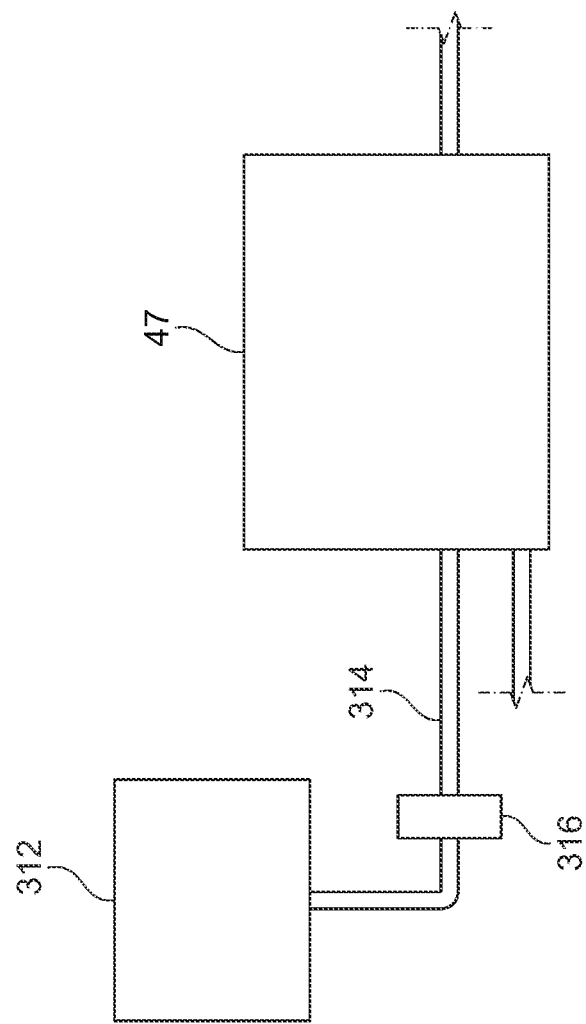
FIG. 46 is a flow chart of a chemical treatment assembly connected to sonolysis unit according to another embodiment of the disclosure.
Figure 47:
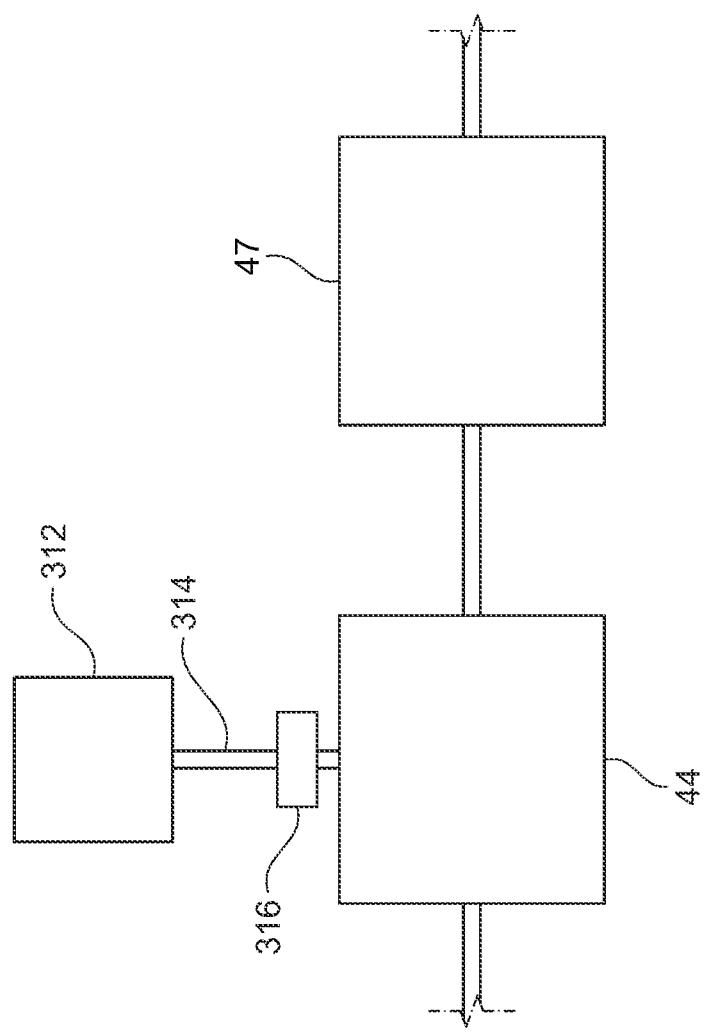
FIG. 47 is a flow chart of a chemical treatment assembly connected to a holding tank upstream sonolysis unit according to a further embodiment of the disclosure.

To improve the function of sonolysis module, in similar fashion to the autoclave units, as shown in FIG. 46, chemical compounds can be introduced either into tube 300 during a treatment session or after a treatment session before the now treated effluent is released from the sonolysis unit(s) 47. Alternatively, chemical compounds may be added to the effluent after sonolysis treatment by positioning a chemical mixing tank inline and downstream from sonolysis unit(s) 47. Chemical mixing tank 312, as shown in FIG. 47, with a chemical feedline 314 connecting the mixing tank and holding tank 44 may be used for this purpose. Mixing tank 312 is periodically filled with the desired chemical compounds, the delivery of which to the holding tank, including amounts and concentrations, is electronically controlled. An electrically-controlled chemical pump 316 may be positioned in-line with feedline 314 to urge chemical compounds into the holding tank 44.

In similar fashion to the use of chemicals with the autoclave units, base chemicals, such as, illustratively, sodium bicarbonate, sodium hydroxide and calcium oxide and various mixtures thereof may be used to produce compounds such as sodium fluoride, calcium carbonate and other harmless chemical compounds when the fluorine atom is cleaved from PFAS via cavitation events produced by the sonolysis treatment. The base chemicals can be in the form of a pre-mixed slurry of a base, e.g., $NaHCO_3$ added to the tank before or during the sonolysis treatment. The resulting products, e.g., NaF, free hydrogen ions or $H_2$ and $CO_2$ all can be captured and utilized elsewhere in the wastewater treatment system or for other purposes beyond the system.

One possible side benefit of the sonolysis process is the development of hydrogen gas, which can be siphoned off and transported to a hydrogen containment facility for use a fuel for hydrogen-propelled vehicles. The treated solid waste can be shipped to storage sites for further processing and for ultimate use as fertilizer. The system is designed to essentially make possible the reuse of all solid waste for soil regeneration along with water reclamation and use.

Figure 44:
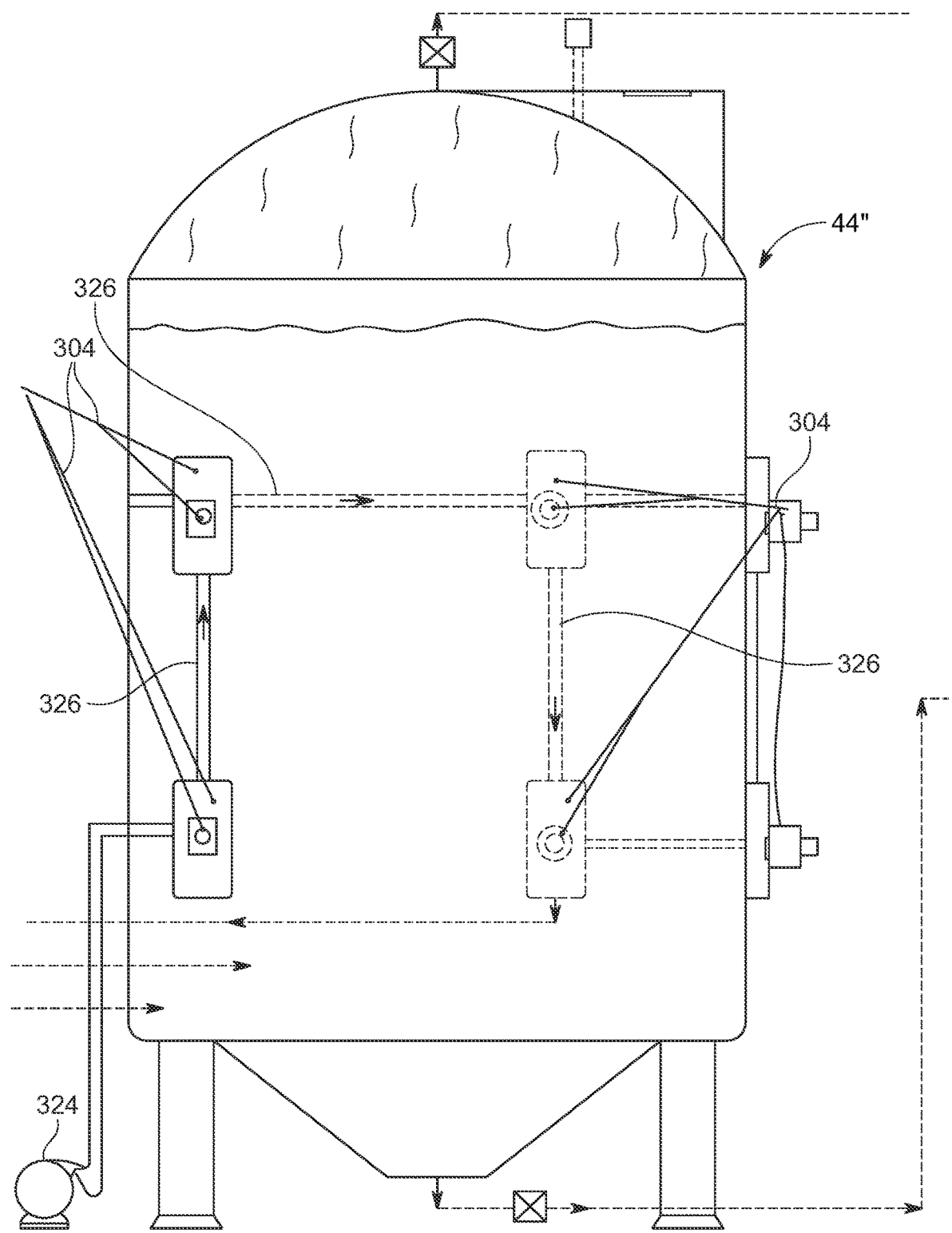
FIG. 44 is a side view of a holding tank modified with a sonolysis unit according to a further embodiment of the disclosure.
Figure 44A:
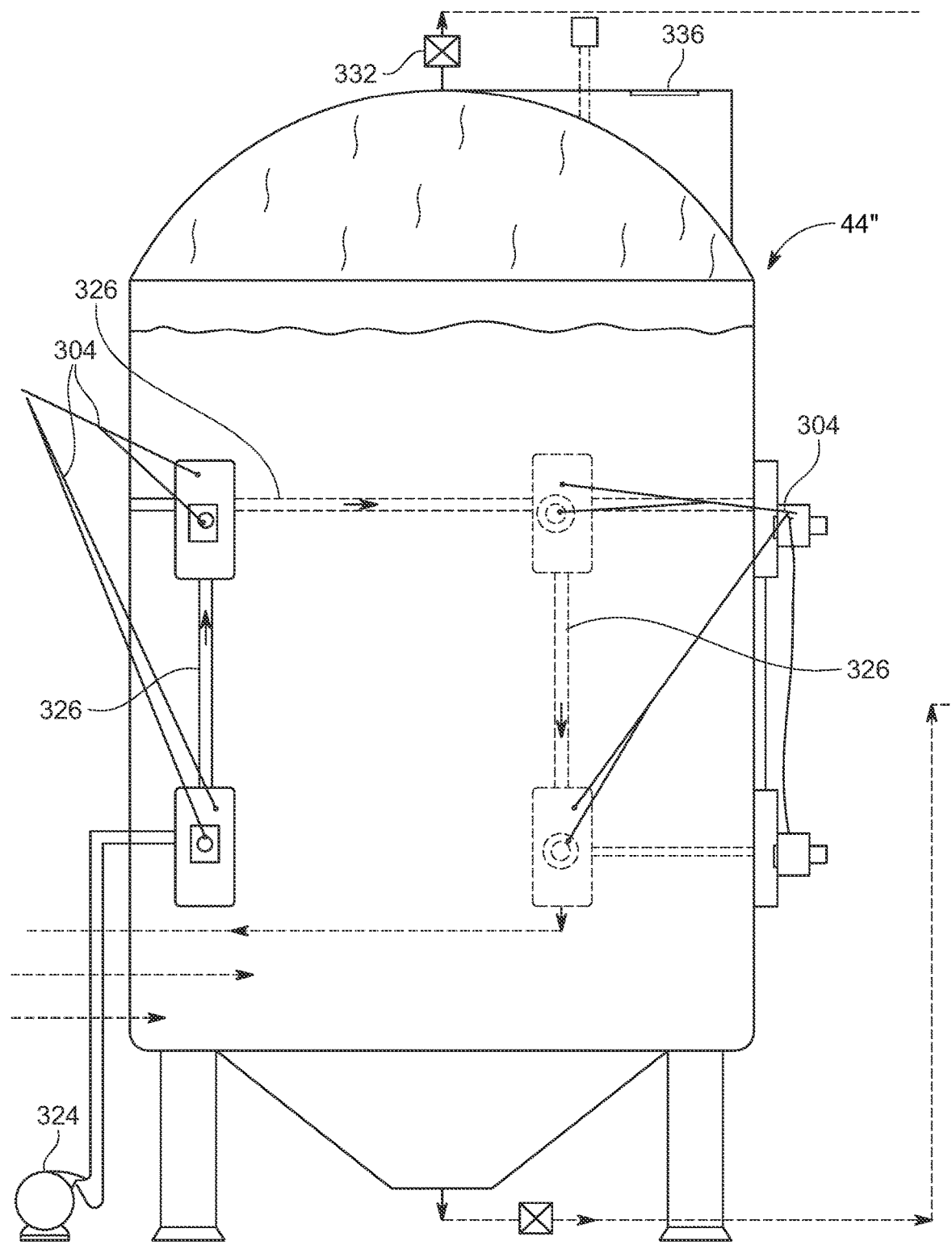
FIG. 44A is a side view of a holding tank modified with a sonolysis unit according to a further embodiment of the disclosure.
Figure 45:
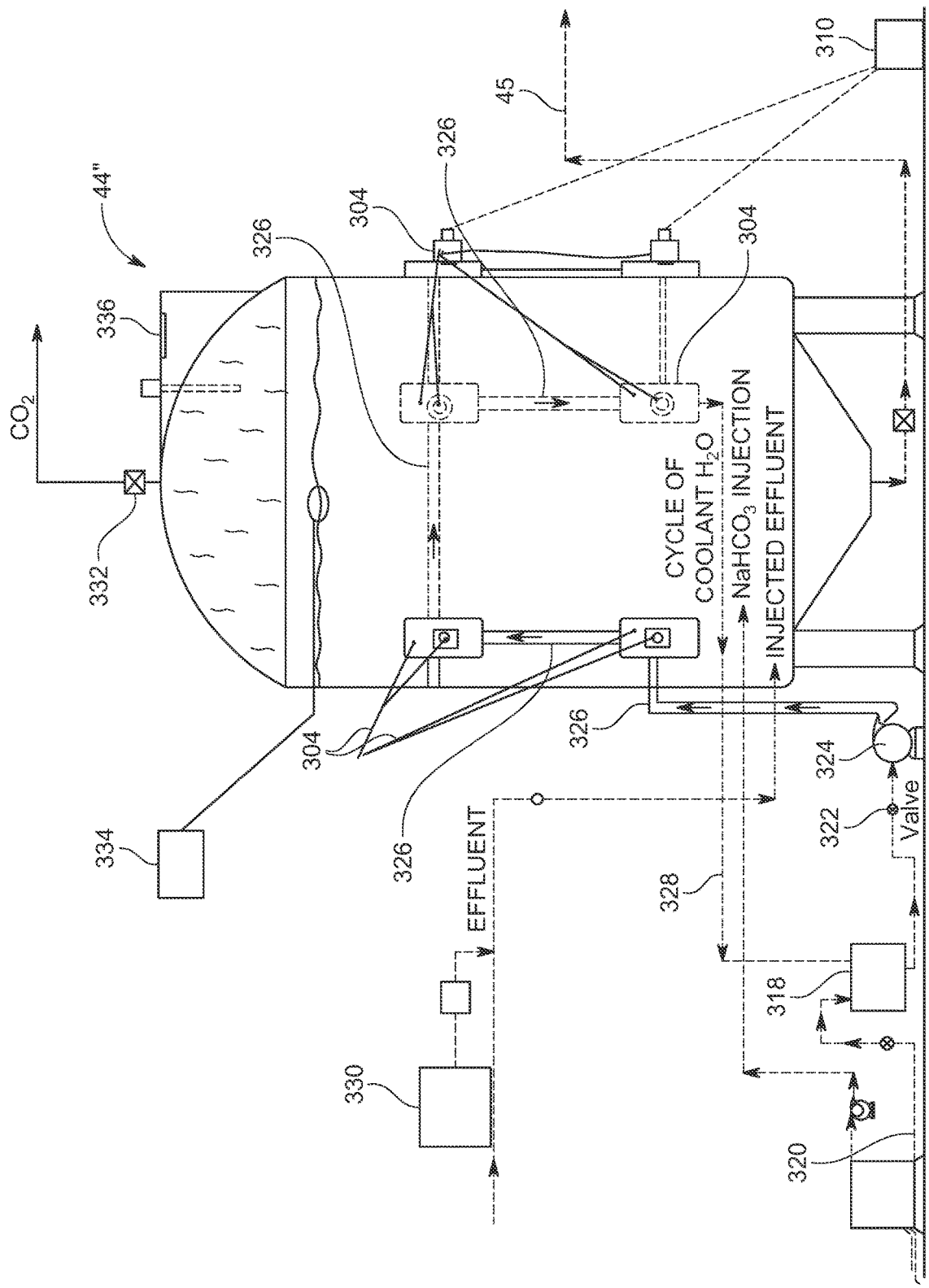
FIG. 45 is a reduced-scale side view of the holding tank shown in FIG. 44.

Referring now to FIGS. 44, 44a and 45, in an alternate embodiment of the sonolysis module, holding tank 44 is modified with the sonolysis module to perform sonolysis on the effluent transferred to the holding tank from the filtration module. The effluent may include water derived from AC units and/or rain water if the system is constructed to direct those water sources directly or indirectly to holding tank 44 as disclosed in more detail herein. Holding tank 44 is modified with sonolysis transducer units to pretreat the processed fluid before transfer to the autoclave units to provide a hybrid sonolysis/autoclave system to degrade and destroy pathogens and toxic chemicals in the effluent received from the filtration system. The pretreatment function also applies to configurations the do not include an autoclave unit with the pretreated effluent being transferred directly or indirectly, e.g., via additional holding tanks, to evaporator unit(s) 48 or any variations of the evaporator units.

To construct the modified holding tank 44, a plurality of sonolysis sound transducers 304 are secured about tank 44 in a spaced arrangement to ensure maximum coverage and uniform production of sound waves into the effluent volume. Transducers 304 may be piezoelectric transducers set at 612 kilohertz with titanium probes extending into the effluent. The transducers also have cooling chambers connected to, and in fluid communication with, a series of pipes that transfer cooling water to and from the transducer units. The probes transmit the sound energy directly into the effluent. It should be understood that the transducer energy settings can be modified and remain within the scope of the disclosure.

To power the transducers, one or more or supply units 310 is/are electrically connected to the transducers as shown. Each power supply unit 310 may be a 250-watt power unit. The wattage can be adjusted as needed to effectuate the sonolysis process. The goal is to supply sufficient wattage to perform a complete sonolysis treatment of the effluent.

The sonolysis transducers are immersed in a cooling system to keep the transducers from overheating. The coolant system is maintained at 80-104° F. in order to cool and maintain a longer life span for the 612 Hz piezoelectric transducer probes operating at about 250 Watts (each) of power. To ensure sufficient cool water is present to fill and replenish the cooling chambers of transducers 304, an auxiliary water source, e.g., from a city water supply, may be connected to holding tank 44. Auxiliary water holding tank 318 is connected to a water supply. Auxiliary tank Intake valve 320 controls the transfer of water into holding tank 318. Auxiliary tank outlet valve 322 controls the transfer of water out of holding tank 318 to transducers 304. Water supply pump 324 urges water from holding tank 318 into transducers 304 via a series of water lines 326 that feed all the transducers. A water return line 328 recycles the cooling water back to holding tank 318.

As a yet further alternative embodiment, effluent derived from the filtration module can be infused or injected with ozone via an ozone unit 330 before entry into holding tank 44. The ozone should return to elemental oxygen when mixed with the effluent and chemical compounds, all exposed to the sonolysis process. Any $CO_2$ generated by the process will migrate to the top of the holding tank and exit the holding tank via vent 332. Vent 332 may be connected directly or indirectly to the $CO_2$ capture system disclosed herein with respect to the evaporator module. An automated water level control 334 may be incorporated into holding tank 44 to monitor effluent levels in the holding tank, data that can be used to calculate how much ozone or chemical compounds to inject into the system. A pressure relief valve 337 may be incorporated into the holding tank to address any unwanted spikes in pressure/temperature. A manway 336 may be formed on a top end of the holding tank to permit access for maintenance.

Figure 48:
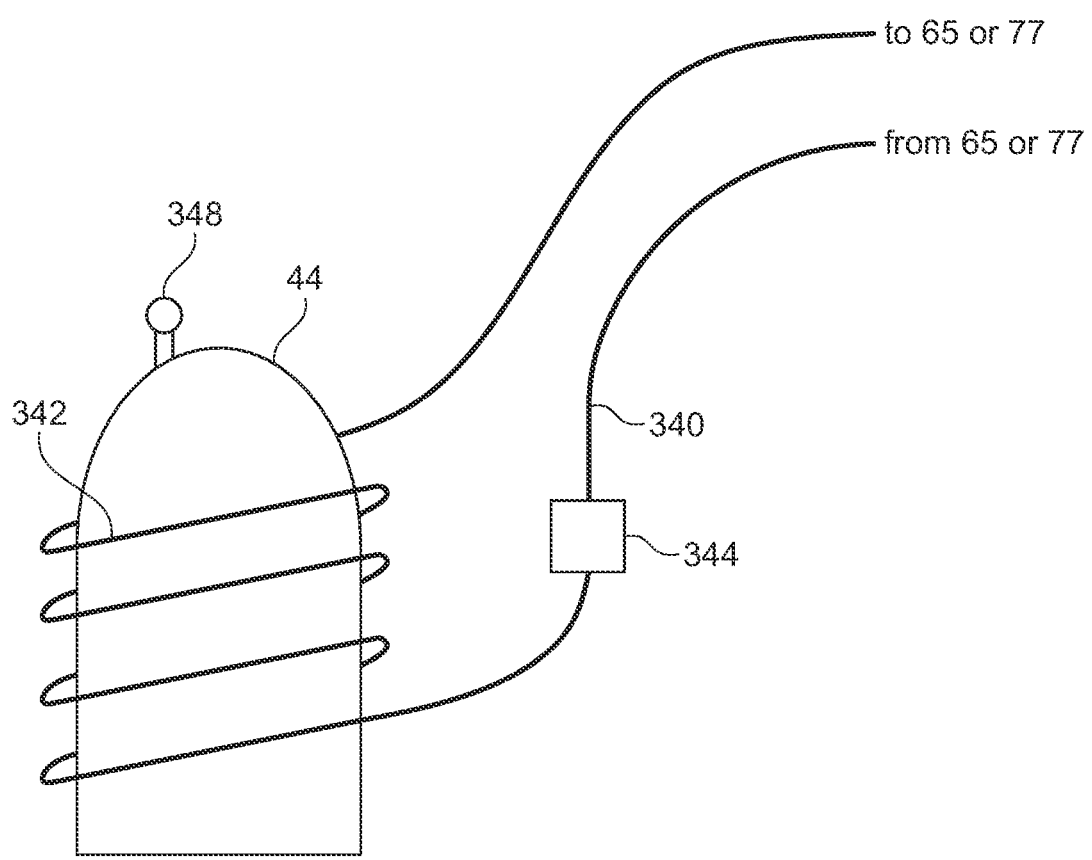
FIG. 48 is a side view of a holding tank modified with a $CO_2$ cooling assembly according to another embodiment of the disclosure.

To improve the efficiency of the sonolysis module, for systems that use natural gas or other fossil fuels to operate the evaporator(s), $CO_2$ captured from the natural gas combustion process in separator 65 and/or $CO_2$ holding tank 77 can be pumped back around the holding tank 44 to lower the temperature of the resident effluent/fluid. This lowers the energy needed for the sonolysis process. To accomplish this, as shown in FIG. 48, a $CO_2$ routing pipe 340 connects the $CO_2$ holding tank with a radiator-like arrangement of cooling pipes 342 around holding tank 44. An electronically controlled $CO_2$ delivery valve 344 is used to selectively release $CO_2$ into the pipe system. The pipe system has a return line 346 that returns the $CO_2$ back to the $CO_2$ holding tank. A temperature gauge 348 is used to provide temperature data to control the flow of the $CO_2$ and regulate the holding tank temperature. Temperature control is achieved with activation or deactivation of $CO_2$ delivery valve 344.

Figure 79A:
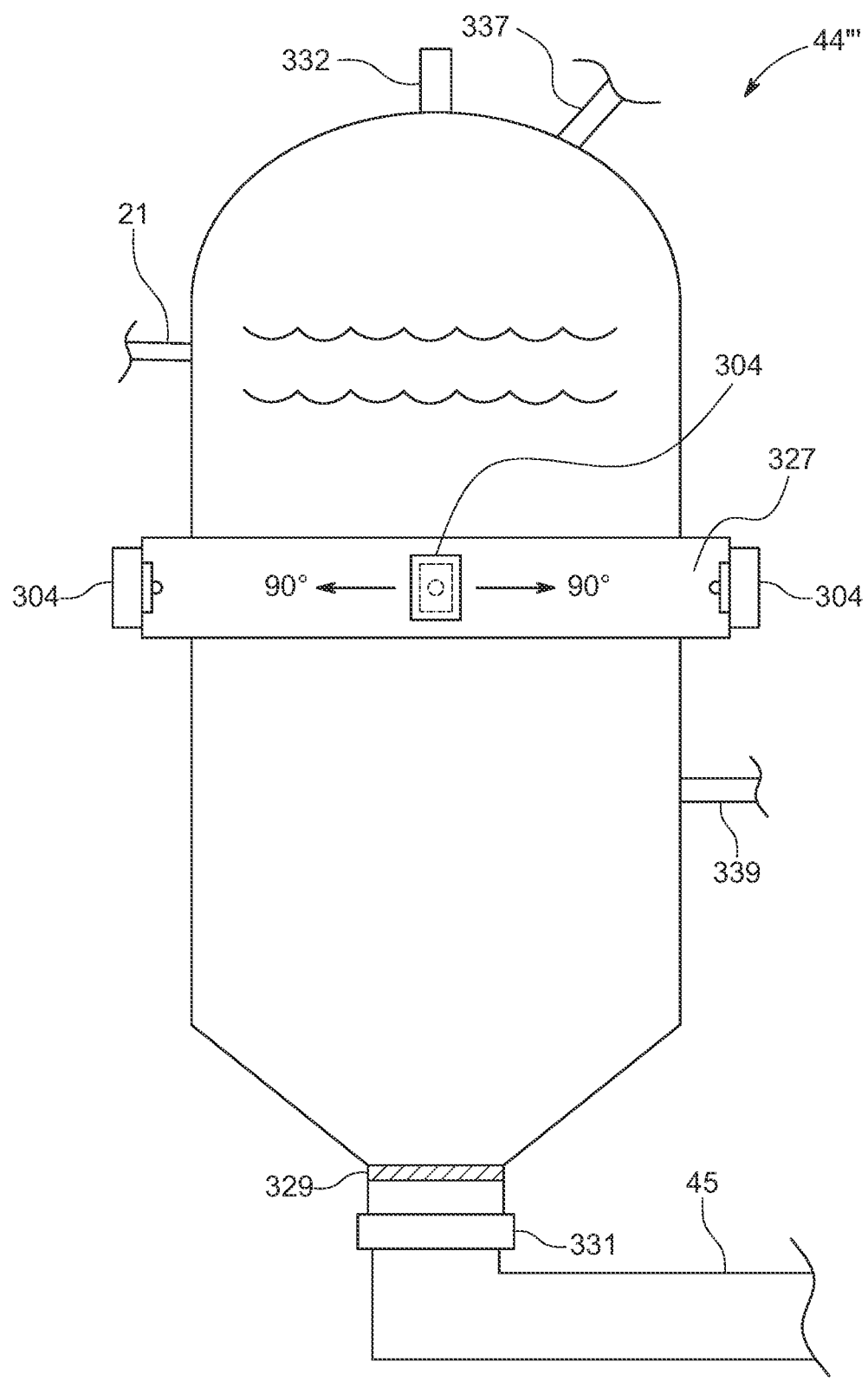
FIG. 79a is a side view in elevation of a sonolysis unit with an exterior annular gantry according to another embodiment of the disclosure.

Referring now to FIGS. 79a-90, in yet further alternative embodiments of the disclosure, the sonolysis transducers are placed in internal or external annular and/or helical track assemblies to ensure complete treatment of the effluent in the holding tank. Referring to FIG. 79a, a modified holding tank, designated generally as 44''', includes an annular chase, track or gantry 327 positioned about the annular periphery of holding tank 44'''. It should be understood that chase 327 can be positioned at any height on the holding tank wall and multiple chases 327 may be assembled to a single holding tank at differing heights on the holding tank including the top and bottom of the holding tank. One or more transducers 304 are secured in chase 327 and permitted to translate along the chase. In one embodiment, transducers 304 can move along the chase to about 90° in either direction. In another embodiment, transducers 304 are fixed to chase 327 and chase 327 rotates about the holding tank wall on an internal track with bearings to impart variable positioning of the transducers. Because the transducers are located outside the holding tank, the holding tank should be constructed from polyvinylchloride (PVC), high-density polyethylene (HDPE) or similar polymer to ensure the soundwaves can penetrate the tank's walls and perform their intended function to break up and neutralize chemicals, toxins and pathogens.

With the transducers positioned outside the holding tank, the transducers require a source of cooling. Chase 327 may be sealed and have water or compressed $CO_2$ lines, such as water lines 326 shown in FIG. 44A, secured to, and in fluid communication with, the chase to introduce water, $CO_2$ or other refrigerant into the chase to keep the transducers 304 cool during operation. Chase 327 is sealed regardless whether the transducers move within the chase or the chase revolves around the holding tank wall on an internal track (not shown) with bearings, e.g., roller, ball or similar, to permit rotation.

To assist in the processing of the effluent contained in holding tank 44''', chemical dispenser treatment line 21 may be secured to the holding tank to deliver base chemicals, such as $NaHCO_3$ or other chemicals into the effluent. As disclosed herein, chemical additions may be used to further neutralize the chemical components broken down by the sonolysis process. Prevention of the formation of acids, in particular, is contemplated by the addition of the base chemicals. An ozone delivery line 339 also may be secured to holding tank 44''' to deliver ozone into the effluent for the purposes of chemical degradation and neutralization. Any $CO_2$ (or other gas such as $H_2$) generated by the process will migrate to the top of the holding tank and exit the holding tank via vent 332 for expulsion or further capture and reuse as disclosed herein. An auxiliary vent valve 337 may be incorporated into the holding tank to function as a temperature/pressure valve or as another gas vent.

To ensure any large particulates are not passed from the holding tank, a holding tank filter 329 may be secured to a bottom of the tank, upstream from, and in fluid communication with, a downstream pipeline such as autoclave inlet pipe 45. A holding tank pump 331 may be installed in-line with the downstream pipe, such as inlet pipe 45, to urge effluent in the holding tank downstream to further wastewater treatment modules such as autoclave 80' and evaporator(s) 48.

Figure 79B:
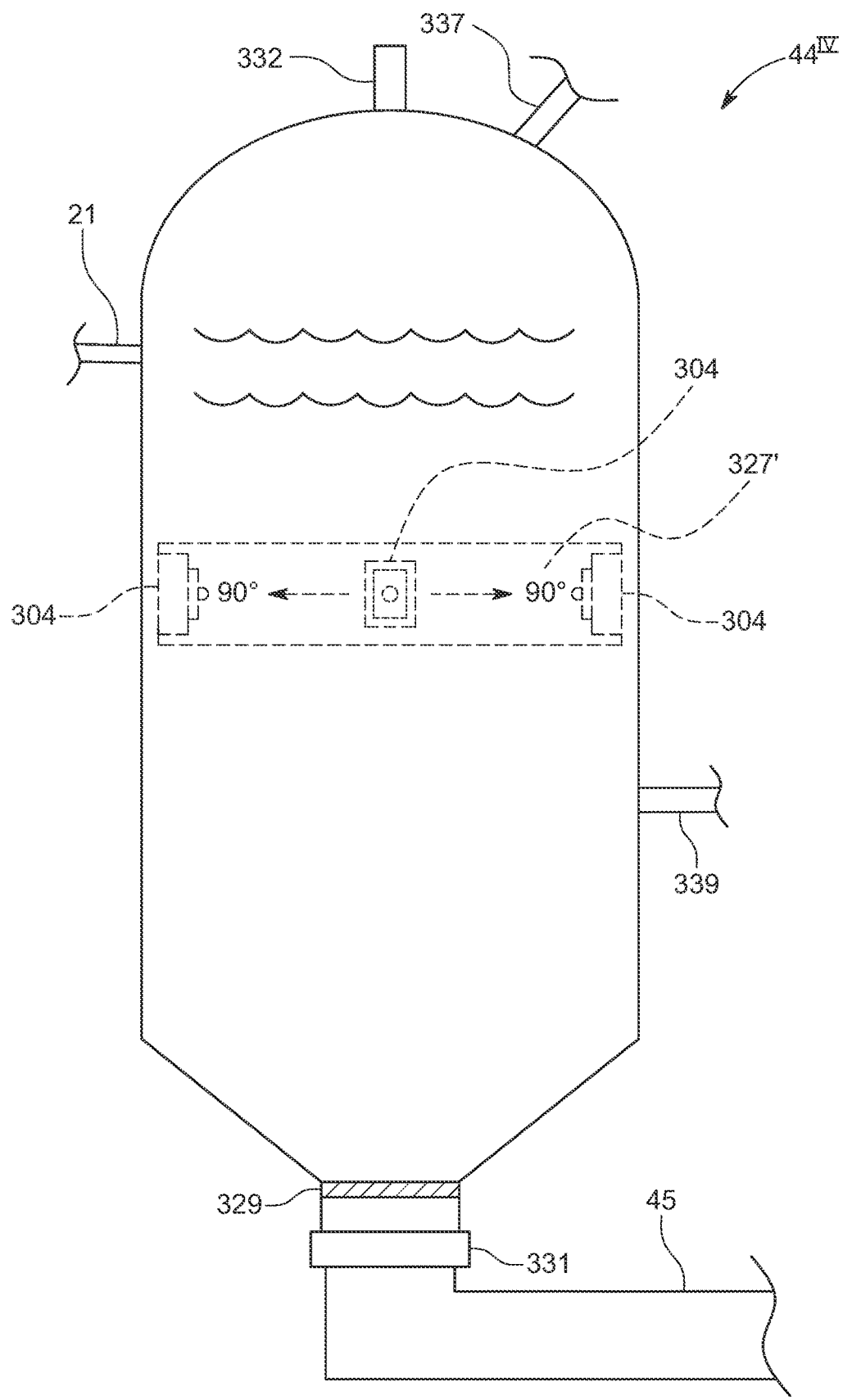
FIG. 79b is a side view in elevation of a sonolysis unit with an interior annular gantry according to another embodiment of the disclosure.

Referring now to FIG. 79b, in another embodiment of the disclosure, a holding tank, designated generally as $44^{IV}$ includes the same features as holding tank 44''' except that the chase 327' and transducers 304 are secured to the inner wall of the holding tank. Like the combination of chase 327 and transducers 304, the chase 327'/transducer 304 combination can have the transducers rotate within the chase (with sealed bearings) or the chase may be secured to an outer track and rotated with the use of sealed bearings as is well known in the art. With any arrangement, wiring used to supply the transducers are positioned and provided with sufficient length to permit the rotation of the transducers and/or chase(s) to ensure complete penetration of the entire volume of effluent in the holding tank. In this configuration, the holding tank may be formed from any polymer or metallic material such as stainless steel. The need for cooling lines is further eliminated as the effluent will function as a heat sink during processing. In an alternative embodiment, cooling lines may be secured to the transducers should the effluent provide insufficient to keep the transducers cools during use.

Figure 80A:
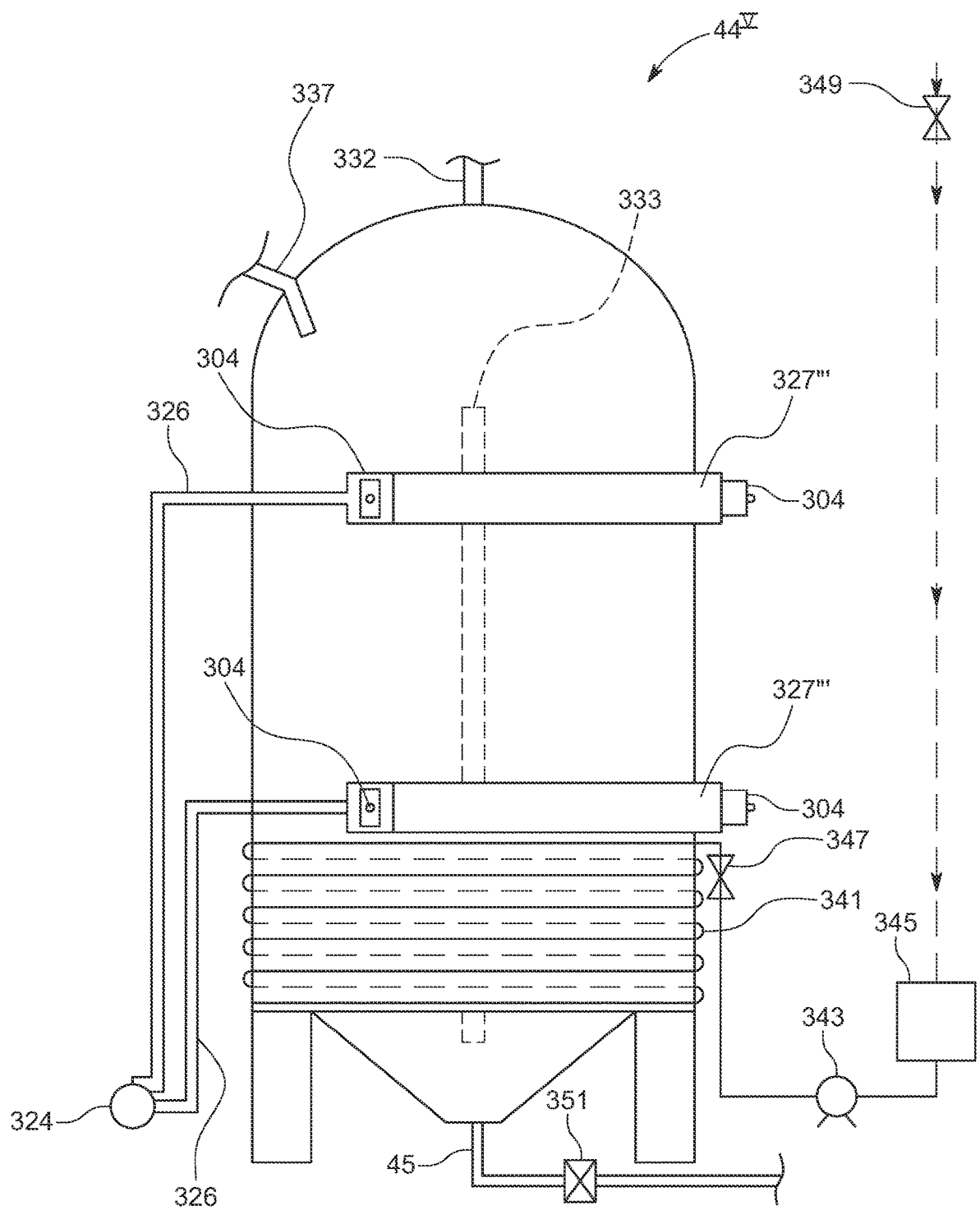
FIG. 80a is a side view of a sonolysis unit with two exterior sonolysis racks and a sound-wave reflection center post according to yet another embodiment of the disclosure.

Referring now to FIG. 80a, in a further embodiment of the disclosure, a holding tank, designated generally as $44^{V}$, includes the same features as holding tank 44'' with the addition of a cooling jacket 341 formed from coiled tubing. An evaporator $CO_2$ valve 349 permits the delivery of $CO_2$ derived from gas operation of evaporator 48 to a $CO_2$ compressor 345 to turn the $CO_2$ into a refrigerant. An optional $CO_2$ pump 343 may be incorporated in-line with the cooling jacket 341 coiled tubing to urge the compressed $CO_2$ into the cooling jacket. An expansion valve 341 secured in-line with the coiled tubing upstream cooling jacket 341 permits the cooling effect to be imparted via the cooling jacket into the holding tank and resident effluent. It is understood that the sonolysis process is optimized if the fluid being treated is maintained at a temperature from about 35° to about 60° F. Cooling jacket 341 performs this advantageous function. In an alternative embodiment, cooling jacket 341 may be secured to, or in close proximity with, an inner wall of holding tank $44^{V}$. A valve 351 controls the flow of effluent treated in the holding tank downstream for further processing.

Figure 80B:
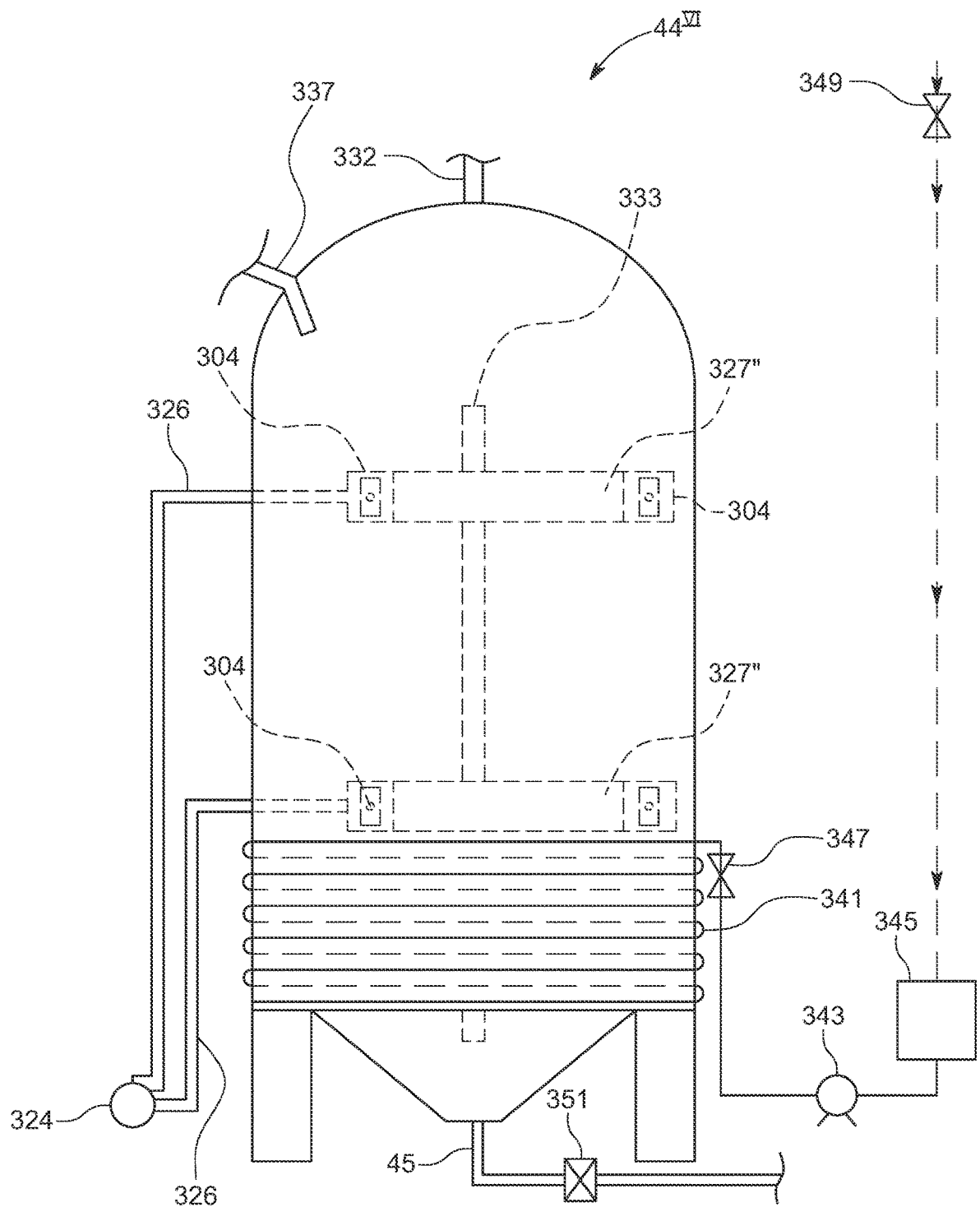
FIG. 80b is a side view of a sonolysis unit with two interior sonolysis racks and a sound-wave reflection center post according to yet another embodiment of the disclosure.

Referring now to FIG. 80b, in a still further embodiment of the disclosure, a holding tank, designated generally as $44^{VI}$, includes the same features as holding tank 44''' with the addition of a cooling jacket 341 formed from coiled tubing. An evaporator $CO_2$ valve 349 permits the delivery of $CO_2$ to a $CO_2$ compressor 345 to turn the $CO_2$ into a refrigerant. An optional $CO_2$ pump 343 may be incorporated in-line with the cooling jacket 341 coiled tubing to urge the compressed $CO_2$ into the cooling jacket. An expansion valve 341 secured in-line with the coiled tubing upstream cooling jacket 341 permits the cooling effect to be imparted via the cooling jacket into the holding tank and resident effluent. In an alternative embodiment, cooling jacket 341 may be secured to, or in close proximity with, an inner wall of holding tank $44^{V}$. A valve 351 controls the flow of effluent treated in the holding tank downstream for further processing.

Figure 81A:
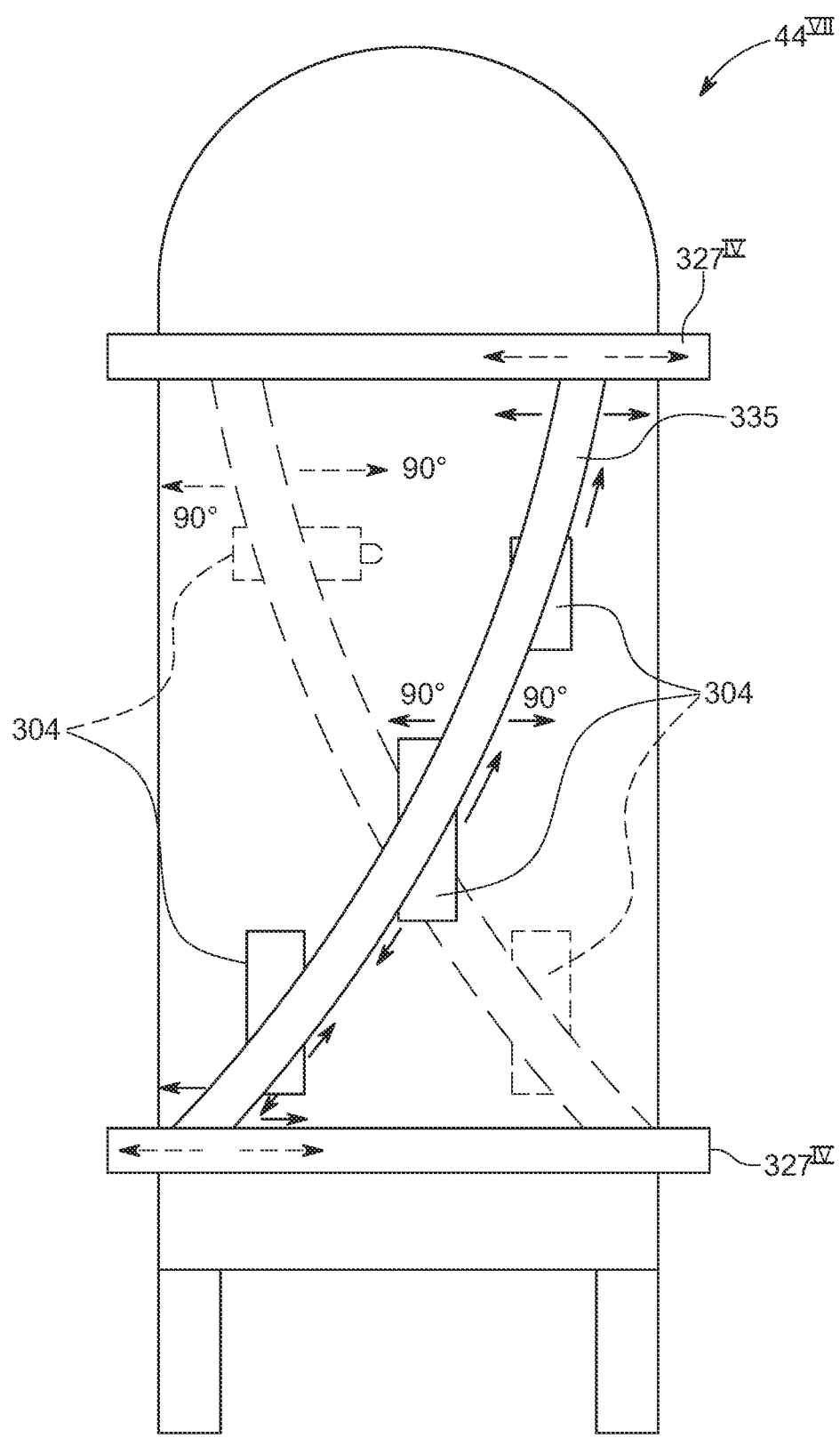
FIG. 81a is a side view in elevation and partial phantom of a sonolysis unit with exterior rotatable helical sound transducer arms according to a further embodiment of the disclosure.

Referring now to FIG. 81a, in another embodiment of the disclosure, a holding tank, designated generally as $44^{VII}$, includes outer annular chases $327^{IV}$, one positioned proximal an upper end of the holding tank and a second positioned proximal a lower end of the holding tank. Secured in rotational engagement with the chases are one or more helical transducer supports 335 that hold transducers 304. Helical transducer supports 335 permit the transducers to be positioned at various points along the helical supports to optimize penetration of the full volume of effluent in the holding tank. If motorized, the transducers can be moved along the helical transducer supports 335 during operation. By enabling the helical transducer supports to rotate about the holding tank via chases $327^{IV}$, all three-dimensional space in the holding tank can be serviced by the transducers. The inclusion of a reflection post 333 (shown in FIG. 80a) at the axial center of the holding tank further optimizes the efficiency of the transducers as disclosed in more detail herein. Because the transducers are located outside holding tank $44^{VII}$, the tank should be formed from polymers as disclosed in more detail hereinabove to permit the sound waves to penetrate the holding tank walls and perform their intended function to degrade and neutralize chemicals and pathogens in the enclosed effluent.

Referring now to FIGS. 85, 86, 88 and 89, the bottom ends of helical transducer supports 335 may be connected together with a center rotating post 361 and connecting rods or slats 359. By connecting the supports 335 together, they can be synchronized as they rotate about chases $327^{IV}$. The top and bottom ends of helical transducer supports 335 have rollers 353 that rotate within the chases. Lips formed on the chases maintain rollers 353 in the chases. Motors (not shown) are used to move the helical transducer supports about the chases. The motors can be step motors to precisely position the helical supports and attached transducers.

Figure 87:
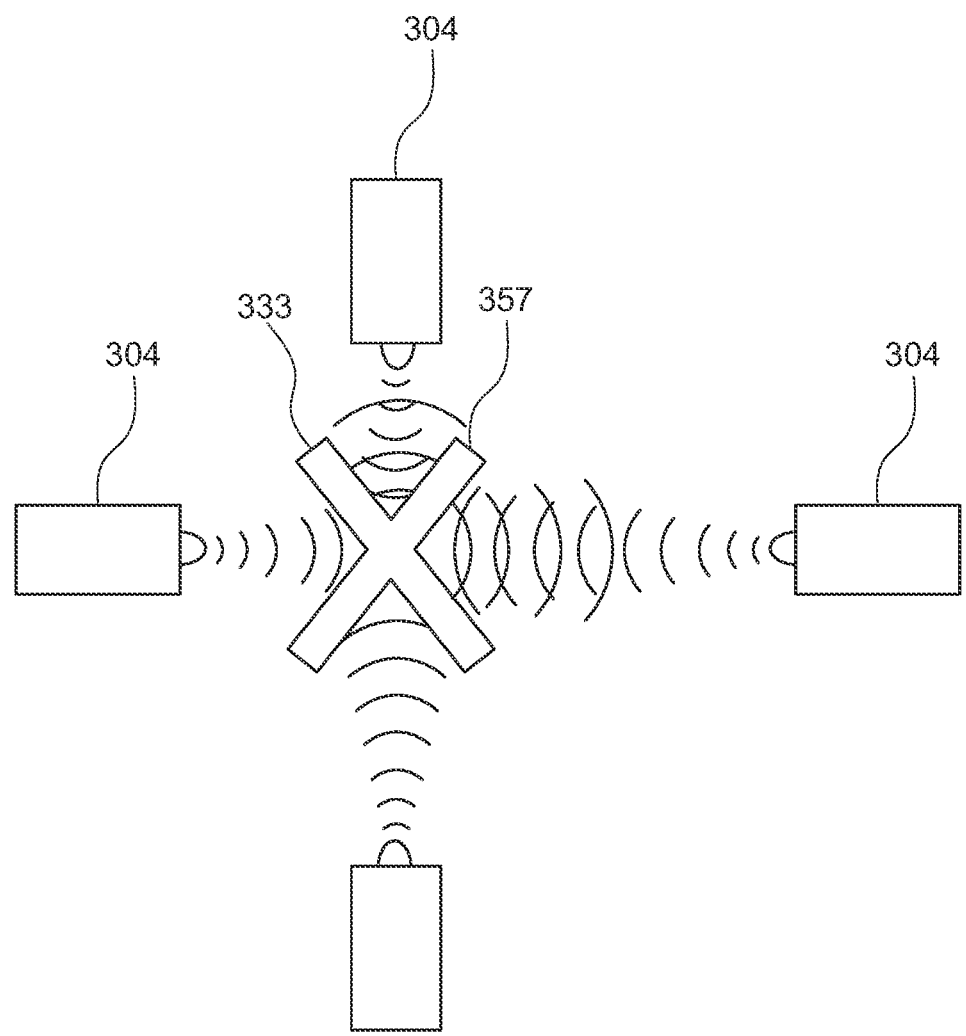
FIG. 87 is a top view showing the spatial relationship between the helical-support-arm-mounted transducers positioned before the center sound-wave reflection post according to the embodiment of the disclosure shown in FIG. 81.
Figure 88:
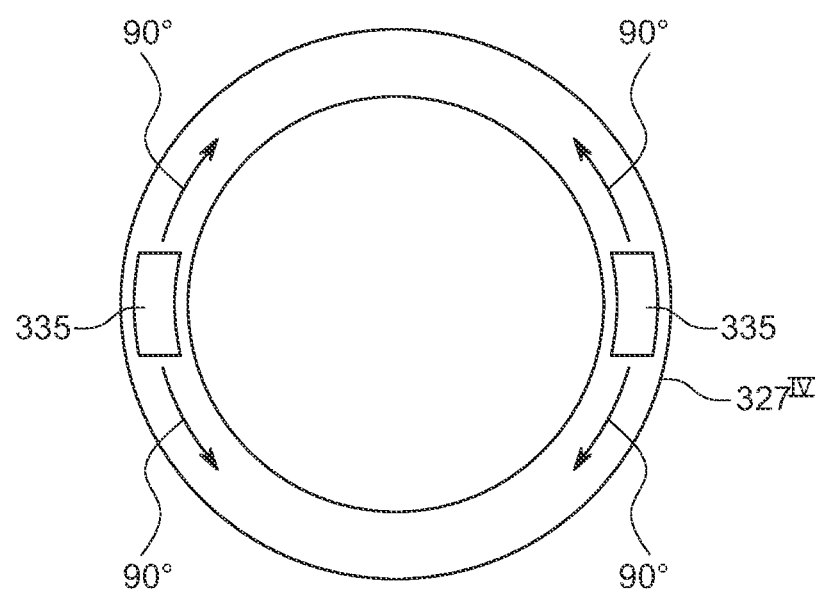
FIG. 88 is a top view showing the spatial relationship between the helical-support-arm-mounted transducers secured in the annular support-arm track according to the embodiment of the disclosure shown in FIG. 81.
Figure 89:
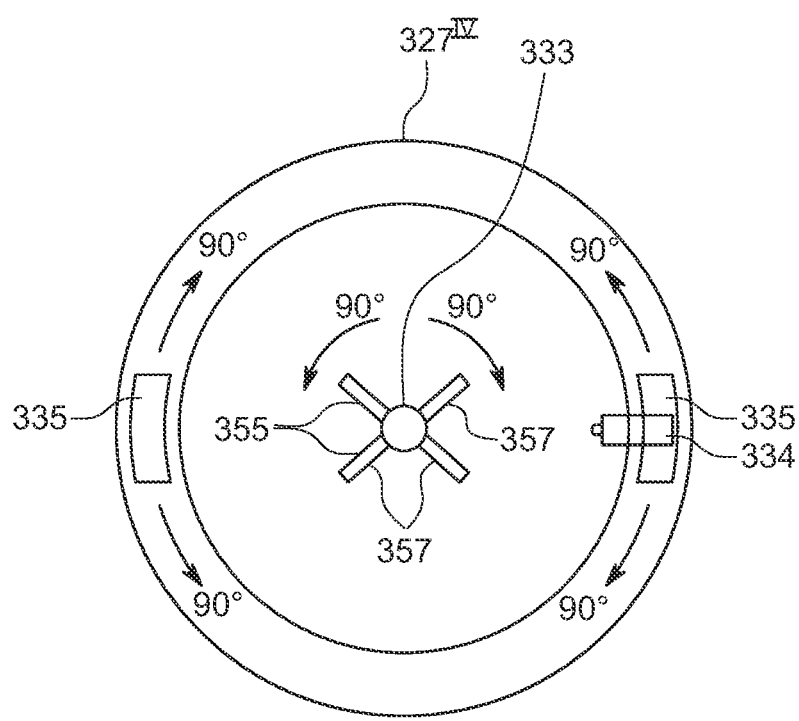
FIG. 89 is a top view showing the spatial relationship between the helical-support-arm-mounted transducers secured in the annular support-arm track and center sound-wave reflection post according to the embodiment of the disclosure shown in FIG. 81.
Figure 90:
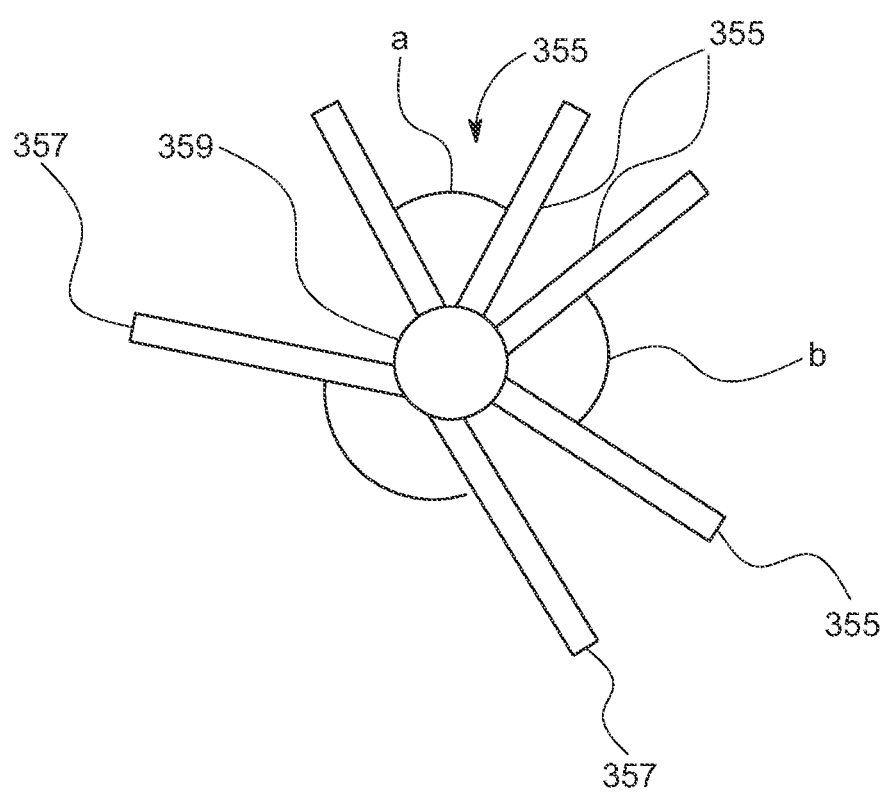
FIG. 90 is a top view of a center sound-wave reflection post with variable angle spacing of rotatable reflection post fins according to another embodiment of the disclosure.

Referring now to FIGS. 82-84 and 87, 89 and 90, to improve the energy efficiency of the transducers, reflection post 333 is secured along the axial center of the holding tank and positioned about and/or attached to rotating post 361. In one embodiment, rotating post 361 and reflection post 333 are the same post. Extending radially from a center of rotating post 333 are longitudinal reflection wings 357. Reflection wings 357 can be fixed or rotatable as shown in FIGS. 89 and 90. By rotating the wings to form particular angles, the sound waves produced by transducers 304 can be reflected back toward the transducers to magnify the amplitudes of the sound waves by synchronizing the forward propagating waves with the reflected propagating waves as shown in FIG. 87. This should reduce total energy consumption by 50%. The angles formed by the rotatable reflection wings are set to optimize the wave amplification effect. All the movement of the rotatable components is performed by computer-controlled motors as is well known in the art.

Figure 81B:
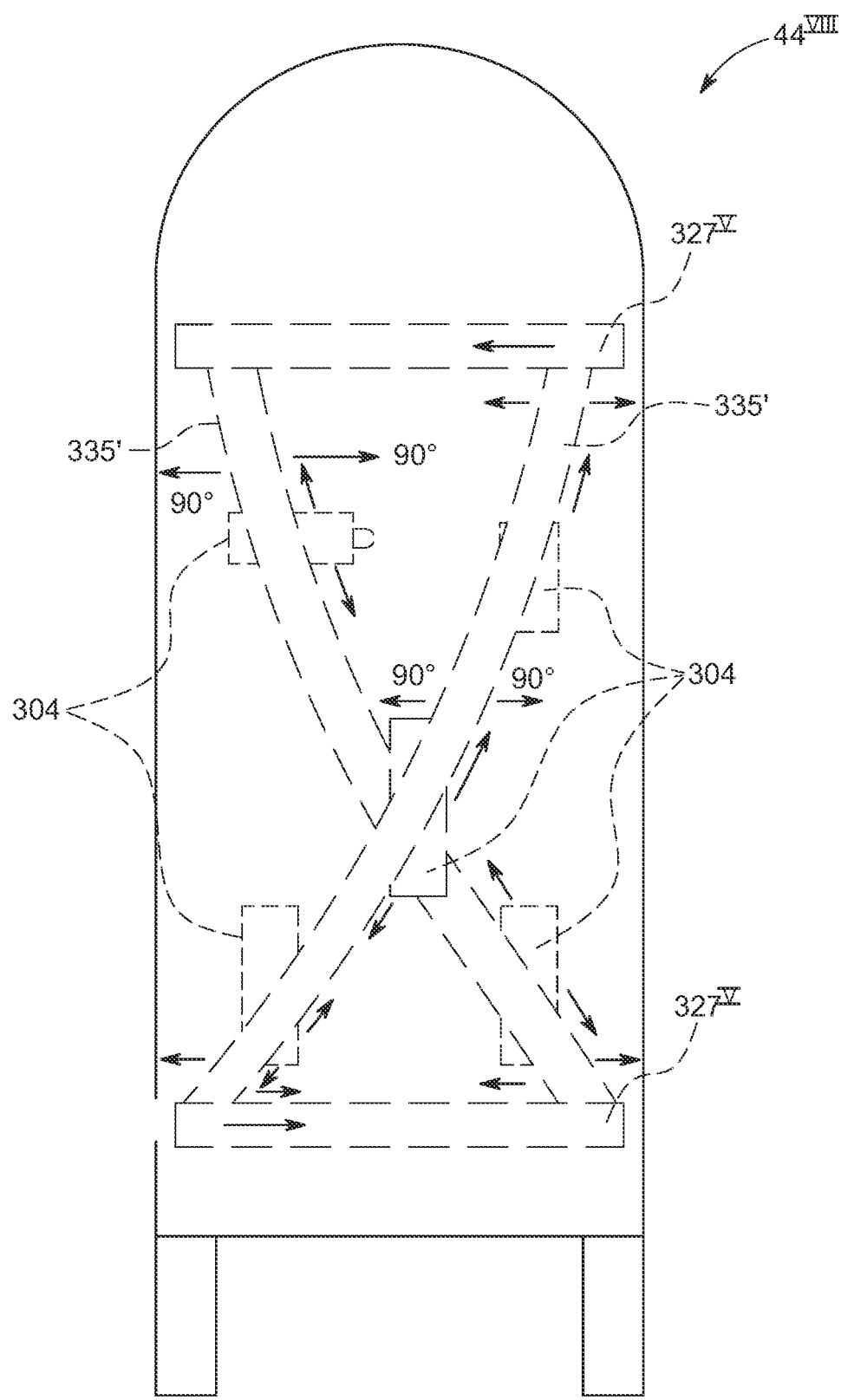
FIG. 81b is a side view in elevation and partial phantom of a sonolysis unit with interior rotatable helical sound transducer arms according to a further embodiment of the disclosure.
Figure 82:
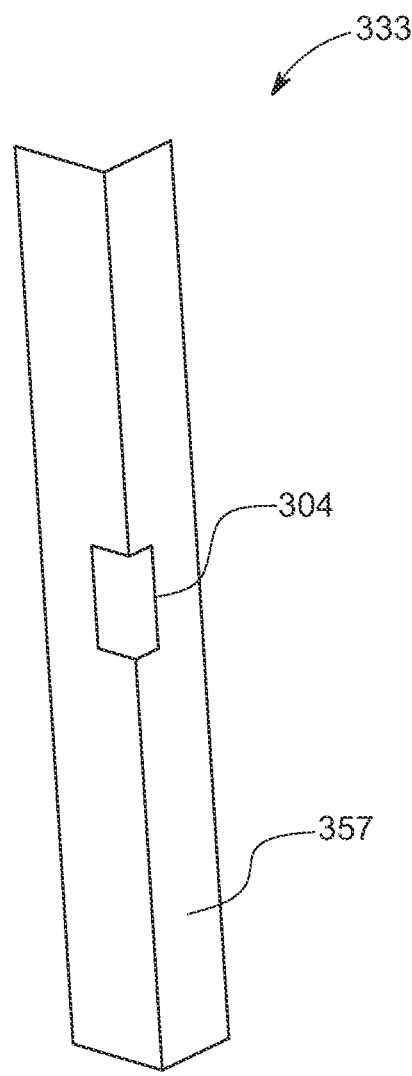
FIG. 82 is a front view in elevation of a transducer positioned before a sound-wave reflection post of the sonolysis unit shown in FIG. 81.
Figure 83:
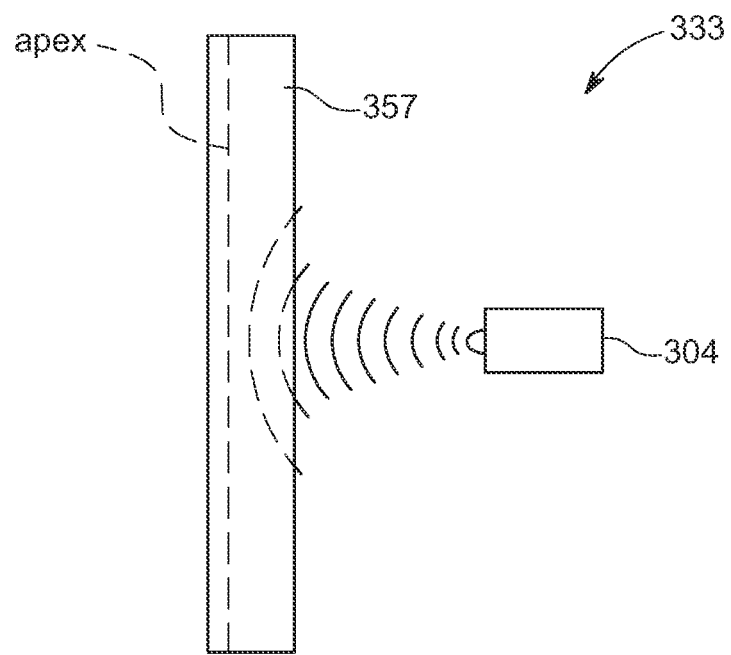
FIG. 83 is a side view in elevation of the transducer positioned before the sound-wave reflection post shown in FIG. 82.
Figure 84:
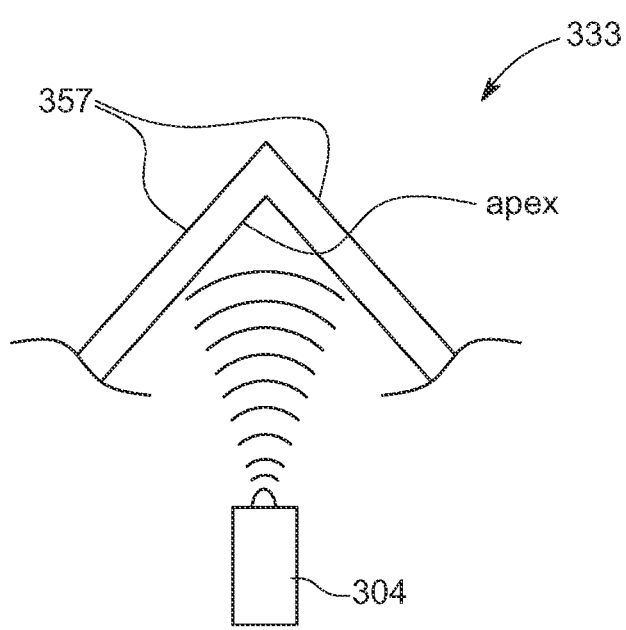
FIG. 84 is a top view of the transducer positioned before the sound-wave reflection post shown in FIG. 82.
Figure 85:
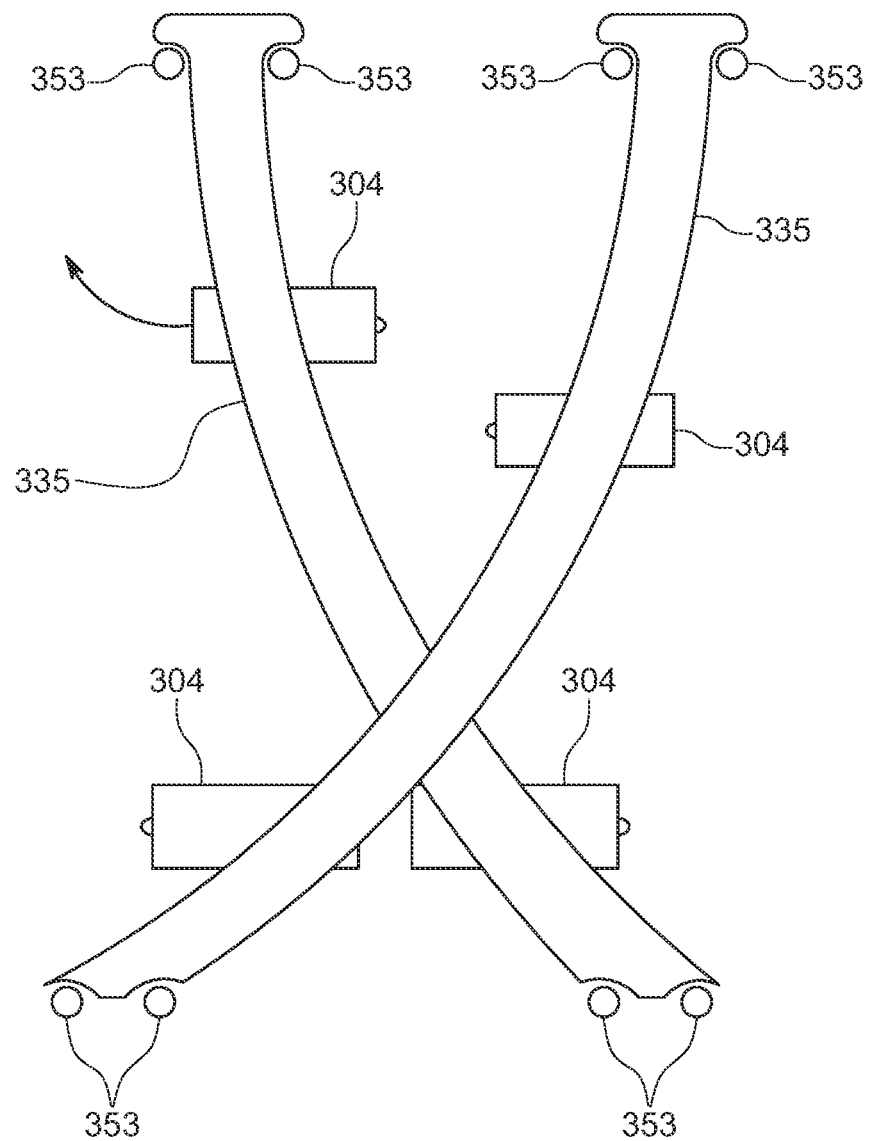
FIG. 85 is a front view in elevation of the helical sound transducer arms and attached sound transducers according to the embodiment of the disclosure shown in FIG. 81.
Figure 86:
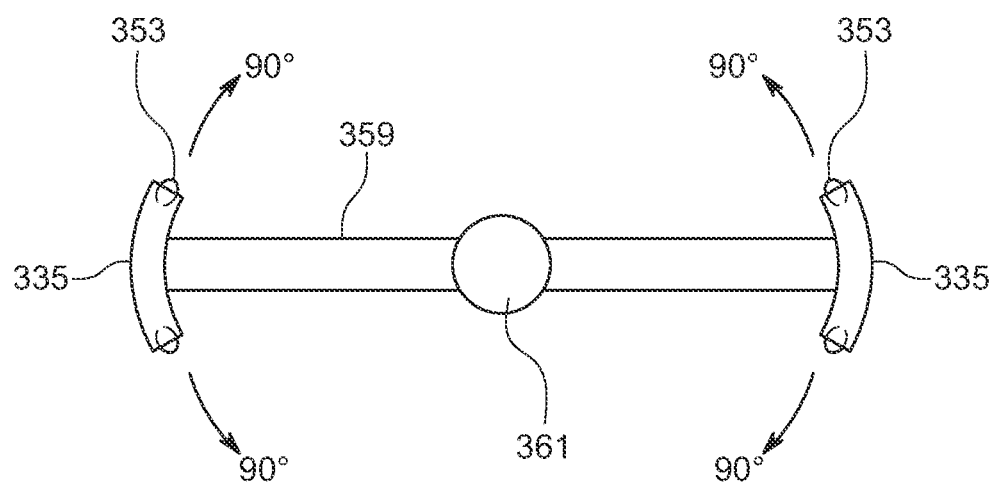
FIG. 86 is a bottom view of the helical supports connected to the center sound-wave reflection post according to the embodiment of the disclosure shown in FIG. 81.

Referring now to FIG. 81b, in yet another embodiment of the disclosure, a holding tank, designated generally as $44^{VIII}$, includes all the same features as holding tank $44^{VII}$ except the chases $327^{V}$ and helical transducer supports 335' are secured inside of, and/or secured to, the inner wall of the holding tank. Like the combination of chase $327^{IV}$, helical transducer supports 335 and transducers 304, the chase 327'/transducer support 335/transducer 304 combination can have the transducers rotate within the chase (with sealed bearings) or the chase may be secured to an outer track secured to the inner wall and rotated with the use of sealed bearings as is well known in the art. With any arrangement, wiring used to supply the transducers are positioned and provided with sufficient length to permit the rotation of the transducers and/or chase(s) to ensure complete penetration of the entire volume of effluent in the holding tank. In this configuration, the holding tank may be formed from any polymer or metallic material such as stainless steel. The need for cooling lines is further eliminated as the effluent will function as a heat sink during processing. In an alternative embodiment, cooling lines may be secured to the transducers should the effluent provide insufficient to keep the transducers cools during use.

X. Water treatment System Module Combinations:

Having described the multitude of water treatment modules used to structure wastewater treatment systems according to the disclosure, the following are examples of possible water treatment module configurations useful for particular water-treatment needs. It should be understood that the examples are provided for illustrative purposes only and do not limit the many combinations possible to treat wastewater. There are multiple combinations that can be made of the modules/components to provide the desired wastewater treatment. The examples have been simplified by not reciting all the valves, unions, pumps and other accessory components disclosed herein as part of the treatment modules and overall wastewater treatment systems. It should be understood that these accessories are part of the complete wastewater treatment system configurations.

Figure 49:
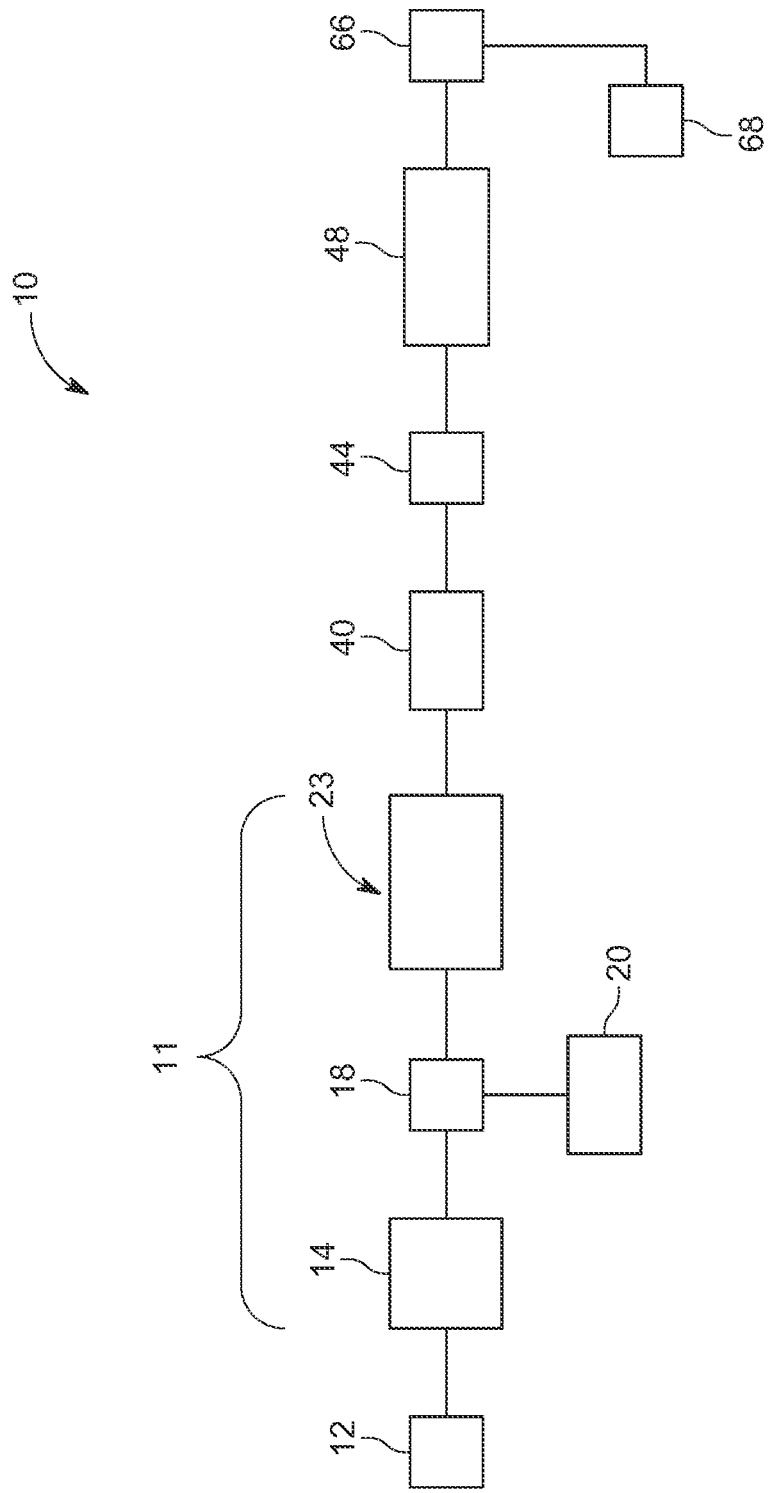
FIG. 49 is a flow chart of a wastewater treatment system with a UV-light module upstream an evaporator module and a condenser unit downstream the evaporator module according to one embodiment of the disclosure.

In one configuration shown in FIG. 49, a filtration module 11 is connected downstream to a UV light module 40 and further downstream to an evaporator module 48. A condenser unit 66 is connected downstream to evaporator module 48 followed by an optional ozone module 69 and a purified water holding tank 68 connected downstream from the ozone module. This configuration is useful for water conditions that do not include significant concentrations of harmful chemicals such as PFAS and arsenic but may contain pathogens.

Figure 50:
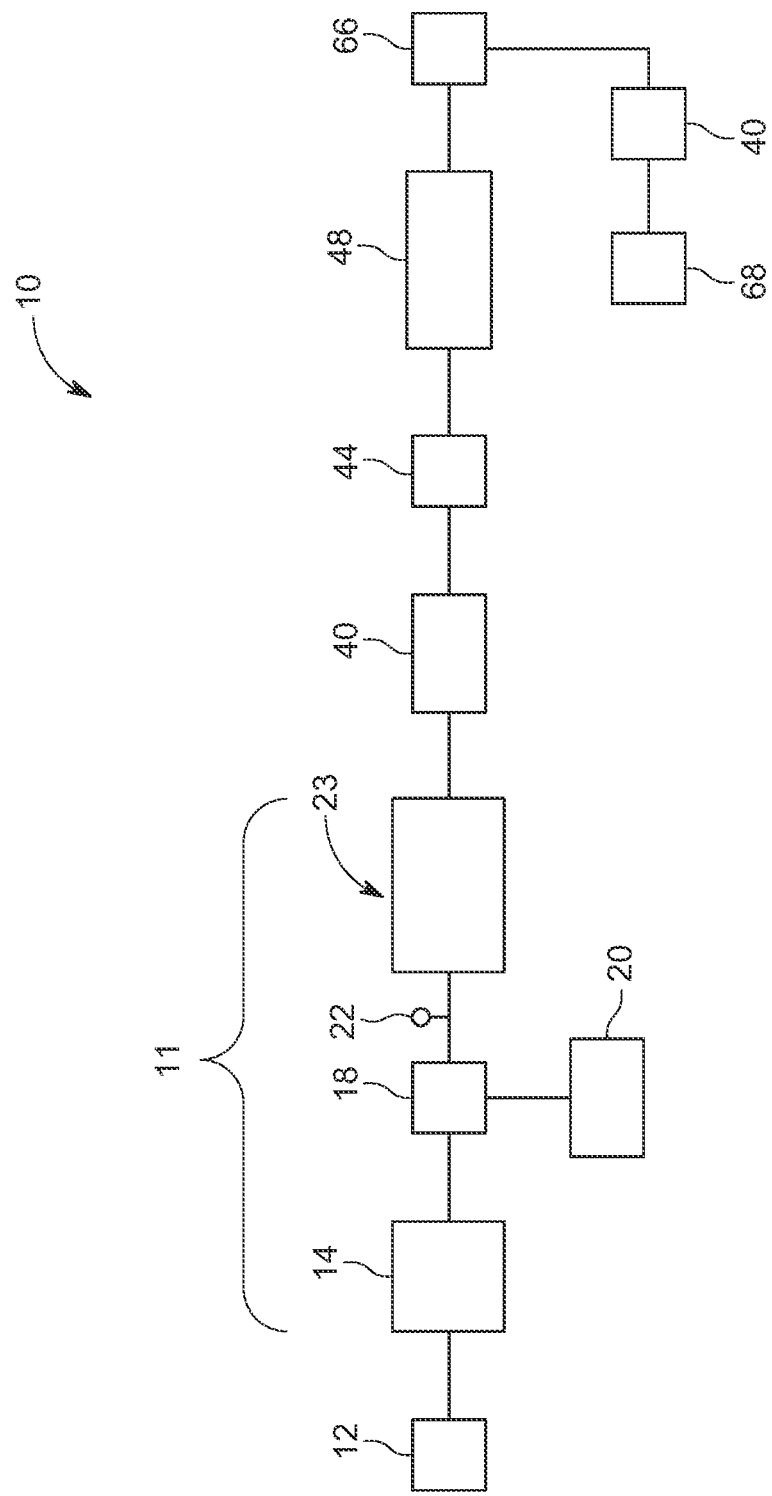
FIG. 50 is a flow chart of a wastewater treatment system with a UV-light module downstream a condenser unit according to another embodiment of the disclosure.

In another wastewater treatment system configuration shown in FIG. 50, a filtration module 11 is connected downstream to a UV light module 40 and further downstream to an evaporator module 48. A condenser unit 66 is connected downstream to evaporator module 48 followed by an optional second UV light module 40 and a purified water holding tank 68 connected downstream from the UV light module. This configuration also is useful for water conditions that do not include significant concentrations of harmful chemicals such as PFAS and arsenic but may contain pathogens. The post evaporator UV light module is included to meet certain potable water standards in certain jurisdictions.

Figure 51:
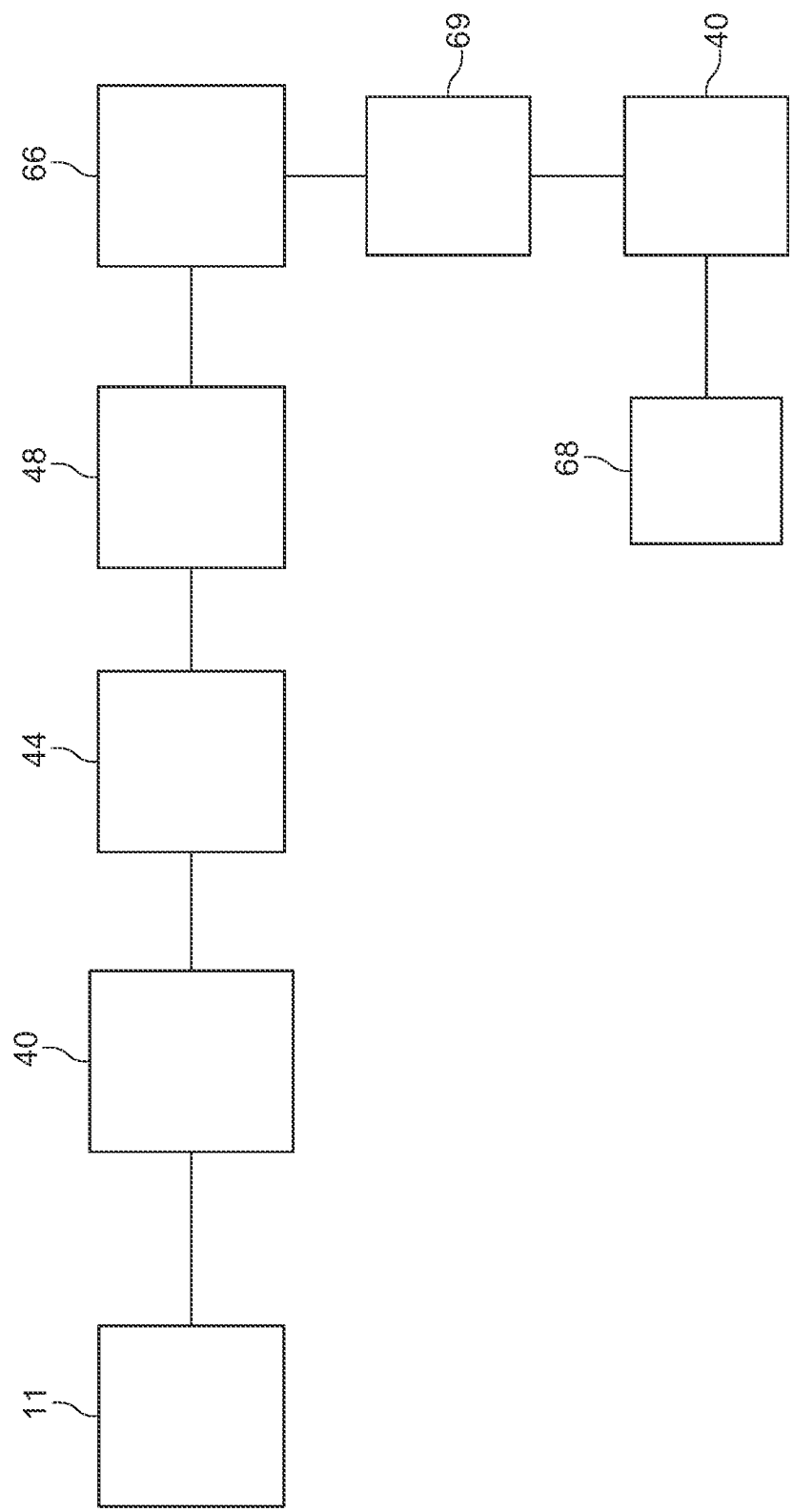
FIG. 51 is a flow chart of a wastewater treatment system with an ozone module downstream a condenser unit and a UV-light module downstream an ozone module according to a further embodiment of the disclosure.

In yet another wastewater treatment system configuration shown in FIG. 51, a filtration module 11 is connected downstream to a UV light module 40 and further downstream to an evaporator module 48. A condenser unit 66 is connected downstream to evaporator module 48 followed by an optional ozone module 69 and a second UV light module 40 and a purified water holding tank 68 connected downstream from the UV light module. It should be understood the sequencing of the ozone and second UV light modules can be reversed. This configuration also is useful for water conditions that do not include significant concentrations of harmful chemicals such as PFAS and arsenic but may contain organic pathogens.

Figure 52:
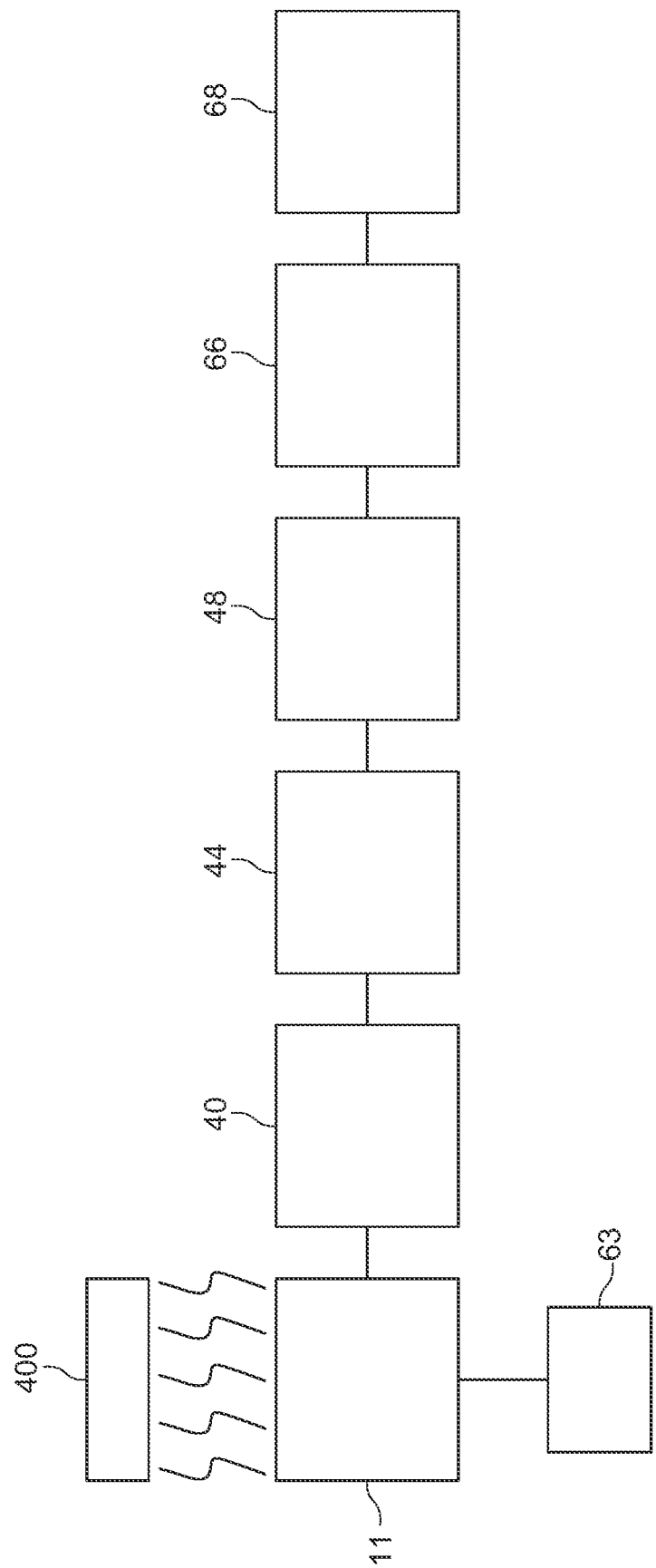
FIG. 52 is a flow chart of the wastewater treatment system shown in FIG. 49 with a microwave unit secured to a filtration module and an odor control module positioned over the filtration module according to another embodiment of the disclosure.

In still another wastewater treatment system configuration shown in FIG. 52, a filtration module 11 is connected downstream to a UV light module 40 and further downstream to an evaporator module 48. A condenser unit 66 is connected downstream to evaporator module 48 and upstream from a purified water holding tank 68. A microwave module 63 is connected to filtration module 11 to treat the waste solids component before transfer offsite. An odor control module is positioned above filtration module 11. This configuration also is useful for water conditions that do not include significant concentrations of harmful chemicals such as PFAS and arsenic but may contain organic pathogens.

Figure 53:
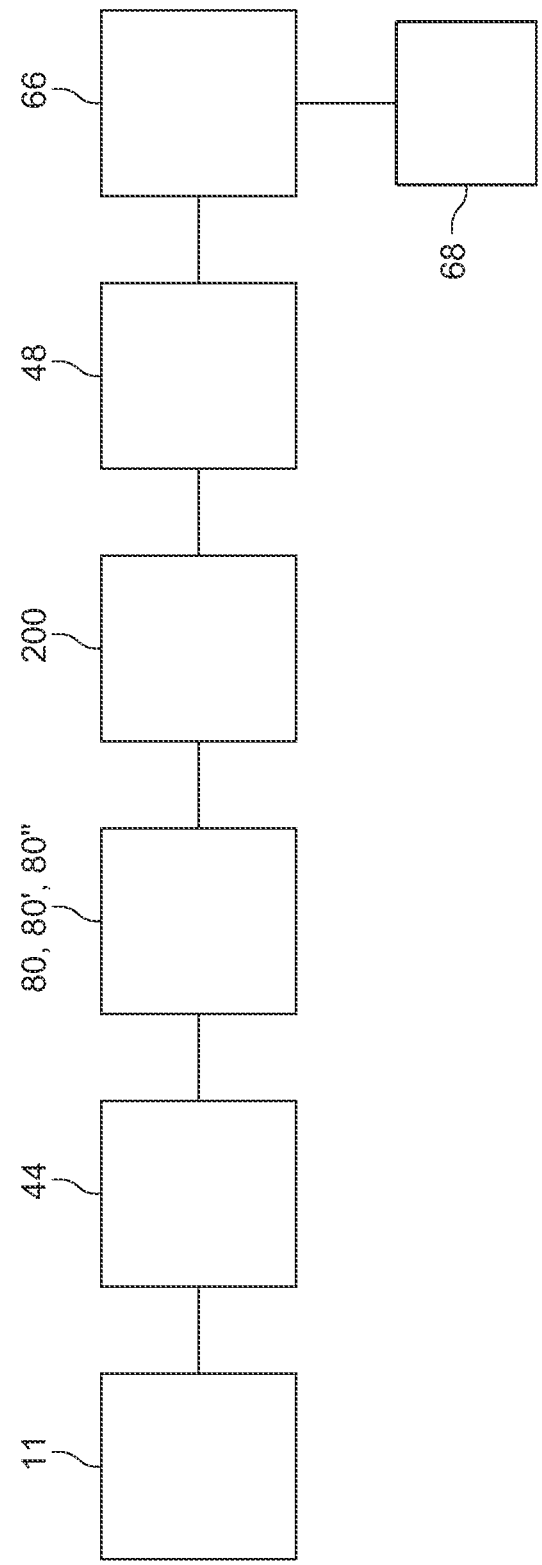
FIG. 53 is a flow chart of the wastewater treatment system shown in FIG. 49 with an autoclave module substituted for a UV-light module according to a further embodiment of the disclosure.

In a further configuration shown in FIG. 53, a filtration module 11 is connected downstream to an autoclave module 80 and further downstream to a flash tank 200. An evaporator module 48 is connected downstream flash tank 200. A condenser unit 66 is connected downstream to evaporator module 48 and connected upstream from a purified water holding tank 68. This configuration is useful for water conditions that involve significant concentrations of harmful chemicals such as PFAS and arsenic and organic pathogens.

Figure 54:
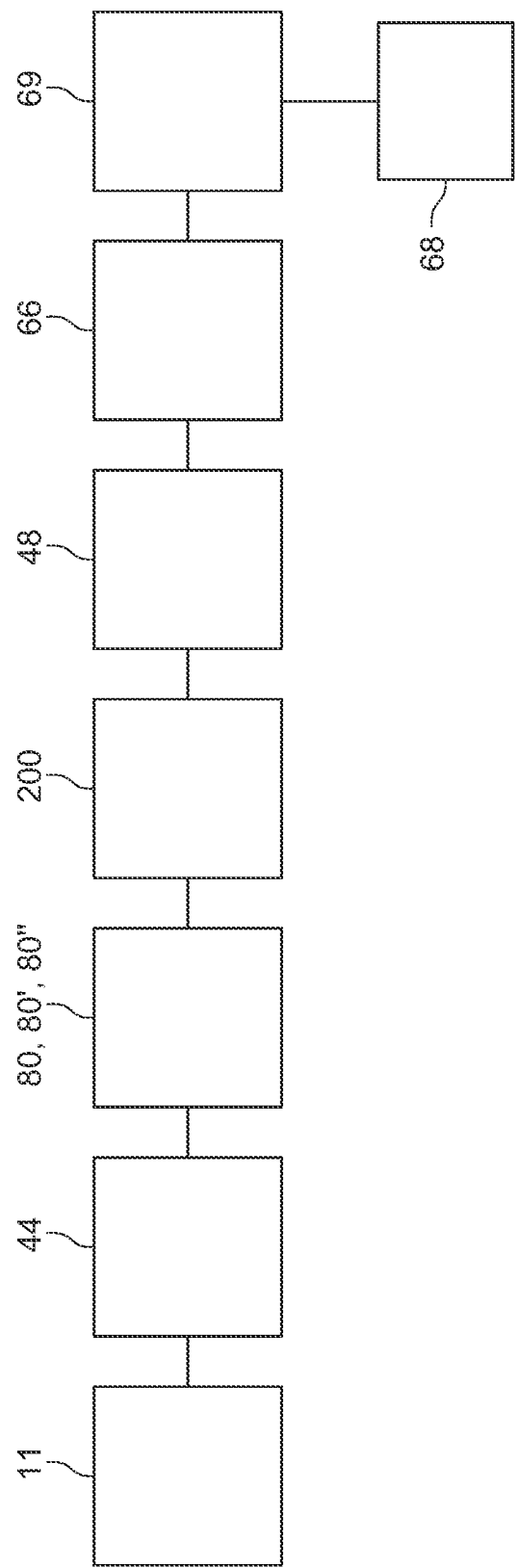
FIG. 54 is a flow chart of the wastewater treatment system shown in FIG. 53 with an ozone module secured downstream from a condenser unit according to a yet further embodiment of the disclosure.

In a yet further configuration shown in FIG. 54, a filtration module 11 is connected downstream to an autoclave module 80 and further downstream to a flash tank 200. An evaporator module 48 is connected downstream flash tank 200. A condenser unit 66 is connected downstream to evaporator module 48 and connected upstream from an ozone module 69. A purified water holding tank 68 is connected downstream from the ozone module 69. This configuration is useful for water conditions that involve significant concentrations of harmful chemicals such as PFAS and arsenic as well as organic pathogens. The ozone module ensures potable water is transferred into holding tank 68.

Figure 55:
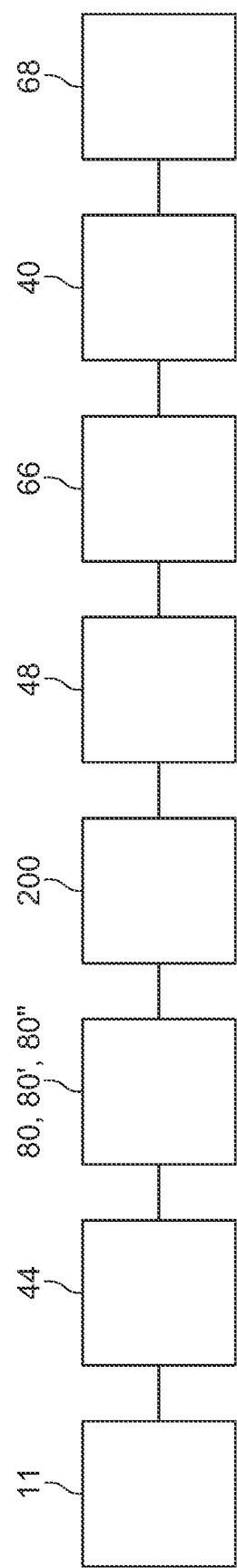
FIG. 55 is a flow chart of the wastewater treatment system shown in FIG. 53 with a UV-light module secured downstream from a condenser unit according to a still further embodiment of the disclosure.

In another configuration shown in FIG. 55, a filtration module 11 is connected downstream to an autoclave module 80 and further downstream to a flash tank 200. An evaporator module 48 is connected downstream flash tank 200. A condenser unit 66 is connected downstream to evaporator module 48 and connected upstream from a UV light module 40. A purified water holding tank 68 is connected downstream from UV light module 40. This configuration is useful for water conditions that involve significant concentrations of harmful chemicals such as PFAS and arsenic as well as organic pathogens. The UV light module ensures potable water is transferred into holding tank 68.

Figure 56:
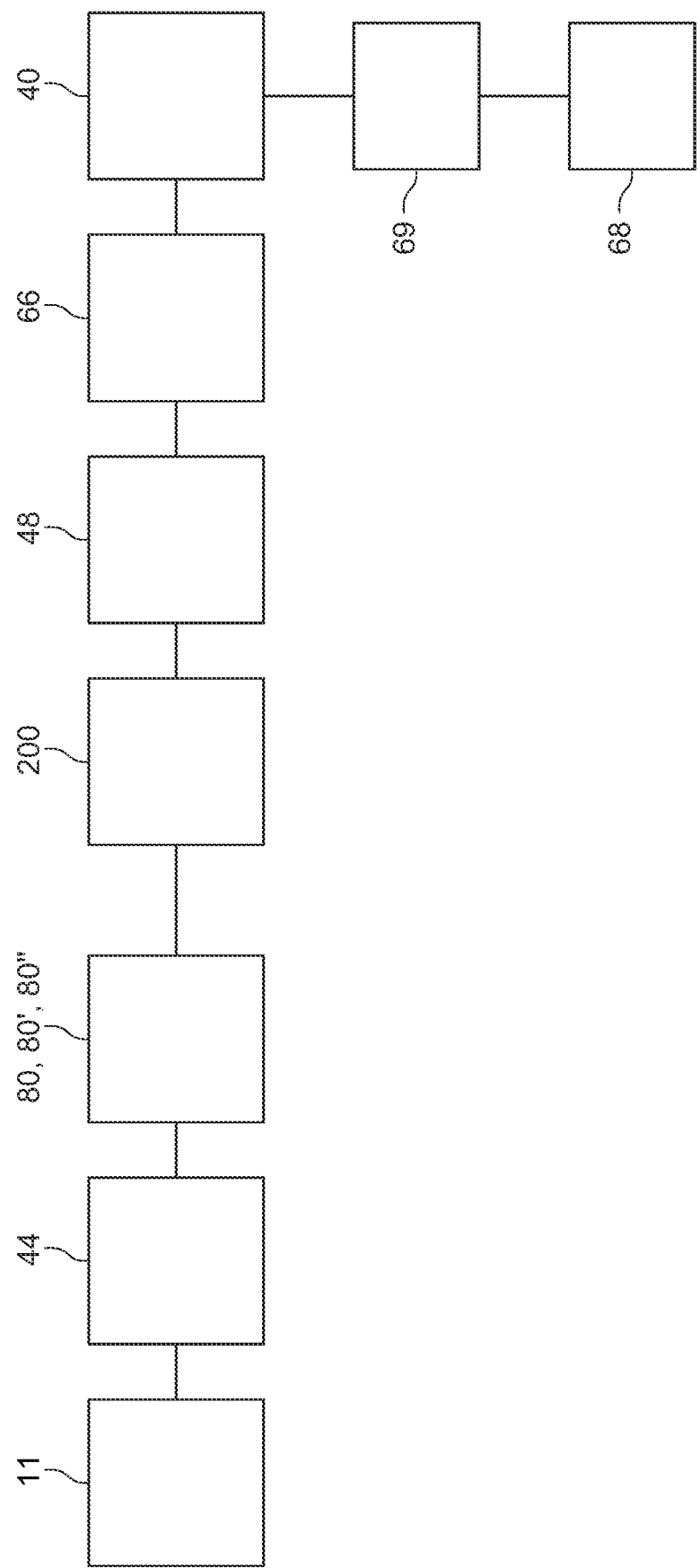
FIG. 56 is a flow chart of the wastewater treatment system shown in FIG. 55 with an ozone module secured downstream from the UV-light module according to another embodiment of the disclosure.

In yet another configuration shown in FIG. 56, a filtration module 11 is connected downstream to an autoclave module 80 and further downstream to a flash tank 200. An evaporator module 48 is connected downstream flash tank 200. A condenser unit 66 is connected downstream to evaporator module 48 and connected upstream from a UV light module 40. An ozone module 69 is connected downstream from UV light module 40 and upstream from a purified water holding tank 68. It should be understood the sequencing of the ozone and second UV light modules can be reversed. This configuration is useful for water conditions that involve significant concentrations of harmful chemicals such as PFAS and arsenic as well as organic pathogens. The UV light module ensures potable water is transferred into holding tank 68.

Figure 57:
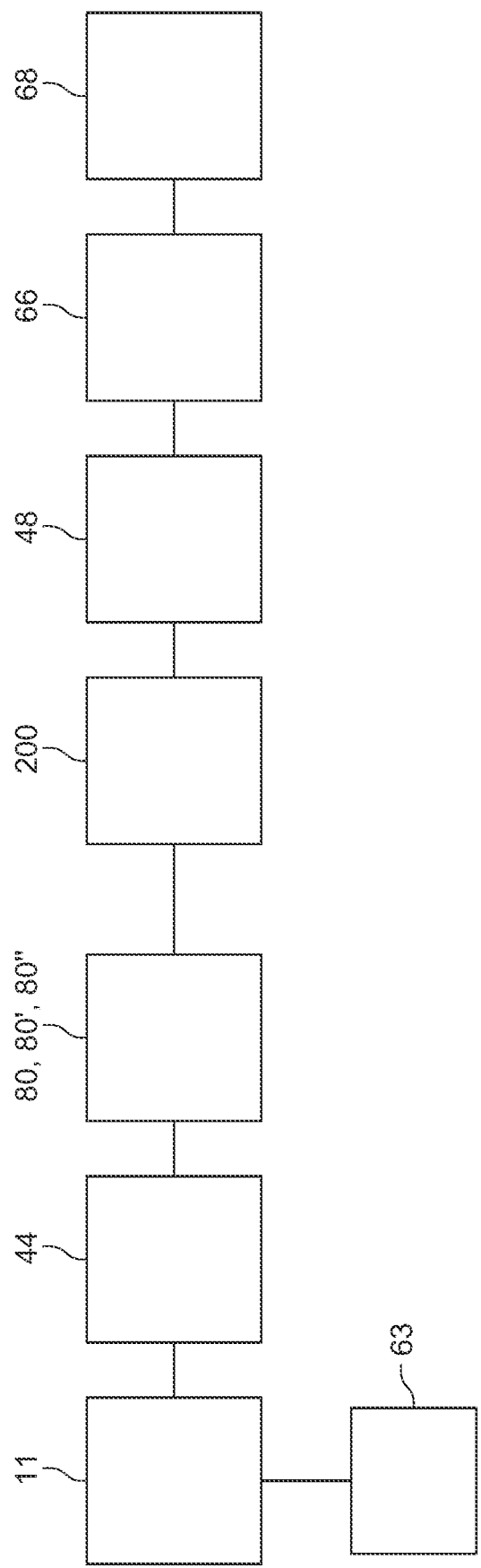
FIG. 57 is a flow chart of the wastewater treatment system shown in FIG. 53 with a microwave module secured to the filtration module according to a further embodiment of the disclosure.

In still another configuration shown in FIG. 57, a filtration module 11 is connected downstream to an autoclave module 80 and further downstream to a flash tank 200. An evaporator module 48 is connected downstream from flash tank 200. A condenser unit 66 is connected downstream to evaporator module 48 and connected upstream from a purified water holding tank 68. A microwave module 63 is connected to filtration module 11 to treat the waste solids component before transfer offsite. This configuration is useful for water conditions that involve significant concentrations of harmful chemicals such as PFAS and arsenic as well as organic pathogens.

Figure 58:
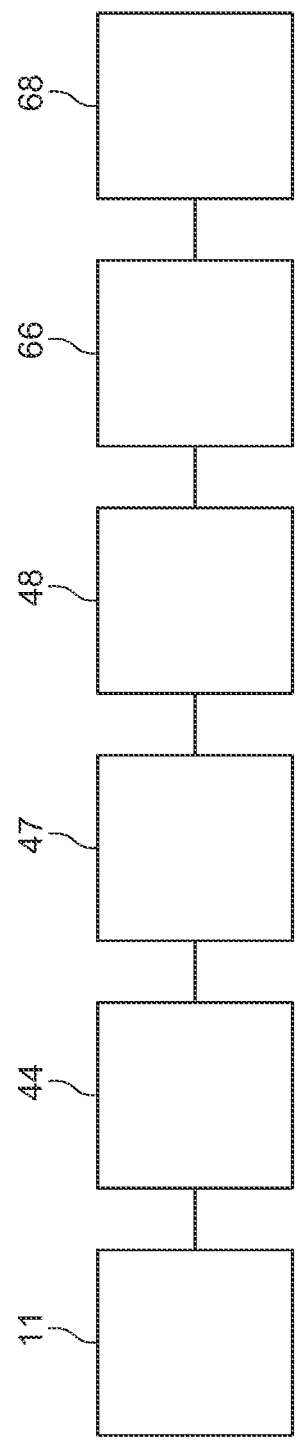
FIG. 58 is a flow chart of the wastewater treatment system shown in FIG. 49 with a sonolysis module substituted for the UV-light module according to a yet further embodiment of the disclosure.

In a further configuration shown in FIG. 58, a filtration module 11 is connected downstream to a sonolysis module 47. An evaporator module 48 is connected downstream from sonolysis module 47. A condenser unit 66 is connected downstream to evaporator module 48 and connected upstream from a purified water holding tank 68. This configuration is useful for water conditions that involve significant concentrations of harmful chemicals such as PFAS and arsenic and organic pathogens.

Figure 59:
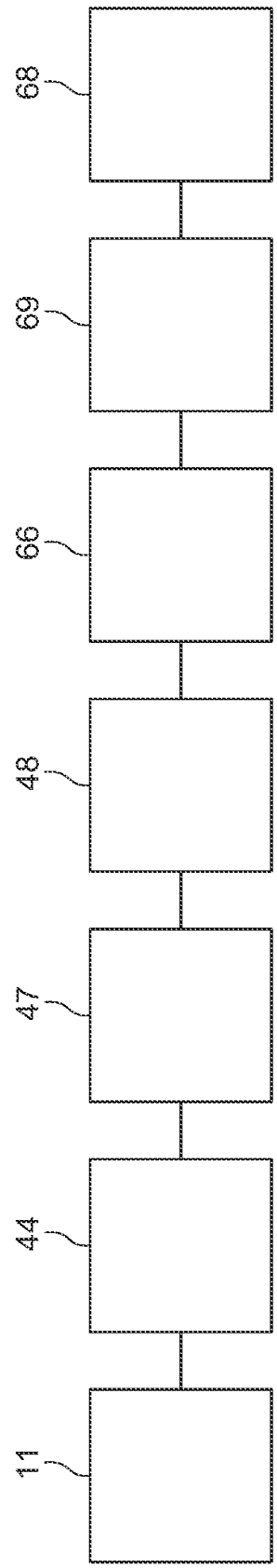
FIG. 59 is a flow chart of the wastewater treatment system shown in FIG. 58 with an ozone module secured downstream from the condenser unit according to a still further embodiment of the disclosure.

In a yet further configuration shown in FIG. 59, a filtration module 11 is connected downstream to a sonolysis module 47. An evaporator module 48 is connected downstream from sonolysis module 47. A condenser unit 66 is connected downstream to evaporator module 48 and connected upstream from an ozone module 69. A purified water holding tank 68 is connected downstream from ozone module 69. This configuration is useful for water conditions that involve significant concentrations of harmful chemicals such as PFAS and arsenic and organic pathogens. The ozone module ensures potable water is transferred to holding tank 68.

In a still further configuration shown in FIG. 60, a filtration module 11 is connected downstream to a sonolysis module 47. An evaporator module 48 is connected downstream from sonolysis module 47. A condenser unit 66 is connected downstream to evaporator module 48 and connected upstream from a UV light module 40. A purified water holding tank 68 is connected downstream from UV light module 40. This configuration is useful for water conditions that involve significant concentrations of harmful chemicals such as PFAS and arsenic and organic pathogens. The UV light module ensures potable water is transferred to holding tank 68.

In another configuration shown in FIG. 61, a filtration module 11 is connected downstream to a sonolysis module 47. An evaporator module 48 is connected downstream from sonolysis module 47. A condenser unit 66 is connected downstream to evaporator module 48 and connected upstream from an ozone module 69. A UV light module 40 is connected downstream from ozone module 69. A purified water holding tank 68 is connected downstream from UV light module 40. It should be understood the sequencing of the ozone and second UV light modules can be reversed. This configuration is useful for water conditions that involve significant concentrations of harmful chemicals such as PFAS and arsenic and organic pathogens. The ozone and UV light modules ensure potable water is transferred to holding tank 68.

Figure 62:
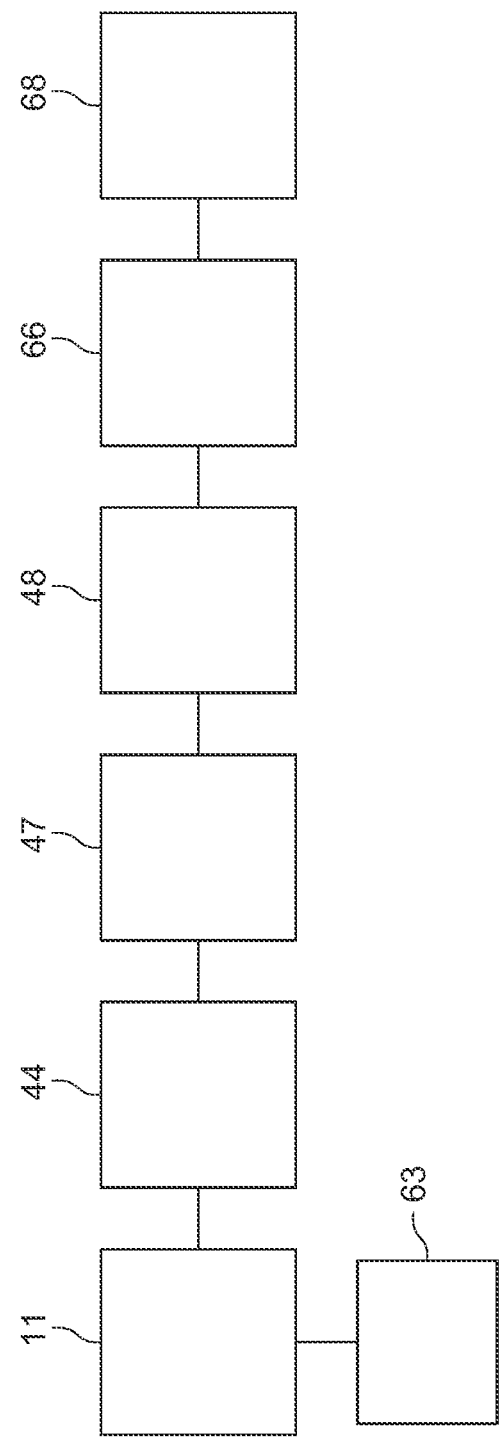
FIG. 62 is a flow chart of the wastewater treatment system shown in FIG. 58 with a microwave module secured to the filtration module according to a further embodiment of the disclosure.

In yet another configuration shown in FIG. 62, a filtration module 11 is connected downstream to a sonolysis module 47. An evaporator module 48 is connected downstream from sonolysis module 47. A condenser unit 66 is connected downstream to evaporator module 48 and connected upstream from a purified water holding tank 68. A microwave module 63 is connected to filtration module 11 to treat the waste solids component before transfer offsite. This configuration is useful for water conditions that involve significant concentrations of harmful chemicals such as PFAS and arsenic and organic pathogens.

Figure 63:
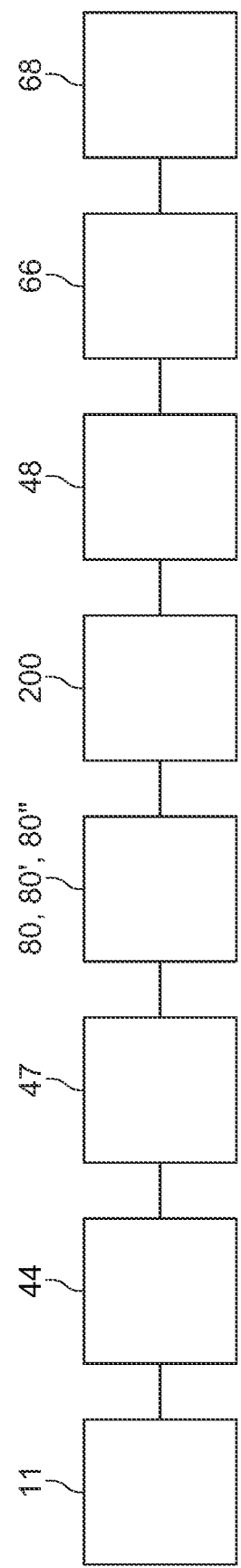
FIG. 63 is a flow chart of the wastewater treatment system shown in FIG. 58 with an autoclave module and a flash tank secured downstream the sonolysis module according to a still further embodiment of the disclosure.

In still another configuration shown in FIG. 63, a filtration module 11 has a sonolysis module 47 connected downstream. An autoclave module 80 and a flash tank 200 are connected downstream from the sonolysis unit 47. An evaporator module 48 is connected downstream flash tank 200. A condenser unit 66 is connected downstream to evaporator module 48 and connected upstream from a purified water holding tank 68. This configuration is useful for water conditions that involve significant concentrations of harmful chemicals such as PFAS and arsenic and organic pathogens.

Figure 64:
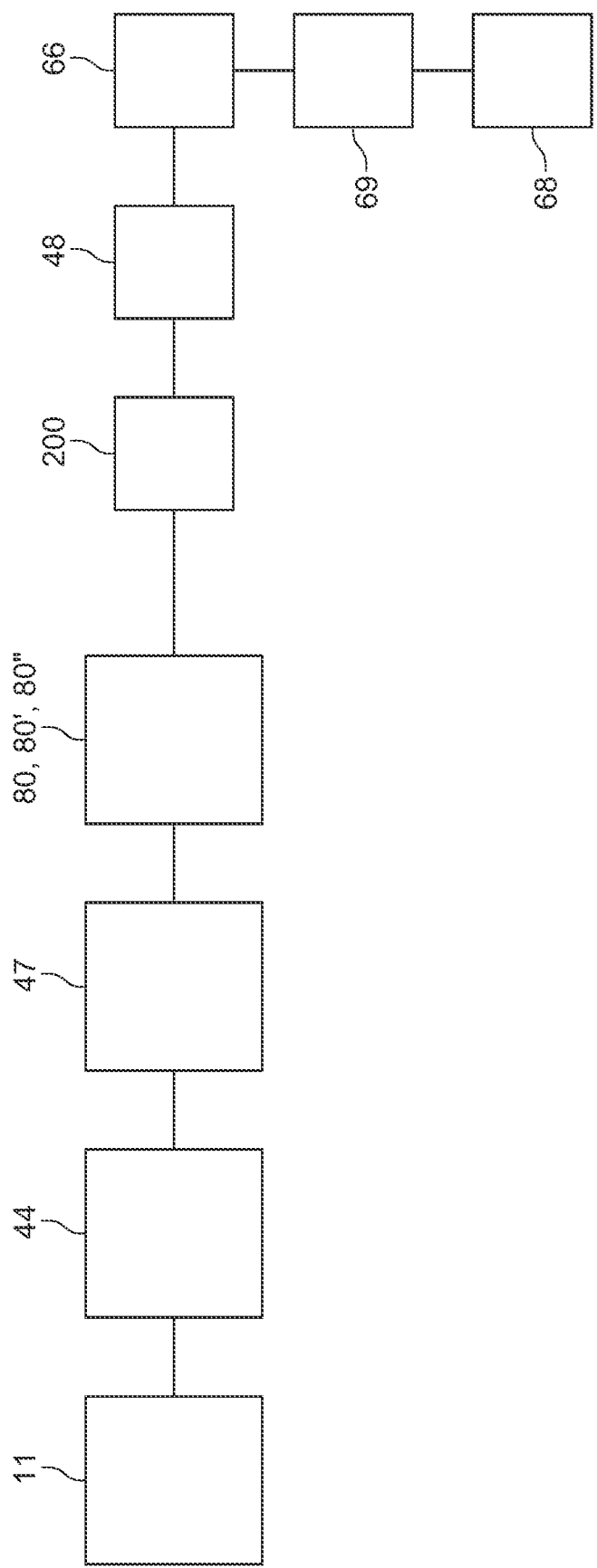
FIG. 64 is a flow chart of the wastewater treatment system shown in FIG. 63 with an ozone module secured downstream from the condenser unit according to another embodiment of the disclosure.

In a further configuration shown in FIG. 64, a filtration module 11 has a sonolysis module 47 connected downstream. An autoclave module 80 and a flash tank 200 are connected downstream from the sonolysis unit 47. An evaporator module 48 is connected downstream flash tank 200. A condenser unit 66 is connected downstream to evaporator module 48 and connected upstream from an ozone module 69. A purified water holding tank 68 is connected downstream from ozone module 69. This configuration is useful for water conditions that involve significant concentrations of harmful chemicals such as PFAS and arsenic and organic pathogens. The ozone module ensures potable water is transferred to holding tank 68.

Figure 65:
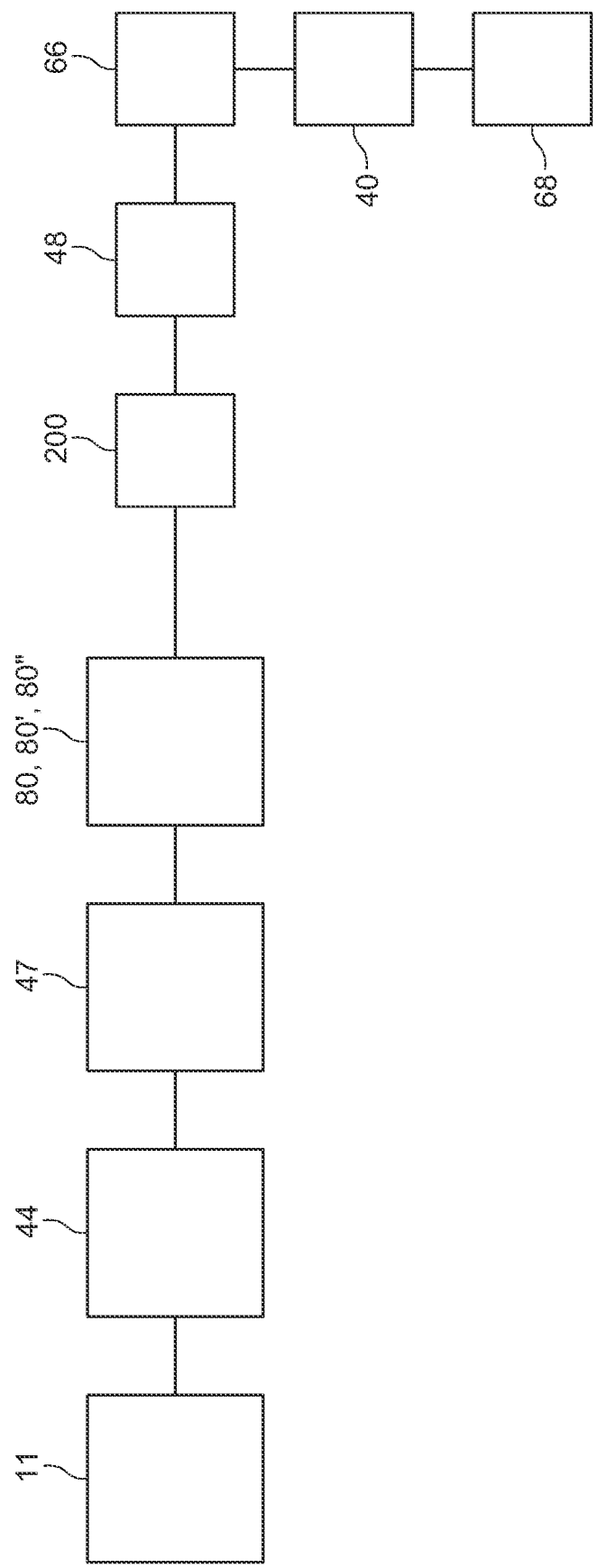
FIG. 65 is a flow chart of the wastewater treatment system shown in FIG. 63 with a UV-light module secured downstream from the condenser unit according to yet another embodiment of the disclosure.

In a yet further configuration shown in FIG. 65, a filtration module 11 has a sonolysis module 47 connected downstream. An autoclave module 80 and a flash tank 200 are connected downstream from the sonolysis unit 47. An evaporator module 48 is connected downstream flash tank 200. A condenser unit 66 is connected downstream to evaporator module 48 and connected upstream from a UV light module 40. A purified water holding tank 68 is connected downstream from UV light module 40. This configuration is useful for water conditions that involve significant concentrations of harmful chemicals such as PFAS and arsenic and organic pathogens. The UV light module ensures potable water is transferred to holding tank 68.

Figure 66:
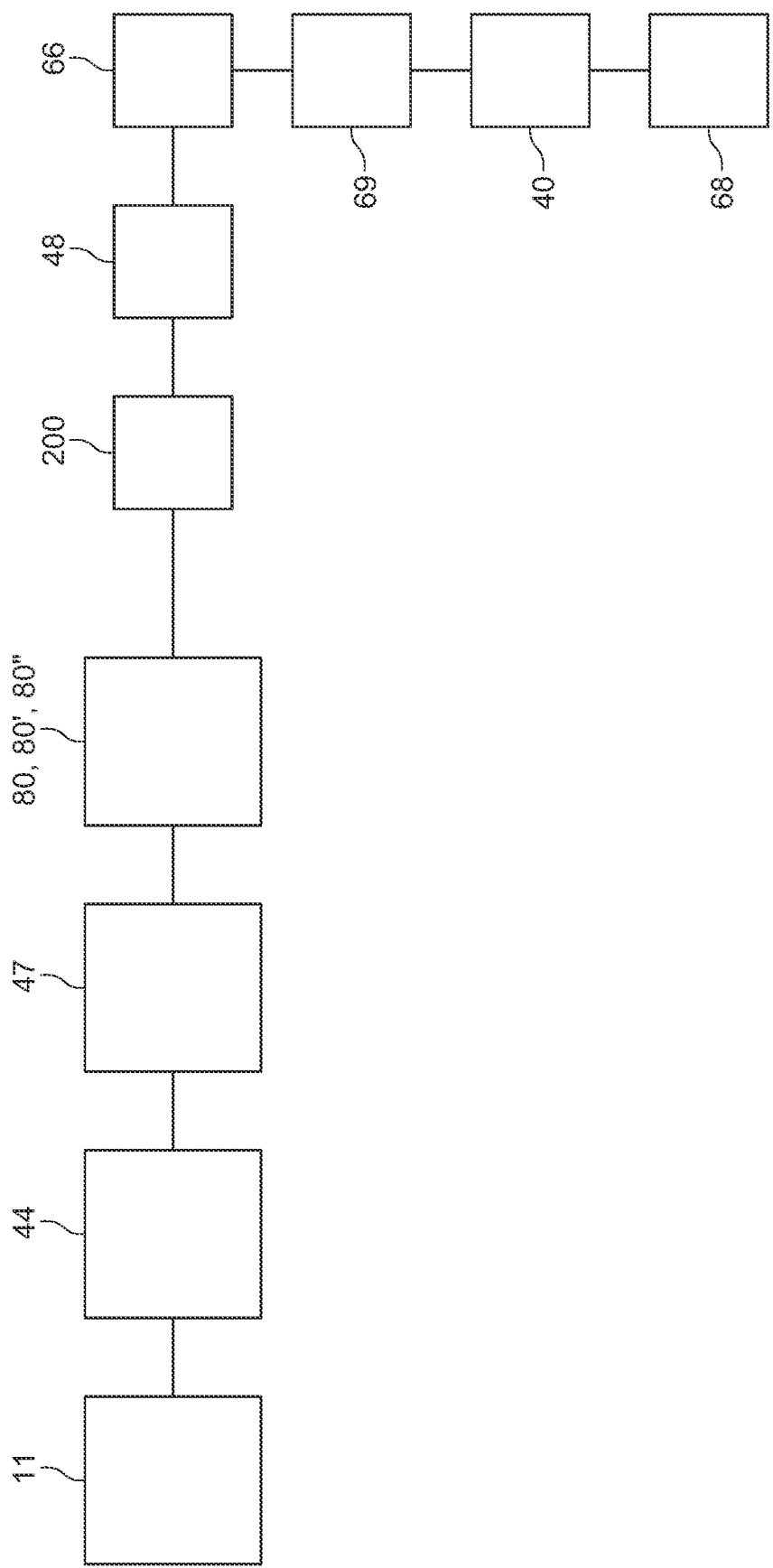
FIG. 66 is a flow chart of the wastewater treatment system shown in FIG. 63 with an ozone module secured downstream from the condenser unit and a UV-light unit secured downstream from the ozone module according to yet another embodiment of the disclosure.

In a still further configuration shown in FIG. 66, a filtration module 11 has a sonolysis module 47 connected downstream. An autoclave module 80 and a flash tank 200 are connected downstream from the sonolysis unit 47. An evaporator module 48 is connected downstream flash tank 200. A condenser unit 66 is connected downstream to evaporator module 48 and connected upstream from an ozone module 69. A UV light module 40 is connected downstream from ozone module 69. A purified water holding tank 68 is connected downstream from UV light module 40. It should be understood the sequencing of the ozone and second UV light modules can be reversed. This configuration is useful for water conditions that involve significant concentrations of harmful chemicals such as PFAS and arsenic and organic pathogens. The ozone and UV light modules ensure potable water is transferred to holding tank 68.

Figure 67:
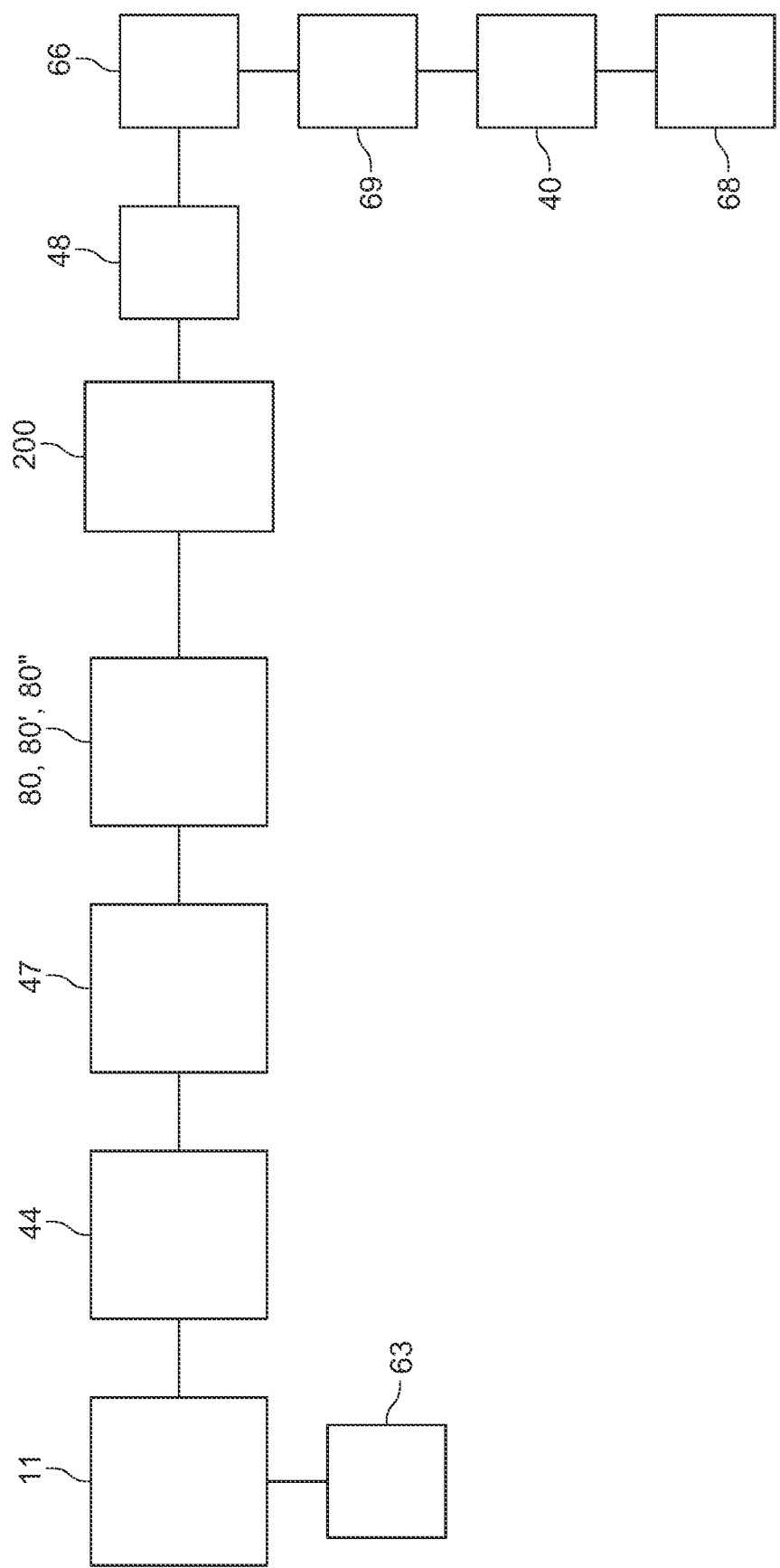
FIG. 67 is a flow chart of the wastewater treatment system shown in FIG. 66 with a microwave module secured to the filtration module according to still another embodiment of the disclosure.

In another configuration shown in FIG. 67, a filtration module 11 has a sonolysis module 47 connected downstream. An autoclave module 80 and a flash tank 200 are connected downstream from the sonolysis unit 47. An evaporator module 48 is connected downstream flash tank 200. A condenser unit 66 is connected downstream to evaporator module 48 and connected upstream from an ozone module 69. A UV light module 40 is connected downstream from ozone module 69. A purified water holding tank 68 is connected downstream from UV light module 40. It should be understood the sequencing of the ozone and second UV light modules can be reversed. A microwave module 63 is connected to filtration module 11 to treat the waste solids component before transfer offsite. This configuration is useful for water conditions that involve significant concentrations of harmful chemicals such as PFAS and arsenic and organic pathogens. The ozone and UV light modules ensure potable water is transferred to holding tank 68.

For any of the embodiments disclosed in FIGS. 49-67, a pretreatment module 12 can be connected to the systems before the filtration unit. It is also possible to connect one or more autoclave units and/or one or more sonolysis units between the pretreatment module 12 and filtration module 11 to treat the clarified liquid derived from pretreatment module 12. It is further within the scope of the disclosure to substitute a pretreatment module 12 with an autoclave module 80 for the filtration module 12, as shown in FIG. 54, for water conditions that do not include significant solids in the clarified liquid component derived from pretreatment tank 12. It is still within the scope of the disclosure to substitute a pretreatment module 12 with a sonolysis module 80 for the filtration module 12, as shown in FIG. 55, for water conditions that do not include significant solids in the clarified liquid component derived from pretreatment tank 12. It is yet still within the scope of the disclosure to substitute a pretreatment module 12 with a sonolysis module and an autoclave module 80 for the filtration module 12, as shown in FIG. 56, for water conditions that do not include significant solids in the clarified liquid component derived from pretreatment tank 12. Any of the embodiments shown in FIGS. 54-56 will include one or more evaporators 48 after the pretreatment, sonolysis and/or autoclave modules to distill the effluent derived from the prior modules. The distilled water may then be treated with any of the post-distillation treatments disclosed herein, e.g., the ozone, UV-light and chlorination modules.

It is further contemplated that the wastewater treatment system is readily adaptable to address water contaminated with pollutants not classified as wastewater. Illustratively, groundwater on military base installations is known to be contaminated with toxic chemicals such as PFASs. The disclosed wastewater treatment system can be modified to address this problem. For this use, the filtration module can be eliminated. Any of the above-disclosed combinations can be used with the removal of the filtration step/component. Such contaminated groundwater, well water, etc., can be pumped into the system beginning with the sonolysis unit 47 and/or the autoclave unit 80. This is followed by the evaporator unit(s) 48. The resultant distilled water can be simply allowed to enter the atmosphere, or could be condensed with a condenser unit 66 as disclosed herein for return to the ground, well, a holding tank 68, etc. Any gases, such as $CO_2$ produced by the contamination removal process may be captured in the manner disclosed herein.

Figure 68:
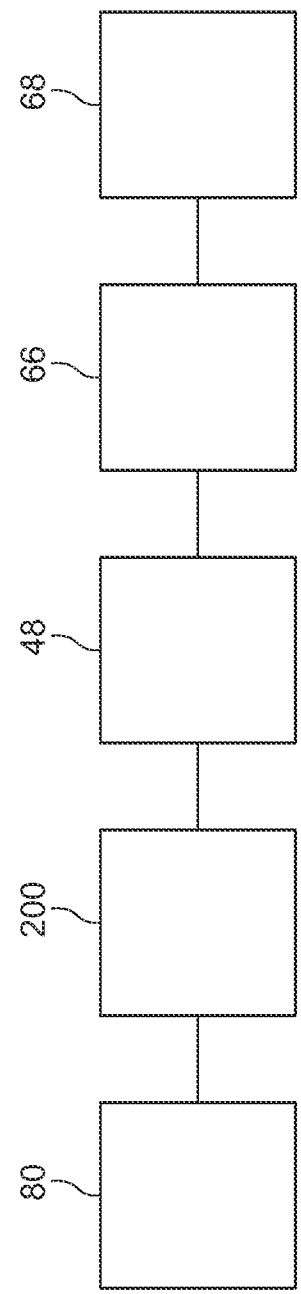
FIG. 68 is a modified wastewater treatment system with an autoclave module, a flash tank, an evaporator module, a condenser unit and a holding tank according to a further embodiment of the disclosure.

In another configuration shown in FIG. 68, an autoclave module 80 has a flash tank 200 connected downstream from the autoclave module. An evaporator module 48 is connected downstream from flash tank 200. A condenser unit 66 is connected downstream to evaporator module 48 and connected upstream from a purified water holding tank 68. This configuration is useful for water conditions that do not involve solid waste but involve significant concentrations of harmful chemicals such as PFAS and arsenic and organic pathogens.

Figure 69:
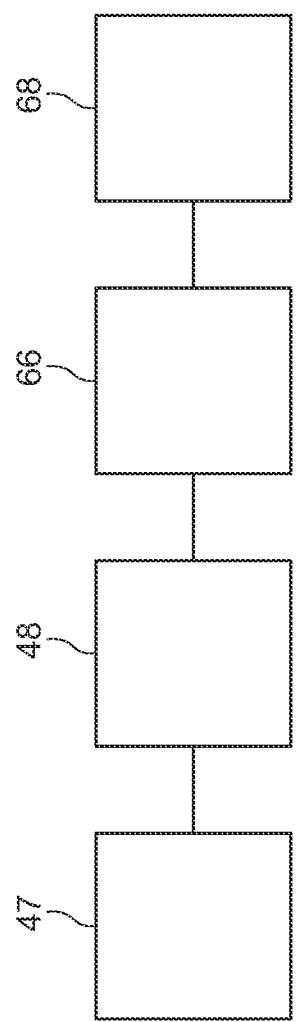
FIG. 69 is a modified wastewater treatment system with a sonolysis module, a flash tank, an evaporator module, a condenser unit and a holding tank according to a yet further embodiment of the disclosure.

In yet another configuration shown in FIG. 69, a sonolysis module 47 has an evaporator module 48 connected downstream from the sonolysis module. A condenser unit 66 is connected downstream from evaporator module 48 and connected upstream from a purified water holding tank 68. This configuration is useful for water conditions that do not involve solid waste but involve significant concentrations of harmful chemicals such as PFAS and arsenic and organic pathogens.

Figure 70:
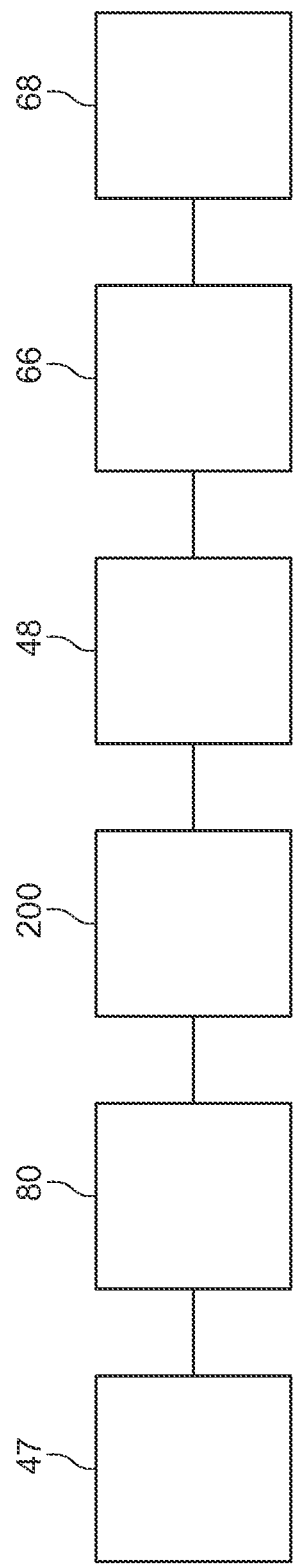
FIG. 70 is a modified wastewater treatment system with a sonolysis module, an autoclave module, a flash tank, an evaporator module, a condenser and a holding tank according to a still further embodiment of the disclosure.

In still another configuration shown in FIG. 70, a sonolysis module 47 has an autoclave module 80 secured downstream from the sonolysis module. A flash tank 200 is connected downstream from the autoclave module. An evaporator module 48 is connected downstream from the flash tank. A condenser unit 66 is connected downstream from evaporator module 48 and connected upstream from a purified water holding tank 68. A water re-mineralization module may be connected via piping to holding tank 68, upstream from the tank and downstream from condenser unit 66 to re-mineralize the purified water before transfer to holding tank 68. This configuration is useful for water conditions that do not involve solid waste but involve significant concentrations of harmful chemicals such as PFAS and arsenic and organic pathogens.

To further illustrate and describe the wastewater treatment system disclosed herein. Additional configurations will be described and shown that show the system connected to various fixtures and features in a building used as a residence or as a commercial facility. Again, the following descriptions and drawings are meant to be illustrative and not limiting in effect with respect to the scope of the disclosure.

Figure 71:
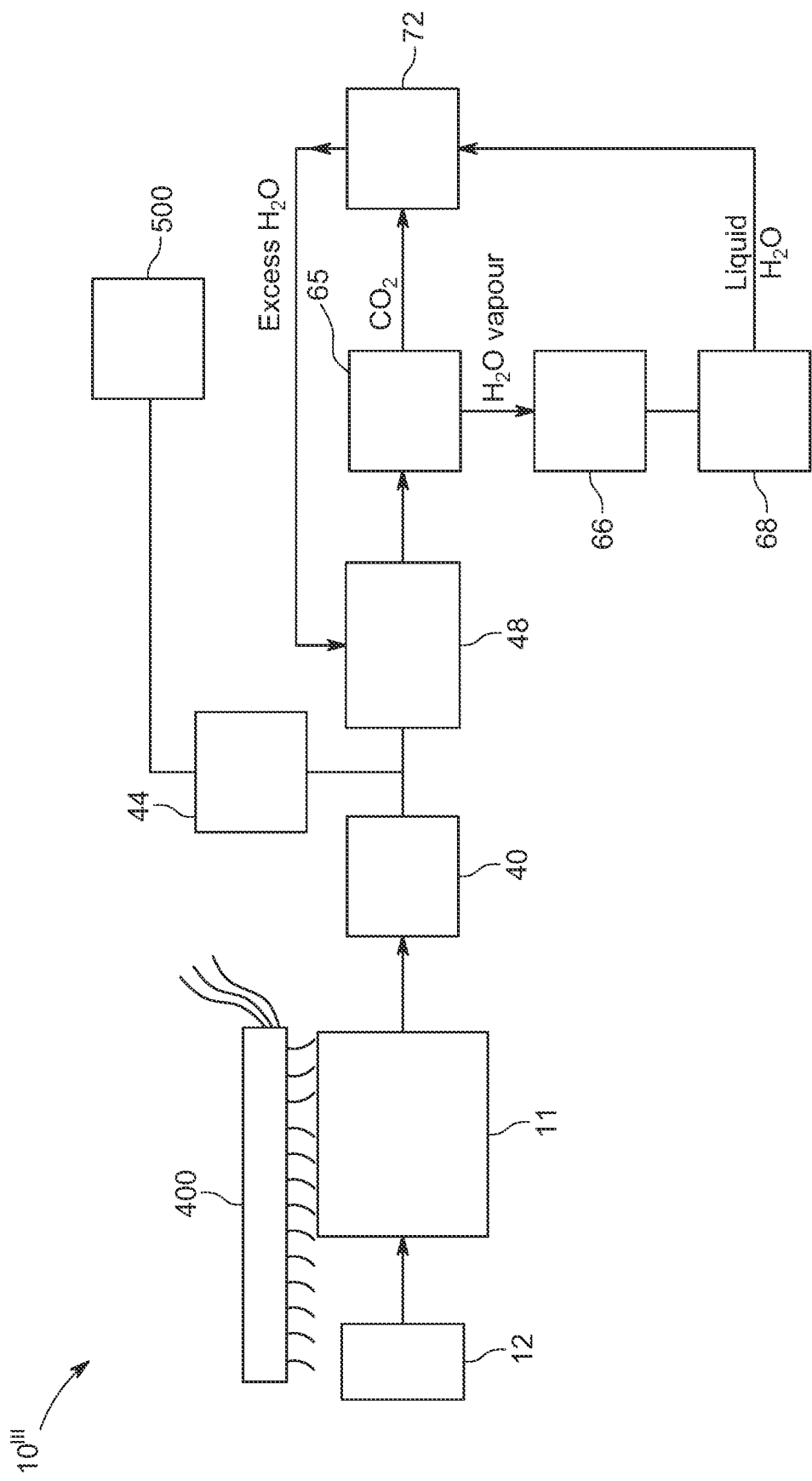
FIG. 71 is a flow chart of a wastewater treatment system with an odor control module positioned above a filtration module and connections to provide a closed-loop system with a building's toilet system according to one embodiment of the disclosure.

Referring now to FIG. 71, a wastewater treatment system shown generally as 10 includes a pretreatment tank or module 12 that collects wastewater from various fixtures (not shown) in a building via pipes (not shown) that feed wastewater into pretreatment tank 12. Solids settled out of the wastewater are processed as disclosed in more detail herein. Clarified liquid derived from pretreatment tank 12 is transferred via piping to filtration subassembly or module 11 for filtration of particulate matter in the fluid. An odor control module 400 may be connected to filtration subassembly or module 11.

Effluent derived from filtration module 11 is transferred via piping to one or more UV light unit modules 40 to degrade or destroy potential pathogenic material in the effluent. The UV-treated effluent is next transferred via piping to holding tank 44 to be temporarily stored for either further processing or transfer to the building's toilet system 500. Wastewater produced by toilet system 500 is transferred via piping to pretreatment tank or module 12 to be processed again. In this manner, water used to supply toilets is maintained and replenished in a closed loop. If the stored effluent is designated for further processing, the effluent is transferred via piping to one or more evaporator units 40 for distillation and further separation of particulate matter from the water component.

Any solids obtained from operation of evaporator units 40 are processed as disclosed herein. Water vapor produced by the evaporators is transferred to a condenser 66 for phase transition to liquid water. If natural gas is used as the fuel to run the evaporators, the liquid water may be combined with water vapor produced by the combustion of the natural gas in a separator 65. It should be understood that the liquid water could be sent via a dedicated pipeline to condenser 66 while the water vapor produced by the natural gas combustion will be transferred to the separator 65 and then via piping to condenser 66. The $CO_2$ component of the combustion process will be processed as disclosed herein. With or without further treatment, e.g., UV light, ozone, chlorination, etc., the liquid water is transferred via piping from condenser 66 to holding tank 68 for further use such as irrigation of flora in greenhouse 72.

Figure 72:
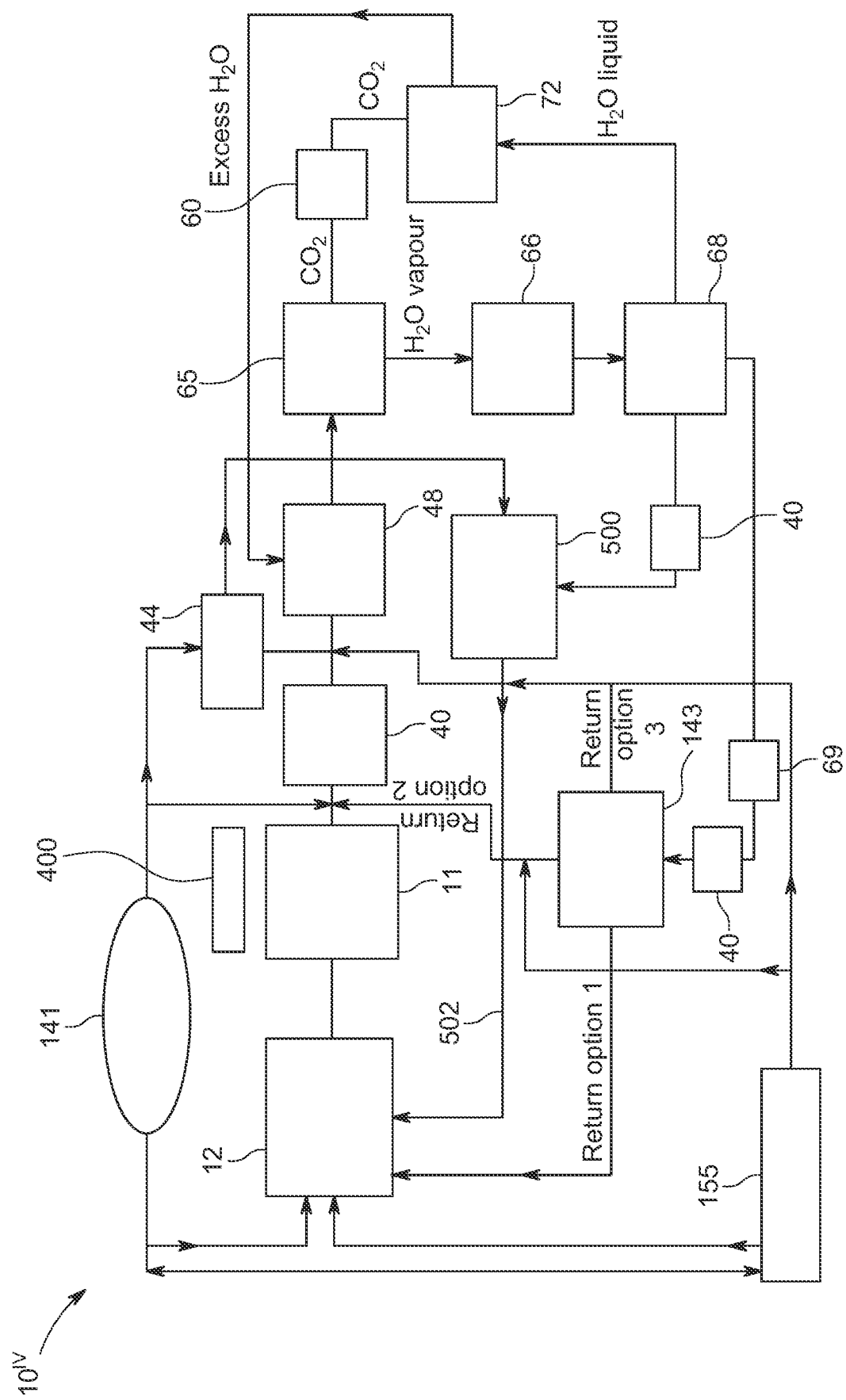
FIG. 72 is a flow chart of the wastewater treatment system shown in FIG. 71 with connections to provide a closed-loop system with a building's AC system according to another embodiment of the disclosure.

Referring now to FIG. 72, a wastewater treatment system shown generally as $10^{IV}$ includes a pretreatment tank or module 12 that collects wastewater from various fixtures such as toilets 500 in a building via pipes such as pipe 502 that feed wastewater into pretreatment tank 12. Water also may be collected and transferred to module 12 from a building's HVAC or AC system 143 and/or rainwater gutter and collection system 141. The various pathways rainwater and AC-system-derived water can be transferred into the system $10^{IV}$ shown in FIG. 72 and described in more detail herein.

Solids settled out of the wastewater are processed as disclosed in more detail herein. Clarified liquid derived from pretreatment tank 12 is transferred via piping to filtration subassembly or module 11 for filtration of particulate matter in the fluid. An odor control unit or module 400 is incorporated into the system to control odors created by filtration module 11. Effluent derived from filtration module 11 is transferred via piping to one or more UV light unit modules 40 to degrade or destroy potential pathogenic material in the effluent. The UV-treated effluent is next transferred via piping to holding tank 44 to be temporarily stored for either further processing or transfer to the building's toilet system 500. Water used in toilet system 500 is transferred back to pretreatment tank or module 12 via pipe 501 to undergo the water treatment process again in a closed loop system. If the stored effluent is designated for further processing, the effluent is transferred via piping to one or more evaporator units 40 for distillation and further separation of particulate matter from the water component.

Any solids obtained from operation of evaporator units 40 are processed as disclosed herein. Water vapor produced by the evaporators is transferred to a condenser 66 for phase transition to liquid water. If natural gas is used as the fuel to run the evaporators, the liquid water may be combined with water vapor produced by the combustion of the natural gas in a separator 65. It should be understood that the liquid water could be sent via a dedicated pipeline to condenser 66 while the water vapor produced by the natural gas combustion will be transferred to separator 65 and then via piping to condenser 66. The $CO_2$ component of the combustion process will be processed as disclosed herein such as transfer to a greenhouse 72 for assimilation via flora 70 enclosed in the greenhouse. Any excess $CO_2$ can be processed as disclosed herein. With or without further treatment, e.g., UV light, ozone, chlorination, etc., the liquid water is transferred via piping from condenser 66 to holding tank 68 for further use such as irrigation of flora 70 in greenhouse 72. Any excess water in greenhouse 72, which now should be considered contaminated, may be transferred back to evaporator unit(s) or module(s) 48 via dedicated piping for reprocessing. It should be understood that the water being transferred to holding tank 68 can be further treated to produce water in a purer state before transfer to holding tank 68.

The water stored in holding tank 68 may be put to several other uses. With UV light treatment from a UV light module 40, the water may be transferred via piping to a building's toilet system 500. The water also may be transferred to a building's HVAC or AC units 143 if first treated with a UV light module 40 and/or an ozone module 69. If the water is sufficiently pure, it can be transferred via piping (not shown) to a building's main water supply line (not shown) or an auxiliary water supply line (not shown) to supplement the incoming water for use as drinking and bathing water. It should be understood that wastewater treatment system $10^{IV}$ can be modified to not collect water from HVAC or AC unit system 143 and/or rainwater system 141 and remain within the scope of the disclosure.

Figure 73:
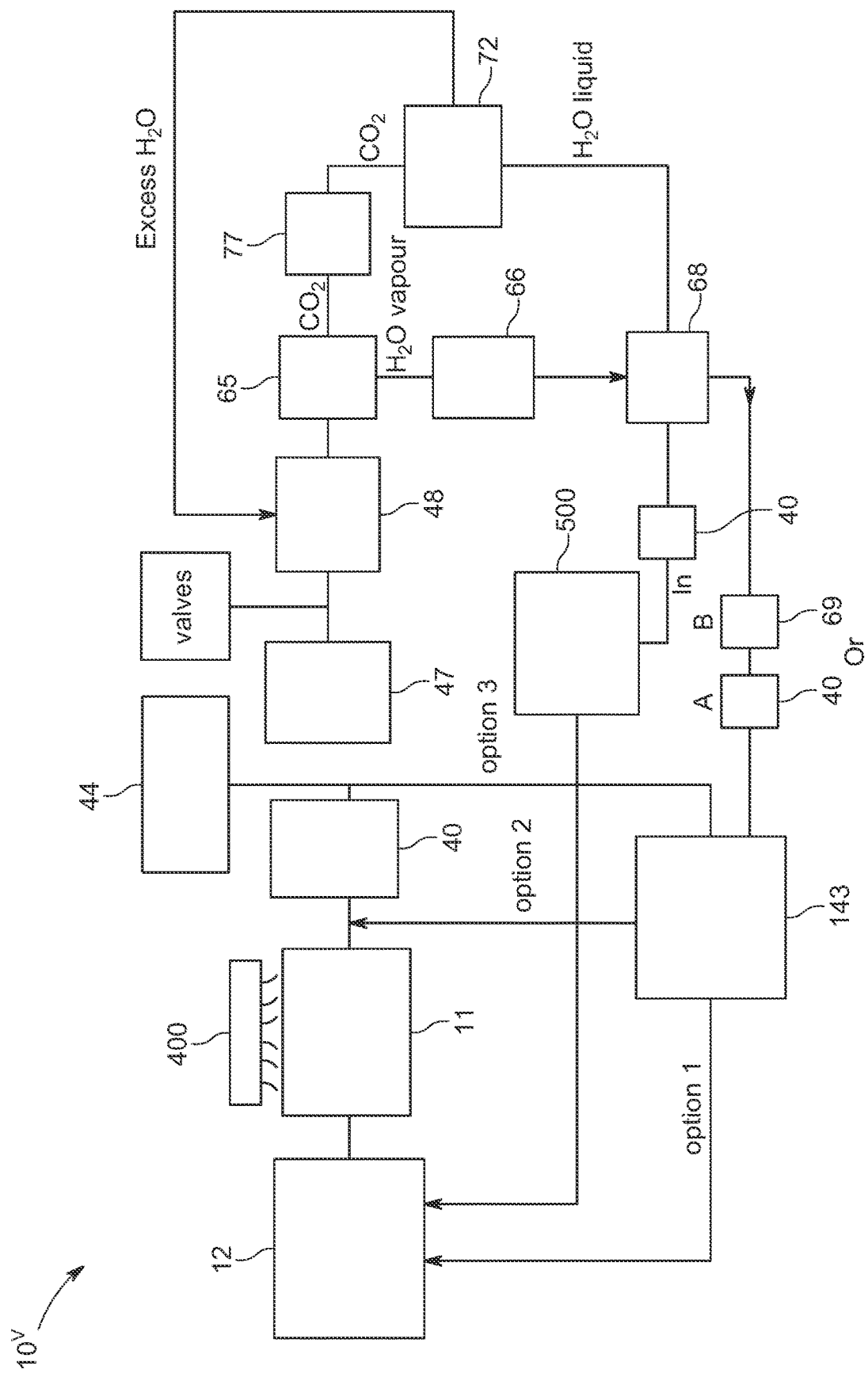
FIG. 73 is a flow chart of the wastewater treatment system shown in FIG. 72 with a sonolysis module secured downstream the UV-light module according to yet another embodiment of the disclosure.

Referring now to FIG. 73, a wastewater treatment system shown generally as $10^V$ includes the same features as system $10^{IV}$ with the addition of a sonolysis module 47 positioned downstream from UV light module or unit 40. It should be understood that sonolysis module 47 can be placed upstream from module 40 as well. System $10^V$ includes a pretreatment tank or module 12 that collects wastewater from various fixtures such as toilets 500 in a building via pipes such as pipe 502 that feed wastewater into pretreatment tank 12. Water also may be collected and transferred to module 12 from a building's HVAC or AC system 143 and/or rainwater gutter and collection system 141. The various pathways rainwater and AC-system-derived water can be transferred into the system $10^{IV}$ shown in FIG. 72 and described in more detail herein.

Solids settled out of the wastewater are processed as disclosed in more detail herein. Clarified liquid derived from pretreatment tank 12 is transferred via piping to filtration subassembly or module 11 for filtration of particulate matter in the fluid. An odor control unit or module 400 is incorporated into the system to control odors created by filtration module 11. Effluent derived from filtration module 11 is transferred via piping to one or more UV light unit modules 40 to degrade or destroy potential pathogenic material in the effluent.

The UV-treated effluent is next transferred via piping to holding tank 44 to be temporarily stored for either further processing or transfer to the building's toilet system 500. Water used in toilet system 500 is transferred back to pretreatment tank or module 12 via pipe 501 to undergo the water treatment process again in a closed loop system. If the stored effluent is designated for further processing, the effluent is transferred via piping to one or more sonolysis units or modules 47 to degrade or destroy pathogenic organisms that may have survived in the effluent processed through UV light module 40. Once processed through sonolysis module(s) or unit(s) units 47 as disclosed in more detail herein, the processed effluent is transferred to evaporator unit(s) or modules(s) 40 for distillation and further separation of particulate matter from the water component.

Any solids obtained from operation of evaporator units 40 are processed as disclosed herein. Water vapor produced by the evaporators is transferred to a condenser 66 for phase transition to liquid water. If natural gas is used as the fuel to run the evaporators, the liquid water may be combined with water vapor produced by the combustion of the natural gas in a separator 65. It should be understood that the liquid water could be sent via a dedicated pipeline to condenser 66 while the water vapor produced by the natural gas combustion will be transferred to separator 65 and then via piping to condenser 66. The $CO_2$ component of the combustion process will be processed as disclosed herein such as transfer to a greenhouse 72 for assimilation via flora 70 enclosed in the greenhouse. Any excess $CO_2$ can be processed as disclosed herein. With or without further treatment, e.g., UV light, ozone, chlorination, etc., the liquid water is transferred via piping from condenser 66 to holding tank 68 for further use such as irrigation of flora 70 in greenhouse 72. It should be understood that the water can be further treated to produce water in a purer state before transfer to holding tank 68.

The water stored in holding tank 68 may be put to several other uses. With UV light treatment from a UV light module 40, the water may be transferred via piping to a building's toilet system 500. The water also may be transferred to a building's HVAC or AC units 143 if first treated with a UV light module 40 and/or an ozone module 69. If the water is sufficiently pure, it can be transferred via piping (not shown) to a building's main water supply line (not shown) or an auxiliary water supply line (not shown) to supplement the incoming water for use as drinking and bathing water. It should be understood that wastewater treatment system $10^V$ can be modified to not collect water from HVAC or AC unit system 143 and/or rainwater system 141 and remain within the scope of the disclosure. It should be further understood that wastewater treatment system $10^V$ may be modified by removing UV light unit(s) or module(s) 40 upstream from sonolysis unit(s) or module(s) 47 without departing from the scope of the disclosure.

Referring now to FIG. 73, a wastewater treatment system shown generally as $10^{VI}$ includes the same features as system $10^V$ with the substitution of a plurality of sonolysis units or modules 47 for the single sonolysis unit or module 47 shown in FIG. 62. The plurality of sonolysis units or modules 47 are integrated into the wastewater treatment system with a manifold system is disclosed in more detail herein. The remainder of the system is identical to system $10^V$, the details of which are incorporated here. Like system $10^V$, system $10^{VI}$ can be modified with the removal of the UV light unit(s) or module(s) 40 without departing from the scope of the disclosure.

Figure 74:
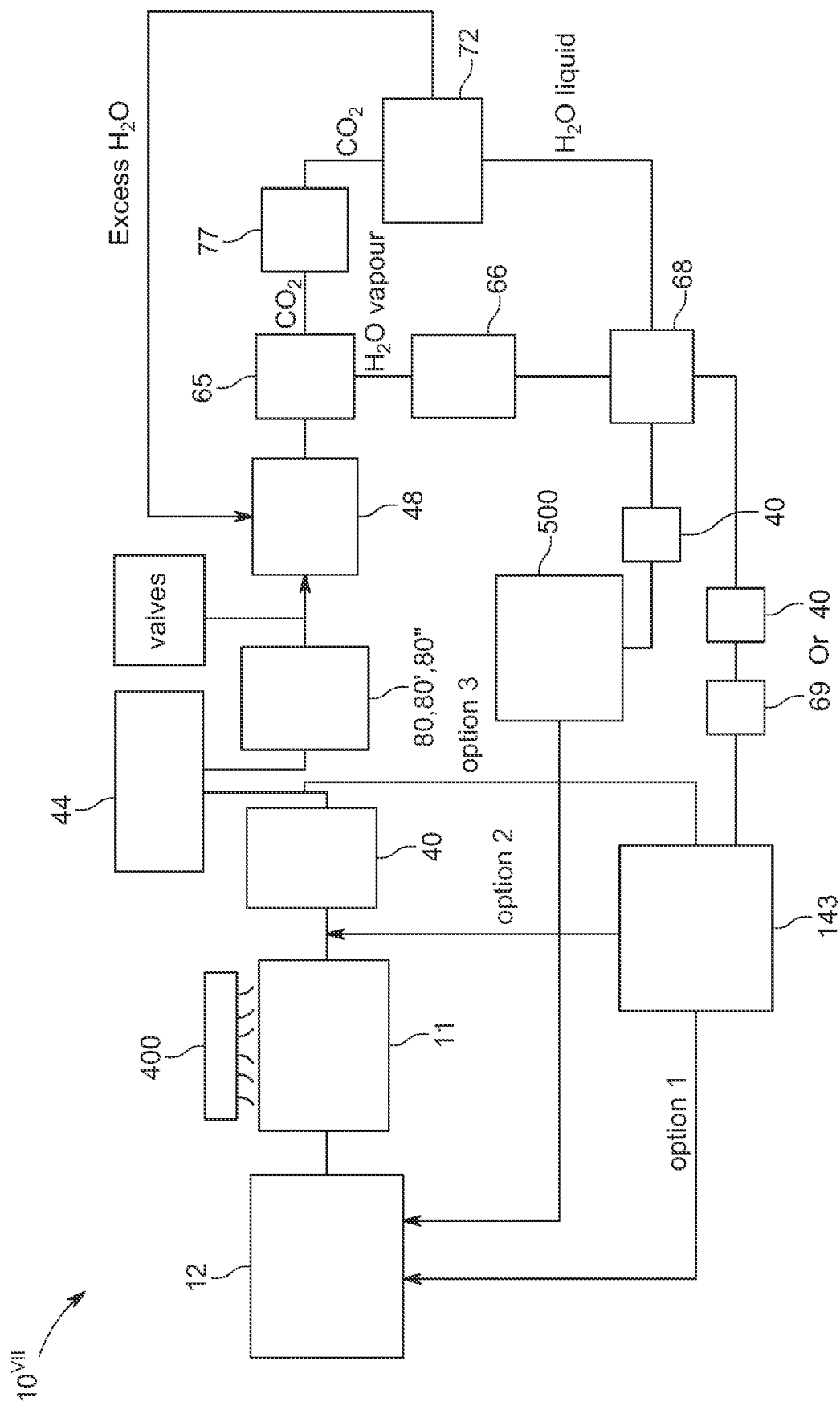
FIG. 74 is a flow chart of the wastewater treatment system shown in FIG. 72 with an autoclave module secured downstream the UV-light module according to yet another embodiment of the disclosure.

Referring now to FIG. 74, a wastewater treatment system shown generally as $10^{VII}$ includes the same features as system $10^V$ with the substitution of an autoclave unit or module 80 (or 80' or 80") for the sonolysis module 47 positioned downstream from UV light module or unit 40. It should be understood that autoclave module 80 can be placed upstream from module 40 as well. System $10^{VII}$ includes a pretreatment tank or module 12 that collects wastewater from various fixtures such as toilets 500 in a building via pipes such as pipe 502 that feed wastewater into pretreatment tank 12. Water also may be collected and transferred to module 12 from a building's HVAC or AC system 143 and/or rainwater gutter and collection system 141. The various pathways rainwater and AC-system-derived water can be transferred into the system $10^{IV}$ shown in FIG. 72 and described in more detail herein.

Solids settled out of the wastewater are processed as disclosed in more detail herein. Clarified liquid derived from pretreatment tank 12 is transferred via piping to filtration subassembly or module 11 for filtration of particulate matter in the fluid. An odor control unit or module 400 is incorporated into the system to control odors created by filtration module 11. Effluent derived from filtration module 11 is transferred via piping to one or more UV light unit modules 40 to degrade or destroy potential pathogenic material in the effluent.

The UV-treated effluent is next transferred via piping to holding tank 44 to be temporarily stored for either further processing or transfer to the building's toilet system 500. Water used in toilet system 500 is transferred back to pretreatment tank or module 12 via pipe 501 to undergo the water treatment process again in a closed loop system. If the stored effluent is designated for further processing, the effluent is transferred via piping to one or more autoclave units or modules 80 to degrade or destroy pathogenic organisms that may have survived in the effluent processed through UV light module 40. Once processed through autoclave module(s) or unit(s) units 80 as disclosed in more detail herein, the processed effluent is transferred to evaporator unit(s) or modules(s) 40 for distillation and further separation of particulate matter from the water component.

Any solids obtained from operation of evaporator units 40 are processed as disclosed herein. Water vapor produced by the evaporators is transferred to a condenser 66 for phase transition to liquid water. If natural gas is used as the fuel to run the evaporators, the liquid water may be combined with water vapor produced by the combustion of the natural gas in a separator 65. It should be understood that the liquid water could be sent via a dedicated pipeline to condenser 66 while the water vapor produced by the natural gas combustion will be transferred to separator 65 and then via piping to condenser 66. The $CO_2$ component of the combustion process will be processed as disclosed herein such as transfer to a greenhouse 72 for assimilation via flora 70 enclosed in the greenhouse. Any excess $CO_2$ can be processed as disclosed herein. With or without further treatment, e.g., UV light, ozone, chlorination, etc., the liquid water is transferred via piping from condenser 66 to holding tank 68 for further use such as irrigation of flora 70 in greenhouse 72. It should be understood that the water can be further treated to produce water in a purer state before transfer to holding tank 68.

The water stored in holding tank 68 may be put to several other uses. With UV light treatment from a UV light module 40, the water may be transferred via piping to a building's toilet system 500. The water also may be transferred to a building's HVAC or AC units 143 if first treated with a UV light module 40 and/or an ozone module 69. If the water is sufficiently pure, it can be transferred via piping (not shown) to a building's main water supply line (not shown) or an auxiliary water supply line (not shown) to supplement the incoming water for use as drinking and bathing water. It should be understood that wastewater treatment system $10^V$ can be modified to not collect water from HVAC or AC unit system 143 and/or rainwater system 141 and remain within the scope of the disclosure. It should be further understood that wastewater treatment system $10^V$ may be modified by removing UV light unit(s) or module(s) 40 upstream from autoclave unit(s) or module(s) 80 without departing from the scope of the disclosure.

Figure 75:
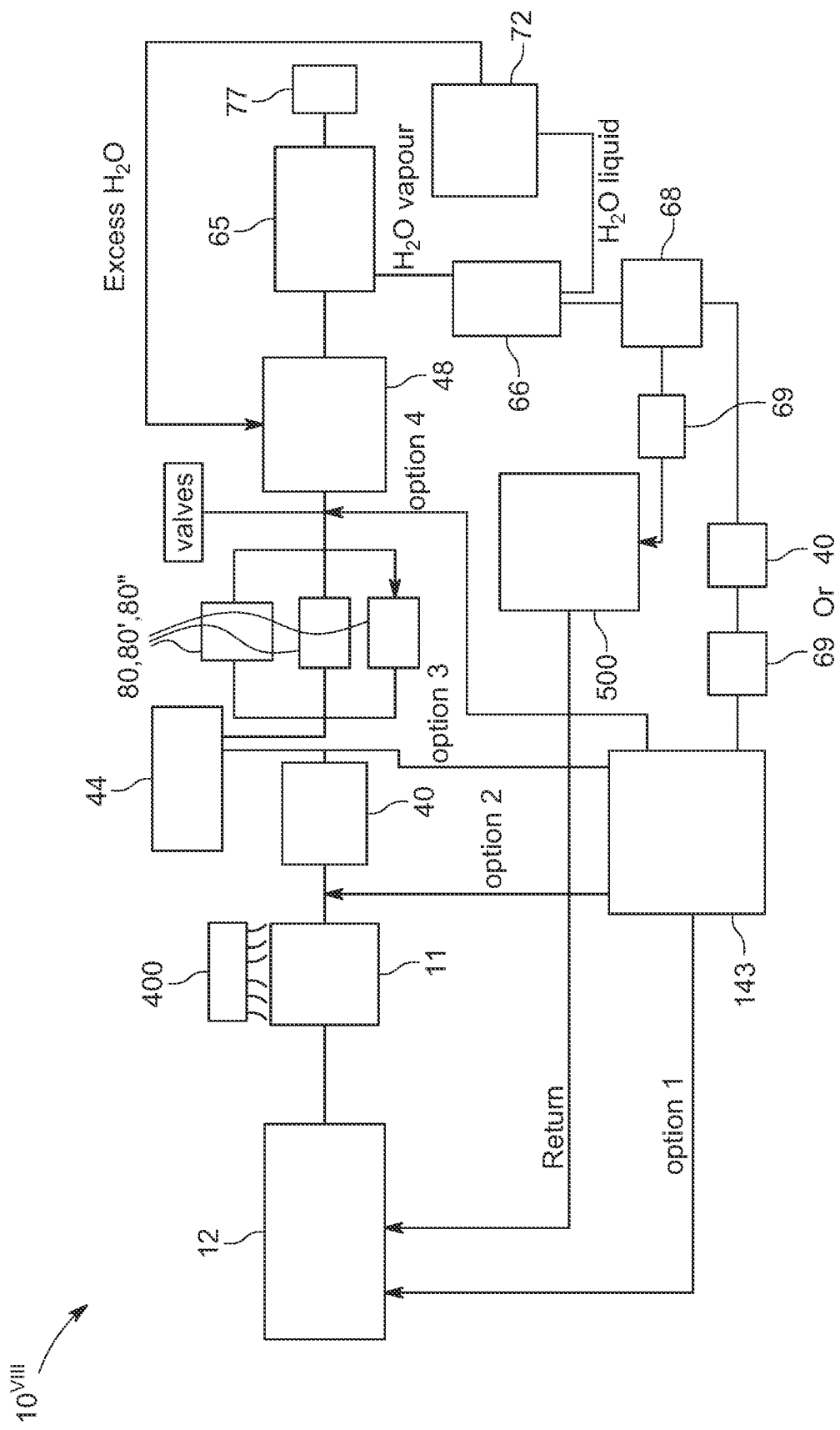
FIG. 75 is a flow chart of the wastewater treatment system shown in FIG. 72 with a plurality of autoclave units secured downstream the UV-light module according to yet another embodiment of the disclosure.
Figure 76:
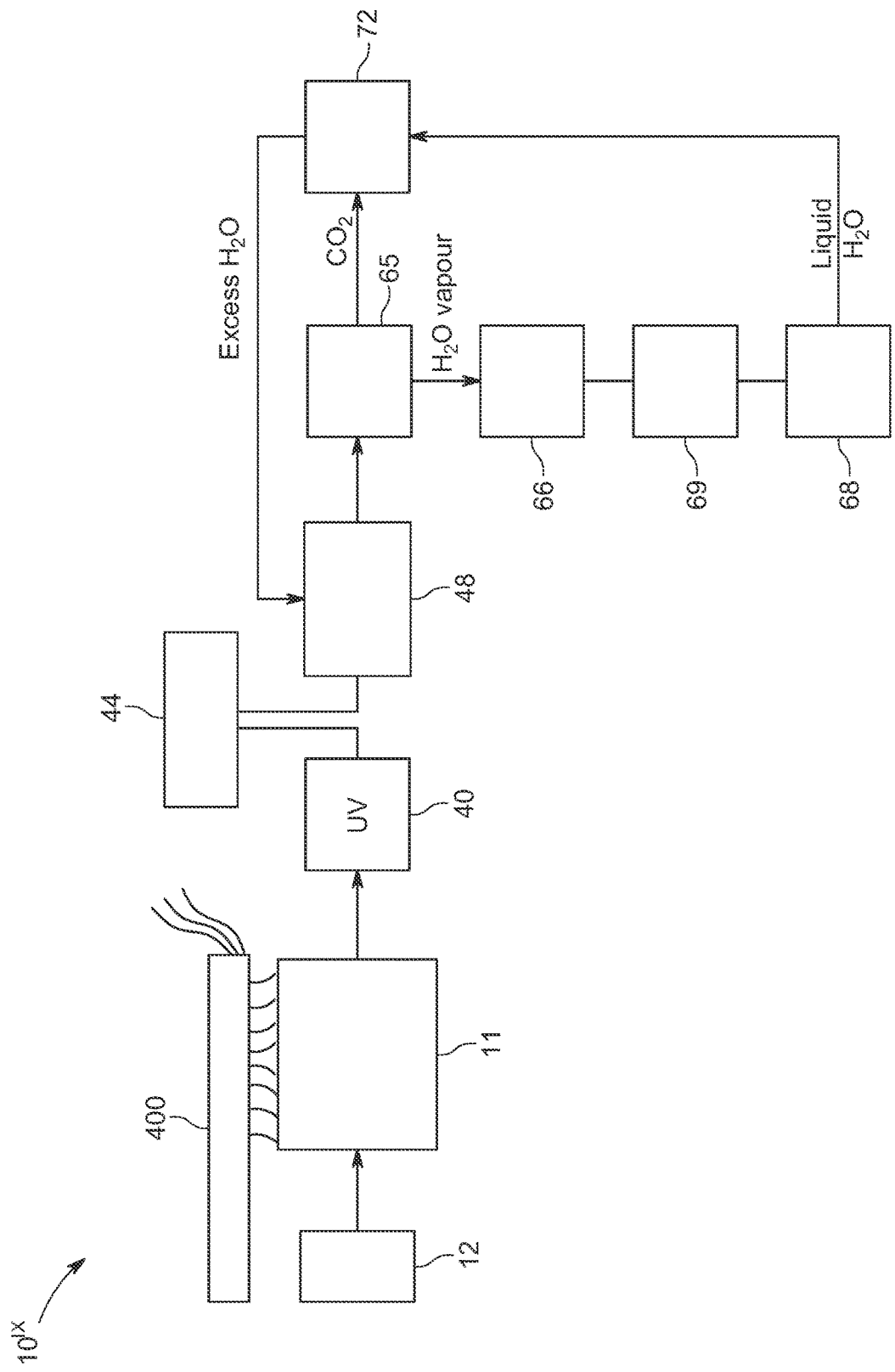
FIG. 76 is a flow chart of a wastewater treatment system with an odor control module positioned above a filtration module and with an ozone module positioned downstream from a condenser unit according to a further embodiment of the disclosure.

Referring now to FIG. 75, a wastewater treatment system shown generally as $10^{VIII}$ includes the same features as system $10^{VII}$ with the substitution of a plurality of autoclave units or modules 80 for the single autoclave unit or module 80 shown in FIG. 64. The plurality of autoclave units or modules 80 are integrated into the wastewater treatment system with a manifold system as disclosed in more detail herein. The remainder of the system is identical to system $10^{VII}$, the details of which are incorporated here. Like system $10^{VII}$, system $10^{VIII}$ can be modified with the removal of the UV light unit(s) or module(s) 40 without departing from the scope of the disclosure.

Referring now to FIG. 66, a wastewater treatment system shown generally as $10^{IX}$ includes the same features as system $10^{III}$ shown in FIG. 60 with the addition of an ozone module 69 upstream from holding tank 68. The addition of ozone module 69 ensures the water transferred to holding tank 68 is in a purer state for additional uses such as drinking if the water is of a sufficient purity for such purposes. The remainder of the system $10^{IX}$ is identical to system $10^{III}$, the details of which are incorporated here. Like system $10^{III}$, system $10^{IX}$ can be modified with the removal of the UV light unit(s) or module(s) 40 without departing from the scope of the disclosure. System $10^{IX}$ also can be modified by substituting a UV light unit or module 40 or a chlorination module 67 for ozone module 69 and remain within the scope of the disclosure. It should further be understood that any combination and serial arrangement of a UV light module 40, an ozone module 69, and/or a chlorination module 67 may be substituted for ozone module 69 and remain within the scope of the disclosure.

Figure 77:
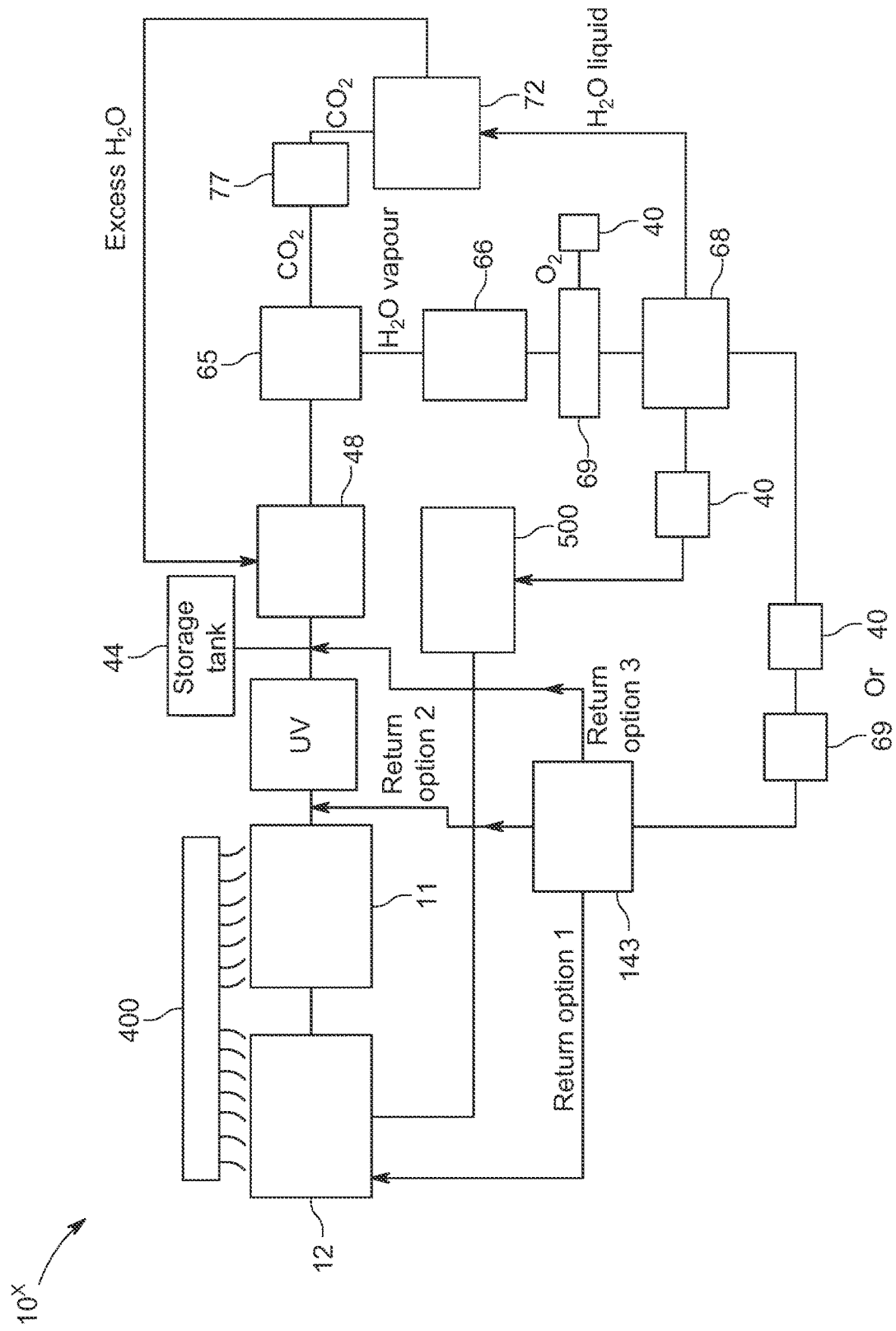
FIG. 77 is a flow chart of the wastewater treatment system shown in FIG. 76 with a toilet closed-loop system and a closed-loop AC system according to a yet further embodiment of the disclosure.

Referring now to FIG. 77, a wastewater treatment system shown generally as $10^X$ includes the same features as system $10^{IV}$ shown in FIG. 72 with the addition of an ozone module 69 upstream from holding tank 68. The addition of ozone module 69 ensures the water transferred to holding tank 68 is in a purer state for additional uses such as drinking if the water is of a sufficient purity for such purposes. The remainder of the system $10^X$ is identical to system $10^{IV}$, the details of which are incorporated here. Like system $10^{IV}$, system $10^X$ can be modified with the removal of the UV light unit(s) or module(s) 40 downstream from the filtration module 11 without departing from the scope of the disclosure. System $10^X$ also can be modified by substituting a UV light unit or module 40 or a chlorination module 67 for ozone module 69 and remain within the scope of the disclosure. It should further be understood that any combination and serial arrangement of a UV light module 40, an ozone module 69, and/or a chlorination module 67 may be substituted for ozone module 69 and remain within the scope of the disclosure.

Figure 78:
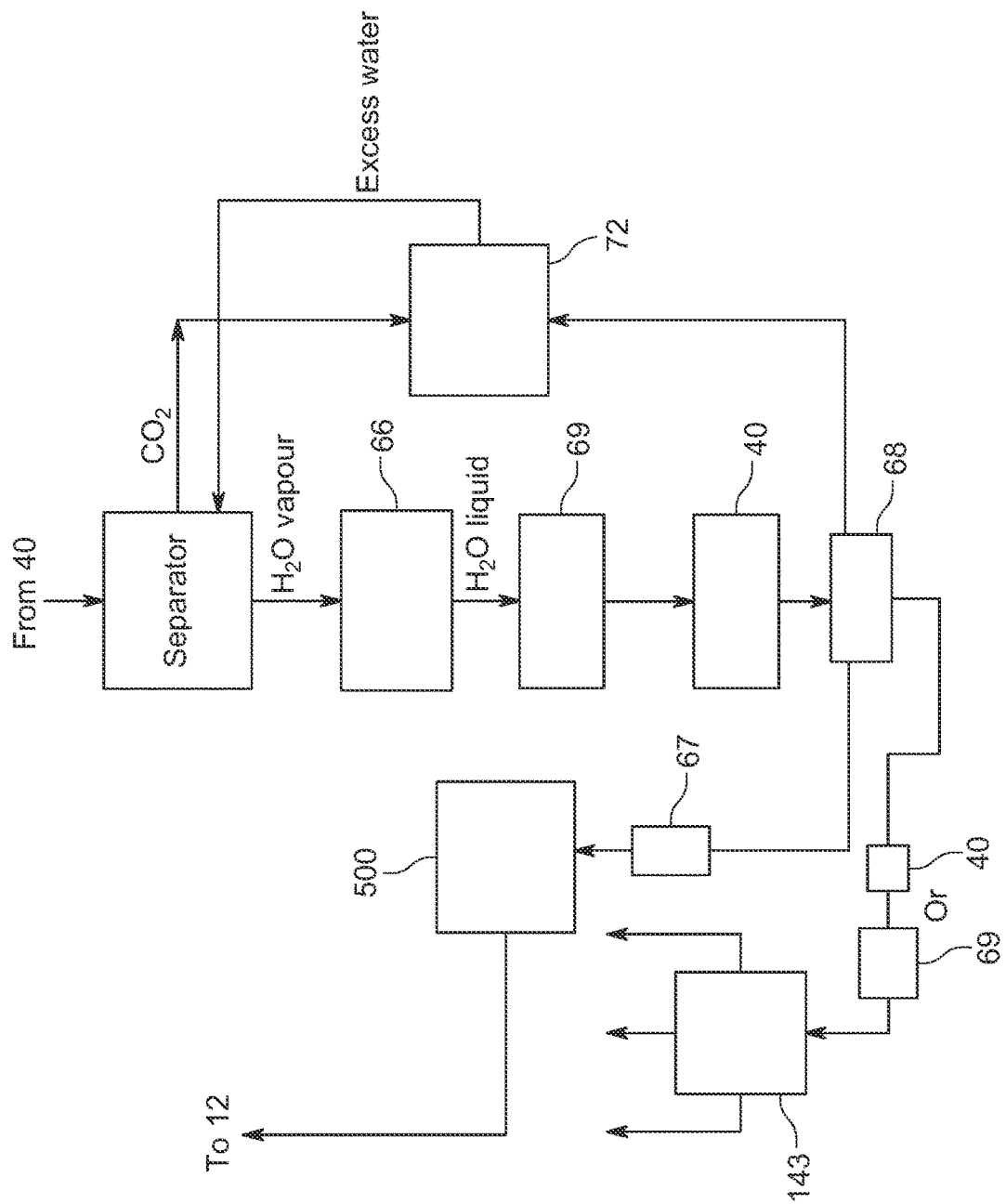
FIG. 78 is a flow chart of a segment of a wastewater treatment system with a $CO_2$ separator upstream condenser unit with an ozone module secured downstream the condenser unit, a chlorination module secured downstream the ozone module and a UV-light module secured downstream the chlorination module and with a closed loop toilet system and a closed loop AC system according to a still further embodiment of the disclosure.

Referring now to FIG. 78, a subsection of a wastewater treatment system shown generally as $10^{XI}$ shows the back end of the wastewater treatment system beginning with evaporator module 48. As described in more detail herein, water vapor produced by the evaporator module is transferred to a condenser 66 for phrase transition to liquid water. The liquid water is then transferred to, in no particular order, an ozone module 69, a chlorination module 67 and a UV light module 40. The now purified and potable water is transferred to a holding tank 68. The water can now be used for a variety of purposes such as toilets 500, an HVAC or AC system 143, to irrigate flora 70 in a greenhouse and/or hydroponic system 72 as well as transferred and connected to a building's main water supply for general use including drinking. Any water used in the toilet systems, HVAC or AC systems and greenhouse or hydroponic systems can be returned to the treatment system at various points such as the pretreatment tank 12 or the holding tank 44 for further processing and reuse in a closed system.

Figure 91B:
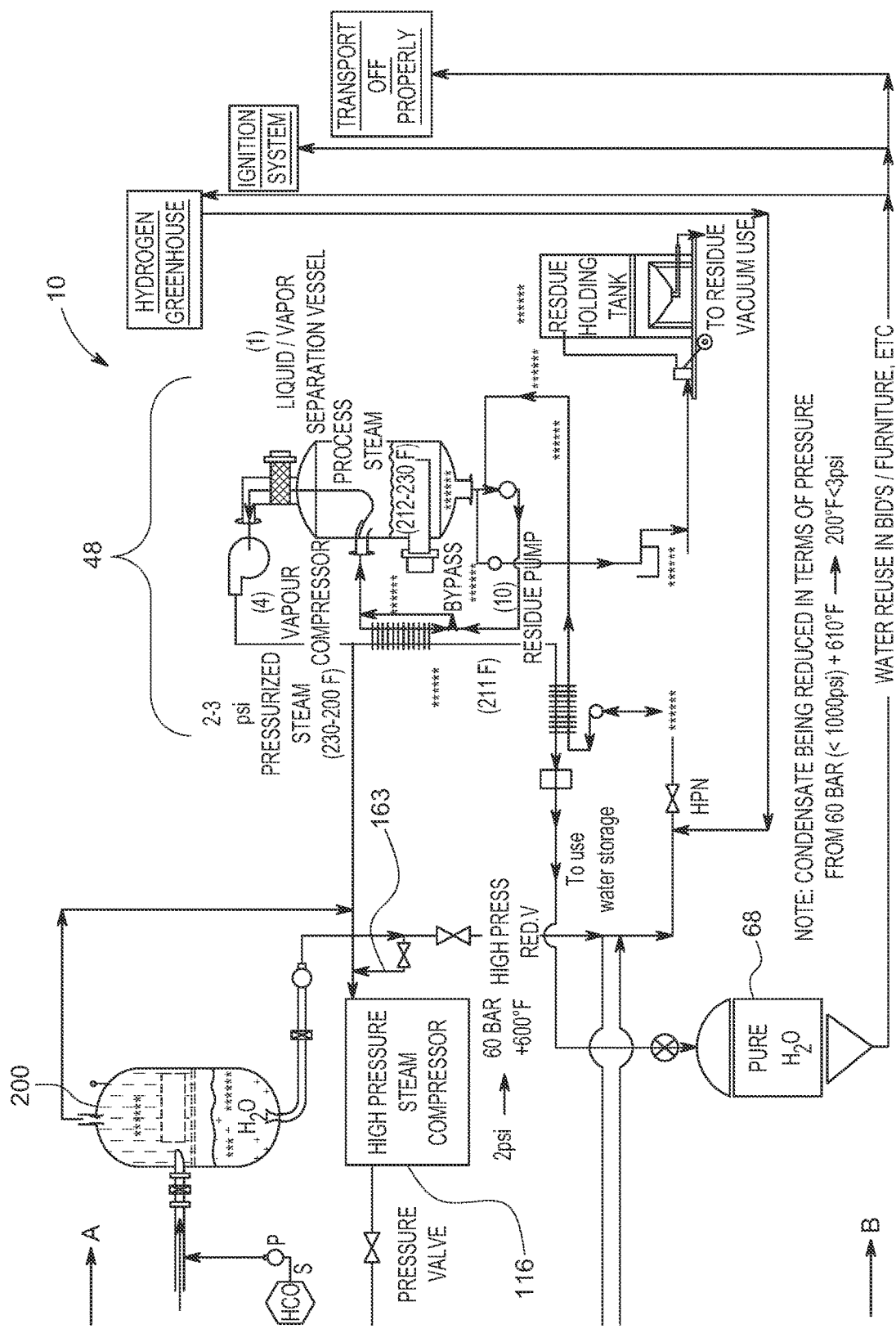

Referring now to FIGS. 91a and 91b, in a yet further aspect of the disclosure, a wastewater treatment system, designated generally as $10^{XII}$, includes a pretreatment tank module 12 connected upstream from a filtration module 11 connected upstream a diatomaceous filtration module 11' connected upstream a holding tank 44 connected upstream an autoclave module 80' connected upstream a flash tank 200 connected upstream an evaporator 48, which is connected ultimately to holding tank 68. Purified water in holding tank 68 may be used for multiple purposes including building reuse, water for hydroponic and/or greenhouse 72, an irrigation system and/or transfer offsite for other uses such as pool water. In this system $10^{XII}$, a steam recirculation path 163 is used to return high-pressure/high-temperature steam derived from the autoclave chamber and flash tank back to compressor 116 for use in another autoclave effluent treatment process. By circulating back high-pressure steam to the compressor, the compressor will not have to work as hard to get the steam back to the operational pressure/temperature needed to perform another autoclave cycle. The high-steam recirculation path can go directly from the autoclave module to the compressor or from the flash tank to the compressor. Once the high-pressure steam and processed effluent is allowed to reside in flash tank 200, it exits the flash tank at about 75 psig at about 300° F.

System $10^{XII}$ can be modified by eliminating filtration module 11 so that pretreatment module 12 is connected upstream from diatomaceous earth filter module 11'. It can further be modified with the addition of odor control module 400 as shown in FIG. 91A. In a yet further alternative embodiment, more than one pretreatment module 12 may be used to serially reduce the turbidity of the wastewater to improve the function of the diatomaceous earth filter module 11'.

At this point, i.e., after any of the disclosed wastewater treatment configurations are operated, the water should be pure and should contain no unwanted substances. Testing can be performed by sending test samples to labs to test for contaminants such as PFAS, Legionnaire's disease (Listeria) and now COVID-19. Because of the treatments used in the system, there should be no contaminants, not even trace amounts.

Any particulate matter separated in the pre-treatment, filtration and evaporator modules is transferred to a particulates/solids holding tank as disclosed herein for removal and offsite processing. The solids should be free of pathogens and toxic chemicals due to the treatments provided by the sonolysis units and the autoclave units along with the optional microwave treatment. One possible use for the solids is use as fertilizers.

Once the water component has been distilled by the evaporator units, the water should be free of all nitrates, nitrites, bromates, bromides, pathogens and toxic chemicals. It is pure water. The pathogens and toxic chemicals are neutralized by the sonolysis and/or autoclave units. Particularly, PFAS compounds are neutralized into fluorine-based compounds that do not pose a health risk. Any post-evaporator treatments, such as with the ozone, chlorination and UV unit modules, is intended to meet or exceed any federal, state and local regulatory requirements for the reclamation and reuse of water. The sludge component is equally neutralized of any pathogens and can safely be used as a fertilizer/soil enrichment composition to revitalize soil depleted of its natural biome elements. The system enables human consumption and waste to be cycled back into the soil to recreate natural biological processes and natural dynamic systems of environmental health. It further provides reclaimed sources of minerals for remineralization of water, if desired.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by Letters Patent is:

1. A wastewater/water treatment and management system for processing wastewater with a solids component comprising:
   at least one pre-treatment tank or module for separating solids from liquids;
   at least one filtration module to filter solids from liquids connected downstream from the at least one pre-treatment tank or module via piping;
   an inlet pipe having an upstream end and a downstream end, wherein the upstream end is connected to, and downstream from, the at least one filtration module;
   at least one autoclave module connected to, and downstream from, the inlet pipe, wherein each of the at least one autoclave module is selected from the group consisting of a first autoclave module comprising a plurality of autoclave pipes and an autoclave jacket, wherein the plurality of pipes are secured to an inlet manifold at an inlet end and an outlet manifold at an outlet end, wherein the inlet manifold is connected to, and in fluid communication with, the inlet pipe, wherein the outlet manifold is connected to, upstream from, and in fluid communication with, an outlet pipe, wherein the outlet pipe is downstream from the first autoclave module, wherein the autoclave jacket is secured about the plurality of autoclave pipes and secured to the inlet pipe at an inlet jacket end and to the outlet pipe at an outlet jacket end, and wherein the combination of the autoclave jacket, inlet jacket end, outlet jacket end and plurality of autoclave pipes form an autoclave chamber, and a second autoclave module comprising at least one serpentine autoclave pipe and an autoclave jacket, wherein an inlet end of the at least one serpentine autoclave pipe is connected to, downstream from, and in fluid communication with, the inlet pipe, wherein an outlet end of the at least one serpentine pipe is connected to, upstream from, and in fluid communication with, the outlet pipe, wherein the autoclave jacket is secured about the at least one serpentine autoclave pipe and secured to the inlet pipe at an inlet jacket end and to the outlet pipe at an outlet jacket end, and wherein the combination of the autoclave jacket, inlet jacket end, outlet jacket end and the at least one serpentine autoclave pipe form an autoclave chamber and combinations thereof; and, at least one evaporator module connected to, and downstream from, the outlet pipe to distill effluent received by the at least one evaporator module.

2. The wastewater/water treatment and management system of claim 1 further comprising at least one condenser unit connected via piping to, and downstream from, the at least one evaporator module to condense water vapor created by the at least one evaporator module and at least one water holding tank connected via piping to, and downstream from, the at least one condenser unit for receiving water vapor condensed into water by the condenser unit.

3. The wastewater/water treatment and management system of claim 2 further comprising at least one post-distillation water treatment module selected from the group consisting of a UV-light module, an ozone module, a chlorination module and combinations thereof, wherein the at least one post-distillation module is inserted between the at least one condenser unit and the at least one holding tank, wherein the at least one post-distillation module is connected via piping to, and downstream from, the at least one condenser unit and connected via piping to, and upstream from, the at least one water holding tank.

4. The wastewater/water treatment and management system of claim 1 further comprising at least one flash tank connected via piping to, and downstream from, the at least one autoclave module and connected via piping to, and upstream from, the at least one evaporator module.

5. The wastewater/water treatment and management system of claim 4 further comprising a steam return pipe connected between each of the at least one autoclave module and the at least one flash tank to return steam in the autoclave chamber of each of the at least one autoclave module to the at least one evaporator module via the at least one flash tank after operation of the at least one autoclave module.

6. The wastewater/water treatment and management system of claim 1 further comprising a microwave unit secured to the at least one pre-treatment tank or module and/or to the at least one filtration module to treat solids derived from the pre-treatment and/or filtration modules before off-site removal of the solids.

7. The wastewater/water treatment and management system of claim 1 further comprising at least one effluent storage tank connected via piping to, and downstream from, the at least one filtration module and connected via piping to, and upstream from the at least one autoclave module.

8. The wastewater/water treatment and management system of claim 7 further comprising-an ozone odor control module positioned about, or in close proximity to, the at least one pre-treatment tank or module and/or the at least one filtration module to capture and neutralize gases produced by, or escaped from, the at least one pre-treatment tank or module and/or the at least one filtration module.

9. The wastewater/water treatment and management system of claim 1 further comprising an ozone odor control module positioned about, or in close proximity to, the at least one pre-treatment tank or module and/or the at least one filtration module to capture and neutralize gases produced by, or escaped from, the at least one pre-treatment tank or module and/or the at least one filtration module.

10. A wastewater/water treatment and management system comprising an autoclave module comprising a plurality of one-piece autoclave pipes and an autoclave jacket, wherein each of the plurality of one-piece pipes are secured to an inlet manifold at an inlet end and to an outlet manifold at an outlet end, wherein the inlet manifold is connected to, and in fluid communication with, an inlet pipe, wherein the outlet manifold is connected to, and in fluid communication with, an outlet pipe, wherein the autoclave jacket is secured about the plurality of autoclave pipes and secured to the inlet pipe at an inlet jacket end and to the outlet pipe at an outlet jacket end, and wherein the combination of the autoclave jacket, inlet jacket end, outlet jacket end and plurality of one-piece autoclave pipes form an autoclave chamber.

11. The wastewater/water treatment and management system of claim 10 further comprising an inlet valve positioned in-line with the inlet pipe upstream of the at least one autoclave module and an outlet valve positioned in-line with the outlet pipe downstream of the at least one autoclave module, wherein the inlet valve and the outlet valve are in fluid communication with the plurality of autoclave pipes.

12. The wastewater/water treatment and management system of claim 11 further comprising at least one evaporator module connected via piping to, and downstream from, the at least one autoclave module and a steam delivery pipe connected between the at least one autoclave module and the at least one evaporator module for transferring steam generated by the at least one evaporator module to the autoclave chamber formed in the at least one autoclave module.

13. The wastewater/water treatment and management system of claim 12 further comprising at least one steam exhaust pipe connected to the autoclave jacket and in fluid communication with the autoclave chamber at one end and connected to, and in fluid communication with, the at least one evaporator module at a second end to return steam in the autoclave chamber to the at least one evaporator module after operation of the at least one autoclave module, wherein the at least one steam exhaust pipe includes at least one valve.

14. The wastewater/water treatment and management system of claim 10 further comprising at least one steam compressor connected via piping at one end to the autoclave module, wherein the piping has a lumen and is connected to the autoclave jacket, wherein the lumen of the piping and the at least one steam compressor are in fluid communication with the autoclave chamber.

15. The wastewater/water treatment and management system of claim 14 further comprising at least one flash tank, wherein the at least one flash tank is secured to a downstream end of the outlet pipe, and wherein the plurality of autoclave pipes, the inlet manifold, the outlet manifold, the outlet pipe and the at least one flash tank are in fluid communication.

16. A wastewater/water treatment and management system comprising an autoclave module comprising at least one single-piece serpentine autoclave pipe and an autoclave jacket, wherein an inlet end of the at least one single-piece serpentine autoclave pipe is connected to, and in fluid communication with, an inlet pipe, wherein an outlet end of the at least one single-piece serpentine pipe is connected to, and in fluid communication with, an outlet pipe, wherein the autoclave jacket is secured about the at least one single-piece serpentine autoclave pipe and secured to the inlet pipe at an inlet jacket end and to the outlet pipe at an outlet jacket end, and wherein the combination of the autoclave jacket, inlet jacket end, outlet jacket end and the at least one single-piece serpentine autoclave pipe form an autoclave chamber.

17. The wastewater/water treatment and management system of claim 16 further comprising an inlet valve positioned in-line with the inlet pipe upstream of the autoclave module and an outlet valve positioned in-line with the outlet pipe downstream of the autoclave module, wherein the inlet valve and the outlet valve are in fluid communication with the at least one serpentine autoclave pipe.

18. The wastewater/water treatment and management system of claim 17 further comprising at least one evaporator module connected via piping to, and downstream from, the autoclave module and a steam delivery pipe connected between the autoclave module and the at least one evaporator module for transferring steam generated by the at least one evaporator module to the autoclave chamber formed in the autoclave module.

19. The wastewater/water treatment and management system of claim 18 further comprising at least one steam exhaust pipe connected to the autoclave jacket and in fluid communication with the autoclave chamber at one end and connected to, and in fluid communication with, the at least one evaporator module at a second end to return steam in the autoclave chamber to the at least one evaporator module after operation of the autoclave module, wherein the at least one steam exhaust pipe includes at least one valve.

20. The wastewater/water treatment and management system of claim 16 further comprising at least one steam compressor connected via piping at one end to the autoclave module, wherein the piping has a lumen and is connected to the autoclave jacket, wherein the lumen of the piping and the at least one steam compressor are in fluid communication with the autoclave chamber.

21. The wastewater/water treatment and management system of claim 20 further comprising at least one flash tank, wherein the at least one flash tank is secured to a downstream end of the outlet pipe, and wherein the at least one single-piece serpentine autoclave pipe, the outlet pipe and the at least one flash tank are in fluid communication.

22. A wastewater/water treatment and management system for processing wastewater with a solids component comprising:
at least one pre-treatment tank or module for separating solids from liquids;
at least one filtration module to filter solids from liquids connected to, and downstream from, the at least one pre-treatment tank or module via piping;
an odor control module positioned about, or in close proximity to, the at least one pre-treatment tank or module and/or the at least one filtration module to capture and neutralize gases produced by, or escaped from, the at least one pre-treatment tank or module and/or the at least one filtration module;
at least one autoclave module having an autoclave jacket and an autoclave pipe secured in the autoclave jacket, wherein the autoclave pipe is selected from the group consisting of a plurality of autoclave pipes secured with inlet and outlet manifolds, a serpentine autoclave pipe and combinations thereof, wherein the autoclave jacket defines an autoclave chamber, and wherein the at least one autoclave module is connected via piping to, and downstream from, the at least one filtration module; and,
at least one evaporator module connected via piping to, and downstream from, the at least one autoclave module to distill effluent received by the at least one evaporator module.

23. The wastewater/water treatment and management system of claim 22 further comprising at least one condenser unit connected via piping to, and downstream from, the at least one evaporator module to condense water vapor created by the at least one evaporator module, wherein the at least one condenser unit is connected to, and downstream from, the at least one evaporator module via piping.

24. The wastewater/water treatment and management system of claim 23 further comprising at least one water holding tank connected to, and downstream from, the at least one condenser unit for receiving water vapor condensed into water by the at least one condenser unit.

25. The wastewater/water treatment and management system of claim 24 further comprising at least one post-distillation water treatment module selected from the group consisting of a UV-light module, an ozone module, a chlorination module and combinations thereof, wherein the at least one post-distillation module is connected to, and downstream from, the at least one evaporator module and connected to, and upstream from, the at least one water holding tank.

26. The wastewater/water treatment and management system of claim 22 further comprising at least one flash tank connected via piping to, and downstream from, the at least one autoclave module and connected via piping to, and upstream from, the at least one evaporator module.

27. The wastewater/water treatment and management system of claim 22 further comprising a $CO_2$ collector connected via piping to, and downstream from, the at least one evaporator module.

28. The wastewater/water treatment and management system of claim 22 further comprising a microwave unit secured to the at least one pre-treatment tank or module and/or the at least one filtration module to treat solids derived from the pre-treatment and/or filtration modules before off-site removal of the solids.

29. A wastewater/water treatment and management system for treating wastewater without solids comprising:
at least one autoclave module having an autoclave jacket and an autoclave pipe secured in the autoclave jacket, wherein the autoclave pipe is selected from the group consisting of a plurality of one-piece autoclave pipes secured with inlet and outlet manifolds, a one-piece serpentine autoclave pipe and combinations thereof, wherein the autoclave jacket defines an autoclave chamber; and,
at least one evaporator module connected via piping to, and downstream from, the at least one autoclave module.

30. The wastewater/water treatment and management system of claim 29 further comprising at least one condenser unit connected to, and downstream from, the at least one evaporator module to condense water vapor created by the at least one evaporator module.

31. The wastewater/water treatment and management system of claim 30 further comprising at least one water holding tank connected via piping to, and downstream from, the at least one condenser unit for receiving water vapor condensed into water by the at least one condenser unit.

32. The wastewater/water treatment and management system of claim 29 wherein the wastewater treatment and management system further comprises a steam delivery pipe connected between each of the at least one autoclave module and the at least one evaporator module for transferring steam generated by the at least one evaporator module to the autoclave chamber formed in each of the at least one autoclave module and at least one steam exhaust pipe connected to the autoclave jacket and in fluid communication with the autoclave chamber at one end and connected to, and in fluid communication with, the at least one evaporator module at a second end to return steam in the autoclave chamber to the at least one evaporator module after operation of each of the at least one autoclave module, wherein the at least one steam exhaust pipe includes at least one valve.

33. The wastewater/water treatment and management system of claim 29 further comprising at least one flash tank connected via piping to, and downstream from, the at least one autoclave module and connected via piping to, and upstream from, the at least one evaporator module.

34. The wastewater/water treatment and management system of claim 33 further comprising a steam return pipe connected between each of the at least one autoclave module and the at least one flash tank to return steam in the autoclave chamber to the at least one evaporator module via the at least one flash tank after operation of the at least one autoclave module.

35. A wastewater/water treatment and management system for processing wastewater with a solids component comprising:
at least one filtration module to filter solids from liquids;
at least one autoclave module having an autoclave jacket and an autoclave pipe secured in the jacket, wherein the autoclave pipe is selected from the group consisting of a plurality of autoclave pipes secured with inlet and outlet manifolds, a serpentine autoclave pipe and combinations thereof, wherein the autoclave jacket defines an autoclave chamber, and wherein the at least one autoclave module is connected via piping to, and downstream from, the at least one filtration module; and,
at least one evaporator module connected via piping to, and downstream from, the at least one autoclave module to distill effluent received by the at least one evaporator module.

36. The wastewater/water treatment and management system of claim 35 further comprising an ozone odor control module positioned about, or in close proximity to, the at least one filtration module to capture and neutralize gases produced by, or escaped from, the at least one filtration module.

37. The wastewater/water treatment and management system of claim 36 further comprising at least one effluent storage tank connected via piping to, and downstream from, the at least one filtration module and connected via piping to, and upstream from, the at least one water treatment module.

38. The wastewater/water treatment and management system of claim 35 further comprising at least one condenser unit connected to, and downstream from, the at least one evaporator module to condense water vapor created by the at least one evaporator module.

39. A wastewater/water treatment and management system for processing wastewater with a solids component comprising:
at least one pre-treatment tank or module for separating solids from liquids;
at least one autoclave module having an autoclave jacket and an autoclave pipe secured in the jacket, wherein the autoclave pipe is selected from the group consisting of a plurality of autoclave pipes secured with inlet and outlet manifolds, a serpentine autoclave pipe and combinations thereof, wherein the autoclave jacket defines an autoclave chamber, and wherein the at least one water treatment module is connected via piping to, and downstream from, the at least one pre-treatment tank or module; and,
at least one evaporator module connected via piping to, and downstream from, the at least one autoclave module to distill effluent received by the at least one evaporator module.

40. The wastewater/water treatment and management system of claim 39 further comprising at least one condenser unit connected via piping to, and downstream from, the at least one evaporator module.

41. The wastewater/water treatment and management system of claim 40 further comprising at least one effluent storage tank connected via piping to, and downstream from, the at least one pretreatment tank or module and connected via piping to, and upstream from the at least one autoclave module.

42. The wastewater/water treatment and management system of claim 41 further comprising at least one flash tank connected via piping to, and downstream from, the at least one autoclave module and connected via piping to, and upstream from, the at least one evaporator module.

43. The wastewater/water treatment and management system of claim 42 further comprising at least one water holding tank connected via piping to, and downstream from, the condenser unit for receiving water vapor condensed into water by the condenser unit.

44. The wastewater/water treatment and management system of claim 43 further comprising at least one post-distillation water treatment module selected from the group consisting of a UV-light module, an ozone module, a chlorination module and combinations thereof, wherein the at least one post-distillation module is connected via piping to, and downstream from, the at least one condenser unit and connected via piping to, and upstream from, the at least one water holding tank.

45. The wastewater/water treatment and management system of claim 44 further comprising a re-mineralization module connected via piping to, and downstream from, the at least one post-distillation water treatment module to re-mineralize the distilled and treated water.

46. The wastewater/water treatment and management system of claim 42 further comprising at least one steam compressor connected via piping at one end to the at least one flash tank and connected via piping at a second end to the autoclave jacket of the at least one autoclave module, wherein the lumen of the piping and the at least one steam compressor are in fluid communication with the autoclave chamber of the at least one autoclave module.

47. The wastewater/water treatment and management system of claim 39 further comprising a building water use system selected from the group consisting of a toilet system, an HVAC or air conditioning system, a rainwater gutter system and combinations thereof, wherein the building water use system is connected via piping to one or more components of the wastewater/water treatment and management system to capture and process wastewater, air conditioning condensate and rainwater.

48. The wastewater/water treatment and management system of claim 39 further comprising at least one steam compressor connected via piping at one end to the at least one evaporator module and connected via piping at a second end to the autoclave jacket of the at least one autoclave module, wherein the lumen of the piping, the at least one steam compressor and the at least one evaporator module are in fluid communication with the autoclave chamber of the at least one autoclave module.

49. The wastewater/water treatment and management system of claim 39 further comprising at least one steam compressor connected via piping at one end to the autoclave jacket of the at least one autoclave module and connected via a second set of piping at a second end to the autoclave jacket of the at least one autoclave module, wherein the lumen of the piping is in fluid communication with the autoclave chamber, wherein the lumen of the piping the second set of piping, the autoclave jacket and the at least one steam compressor are in fluid communication and form a closed loop for the delivery of compressed steam from the at least one steam compressor to the autoclave chamber.

* * * * *